United States Patent
Yi et al.

(10) Patent No.: US 12,426,042 B2
(45) Date of Patent: *Sep. 23, 2025

(54) UPLINK CONTROL MULTIPLEXING OF A PUCCH REPETITION

(71) Applicant: Ofinno, LLC, Reston, VA (US)

(72) Inventors: Yunjung Yi, Vienna, VA (US); Hua Zhou, Vienna, VA (US); Esmael Hejazi Dinan, McLean, VA (US); Ali Cagatay Cirik, Chantilly, VA (US); Jonghyun Park, Syosset, NY (US); Kai Xu, Great Falls, VA (US)

(73) Assignee: Ofinno, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,520

(22) Filed: Jun. 11, 2024

(65) Prior Publication Data

US 2024/0334430 A1    Oct. 3, 2024

Related U.S. Application Data

(63) Continuation of application No. 17/572,183, filed on Jan. 10, 2022, now Pat. No. 12,016,016.

(Continued)

(51) Int. Cl.
*H04W 72/1268* (2023.01)
*H04W 72/21* (2023.01)
*H04W 72/23* (2023.01)

(52) U.S. Cl.
CPC ....... *H04W 72/1268* (2013.01); *H04W 72/21* (2023.01); *H04W 72/23* (2023.01)

(58) Field of Classification Search
CPC .. H04W 72/21; H04W 72/1268; H04W 72/23
See application file for complete search history.

(56) References Cited

U.S. PATENT DOCUMENTS 11,601,926 B2 *   3/2023   Yamamoto ............ H04L 1/0009
2021/0298008 A1 *  9/2021   Yamamoto .......... H04W 72/569
(Continued)

OTHER PUBLICATIONS

3GPP TS 38.213 V16.2.0 (Jun. 2020); Technical Specification; 3rd Generation Partnership Project; Technical Specification Group Radio Access Network; NR; Physical layer procedures for control; (Release 16).

(Continued)

*Primary Examiner* — Mahran Y Abu Roumi
(74) *Attorney, Agent, or Firm* — Patrick Moon; Kavon Nasabzadeh; Jacob L. Mangan

(57) ABSTRACT

A method for uplink control multiplexing of a physical uplink control channel (PUCCH) repetition may include transmitting, by a base station to a wireless device, a first message indicating PUCCHs for repetitions of uplink control information (UCI). The method may also include transmitting, by the base station, a second message indicating a number of repetitions of a transport block via physical uplink shared channels (PUSCHs) and indicating a beta offset for multiplexing the UCI via a PUSCH of the PUSCHs. The method may further include receiving, based on a coding rate that has been determined, based on the beta offset and the number of repetitions, and in response to the PUCCHs overlapping with the PUSCHs in at least one symbol, the UCI and the transport block multiplexed in the PUSCHs.

20 Claims, 38 Drawing Sheets

Related U.S. Application Data

(60) Provisional application No. 63/136,517, filed on Jan. 12, 2021, provisional application No. 63/135,305, filed on Jan. 8, 2021.

(56) References Cited

U.S. PATENT DOCUMENTS

| | | | | |
|---|---|---|---|---|
| 2022/0006502 | A1* | 1/2022 | Rahman | H04B 7/048 |
| 2022/0039140 | A1* | 2/2022 | Yi | H04L 1/08 |
| 2022/0053525 | A1* | 2/2022 | Lee | H04B 7/0645 |
| 2022/0210806 | A1* | 6/2022 | Rastegardoost | H04W 74/0833 |

OTHER PUBLICATIONS

3GPP TS 38.214 V16.3.0 (Sep. 2020); Technical Specification; 3rd Generation Partnership Project; Technical Specification Group Radio Access Network; NR; Physical layer procedures for data; (Release 16).

3GPP TS 38.321 V16.2.1 (Sep. 2020); Technical Specification; 3rd Generation Partnership Project; Technical Specification Group Radio Access Network; NR; Medium Access Control (MAC) protocol specification; (Release 16).

3GPP TS 38.331 V16.2.0 (Sep. 2020); Technical Specification; 3rd Generation Partnership Project; Technical Specification Group Radio Access Network; NR; Radio Resource Control (RRC) protocol specification; (Release 16).

R1-2007583; 3GPP TSG RAN WG1 Meeting #103-e; E-meeting, Oct. 26-Nov. 13, 2020; Agenda Item: 8.8.2.1; Source: Huawei, HiSilicon; Title: Potential solutions for PUSCH coverage enhancement; Document for: Discussion and Decision.

R1-2007640; 3GPP TSG RAN WG1 #103-e; e-Meeting, Oct. 26-Nov. 13, 2020; Source: Xiaomi; Title: PUSCH coverage enhancement; Agenda Item: 8.8.2.1; Document for: Discussion and Decision.

R1-2007680; 3GPP TSG RAN WG1 #103-e; e-Meeting, Oct. 26-Nov. 13, 2020; Source: vivo; Title: Discussion on solutions for PUSCH coverage enhancement; Agenda Item: 8.8.2.1; Document for: Discussion and Decision.

R1-2007743; 3GPP TSG RAN WG1 #103-e; e-Meeting, Oct. 26-Nov. 13, 2020; Source: ZTE Corporation; Title: Discussion on potential techniques for PUSCH; Agenda item: 8.8.2.1; Document for: Discussion/Decision.

R1-2007874; 3GPP TSG RAN WG1 Meeting #103-e; e-Meeting, Oct. 26-Nov. 13, 2020; Source: CATT; Title: Discussion on potential techniques for PUSCH coverage enhancement; Agenda Item: 8.8.2.1; Document for: Discussion and Decision.

R1-2007905; 3GPP TSG RAN WG1 Meeting #103-e; Oct. 26-Nov. 13, 2020; Agenda Item: 8.8.2.1; Source: IITH, CeWiT, IITM, Reliance Jio, Tejas Networks; Title: PUSCH coverage enhancements; Document for: Discussion and decision.

R1-2007930; 3GPP TSG RAN WG1 #103-e; e-Meeting, Oct. 26-Nov. 13, 2020; Agenda item: 8.8.2.1 Potential techniques for coverage enhancements—PUSCH; Source: Sierra Wireless; Title: Potential techniques for NR coverage enhancements; Document for: Discussion and decision.

R1-2007954; 3GPP TSG RAN WG1 #103-e; e-Meeting, Oct. 26-Nov. 13, 2020; Source: Intel Corporation; Title: On potential techniques for PUSCH coverage enhancement; Agenda item: 8.8.2.1; Document for: Discussion and Decision.

R1-2007989; 3GPP TSG RAN WG1 #103; e-Meeting, Oct. 26-Nov. 13, 2020; Source: ETRI; Title: PUSCH coverage enhancement; Agenda Item: 8.8.2.1 PUSCH coverage enhancement; Document for: Discussion.

R1-2007994; 3GPP TSG RAN WG1 #103-e; e-Meeting, Oct. 26-Nov. 13, 2020; Agenda item: 8.8.2.1; Source: China Telecom; Title: Discussion on PUSCH coverage enhancements; Document for: Discussion.

R1-2008026; 3GPP TSG RAN WG1 #103-e; e-Meeting, Oct. 26-Nov. 13, 2020; Agenda item: 8.8.2.1; Source: CMCC; Title: Discussion on the PUSCH coverage enhancement; Document for: Discussion and Decision.

R1-2008078; 3GPP TSG RAN WG1 #103-e; e-Meeting, Oct. 26-Nov. 13, 2020; Agenda item: 8.8.2.1; Source: NEC; Title: Discussion on PUSCH coverage enhancement; Document for: Discussion and Decision.

R1-2008092; 3GPP TSG RAN WG1#103-e; e-Meeting, Oct. 26-Nov. 13, 2020; Agenda Item: 8.8.2.1; Source: Spreadtrum Communications; Title: Potential solutions for PUSCH coverage enhancement; Document for: Discussion and decision.

R1-2008181; 3GPP TSG RAN WG1 #103-e; e-Meeting, Oct. 26-Nov. 13, 2020; Agenda Item: 8.8.2.1; Source: Samsung; Title: PUSCH coverage enhancement; Document for: Discussion.

R1-2008271; 3GPP TSG RAN WG1 #103-e; e-Meeting, Oct. 26-Nov. 13, 2020; Agenda Item: 8.8.2.1; Source: OPPO; Title: Consideration on PUSCH coverage enhancement; Document for: Discussion.

R1-2008370; 3GPP TSG RAN WG1#103e; E-meeting, Oct. 26-Nov. 13, 2020; Agenda Item: 8.8.2.1; Source: Sony; Title: PUSCH coverage enhancement techniques; Document for: Discussion.

R1-2008378; 3GPP TSG RAN WG1 #103-e; e-Meeting, Oct. 26-Nov. 13, 2020; Source: Panasonic; Title: Discussion on PUSCH coverage enhancements; Agenda Item: 8.8.2.1; Document for: Discussion.

R1-2008399; 3GPP TSG RAN WG1 #103-e; e-Meeting, Oct. 26-Nov. 13, 2020; Source: Sharp; Title: PUSCH coverage enhancement; Agenda Item: 8.8.2.1; Document for: Discussion and Decision.

R1-2008403; 3GPP TSG RAN WG1 #103-e; e-Meeting, Oct. 26-Nov. 13, 2020; Agenda Item: 8.8.2.1; Source: LG Electronics; Title: Discussions on PUSCH coverage enhancement; Document for: Discussion and decision.

R1-2008419; 3GPP TSG-RAN WG1 Meeting #103-e; e-Meeting, Oct. 26-Nov. 13, 2020; Agenda Item: 8.8.2.1; Source: Ericsson; Title: PUSCH coverage enhancement.

R1-2008479; 3GPP TSG RAN WG1#103; e-Meeting Oct. 26-Nov. 13, 2020; Agenda item: 8.8.2.1; Source: Apple Inc.; Title: On potential techniques for PUSCH coverage enhancement; Document for: Decision.

R1-2008483; 3GPP TSG RAN WG1 #103-e; e-Meeting, Oct. 26-Nov. 13, 2020; Agenda Item: 8.8.2.1; Source: InterDigital Inc.; Title: PUSCH coverage enhancements; Document for: Discussion and Decision.

R1-2008559; 3GPP TSG RAN WG1 #103e; e-Meeting, Oct. 26-Nov. 13, 2020; Source: NTT DOCOMO, Inc.; Title: Potential techniques for PUSCH coverage enhancements; Agenda Item: 8.8.2.1; Document for: Discussion.

R1-2008626; 3GPP TSG-RAN WG1 Meeting #103e; e-Meeting, Oct. 26-Nov. 13, 2020; Agenda item: 8.8.2.1; Source: Qualcomm Incorporated; Title: Potential coverage enhancement techniques for PUSCH; Document for: Discussion/Decision.

R1-2008700; 3GPP TSG RAN WG1#103-e; e-Meeting, Oct. 26-Nov. 13, 2020; Source: NICT; Title: On the use of Tx diversity in DFT-s-OFDM for PUSCH coverage enhancement; Agenda Item: 8.8.2.1; Document for: Discussion and Decision.

R1-2008703; 3GPP TSG RAN WG1 #103; e-Meeting, Oct. 26-Nov. 13, 2020; Agenda item: 8.8.2.1; Source: Nokia, Nokia Shanghai Bell; Title: Discussion on approaches and solutions for NR PUSCH coverage enhancement; Document for: Discussion and Decision.

R1-2008729; 3GPP TSG RAN WG1 #103-e; e-Meeting, Oct. 26-Nov. 13, 2020; Source: WILUS Inc.; Title: Discussion on potential techniques for PUSCH coverage enhancement; Agenda item: 8.8.2.1; Document for: Discussion/Decision.

R1-2008743; 3GPP TSG RAN WG1 #102-e; e-Meeting, Oct. 26-Nov. 13, 2020; Source: Mitsubishi Electric; Title: On transmit diversity techniques for PUSCH coverage enhancement; Agenda Item: 8.8.2.1PUSCH coverage enhancement; Document for: Discussion/Decision.

R1-2009168; 3GPP TSG RAN WG1 #103-e; e-Meeting, Oct. 26-Nov. 13, 2020; Agenda Item: 8.8.2.1; Source: InterDigital Inc.; Title: PUSCH coverage enhancements; Document for: Discussion and Decision.

(56) References Cited

OTHER PUBLICATIONS

R1-2009320; 3GPP TSG RAN WG1 Meeting #103-e; E-meeting, Oct. 26-Nov. 13, 2020; Agenda Item: 8.8.2.1; Source: Moderator (China Telecom); Title: FL summary of PUSCH coverage enhancements; Document for: Discussion.

R1-2009814; 3GPP TSG RAN WG1 Meeting #103-e; E-meeting, Oct. 26-Nov. 13, 2020; Agenda Item: 8.8.2.1; Source: Moderator (China Telecom); Title: [103-e-NR-CovEnh-04] Summary of email discussion on PUSCH coverage enhancements; Document for: Discussion.

RP-202919; 3GPP TSG RAN#90e; e-Meeting, Dec. 7-11, 2020; Agenda item:; Source: 3GPP TSG RAN1 Chairman; Title: Email Summary on Rel-17 Coverage Enhancements Work Item Scoping; Document for: Discussion/Decision.

RP-202928; 3GPP TSG RAN meeting #90e; Electronic Meeting, Dec. 7-11, 2020; Source: China Telecom; Title: New WID on NR coverage enhancements; Document for: Approval; Agenda Item: 9.1.1.

\* cited by examiner

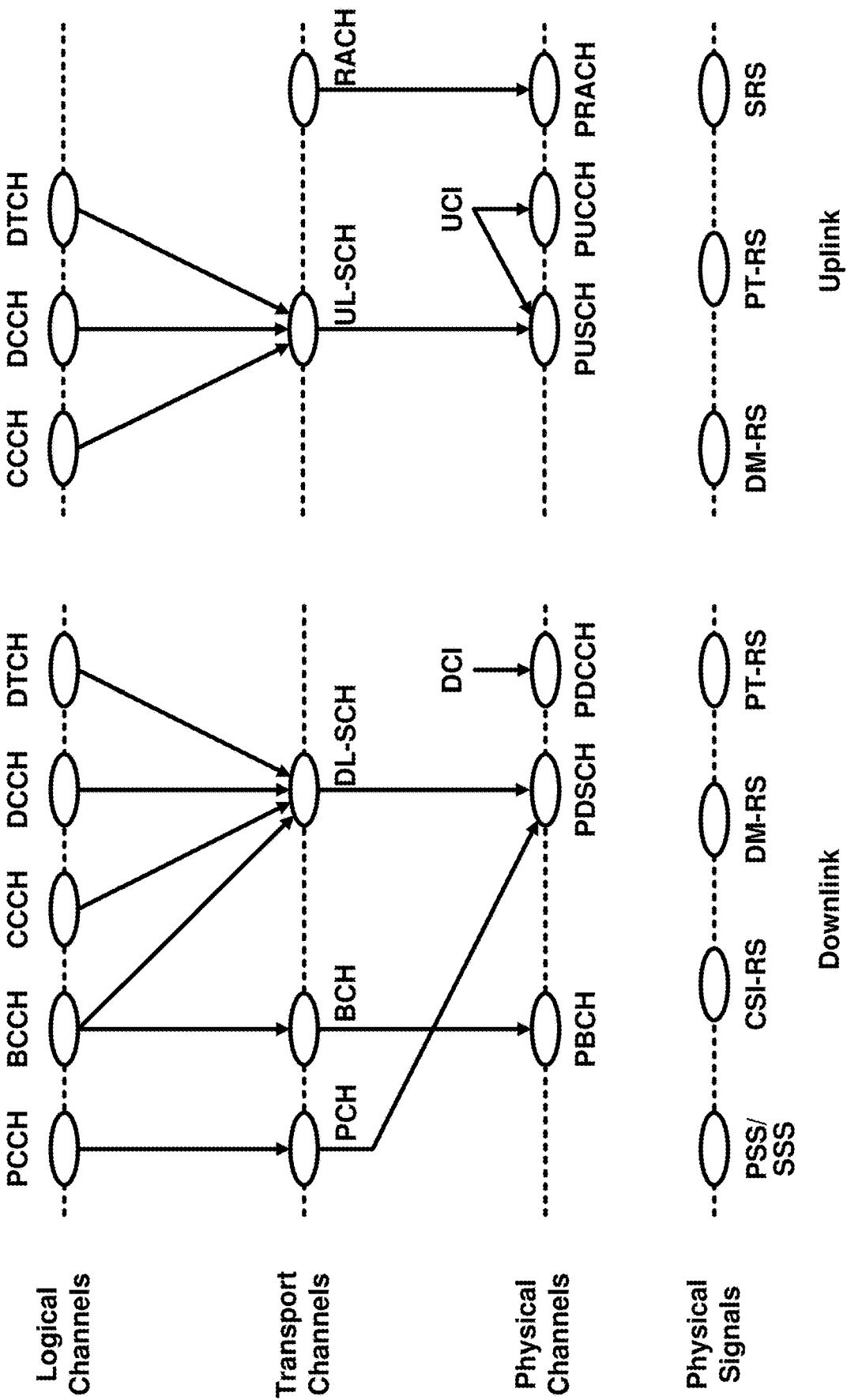

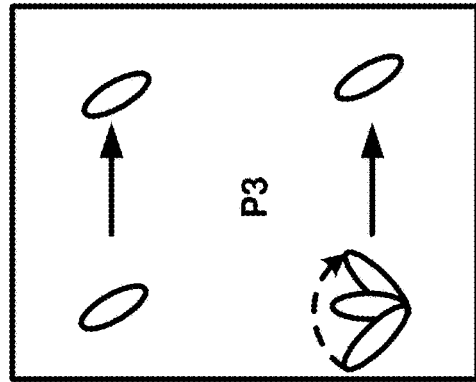
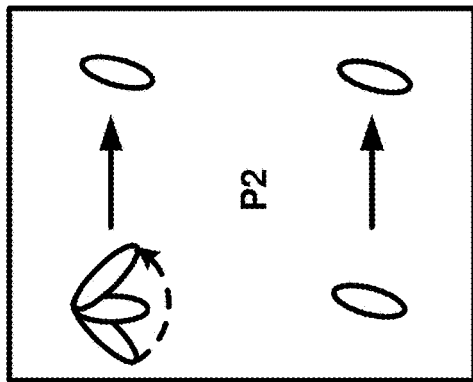
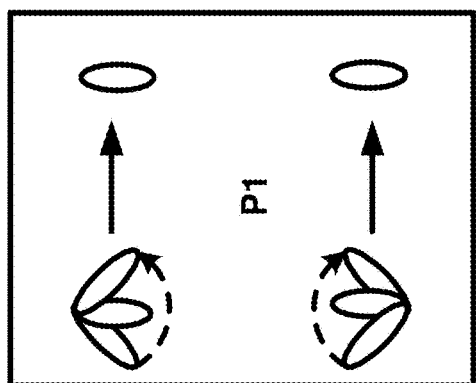
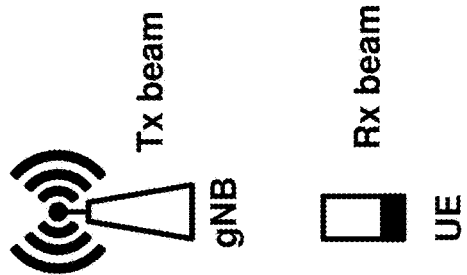
FIG. 12A
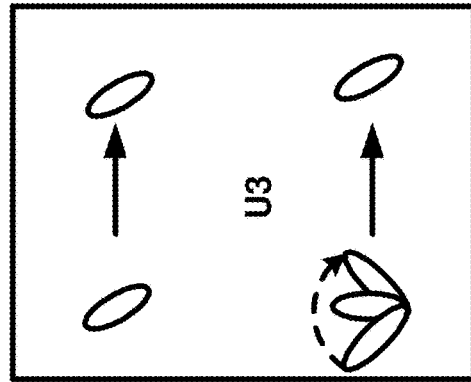
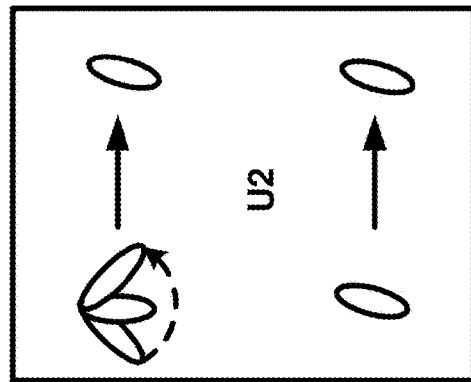
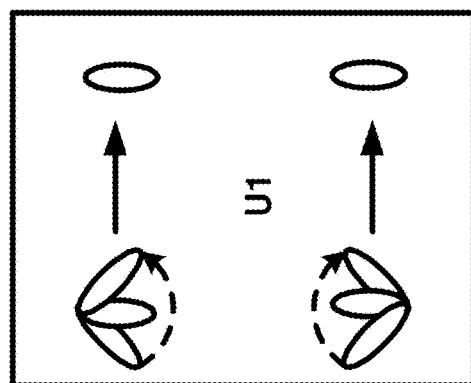
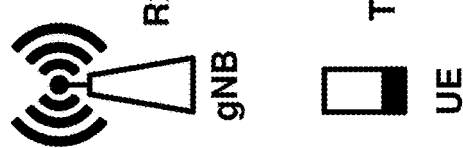
FIG. 12B

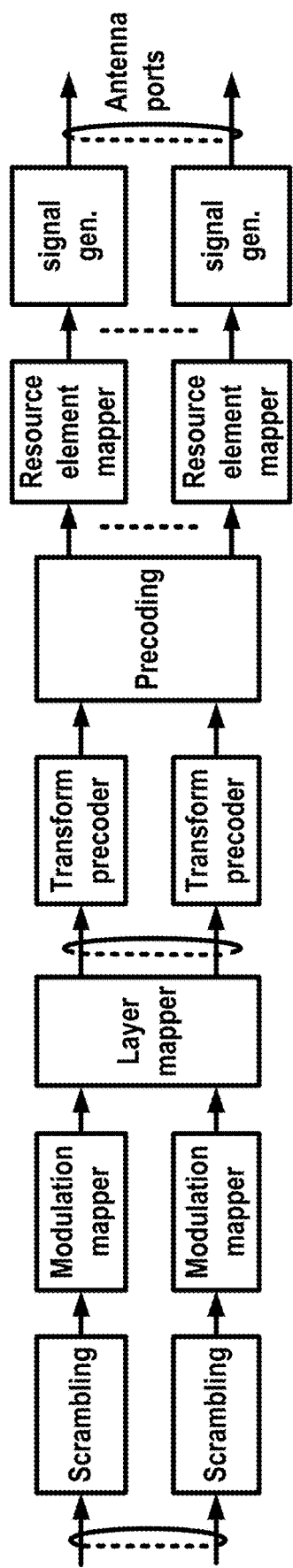
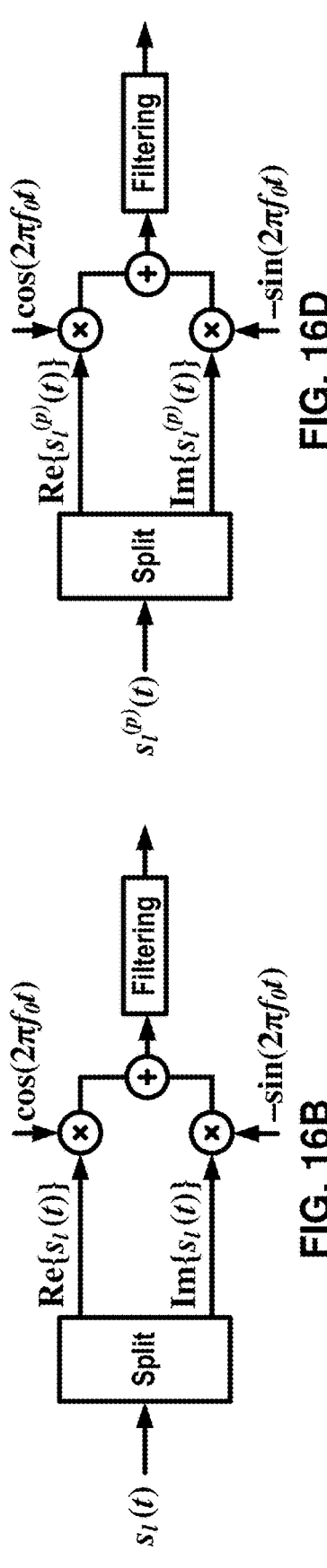
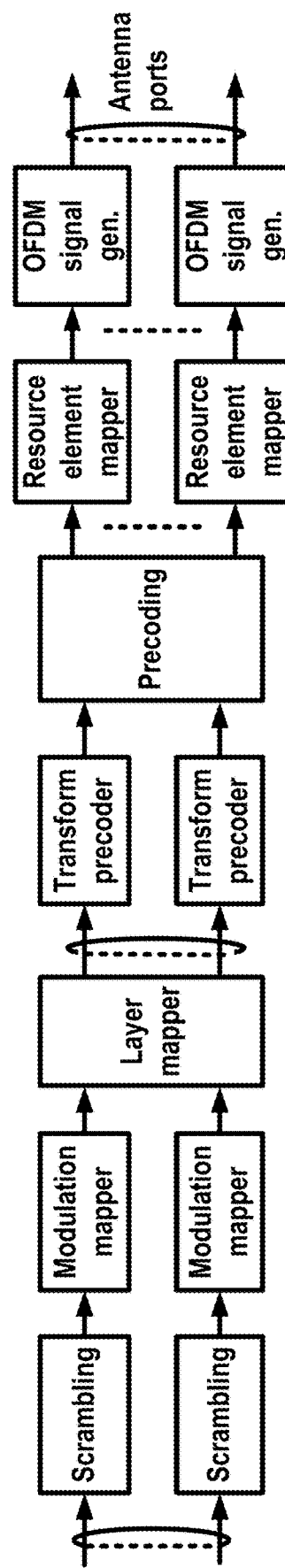
FIG. 16A
FIG. 16B
FIG. 16C
FIG. 16D

| $I_{offset,0}^{HARQ-ACK}$ or $I_{offset,1}^{HARQ-ACK}$ or $I_{offset,2}^{HARQ-ACK}$ or $I_{offset}^{CG-UCI}$ | $\beta_{offset}^{HARQ-ACK}$ or $\beta_{offset}^{HARQ-UCI}$ |
|---|---|
| 0 | 1.000 |
| 1 | 2.000 |
| 2 | 2.500 |
| 3 | 3.125 |
| 4 | 4.000 |
| 5 | 5.000 |
| 6 | 6.250 |
| 7 | 8.000 |
| 8 | 10.000 |
| 9 | 12.625 |
| 10 | 15.875 |
| 11 | 20.000 |
| 12 | 31.000 |
| 13 | 50.000 |
| 14 | 80.000 |
| 15 | 126.000 |
| 16-31 | Reserved |

FIG. 35

| Beta_offset Indicator | $(I_{offset,0}^{HARQ-ACK}$ or $I_{offset,1}^{HARQ-ACK}$ or $I_{offset,2}^{HARQ-ACK})$, $(I_{offset,0}^{CSI-1}$ or $I_{offset,0}^{CSI-2})$, $(I_{offset,1}^{CSI-1}$ or $I_{offset,1}^{CSI-2})$ |
|---|---|
| '00' | 1st offset index provided by higher layers |
| '01' | 2nd offset index provided by higher layers |
| '10' | 3rd offset index provided by higher layers |
| '11' | 4th offset index provided by higher layers |

FIG. 36

UPLINK CONTROL MULTIPLEXING OF A PUCCH REPETITION

CROSS-REFERENCE TO RELATED APPLICATIONS

This application is a continuation of U.S. patent application Ser. No. 17/572,183, filed Jan. 10, 2022, which claims the benefit of U.S. Provisional Application No. 63/135,305, filed Jan. 8, 2021, and U.S. Provisional Application No. 63/136,517, filed Jan. 12, 2021, all of which are hereby incorporated by reference in their entireties.

BRIEF DESCRIPTION OF THE DRAWINGS

Examples of several of the various embodiments of the present disclosure are described herein with reference to the drawings.

FIG. 5A and FIG. 5B respectively illustrate a mapping between logical channels, transport channels, and physical channels for the downlink and uplink.

FIG. 12A and FIG. 12B respectively illustrate examples of three downlink and uplink beam management procedures.

FIG. 16A, FIG. 16B, FIG. 16C, and FIG. 16D illustrate example structures for uplink and downlink transmission.

FIG. 35 illustrates an example table of a beta offset determination as per an aspect of an example embodiment of the present disclosure.

FIG. 36 illustrates an example table of a beta offset determination as per an aspect of an example embodiment of the present disclosure.

DETAILED DESCRIPTION

Figure 1A:
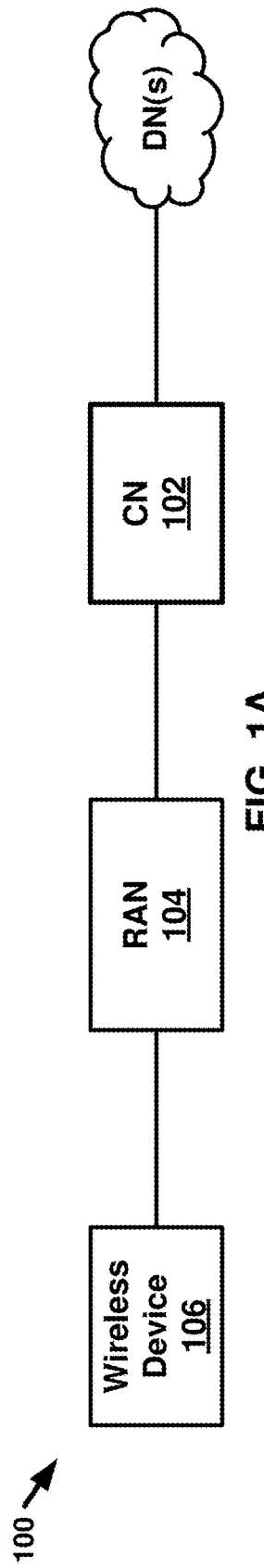
FIG. 1A and FIG. 1B illustrate example mobile communication networks in which embodiments of the present disclosure may be implemented.

In the present disclosure, various embodiments are presented as examples of how the disclosed techniques may be implemented and/or how the disclosed techniques may be practiced in environments and scenarios. It will be apparent to persons skilled in the relevant art that various changes in form and detail can be made therein without departing from the scope. In fact, after reading the description, it will be apparent to one skilled in the relevant art how to implement alternative embodiments. The present embodiments should not be limited by any of the described exemplary embodiments. The embodiments of the present disclosure will be described with reference to the accompanying drawings. Limitations, features, and/or elements from the disclosed example embodiments may be combined to create further embodiments within the scope of the disclosure. Any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, those wireless devices or base stations may perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed by one or more of the various embodiments. The terms "comprises" and "consists of", as used herein, enumerate one or more components of the element being described. The term "comprises" is interchangeable with "includes" and does not exclude unenumerated components from being included in the element being described. By contrast, "consists of" provides a complete enumeration of the one or more components of the element being described. The term "based on", as used herein, should be interpreted as "based at least in part on" rather than, for example, "based solely on". The term "and/or" as used herein represents any possible combination of enumerated elements. For example, "A, B, and/or C" may represent A; B; C; A and B; A and C; B and C; or A, B, and C.

If A and B are sets and every element of A is an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more messages comprise a plurality of parameters, it implies that a parameter in the plurality of parameters is in at least one of the one or more messages, but does not have to be in each of the one or more messages.

Many features presented are described as being optional through the use of "may" or the use of parentheses. For the sake of brevity and legibility, the present disclosure does not explicitly recite each and every permutation that may be obtained by choosing from the set of optional features. The present disclosure is to be interpreted as explicitly disclosing all such permutations. For example, a system described as having three optional features may be embodied in seven ways, namely with just one of the three possible features, with any two of the three possible features or with three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (e.g. hardware with a biological element) or a combination thereof, which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. It may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The mentioned technologies are often used in combination to achieve the result of a functional module.

FIG. 1A illustrates an example of a mobile communication network 100 in which embodiments of the present disclosure may be implemented. The mobile communication network 100 may be, for example, a public land mobile network (PLMN) run by a network operator. As illustrated in FIG. 1A, the mobile communication network 100 includes a core network (CN) 102, a radio access network (RAN) 104, and a wireless device 106.

The CN 102 may provide the wireless device 106 with an interface to one or more data networks (DNS), such as public DNS (e.g., the Internet), private DNs, and/or intra-operator DNs. As part of the interface functionality, the CN 102 may set up end-to-end connections between the wireless device 106 and the one or more DNs, authenticate the wireless device 106, and provide charging functionality.

The RAN 104 may connect the CN 102 to the wireless device 106 through radio communications over an air interface. As part of the radio communications, the RAN 104 may provide scheduling, radio resource management, and retransmission protocols. The communication direction from the RAN 104 to the wireless device 106 over the air interface is known as the downlink and the communication direction from the wireless device 106 to the RAN 104 over the air interface is known as the uplink. Downlink transmissions may be separated from uplink transmissions using frequency division duplexing (FDD), time-division duplexing (TDD), and/or some combination of the two duplexing techniques.

The term wireless device may be used throughout this disclosure to refer to and encompass any mobile device or fixed (non-mobile) device for which wireless communication is needed or usable. For example, a wireless device may be a telephone, smart phone, tablet, computer, laptop, sensor, meter, wearable device, Internet of Things (IoT) device, vehicle road side unit (RSU), relay node, automobile, and/or any combination thereof. The term wireless device encompasses other terminology, including user equipment (UE), user terminal (UT), access terminal (AT), mobile station, handset, wireless transmit and receive unit (WTRU), and/or wireless communication device.

The RAN 104 may include one or more base stations (not shown). The term base station may be used throughout this disclosure to refer to and encompass a Node B (associated with UMTS and/or 3G standards), an Evolved Node B (eNB, associated with E-UTRA and/or 4G standards), a remote radio head (RRH), a baseband processing unit coupled to one or more RRHs, a repeater node or relay node used to extend the coverage area of a donor node, a Next Generation Evolved Node B (ng-eNB), a Generation Node B (gNB, associated with NR and/or 5G standards), an access point (AP, associated with, for example, WiFi or any other suitable wireless communication standard), and/or any combination thereof. A base station may comprise at least one gNB Central Unit (gNB-CU) and at least one a gNB Distributed Unit (gNB-DU).

A base station included in the RAN 104 may include one or more sets of antennas for communicating with the wireless device 106 over the air interface. For example, one or more of the base stations may include three sets of antennas to respectively control three cells (or sectors). The size of a cell may be determined by a range at which a receiver (e.g., a base station receiver) can successfully receive the transmissions from a transmitter (e.g., a wireless device transmitter) operating in the cell. Together, the cells of the base stations may provide radio coverage to the wireless device 106 over a wide geographic area to support wireless device mobility.

In addition to three-sector sites, other implementations of base stations are possible. For example, one or more of the base stations in the RAN 104 may be implemented as a sectored site with more or less than three sectors. One or more of the base stations in the RAN 104 may be implemented as an access point, as a baseband processing unit coupled to several remote radio heads (RRHs), and/or as a repeater or relay node used to extend the coverage area of a donor node. A baseband processing unit coupled to RRHs may be part of a centralized or cloud RAN architecture, where the baseband processing unit may be either centralized in a pool of baseband processing units or virtualized. A repeater node may amplify and rebroadcast a radio signal received from a donor node. A relay node may perform the same/similar functions as a repeater node but may decode the radio signal received from the donor node to remove noise before amplifying and rebroadcasting the radio signal.

The RAN 104 may be deployed as a homogenous network of macrocell base stations that have similar antenna patterns and similar high-level transmit powers. The RAN 104 may be deployed as a heterogeneous network. In heterogeneous networks, small cell base stations may be used to provide small coverage areas, for example, coverage areas that overlap with the comparatively larger coverage areas provided by macrocell base stations. The small coverage areas may be provided in areas with high data traffic (or so-called "hotspots") or in areas with weak macrocell coverage. Examples of small cell base stations include, in order of decreasing coverage area, microcell base stations, picocell base stations, and femtocell base stations or home base stations.

The Third-Generation Partnership Project (3GPP) was formed in 1998 to provide global standardization of specifications for mobile communication networks similar to the mobile communication network 100 in FIG. 1A. To date, 3GPP has produced specifications for three generations of mobile networks: a third generation (3G) network known as Universal Mobile Telecommunications System (UMTS), a fourth generation (4G) network known as Long-Term Evolution (LTE), and a fifth generation (5G) network known as 5G System (5GS). Embodiments of the present disclosure are described with reference to the RAN of a 3GPP 5G network, referred to as next-generation RAN (NG-RAN). Embodiments may be applicable to RANs of other mobile communication networks, such as the RAN 104 in FIG. 1A, the RANs of earlier 3G and 4G networks, and those of future networks yet to be specified (e.g., a 3GPP 6G network). NG-RAN implements 5G radio access technology known as New Radio (NR) and may be provisioned to implement 4G radio access technology or other radio access technologies, including non-3GPP radio access technologies.

Figure 1B:
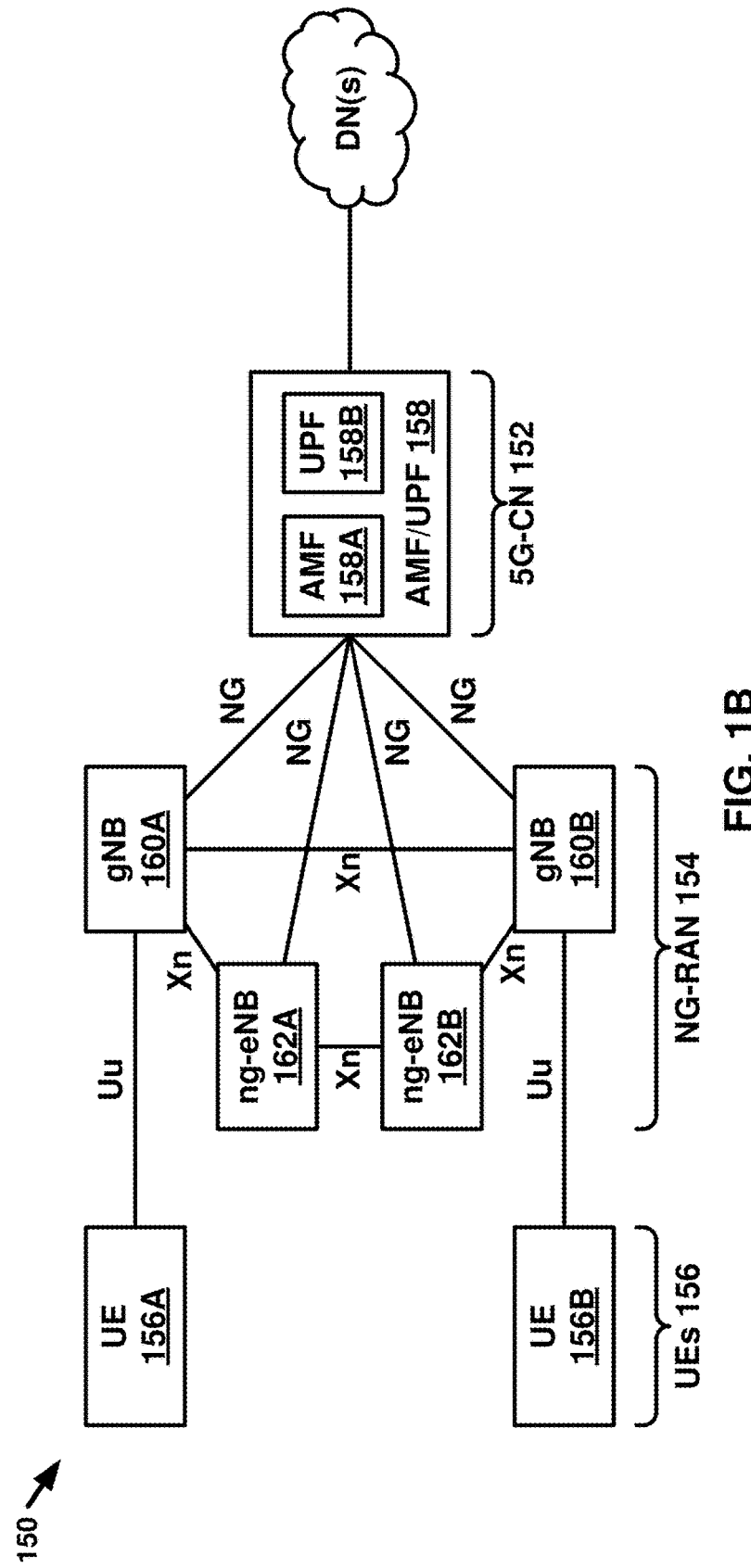

FIG. 1B illustrates another example mobile communication network 150 in which embodiments of the present disclosure may be implemented. Mobile communication network 150 may be, for example, a PLMN run by a network operator. As illustrated in FIG. 1B, mobile communication network 150 includes a 5G core network (5G-CN) 152, an NG-RAN 154, and UEs 156A and 156B (collectively UEs 156). These components may be implemented and operate in the same or similar manner as corresponding components described with respect to FIG. 1A.

The 5G-CN 152 provides the UEs 156 with an interface to one or more DNs, such as public DNS (e.g., the Internet), private DNs, and/or intra-operator DNs. As part of the interface functionality, the 5G-CN 152 may set up end-to-end connections between the UEs 156 and the one or more DNs, authenticate the UEs 156, and provide charging functionality. Compared to the CN of a 3GPP 4G network, the basis of the 5G-CN 152 may be a service-based architecture. This means that the architecture of the nodes making up the 5G-CN 152 may be defined as network functions that offer services via interfaces to other network functions. The network functions of the 5G-CN 152 may be implemented in several ways, including as network elements on dedicated or shared hardware, as software instances running on dedicated or shared hardware, or as virtualized functions instantiated on a platform (e.g., a cloud-based platform).

As illustrated in FIG. 1B, the 5G-CN 152 includes an Access and Mobility Management Function (AMF) 158A and a User Plane Function (UPF) 158B, which are shown as one component AMF/UPF 158 in FIG. 1B for ease of illustration. The UPF 158B may serve as a gateway between the NG-RAN 154 and the one or more DNs. The UPF 158B may perform functions such as packet routing and forwarding, packet inspection and user plane policy rule enforcement, traffic usage reporting, uplink classification to support routing of traffic flows to the one or more DNs, quality of service (QOS) handling for the user plane (e.g., packet filtering, gating, uplink/downlink rate enforcement, and uplink traffic verification), downlink packet buffering, and downlink data notification triggering. The UPF 158B may serve as an anchor point for intra-/inter-Radio Access Technology (RAT) mobility, an external protocol (or packet) data unit (PDU) session point of interconnect to the one or more DNs, and/or a branching point to support a multi-homed PDU session. The UEs 156 may be configured to receive services through a PDU session, which is a logical connection between a UE and a DN.

The AMF 158A may perform functions such as Non-Access Stratum (NAS) signaling termination, NAS signaling security, Access Stratum (AS) security control, inter-CN node signaling for mobility between 3GPP access networks, idle mode UE reachability (e.g., control and execution of paging retransmission), registration area management, intra-system and inter-system mobility support, access authentication, access authorization including checking of roaming rights, mobility management control (subscription and policies), network slicing support, and/or session management function (SMF) selection. NAS may refer to the functionality operating between a CN and a UE, and AS may refer to the functionality operating between the UE and a RAN.

The 5G-CN 152 may include one or more additional network functions that are not shown in FIG. 1B for the sake of clarity. For example, the 5G-CN 152 may include one or more of a Session Management Function (SMF), an NR Repository Function (NRF), a Policy Control Function (PCF), a Network Exposure Function (NEF), a Unified Data Management (UDM), an Application Function (AF), and/or an Authentication Server Function (AUSF).

The NG-RAN 154 may connect the 5G-CN 152 to the UEs 156 through radio communications over the air interface. The NG-RAN 154 may include one or more gNBs, illustrated as gNB 160A and gNB 160B (collectively gNBs 160) and/or one or more ng-eNBs, illustrated as ng-eNB 162A and ng-eNB 162B (collectively ng-eNBs 162). The gNBs 160 and ng-eNBs 162 may be more generically referred to as base stations. The gNBs 160 and ng-eNBs 162 may include one or more sets of antennas for communicating with the UEs 156 over an air interface. For example, one or more of the gNBs 160 and/or one or more of the ng-eNBs 162 may include three sets of antennas to respectively control three cells (or sectors). Together, the cells of the gNBs 160 and the ng-eNBs 162 may provide radio coverage to the UEs 156 over a wide geographic area to support UE mobility.

As shown in FIG. 1B, the gNBs 160 and/or the ng-eNBs 162 may be connected to the 5G-CN 152 by means of an NG interface and to other base stations by an Xn interface. The NG and Xn interfaces may be established using direct physical connections and/or indirect connections over an underlying transport network, such as an internet protocol (IP) transport network. The gNBs 160 and/or the ng-eNBs 162 may be connected to the UEs 156 by means of a Uu interface. For example, as illustrated in FIG. 1B, gNB 160A may be connected to the UE 156A by means of a Uu interface. The NG, Xn, and Uu interfaces are associated with a protocol stack. The protocol stacks associated with the interfaces may be used by the network elements in FIG. 1B to exchange data and signaling messages and may include two planes: a user plane and a control plane. The user plane may handle data of interest to a user. The control plane may handle signaling messages of interest to the network elements.

The gNBs 160 and/or the ng-eNBs 162 may be connected to one or more AMF/UPF functions of the 5G-CN 152, such as the AMF/UPF 158, by means of one or more NG interfaces. For example, the gNB 160A may be connected to the UPF 158B of the AMF/UPF 158 by means of an NG-User plane (NG-U) interface. The NG-U interface may provide delivery (e.g., non-guaranteed delivery) of user plane PDUs between the gNB 160A and the UPF 158B. The gNB 160A may be connected to the AMF 158A by means of an NG-Control plane (NG-C) interface. The NG-C interface may provide, for example, NG interface management, UE context management, UE mobility management, transport of NAS messages, paging, PDU session management, and configuration transfer and/or warning message transmission.

The gNBs 160 may provide NR user plane and control plane protocol terminations towards the UEs 156 over the Uu interface. For example, the gNB 160A may provide NR user plane and control plane protocol terminations toward the UE 156A over a Uu interface associated with a first protocol stack. The ng-eNBs 162 may provide Evolved UMTS Terrestrial Radio Access (E-UTRA) user plane and control plane protocol terminations towards the UEs 156 over a Uu interface, where E-UTRA refers to the 3GPP 4G radio-access technology. For example, the ng-eNB 162B may provide E-UTRA user plane and control plane protocol terminations towards the UE 156B over a Uu interface associated with a second protocol stack.

The 5G-CN 152 was described as being configured to handle NR and 4G radio accesses. It will be appreciated by one of ordinary skill in the art that it may be possible for NR to connect to a 4G core network in a mode known as "non-standalone operation." In non-standalone operation, a 4G core network is used to provide (or at least support) control-plane functionality (e.g., initial access, mobility, and paging). Although only one AMF/UPF 158 is shown in FIG. 1B, one gNB or ng-eNB may be connected to multiple AMF/UPF nodes to provide redundancy and/or to load share across the multiple AMF/UPF nodes.

As discussed, an interface (e.g., Uu, Xn, and NG interfaces) between the network elements in FIG. 1B may be associated with a protocol stack that the network elements use to exchange data and signaling messages. A protocol stack may include two planes: a user plane and a control plane. The user plane may handle data of interest to a user, and the control plane may handle signaling messages of interest to the network elements.

Figure 2A:
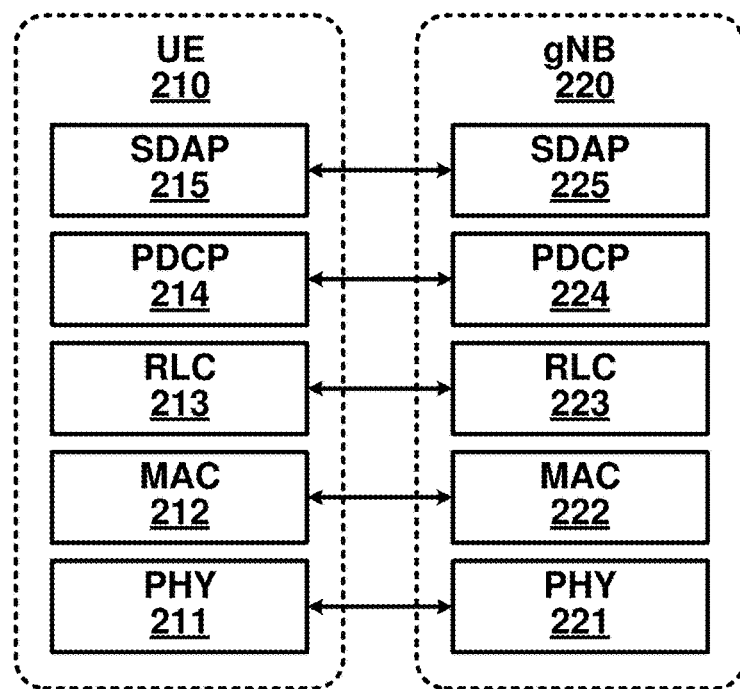
FIG. 2A and FIG. 2B respectively illustrate a New Radio (NR) user plane and control plane protocol stack.
Figure 2B:
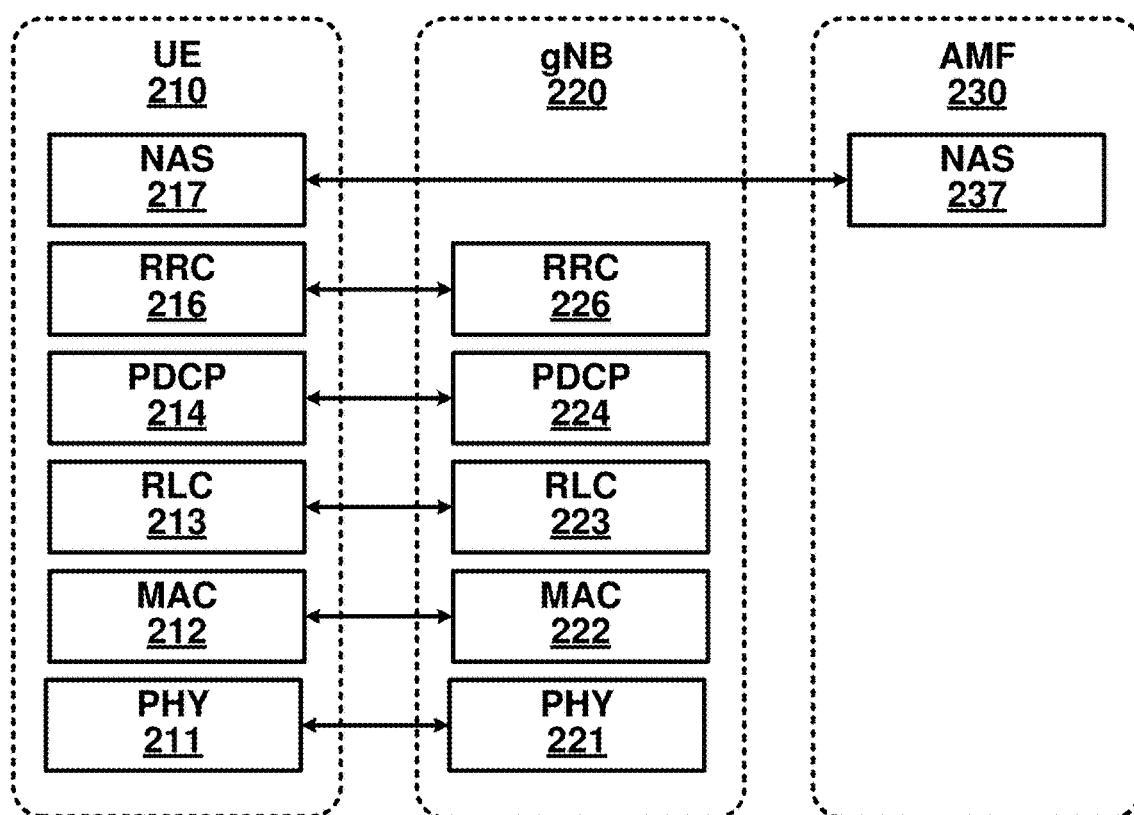

FIG. 2A and FIG. 2B respectively illustrate examples of NR user plane and NR control plane protocol stacks for the Uu interface that lies between a UE 210 and a gNB 220. The protocol stacks illustrated in FIG. 2A and FIG. 2B may be the same or similar to those used for the Uu interface between, for example, the UE 156A and the gNB 160A shown in FIG. 1B.

FIG. 2A illustrates a NR user plane protocol stack comprising five layers implemented in the UE 210 and the gNB 220. At the bottom of the protocol stack, physical layers (PHYs) 211 and 221 may provide transport services to the higher layers of the protocol stack and may correspond to layer 1 of the Open Systems Interconnection (OSI) model. The next four protocols above PHYs 211 and 221 comprise media access control layers (MACs) 212 and 222, radio link control layers (RLCs) 213 and 223, packet data convergence protocol layers (PDCPs) 214 and 224, and service data application protocol layers (SDAPs) 215 and 225. Together, these four protocols may make up layer 2, or the data link layer, of the OSI model.

Figure 3:
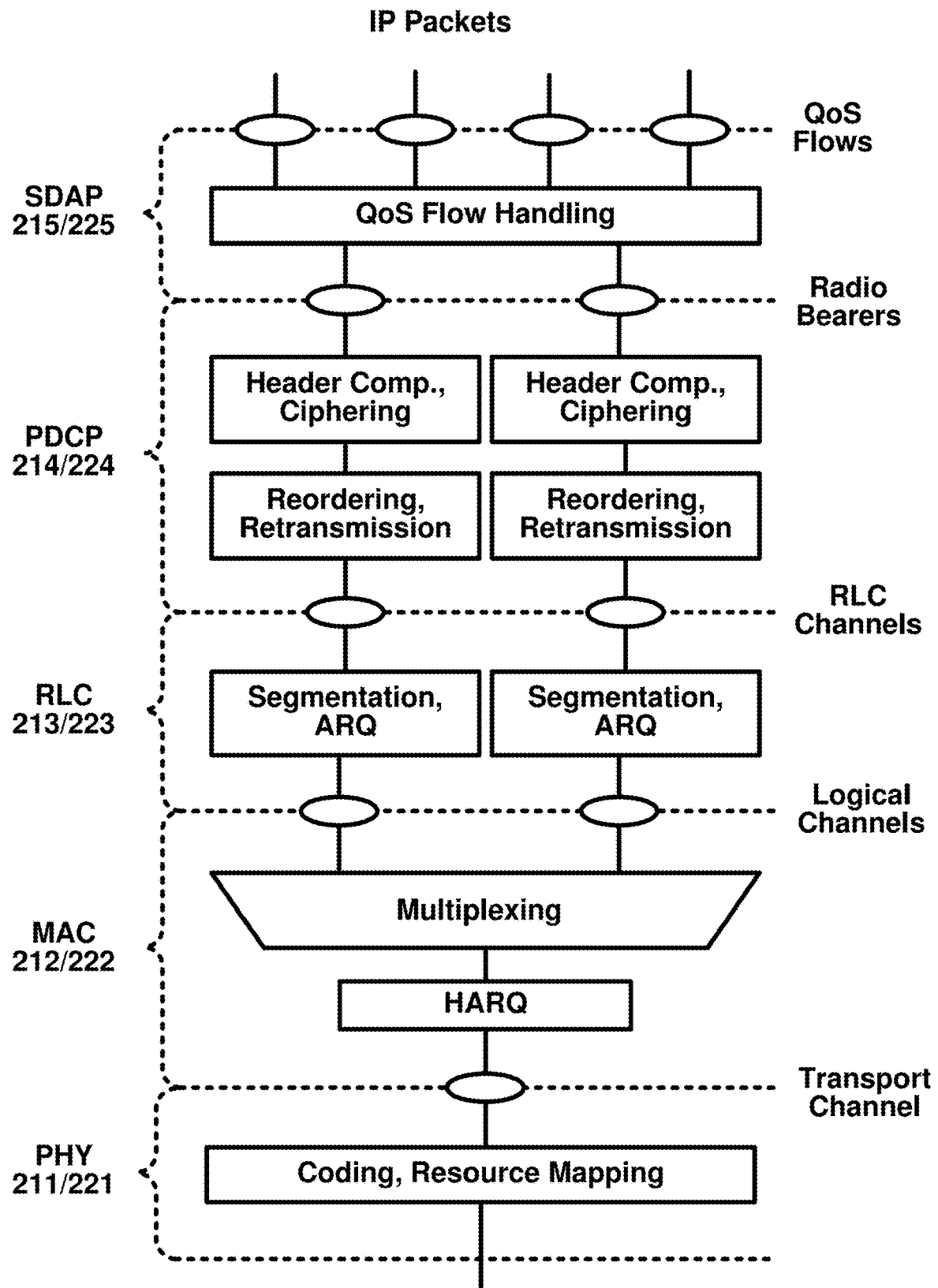
FIG. 3 illustrates an example of services provided between protocol layers of the NR user plane protocol stack of FIG. 2A.

FIG. 3 illustrates an example of services provided between protocol layers of the NR user plane protocol stack. Starting from the top of FIG. 2A and FIG. 3, the SDAPs 215 and 225 may perform QoS flow handling. The UE 210 may receive services through a PDU session, which may be a logical connection between the UE 210 and a DN. The PDU session may have one or more QoS flows. A UPF of a CN (e.g., the UPF 158B) may map IP packets to the one or more QoS flows of the PDU session based on QoS requirements (e.g., in terms of delay, data rate, and/or error rate). The SDAPs 215 and 225 may perform mapping/de-mapping between the one or more QoS flows and one or more data radio bearers. The mapping/de-mapping between the QoS flows and the data radio bearers may be determined by the SDAP 225 at the gNB 220. The SDAP 215 at the UE 210 may be informed of the mapping between the QoS flows and the data radio bearers through reflective mapping or control signaling received from the gNB 220. For reflective mapping, the SDAP 225 at the gNB 220 may mark the downlink packets with a QoS flow indicator (QFI), which may be observed by the SDAP 215 at the UE 210 to determine the mapping/de-mapping between the QoS flows and the data radio bearers.

The PDCPs 214 and 224 may perform header compression/decompression to reduce the amount of data that needs to be transmitted over the air interface, ciphering/deciphering to prevent unauthorized decoding of data transmitted over the air interface, and integrity protection (to ensure control messages originate from intended sources. The PDCPs 214 and 224 may perform retransmissions of undelivered packets, in-sequence delivery and reordering of packets, and removal of packets received in duplicate due to, for example, an intra-gNB handover. The PDCPs 214 and 224 may perform packet duplication to improve the likelihood of the packet being received and, at the receiver, remove any duplicate packets. Packet duplication may be useful for services that require high reliability.

Although not shown in FIG. 3, PDCPs 214 and 224 may perform mapping/de-mapping between a split radio bearer and RLC channels in a dual connectivity scenario. Dual connectivity is a technique that allows a UE to connect to two cells or, more generally, two cell groups: a master cell group (MCG) and a secondary cell group (SCG). A split bearer is when a single radio bearer, such as one of the radio bearers provided by the PDCPs 214 and 224 as a service to the SDAPs 215 and 225, is handled by cell groups in dual connectivity. The PDCPs 214 and 224 may map/de-map the split radio bearer between RLC channels belonging to cell groups.

The RLCs 213 and 223 may perform segmentation, retransmission through Automatic Repeat Request (ARQ), and removal of duplicate data units received from MACs 212 and 222, respectively. The RLCs 213 and 223 may support three transmission modes: transparent mode (TM); unacknowledged mode (UM); and acknowledged mode (AM). Based on the transmission mode an RLC is operating, the RLC may perform one or more of the noted functions. The RLC configuration may be per logical channel with no dependency on numerologies and/or Transmission Time Interval (TTI) durations. As shown in FIG. 3, the RLCs 213 and 223 may provide RLC channels as a service to PDCPs 214 and 224, respectively.

The MACs 212 and 222 may perform multiplexing/demultiplexing of logical channels and/or mapping between logical channels and transport channels. The multiplexing/demultiplexing may include multiplexing/demultiplexing of data units, belonging to the one or more logical channels, into/from Transport Blocks (TBs) delivered to/from the PHYs 211 and 221. The MAC 222 may be configured to perform scheduling, scheduling information reporting, and priority handling between UEs by means of dynamic scheduling. Scheduling may be performed in the gNB 220 (at the MAC 222) for downlink and uplink. The MACs 212 and 222 may be configured to perform error correction through Hybrid Automatic Repeat Request (HARQ) (e.g., one HARQ entity per carrier in case of Carrier Aggregation (CA)), priority handling between logical channels of the UE 210 by means of logical channel prioritization, and/or padding. The MACs 212 and 222 may support one or more numerologies and/or transmission timings. In an example, mapping restrictions in a logical channel prioritization may control which numerology and/or transmission timing a logical channel may use. As shown in FIG. 3, the MACs 212 and 222 may provide logical channels as a service to the RLCs 213 and 223.

The PHYs 211 and 221 may perform mapping of transport channels to physical channels and digital and analog signal processing functions for sending and receiving information over the air interface. These digital and analog signal processing functions may include, for example, coding/decoding and modulation/demodulation. The PHYs 211 and 221 may perform multi-antenna mapping. As shown in FIG. 3, the PHYs 211 and 221 may provide one or more transport channels as a service to the MACs 212 and 222.

Figure 4A:
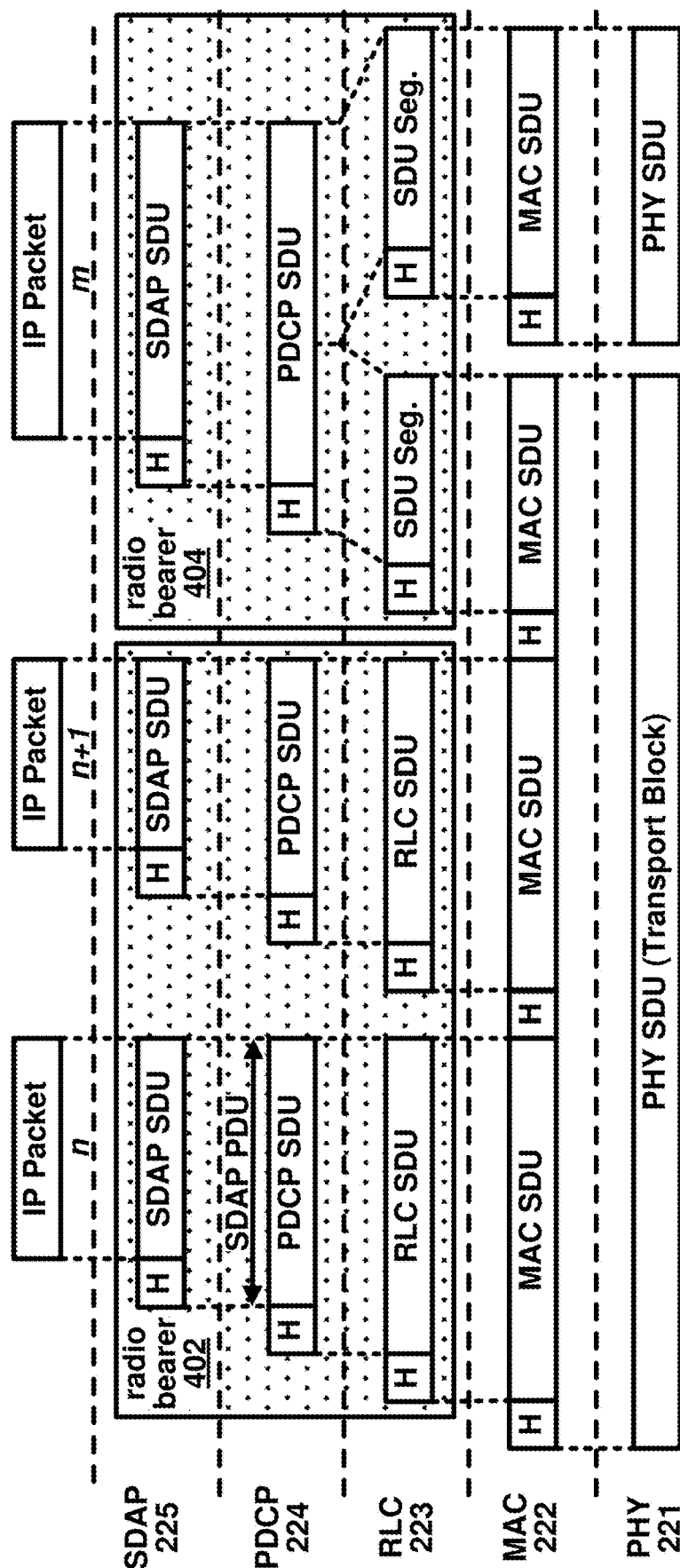
FIG. 4A illustrates an example downlink data flow through the NR user plane protocol stack of FIG. 2A.

FIG. 4A illustrates an example downlink data flow through the NR user plane protocol stack. FIG. 4A illustrates a downlink data flow of three IP packets (n, n+1, and m) through the NR user plane protocol stack to generate two TBs at the gNB 220. An uplink data flow through the NR user plane protocol stack may be similar to the downlink data flow depicted in FIG. 4A.

The downlink data flow of FIG. 4A begins when SDAP 225 receives the three IP packets from one or more QoS flows and maps the three packets to radio bearers. In FIG. 4A, the SDAP 225 maps IP packets n and n+1 to a first radio bearer 402 and maps IP packet m to a second radio bearer 404. An SDAP header (labeled with an "H" in FIG. 4A) is added to an IP packet. The data unit from/to a higher protocol layer is referred to as a service data unit (SDU) of the lower protocol layer and the data unit to/from a lower protocol layer is referred to as a protocol data unit (PDU) of the higher protocol layer. As shown in FIG. 4A, the data unit from the SDAP 225 is an SDU of lower protocol layer PDCP 224 and is a PDU of the SDAP 225.

The remaining protocol layers in FIG. 4A may perform their associated functionality (e.g., with respect to FIG. 3), add corresponding headers, and forward their respective outputs to the next lower layer. For example, the PDCP 224 may perform IP-header compression and ciphering and forward its output to the RLC 223. The RLC 223 may optionally perform segmentation (e.g., as shown for IP packet m in FIG. 4A) and forward its output to the MAC 222. The MAC 222 may multiplex a number of RLC PDUs and may attach a MAC subheader to an RLC PDU to form a transport block. In NR, the MAC subheaders may be distributed across the MAC PDU, as illustrated in FIG. 4A. In LTE, the MAC subheaders may be entirely located at the beginning of the MAC PDU. The NR MAC PDU structure may reduce processing time and associated latency because the MAC PDU subheaders may be computed before the full MAC PDU is assembled.

Figure 4B:
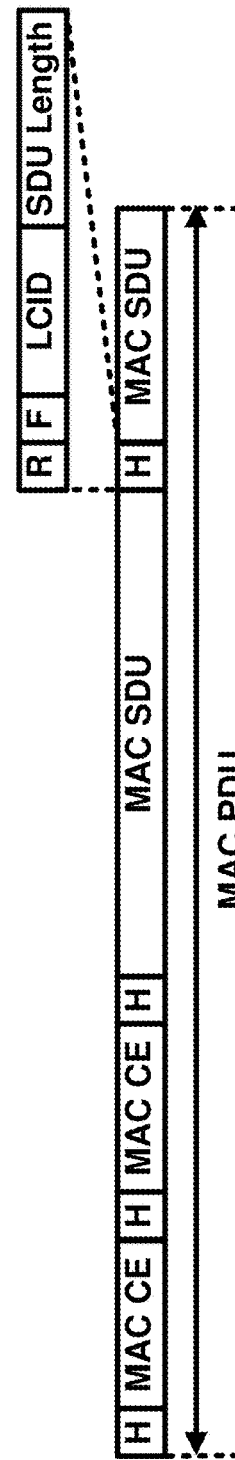
FIG. 4B illustrates an example format of a MAC subheader in a MAC PDU.

FIG. 4B illustrates an example format of a MAC subheader in a MAC PDU. The MAC subheader includes: an SDU length field for indicating the length (e.g., in bytes) of the MAC SDU to which the MAC subheader corresponds; a logical channel identifier (LCID) field for identifying the logical channel from which the MAC SDU originated to aid in the demultiplexing process; a flag (F) for indicating the size of the SDU length field; and a reserved bit (R) field for future use.

FIG. 4B further illustrates MAC control elements (CEs) inserted into the MAC PDU by a MAC, such as MAC 223 or MAC 222. For example, FIG. 4B illustrates two MAC CEs inserted into the MAC PDU. MAC CEs may be inserted at the beginning of a MAC PDU for downlink transmissions (as shown in FIG. 4B) and at the end of a MAC PDU for uplink transmissions. MAC CEs may be used for in-band control signaling. Example MAC CEs include: scheduling-related MAC CEs, such as buffer status reports and power headroom reports; activation/deactivation MAC CEs, such as those for activation/deactivation of PDCP duplication detection, channel state information (CSI) reporting, sounding reference signal (SRS) transmission, and prior configured components; discontinuous reception (DRX) related MAC CEs; timing advance MAC CEs; and random access related MAC CEs. A MAC CE may be preceded by a MAC subheader with a similar format as described for MAC SDUs and may be identified with a reserved value in the LCID field that indicates the type of control information included in the MAC CE.

Before describing the NR control plane protocol stack, logical channels, transport channels, and physical channels are first described as well as a mapping between the channel types. One or more of the channels may be used to carry out functions associated with the NR control plane protocol stack described later below.

FIG. 5A and FIG. 5B illustrate, for downlink and uplink respectively, a mapping between logical channels, transport channels, and physical channels. Information is passed through channels between the RLC, the MAC, and the PHY of the NR protocol stack. A logical channel may be used between the RLC and the MAC and may be classified as a control channel that carries control and configuration information in the NR control plane or as a traffic channel that carries data in the NR user plane. A logical channel may be classified as a dedicated logical channel that is dedicated to a specific UE or as a common logical channel that may be used by more than one UE. A logical channel may also be defined by the type of information it carries. The set of logical channels defined by NR include, for example:
 a paging control channel (PCCH) for carrying paging messages used to page a UE whose location is not known to the network on a cell level;
 a broadcast control channel (BCCH) for carrying system information messages in the form of a master information block (MIB) and several system information blocks (SIBs), wherein the system information messages may be used by the UEs to obtain information about how a cell is configured and how to operate within the cell;
 a common control channel (CCCH) for carrying control messages together with random access;
 a dedicated control channel (DCCH) for carrying control messages to/from a specific the UE to configure the UE; and
 a dedicated traffic channel (DTCH) for carrying user data to/from a specific the UE.

Transport channels are used between the MAC and PHY layers and may be defined by how the information they carry is transmitted over the air interface. The set of transport channels defined by NR include, for example:
 a paging channel (PCH) for carrying paging messages that originated from the PCCH;
 a broadcast channel (BCH) for carrying the MIB from the BCCH;
 a downlink shared channel (DL-SCH) for carrying downlink data and signaling messages, including the SIBs from the BCCH;
 an uplink shared channel (UL-SCH) for carrying uplink data and signaling messages; and a random access channel (RACH) for allowing a UE to contact the network without any prior scheduling.

The PHY may use physical channels to pass information between processing levels of the PHY. A physical channel may have an associated set of time-frequency resources for carrying the information of one or more transport channels. The PHY may generate control information to support the low-level operation of the PHY and provide the control information to the lower levels of the PHY via physical control channels, known as L1/L2 control channels. The set of physical channels and physical control channels defined by NR include, for example:

- a physical broadcast channel (PBCH) for carrying the MIB from the BCH;
- a physical downlink shared channel (PDSCH) for carrying downlink data and signaling messages from the DL-SCH, as well as paging messages from the PCH;
- a physical downlink control channel (PDCCH) for carrying downlink control information (DCI), which may include downlink scheduling commands, uplink scheduling grants, and uplink power control commands;
- a physical uplink shared channel (PUSCH) for carrying uplink data and signaling messages from the UL-SCH and in some instances uplink control information (UCI) as described below;
- a physical uplink control channel (PUCCH) for carrying UCI, which may include HARQ acknowledgments, channel quality indicators (CQI), pre-coding matrix indicators (PMI), rank indicators (RI), and scheduling requests (SR); and
- a physical random access channel (PRACH) for random access.

Similar to the physical control channels, the physical layer generates physical signals to support the low-level operation of the physical layer. As shown in FIG. 5A and FIG. 5B, the physical layer signals defined by NR include: primary synchronization signals (PSS), secondary synchronization signals (SSS), channel state information reference signals (CSI-RS), demodulation reference signals (DMRS), sounding reference signals (SRS), and phase-tracking reference signals (PT-RS). These physical layer signals will be described in greater detail below.

FIG. 2B illustrates an example NR control plane protocol stack. As shown in FIG. 2B, the NR control plane protocol stack may use the same/similar first four protocol layers as the example NR user plane protocol stack. These four protocol layers include the PHYs 211 and 221, the MACs 212 and 222, the RLCs 213 and 223, and the PDCPs 214 and 224. Instead of having the SDAPs 215 and 225 at the top of the stack as in the NR user plane protocol stack, the NR control plane stack has radio resource controls (RRCs) 216 and 226 and NAS protocols 217 and 237 at the top of the NR control plane protocol stack.

The NAS protocols 217 and 237 may provide control plane functionality between the UE 210 and the AMF 230 (e.g., the AMF 158A) or, more generally, between the UE 210 and the CN. The NAS protocols 217 and 237 may provide control plane functionality between the UE 210 and the AMF 230 via signaling messages, referred to as NAS messages. There is no direct path between the UE 210 and the AMF 230 through which the NAS messages can be transported. The NAS messages may be transported using the AS of the Uu and NG interfaces. NAS protocols 217 and 237 may provide control plane functionality such as authentication, security, connection setup, mobility management, and session management.

The RRCs 216 and 226 may provide control plane functionality between the UE 210 and the gNB 220 or, more generally, between the UE 210 and the RAN. The RRCs 216 and 226 may provide control plane functionality between the UE 210 and the gNB 220 via signaling messages, referred to as RRC messages. RRC messages may be transmitted between the UE 210 and the RAN using signaling radio bearers and the same/similar PDCP, RLC, MAC, and PHY protocol layers. The MAC may multiplex control-plane and user-plane data into the same transport block (TB). The RRCs 216 and 226 may provide control plane functionality such as: broadcast of system information related to AS and NAS; paging initiated by the CN or the RAN; establishment, maintenance and release of an RRC connection between the UE 210 and the RAN; security functions including key management; establishment, configuration, maintenance and release of signaling radio bearers and data radio bearers; mobility functions; QoS management functions; the UE measurement reporting and control of the reporting; detection of and recovery from radio link failure (RLF); and/or NAS message transfer. As part of establishing an RRC connection, RRCs 216 and 226 may establish an RRC context, which may involve configuring parameters for communication between the UE 210 and the RAN.

Figure 6:
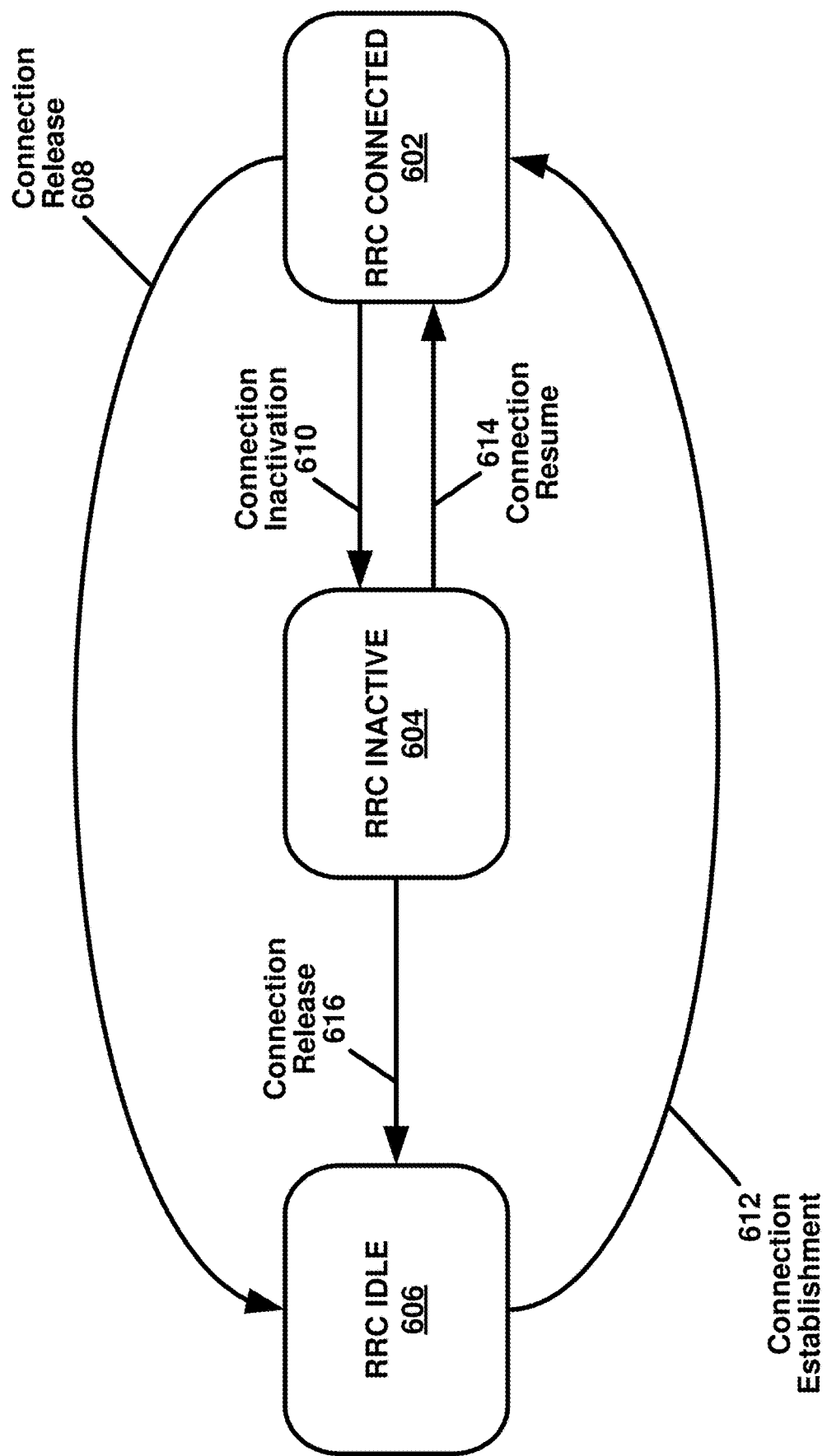
FIG. 6 is an example diagram showing RRC state transitions of a UE.

FIG. 6 is an example diagram showing RRC state transitions of a UE. The UE may be the same or similar to the wireless device 106 depicted in FIG. 1A, the UE 210 depicted in FIG. 2A and FIG. 2B, or any other wireless device described in the present disclosure. As illustrated in FIG. 6, a UE may be in at least one of three RRC states: RRC connected 602 (e.g., RRC_CONNECTED), RRC idle 604 (e.g., RRC_IDLE), and RRC inactive 606 (e.g., RRC_INACTIVE).

In RRC connected 602, the UE has an established RRC context and may have at least one RRC connection with a base station. The base station may be similar to one of the one or more base stations included in the RAN 104 depicted in FIG. 1A, one of the gNBs 160 or ng-eNBs 162 depicted in FIG. 1B, the gNB 220 depicted in FIG. 2A and FIG. 2B, or any other base station described in the present disclosure. The base station with which the UE is connected may have the RRC context for the UE. The RRC context, referred to as the UE context, may comprise parameters for communication between the UE and the base station. These parameters may include, for example: one or more AS contexts; one or more radio link configuration parameters; bearer configuration information (e.g., relating to a data radio bearer, signaling radio bearer, logical channel, QoS flow, and/or PDU session); security information; and/or PHY, MAC, RLC, PDCP, and/or SDAP layer configuration information. While in RRC connected 602, mobility of the UE may be managed by the RAN (e.g., the RAN 104 or the NG-RAN 154). The UE may measure the signal levels (e.g., reference signal levels) from a serving cell and neighboring cells and report these measurements to the base station currently serving the UE. The UE's serving base station may request a handover to a cell of one of the neighboring base stations based on the reported measurements. The RRC state may transition from RRC connected 602 to RRC idle 604 through a connection release procedure 608 or to RRC inactive 606 through a connection inactivation procedure 610.

In RRC idle 604, an RRC context may not be established for the UE. In RRC idle 604, the UE may not have an RRC connection with the base station. While in RRC idle 604, the UE may be in a sleep state for the majority of the time (e.g., to conserve battery power). The UE may wake up periodically (e.g., once in every discontinuous reception cycle) to monitor for paging messages from the RAN. Mobility of the UE may be managed by the UE through a procedure known as cell reselection. The RRC state may transition from RRC idle 604 to RRC connected 602 through a connection establishment procedure 612, which may involve a random access procedure as discussed in greater detail below.

In RRC inactive 606, the RRC context previously established is maintained in the UE and the base station. This allows for a fast transition to RRC connected 602 with reduced signaling overhead as compared to the transition from RRC idle 604 to RRC connected 602. While in RRC inactive 606, the UE may be in a sleep state and mobility of the UE may be managed by the UE through cell reselection. The RRC state may transition from RRC inactive 606 to RRC connected 602 through a connection resume procedure 614 or to RRC idle 604 though a connection release procedure 616 that may be the same as or similar to connection release procedure 608.

An RRC state may be associated with a mobility management mechanism. In RRC idle 604 and RRC inactive 606, mobility is managed by the UE through cell reselection. The purpose of mobility management in RRC idle 604 and RRC inactive 606 is to allow the network to be able to notify the UE of an event via a paging message without having to broadcast the paging message over the entire mobile communications network. The mobility management mechanism used in RRC idle 604 and RRC inactive 606 may allow the network to track the UE on a cell-group level so that the paging message may be broadcast over the cells of the cell group that the UE currently resides within instead of the entire mobile communication network. The mobility management mechanisms for RRC idle 604 and RRC inactive 606 track the UE on a cell-group level. They may do so using different granularities of grouping. For example, there may be three levels of cell-grouping granularity: individual cells; cells within a RAN area identified by a RAN area identifier (RAI); and cells within a group of RAN areas, referred to as a tracking area and identified by a tracking area identifier (TAI).

Tracking areas may be used to track the UE at the CN level. The CN (e.g., the CN 102 or the 5G-CN 152) may provide the UE with a list of TAIs associated with a UE registration area. If the UE moves, through cell reselection, to a cell associated with a TAI not included in the list of TAIs associated with the UE registration area, the UE may perform a registration update with the CN to allow the CN to update the UE's location and provide the UE with a new the UE registration area.

RAN areas may be used to track the UE at the RAN level. For a UE in RRC inactive 606 state, the UE may be assigned a RAN notification area. A RAN notification area may comprise one or more cell identities, a list of RAIs, or a list of TAIs. In an example, a base station may belong to one or more RAN notification areas. In an example, a cell may belong to one or more RAN notification areas. If the UE moves, through cell reselection, to a cell not included in the RAN notification area assigned to the UE, the UE may perform a notification area update with the RAN to update the UE's RAN notification area.

A base station storing an RRC context for a UE or a last serving base station of the UE may be referred to as an anchor base station. An anchor base station may maintain an RRC context for the UE at least during a period of time that the UE stays in a RAN notification area of the anchor base station and/or during a period of time that the UE stays in RRC inactive 606.

A gNB, such as gNBs 160 in FIG. 1B, may be split in two parts: a central unit (gNB-CU), and one or more distributed units (gNB-DU). A gNB-CU may be coupled to one or more gNB-DUs using an F1 interface. The gNB-CU may comprise the RRC, the PDCP, and the SDAP. A gNB-DU may comprise the RLC, the MAC, and the PHY.

In NR, the physical signals and physical channels (discussed with respect to FIG. 5A and FIG. 5B) may be mapped onto orthogonal frequency divisional multiplexing (OFDM) symbols. OFDM is a multicarrier communication scheme that transmits data over F orthogonal subcarriers (or tones). Before transmission, the data may be mapped to a series of complex symbols (e.g., M-quadrature amplitude modulation (M-QAM) or M-phase shift keying (M-PSK) symbols), referred to as source symbols, and divided into F parallel symbol streams. The F parallel symbol streams may be treated as though they are in the frequency domain and used as inputs to an Inverse Fast Fourier Transform (IFFT) block that transforms them into the time domain. The IFFT block may take in F source symbols at a time, one from each of the F parallel symbol streams, and use each source symbol to modulate the amplitude and phase of one of F sinusoidal basis functions that correspond to the F orthogonal subcarriers. The output of the IFFT block may be F time-domain samples that represent the summation of the F orthogonal subcarriers. The F time-domain samples may form a single OFDM symbol. After some processing (e.g., addition of a cyclic prefix) and up-conversion, an OFDM symbol provided by the IFFT block may be transmitted over the air interface on a carrier frequency. The F parallel symbol streams may be mixed using an FFT block before being processed by the IFFT block. This operation produces Discrete Fourier Transform (DFT)-precoded OFDM symbols and may be used by UEs in the uplink to reduce the peak to average power ratio (PAPR). Inverse processing may be performed on the OFDM symbol at a receiver using an FFT block to recover the data mapped to the source symbols.

Figure 7:
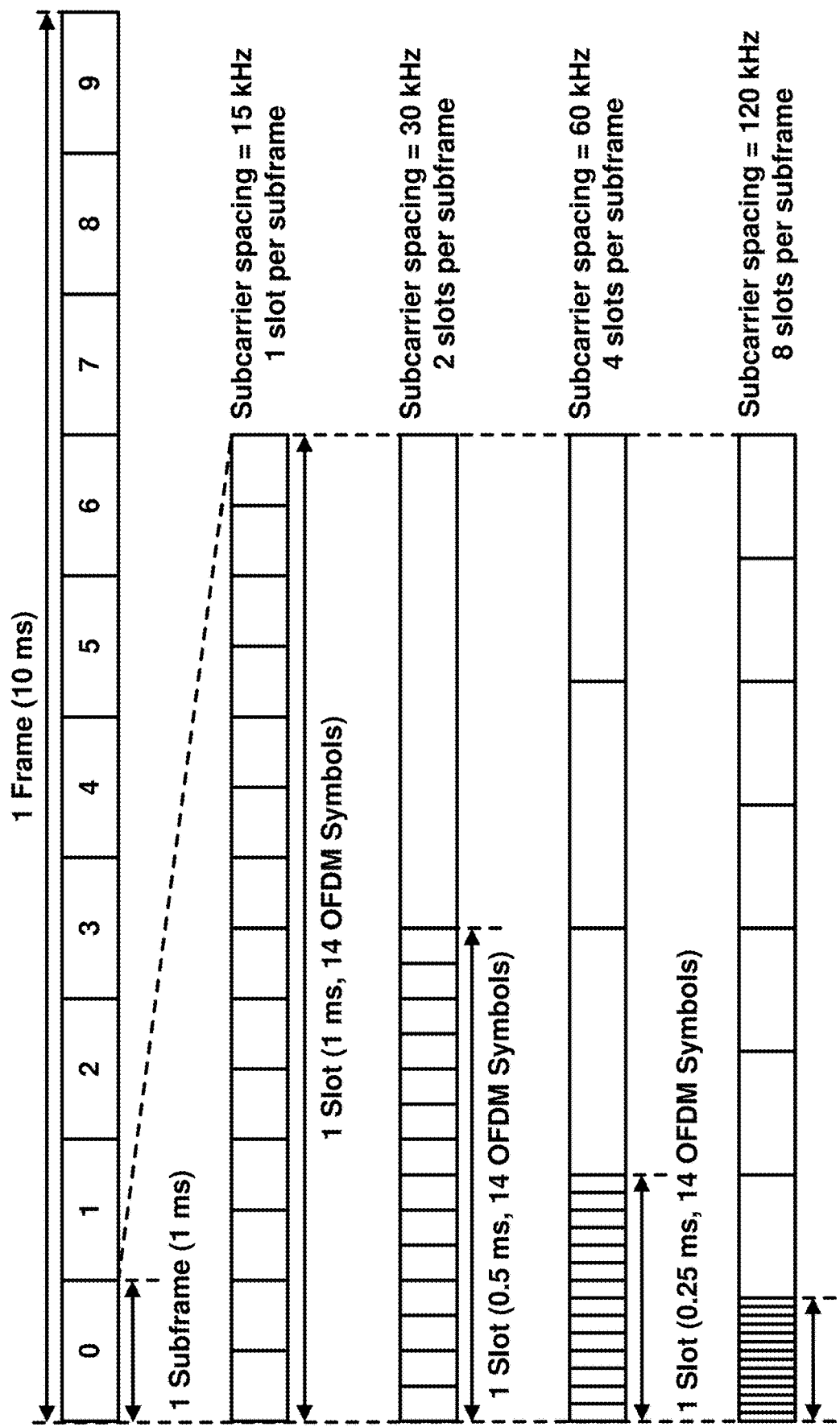
FIG. 7 illustrates an example configuration of an NR frame into which OFDM symbols are grouped.

FIG. 7 illustrates an example configuration of an NR frame into which OFDM symbols are grouped. An NR frame may be identified by a system frame number (SFN). The SFN may repeat with a period of 1024 frames. As illustrated, one NR frame may be 10 milliseconds (ms) in duration and may include 10 subframes that are 1 ms in duration. A subframe may be divided into slots that include, for example, 14 OFDM symbols per slot.

The duration of a slot may depend on the numerology used for the OFDM symbols of the slot. In NR, a flexible numerology is supported to accommodate different cell deployments (e.g., cells with carrier frequencies below 1 GHz up to cells with carrier frequencies in the mm-wave range). A numerology may be defined in terms of subcarrier spacing and cyclic prefix duration. For a numerology in NR, subcarrier spacings may be scaled up by powers of two from a baseline subcarrier spacing of 15 kHz, and cyclic prefix durations may be scaled down by powers of two from a baseline cyclic prefix duration of 4.7 µs. For example, NR defines numerologies with the following subcarrier spacing/cyclic prefix duration combinations: 15 kHz/4.7 µs; 30 KHz/2.3 µs; 60 KHz/1.2 µs; 120 kHz/0.59 µs; and 240 KHz/0.29 µs.

A slot may have a fixed number of OFDM symbols (e.g., 14 OFDM symbols). A numerology with a higher subcarrier spacing has a shorter slot duration and, correspondingly, more slots per subframe. FIG. 7 illustrates this numerology-dependent slot duration and slots-per-subframe transmission structure (the numerology with a subcarrier spacing of 240 KHz is not shown in FIG. 7 for ease of illustration). A subframe in NR may be used as a numerology-independent time reference, while a slot may be used as the unit upon which uplink and downlink transmissions are scheduled. To support low latency, scheduling in NR may be decoupled from the slot duration and start at any OFDM symbol and last for as many symbols as needed for a transmission. These partial slot transmissions may be referred to as mini-slot or subslot transmissions.

Figure 8:
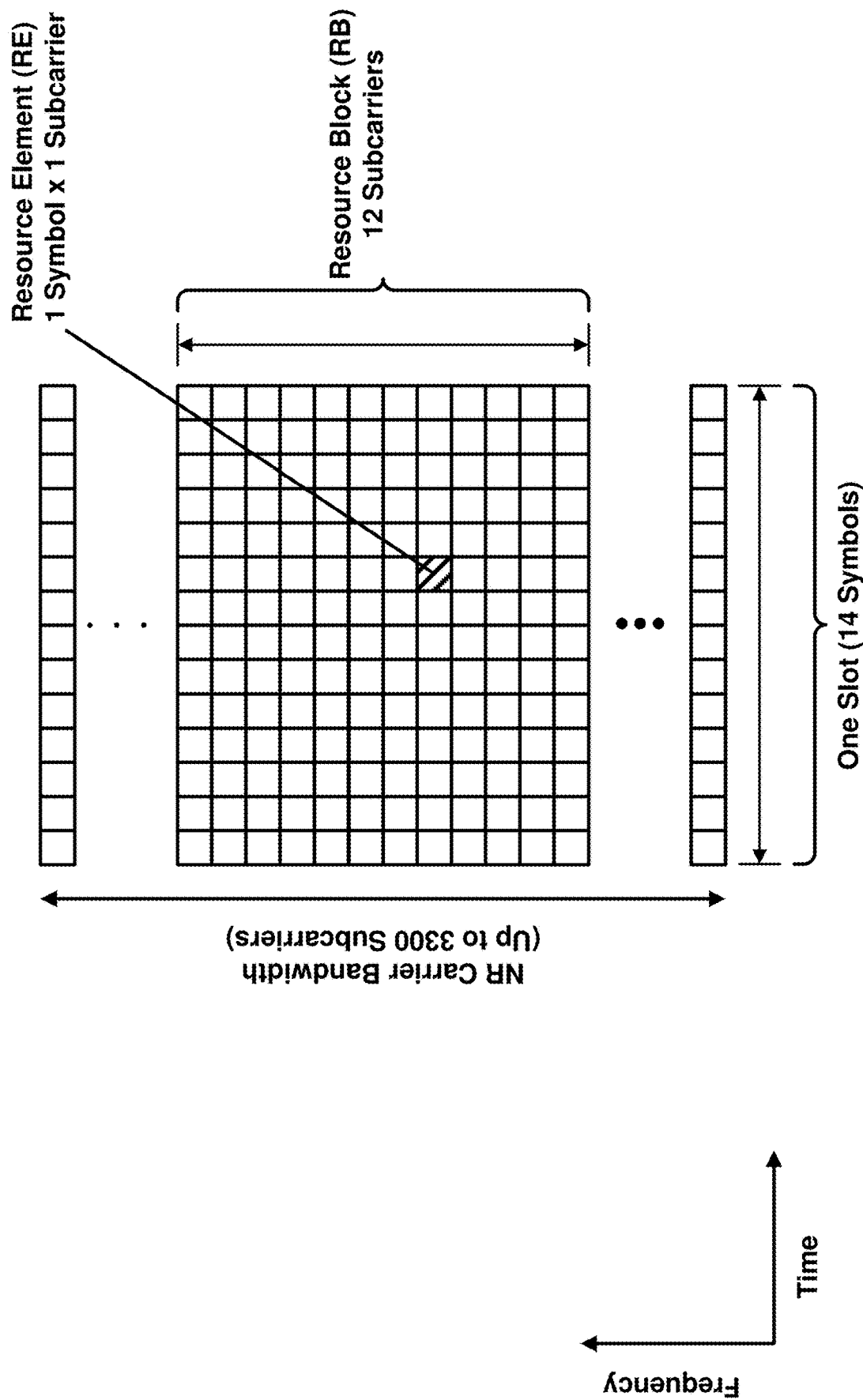
FIG. 8 illustrates an example configuration of a slot in the time and frequency domain for an NR carrier.

FIG. 8 illustrates an example configuration of a slot in the time and frequency domain for an NR carrier. The slot includes resource elements (REs) and resource blocks (RBs). An RE is the smallest physical resource in NR. An RE spans one OFDM symbol in the time domain by one subcarrier in the frequency domain as shown in FIG. 8. An RB spans twelve consecutive REs in the frequency domain as shown in FIG. 8. An NR carrier may be limited to a width of 275 RBs or 275×12=3300 subcarriers. Such a limitation, if used, may limit the NR carrier to 50, 100, 200, and 400 MHz for subcarrier spacings of 15, 30, 60, and 120 kHz, respectively, where the 400 MHz bandwidth may be set based on a 400 MHz per carrier bandwidth limit.

FIG. 8 illustrates a single numerology being used across the entire bandwidth of the NR carrier. In other example configurations, multiple numerologies may be supported on the same carrier.

NR may support wide carrier bandwidths (e.g., up to 400 MHz for a subcarrier spacing of 120 kHz). Not all UEs may be able to receive the full carrier bandwidth (e.g., due to hardware limitations). Also, receiving the full carrier bandwidth may be prohibitive in terms of UE power consumption. In an example, to reduce power consumption and/or for other purposes, a UE may adapt the size of the UE's receive bandwidth based on the amount of traffic the UE is scheduled to receive. This is referred to as bandwidth adaptation.

NR defines bandwidth parts (BWPs) to support UEs not capable of receiving the full carrier bandwidth and to support bandwidth adaptation. In an example, a BWP may be defined by a subset of contiguous RBs on a carrier. A UE may be configured (e.g., via RRC layer) with one or more downlink BWPs and one or more uplink BWPs per serving cell (e.g., up to four downlink BWPs and up to four uplink BWPs per serving cell). At a given time, one or more of the configured BWPs for a serving cell may be active. These one or more BWPs may be referred to as active BWPs of the serving cell. When a serving cell is configured with a secondary uplink carrier, the serving cell may have one or more first active BWPs in the uplink carrier and one or more second active BWPs in the secondary uplink carrier.

For unpaired spectra, a downlink BWP from a set of configured downlink BWPs may be linked with an uplink BWP from a set of configured uplink BWPs if a downlink BWP index of the downlink BWP and an uplink BWP index of the uplink BWP are the same. For unpaired spectra, a UE may expect that a center frequency for a downlink BWP is the same as a center frequency for an uplink BWP.

For a downlink BWP in a set of configured downlink BWPs on a primary cell (PCell), a base station may configure a UE with one or more control resource sets (CORESETs) for at least one search space. A search space is a set of locations in the time and frequency domains where the UE may find control information. The search space may be a UE-specific search space or a common search space (potentially usable by a plurality of UEs). For example, a base station may configure a UE with a common search space, on a PCell or on a primary secondary cell (PSCell), in an active downlink BWP.

For an uplink BWP in a set of configured uplink BWPs, a BS may configure a UE with one or more resource sets for one or more PUCCH transmissions. A UE may receive downlink receptions (e.g., PDCCH or PDSCH) in a downlink BWP according to a configured numerology (e.g., subcarrier spacing and cyclic prefix duration) for the downlink BWP. The UE may transmit uplink transmissions (e.g., PUCCH or PUSCH) in an uplink BWP according to a configured numerology (e.g., subcarrier spacing and cyclic prefix length for the uplink BWP).

One or more BWP indicator fields may be provided in Downlink Control Information (DCI). A value of a BWP indicator field may indicate which BWP in a set of configured BWPs is an active downlink BWP for one or more downlink receptions. The value of the one or more BWP indicator fields may indicate an active uplink BWP for one or more uplink transmissions.

A base station may semi-statically configure a UE with a default downlink BWP within a set of configured downlink BWPs associated with a PCell. If the base station does not provide the default downlink BWP to the UE, the default downlink BWP may be an initial active downlink BWP. The UE may determine which BWP is the initial active downlink BWP based on a CORESET configuration obtained using the PBCH.

A base station may configure a UE with a BWP inactivity timer value for a PCell. The UE may start or restart a BWP inactivity timer at any appropriate time. For example, the UE may start or restart the BWP inactivity timer (a) when the UE detects a DCI indicating an active downlink BWP other than a default downlink BWP for a paired spectra operation; or (b) when a UE detects a DCI indicating an active downlink BWP or active uplink BWP other than a default downlink BWP or uplink BWP for an unpaired spectra operation. If the UE does not detect DCI during an interval of time (e.g., 1 ms or 0.5 ms), the UE may run the BWP inactivity timer toward expiration (for example, increment from zero to the BWP inactivity timer value, or decrement from the BWP inactivity timer value to zero). When the BWP inactivity timer expires, the UE may switch from the active downlink BWP to the default downlink BWP.

In an example, a base station may semi-statically configure a UE with one or more BWPs. A UE may switch an active BWP from a first BWP to a second BWP in response to receiving a DCI indicating the second BWP as an active BWP and/or in response to an expiry of the BWP inactivity timer (e.g., if the second BWP is the default BWP).

Downlink and uplink BWP switching (where BWP switching refers to switching from a currently active BWP to a not currently active BWP) may be performed independently in paired spectra. In unpaired spectra, downlink and uplink BWP switching may be performed simultaneously. Switching between configured BWPs may occur based on RRC signaling, DCI, expiration of a BWP inactivity timer, and/or an initiation of random access.

Figure 9:
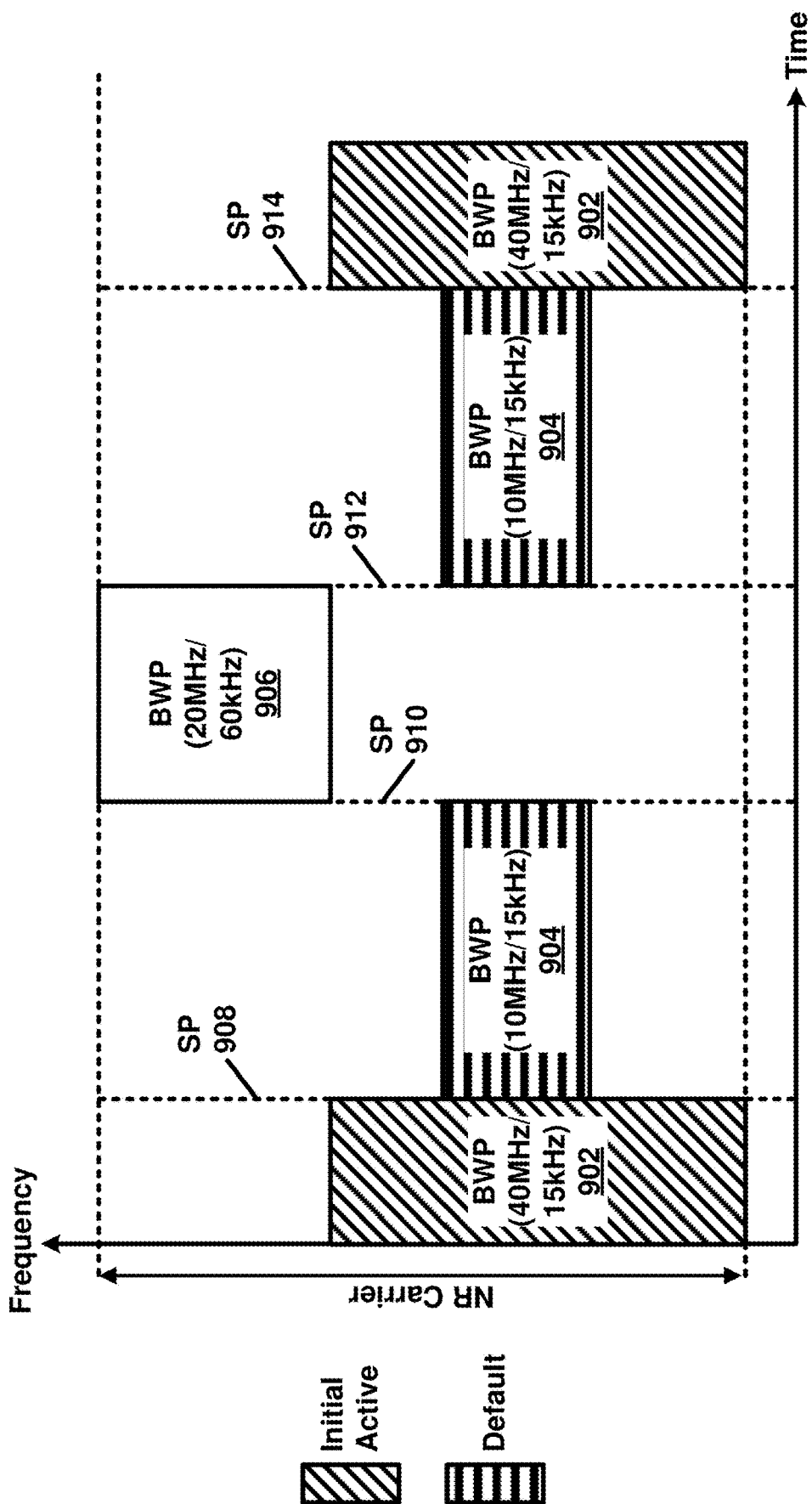
FIG. 9 illustrates an example of bandwidth adaptation using three configured BWPs for an NR carrier.

FIG. 9 illustrates an example of bandwidth adaptation using three configured BWPs for an NR carrier. A UE configured with the three BWPs may switch from one BWP to another BWP at a switching point. In the example illustrated in FIG. 9, the BWPs include: a BWP 902 with a bandwidth of 40 MHz and a subcarrier spacing of 15 kHz; a BWP 904 with a bandwidth of 10 MHz and a subcarrier spacing of 15 kHz; and a BWP 906 with a bandwidth of 20 MHz and a subcarrier spacing of 60 KHz. The BWP 902 may be an initial active BWP, and the BWP 904 may be a default BWP. The UE may switch between BWPs at switching points. In the example of FIG. 9, the UE may switch from the BWP 902 to the BWP 904 at a switching point 908. The switching at the switching point 908 may occur for any suitable reason, for example, in response to an expiry of a BWP inactivity timer (indicating switching to the default BWP) and/or in response to receiving a DCI indicating BWP 904 as the active BWP. The UE may switch at a switching point 910 from active BWP 904 to BWP 906 in response receiving a DCI indicating BWP 906 as the active BWP. The UE may switch at a switching point 912 from active BWP 906 to BWP 904 in response to an expiry of a BWP inactivity timer and/or in response receiving a DCI indicating BWP 904 as the active BWP. The UE may switch at a switching point 914 from active BWP 904 to BWP 902 in response receiving a DCI indicating BWP 902 as the active BWP.

If a UE is configured for a secondary cell with a default downlink BWP in a set of configured downlink BWPs and a timer value, UE procedures for switching BWPs on a secondary cell may be the same/similar as those on a primary cell. For example, the UE may use the timer value and the default downlink BWP for the secondary cell in the same/similar manner as the UE To provide for greater data rates, two or more carriers can be aggregated and simultaneously transmitted to/from the same UE using carrier aggregation (CA). The aggregated carriers in CA may be referred to as component carriers (CCs). When CA is used, there are a number of serving cells for the UE, one for a CC. The CCs may have three configurations in the frequency domain.

Figure 10A:
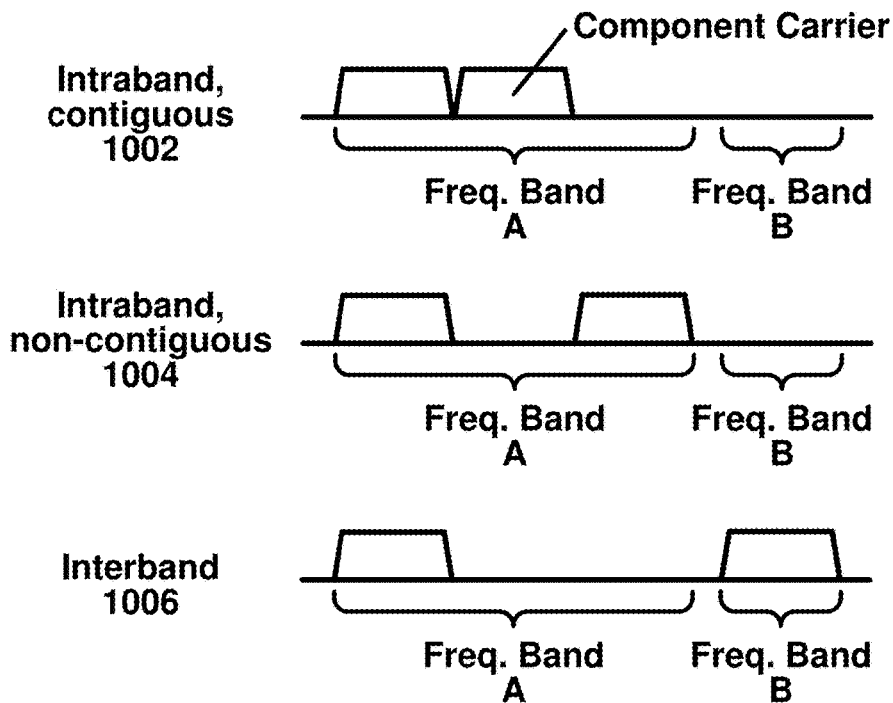
FIG. 10A illustrates three carrier aggregation configurations with two component carriers.

FIG. 10A illustrates the three CA configurations with two CCs. In the intraband, contiguous configuration 1002, the two CCs are aggregated in the same frequency band (frequency band A) and are located directly adjacent to each other within the frequency band. In the intraband, non-contiguous configuration 1004, the two CCs are aggregated in the same frequency band (frequency band A) and are separated in the frequency band by a gap. In the interband configuration 1006, the two CCs are located in frequency bands (frequency band A and frequency band B).

In an example, up to 32 CCs may be aggregated. The aggregated CCs may have the same or different bandwidths, subcarrier spacing, and/or duplexing schemes (TDD or FDD). A serving cell for a UE using CA may have a downlink CC. For FDD, one or more uplink CCs may be optionally configured for a serving cell. The ability to aggregate more downlink carriers than uplink carriers may be useful, for example, when the UE has more data traffic in the downlink than in the uplink.

When CA is used, one of the aggregated cells for a UE may be referred to as a primary cell (PCell). The PCell may be the serving cell that the UE initially connects to at RRC connection establishment, reestablishment, and/or handover. The PCell may provide the UE with NAS mobility information and the security input. UEs may have different PCells. In the downlink, the carrier corresponding to the PCell may be referred to as the downlink primary CC (DL PCC). In the uplink, the carrier corresponding to the PCell may be referred to as the uplink primary CC (UL PCC). The other aggregated cells for the UE may be referred to as secondary cells (SCells). In an example, the SCells may be configured after the PCell is configured for the UE. For example, an SCell may be configured through an RRC Connection Reconfiguration procedure. In the downlink, the carrier corresponding to an SCell may be referred to as a downlink secondary CC (DL SCC). In the uplink, the carrier corresponding to the SCell may be referred to as the uplink secondary CC (UL SCC).

Configured SCells for a UE may be activated and deactivated based on, for example, traffic and channel conditions. Deactivation of an SCell may mean that PDCCH and PDSCH reception on the SCell is stopped and PUSCH, SRS, and CQI transmissions on the SCell are stopped. Configured SCells may be activated and deactivated using a MAC CE with respect to FIG. 4B. For example, a MAC CE may use a bitmap (e.g., one bit per SCell) to indicate which SCells (e.g., in a subset of configured SCells) for the UE are activated or deactivated. Configured SCells may be deactivated in response to an expiration of an SCell deactivation timer (e.g., one SCell deactivation timer per SCell).

Downlink control information, such as scheduling assignments and scheduling grants, for a cell may be transmitted on the cell corresponding to the assignments and grants, which is known as self-scheduling. The DCI for the cell may be transmitted on another cell, which is known as cross-carrier scheduling. Uplink control information (e.g., HARQ acknowledgments and channel state feedback, such as CQI, PMI, and/or RI) for aggregated cells may be transmitted on the PUCCH of the PCell. For a larger number of aggregated downlink CCs, the PUCCH of the PCell may become overloaded. Cells may be divided into multiple PUCCH groups.

Figure 10B:
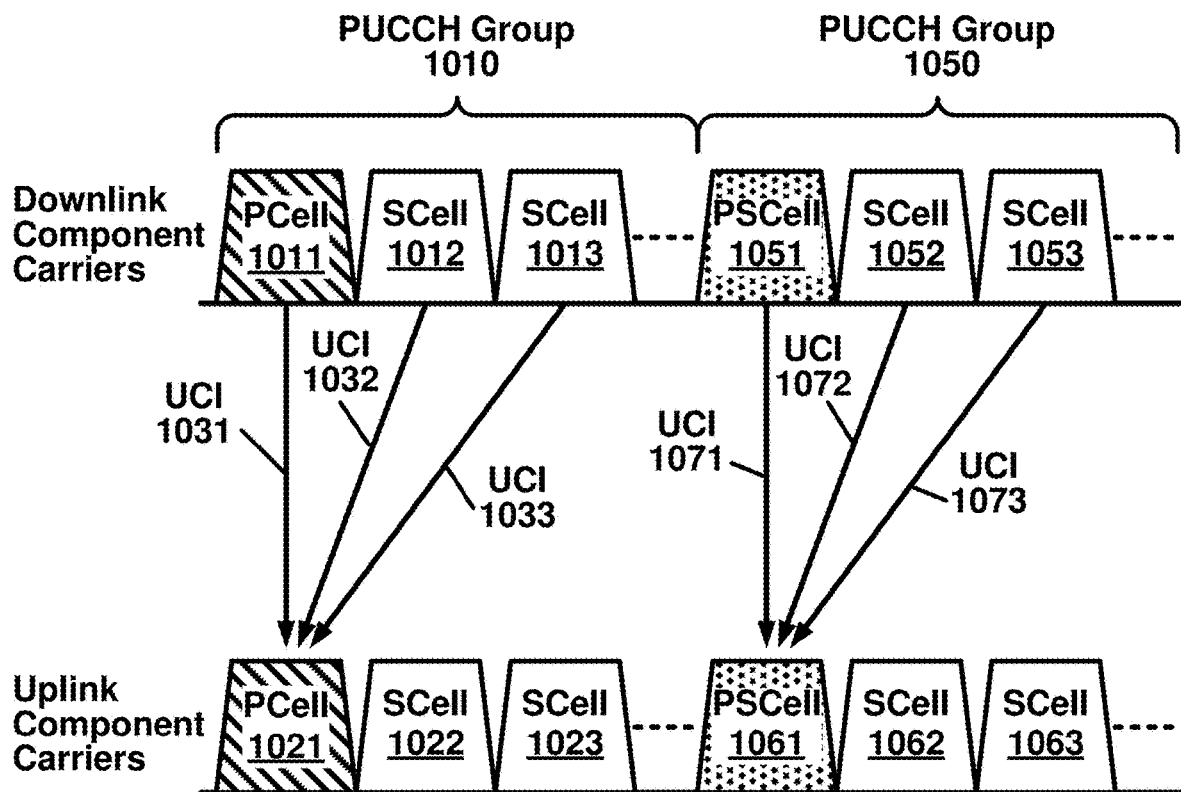
FIG. 10B illustrates an example of how aggregated cells may be configured into one or more PUCCH groups.

FIG. 10B illustrates an example of how aggregated cells may be configured into one or more PUCCH groups. A PUCCH group 1010 and a PUCCH group 1050 may include one or more downlink CCs, respectively. In the example of FIG. 10B, the PUCCH group 1010 includes three downlink CCs: a PCell 1011, an SCell 1012, and an SCell 1013. The PUCCH group 1050 includes three downlink CCs in the present example: a PCell 1051, an SCell 1052, and an SCell 1053. One or more uplink CCs may be configured as a PCell 1021, an SCell 1022, and an SCell 1023. One or more other uplink CCs may be configured as a primary Scell (PSCell) 1061, an SCell 1062, and an SCell 1063. Uplink control information (UCI) related to the downlink CCs of the PUCCH group 1010, shown as UCI 1031, UCI 1032, and UCI 1033, may be transmitted in the uplink of the PCell 1021. Uplink control information (UCI) related to the downlink CCs of the PUCCH group 1050, shown as UCI 1071, UCI 1072, and UCI 1073, may be transmitted in the uplink of the PSCell 1061. In an example, if the aggregated cells depicted in FIG. 10B were not divided into the PUCCH group 1010 and the PUCCH group 1050, a single uplink PCell to transmit UCI relating to the downlink CCs, and the PCell may become overloaded. By dividing transmissions of UCI between the PCell 1021 and the PSCell 1061, overloading may be prevented.

A cell, comprising a downlink carrier and optionally an uplink carrier, may be assigned with a physical cell ID and a cell index. The physical cell ID or the cell index may identify a downlink carrier and/or an uplink carrier of the cell, for example, depending on the context in which the physical cell ID is used. A physical cell ID may be determined using a synchronization signal transmitted on a downlink component carrier. A cell index may be determined using RRC messages. In the disclosure, a physical cell ID may be referred to as a carrier ID, and a cell index may be referred to as a carrier index. For example, when the disclosure refers to a first physical cell ID for a first downlink carrier, the disclosure may mean the first physical cell ID is for a cell comprising the first downlink carrier. The same/similar concept may apply to, for example, a carrier activation. When the disclosure indicates that a first carrier is activated, the specification may mean that a cell comprising the first carrier is activated.

In CA, a multi-carrier nature of a PHY may be exposed to a MAC. In an example, a HARQ entity may operate on a serving cell. A transport block may be generated per assignment/grant per serving cell. A transport block and potential HARQ retransmissions of the transport block may be mapped to a serving cell.

In the downlink, a base station may transmit (e.g., unicast, multicast, and/or broadcast) one or more Reference Signals (RSs) to a UE (e.g., PSS, SSS, CSI-RS, DMRS, and/or PT-RS, as shown in FIG. 5A). In the uplink, the UE may transmit one or more RSs to the base station (e.g., DMRS, PT-RS, and/or SRS, as shown in FIG. 5B). The PSS and the SSS may be transmitted by the base station and used by the UE to synchronize the UE to the base station. The PSS and the SSS may be provided in a synchronization signal (SS)/physical broadcast channel (PBCH) block that includes the PSS, the SSS, and the PBCH. The base station may periodically transmit a burst of SS/PBCH blocks.

Figure 11A:
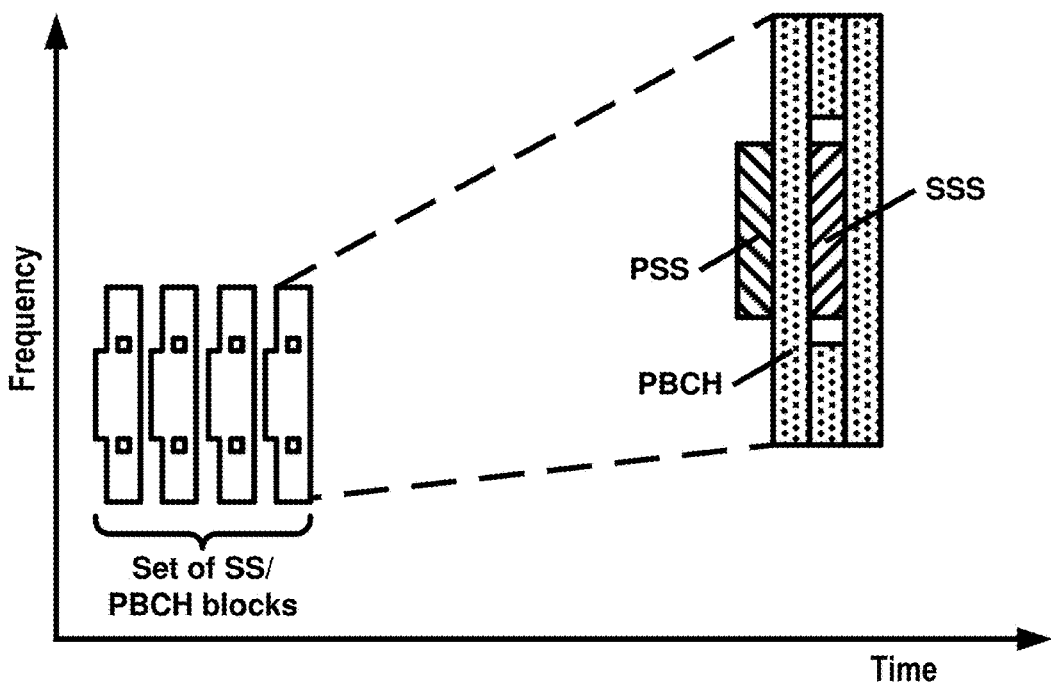
FIG. 11A illustrates an example of an SS/PBCH block structure and location.

FIG. 11A illustrates an example of an SS/PBCH block's structure and location. A burst of SS/PBCH blocks may include one or more SS/PBCH blocks (e.g., 4 SS/PBCH blocks, as shown in FIG. 11A). Bursts may be transmitted periodically (e.g., every 2 frames or 20 ms). A burst may be restricted to a half-frame (e.g., a first half-frame having a duration of 5 ms). It will be understood that FIG. 11A is an example, and that these parameters (number of SS/PBCH blocks per burst, periodicity of bursts, position of burst within the frame) may be configured based on, for example: a carrier frequency of a cell in which the SS/PBCH block is transmitted; a numerology or subcarrier spacing of the cell; a configuration by the network (e.g., using RRC signaling); or any other suitable factor. In an example, the UE may assume a subcarrier spacing for the SS/PBCH block based on the carrier frequency being monitored, unless the radio network configured the UE to assume a different subcarrier spacing.

The SS/PBCH block may span one or more OFDM symbols in the time domain (e.g., 4 OFDM symbols, as shown in the example of FIG. 11A) and may span one or more subcarriers in the frequency domain (e.g., 240 contiguous subcarriers). The PSS, the SSS, and the PBCH may have a common center frequency. The PSS may be transmitted first and may span, for example, 1 OFDM symbol and 127 subcarriers. The SSS may be transmitted after the PSS (e.g., two symbols later) and may span 1 OFDM symbol and 127 subcarriers. The PBCH may be transmitted after the PSS (e.g., across the next 3 OFDM symbols) and may span 240 subcarriers.

The location of the SS/PBCH block in the time and frequency domains may not be known to the UE (e.g., if the UE is searching for the cell). To find and select the cell, the UE may monitor a carrier for the PSS. For example, the UE may monitor a frequency location within the carrier. If the PSS is not found after a certain duration (e.g., 20 ms), the UE may search for the PSS at a different frequency location within the carrier, as indicated by a synchronization raster. If the PSS is found at a location in the time and frequency domains, the UE may determine, based on a known structure of the SS/PBCH block, the locations of the SSS and the PBCH, respectively. The SS/PBCH block may be a cell-defining SS block (CD-SSB). In an example, a primary cell may be associated with a CD-SSB. The CD-SSB may be located on a synchronization raster. In an example, a cell selection/search and/or reselection may be based on the CD-SSB.

The SS/PBCH block may be used by the UE to determine one or more parameters of the cell. For example, the UE may determine a physical cell identifier (PCI) of the cell based on the sequences of the PSS and the SSS, respectively. The UE may determine a location of a frame boundary of the cell based on the location of the SS/PBCH block. For example, the SS/PBCH block may indicate that it has been transmitted in accordance with a transmission pattern, wherein a SS/PBCH block in the transmission pattern is a known distance from the frame boundary.

The PBCH may use a QPSK modulation and may use forward error correction (FEC). The FEC may use polar coding. One or more symbols spanned by the PBCH may carry one or more DMRSs for demodulation of the PBCH. The PBCH may include an indication of a current system frame number (SFN) of the cell and/or a SS/PBCH block timing index. These parameters may facilitate time synchronization of the UE to the base station. The PBCH may include a master information block (MIB) used to provide the UE with one or more parameters. The MIB may be used by the UE to locate remaining minimum system information (RMSI) associated with the cell. The RMSI may include a System Information Block Type 1 (SIB1). The SIB1 may contain information needed by the UE to access the cell. The UE may use one or more parameters of the MIB to monitor PDCCH, which may be used to schedule PDSCH. The PDSCH may include the SIB1. The SIB1 may be decoded using parameters provided in the MIB. The PBCH may indicate an absence of SIB1. Based on the PBCH indicating the absence of SIB1, the UE may be pointed to a frequency. The UE may search for an SS/PBCH block at the frequency to which the UE is pointed.

The UE may assume that one or more SS/PBCH blocks transmitted with a same SS/PBCH block index are quasi co-located (QCLed) (e.g., having the same/similar Doppler spread, Doppler shift, average gain, average delay, and/or spatial Rx parameters). The UE may not assume QCL for SS/PBCH block transmissions having different SS/PBCH block indices.

SS/PBCH blocks (e.g., those within a half-frame) may be transmitted in spatial directions (e.g., using different beams that span a coverage area of the cell). In an example, a first SS/PBCH block may be transmitted in a first spatial direction using a first beam, and a second SS/PBCH block may be transmitted in a second spatial direction using a second beam.

In an example, within a frequency span of a carrier, a base station may transmit a plurality of SS/PBCH blocks. In an example, a first PCI of a first SS/PBCH block of the plurality of SS/PBCH blocks may be different from a second PCI of a second SS/PBCH block of the plurality of SS/PBCH blocks. The PCIs of SS/PBCH blocks transmitted in different frequency locations may be different or the same.

The CSI-RS may be transmitted by the base station and used by the UE to acquire channel state information (CSI). The base station may configure the UE with one or more CSI-RSs for channel estimation or any other suitable purpose. The base station may configure a UE with one or more of the same/similar CSI-RSs. The UE may measure the one or more CSI-RSs. The UE may estimate a downlink channel state and/or generate a CSI report based on the measuring of the one or more downlink CSI-RSs. The UE may provide the CSI report to the base station. The base station may use feedback provided by the UE (e.g., the estimated downlink channel state) to perform link adaptation.

The base station may semi-statically configure the UE with one or more CSI-RS resource sets. A CSI-RS resource may be associated with a location in the time and frequency domains and a periodicity. The base station may selectively activate and/or deactivate a CSI-RS resource. The base station may indicate to the UE that a CSI-RS resource in the CSI-RS resource set is activated and/or deactivated.

The base station may configure the UE to report CSI measurements. The base station may configure the UE to provide CSI reports periodically, aperiodically, or semi-persistently. For periodic CSI reporting, the UE may be configured with a timing and/or periodicity of a plurality of CSI reports. For aperiodic CSI reporting, the base station may request a CSI report. For example, the base station may command the UE to measure a configured CSI-RS resource and provide a CSI report relating to the measurements. For semi-persistent CSI reporting, the base station may configure the UE to transmit periodically, and selectively activate or deactivate the periodic reporting. The base station may configure the UE with a CSI-RS resource set and CSI reports using RRC signaling.

The CSI-RS configuration may comprise one or more parameters indicating, for example, up to 32 antenna ports. The UE may be configured to employ the same OFDM symbols for a downlink CSI-RS and a control resource set (CORESET) when the downlink CSI-RS and CORESET are spatially QCLed and resource elements associated with the downlink CSI-RS are outside of the physical resource blocks (PRBs) configured for the CORESET. The UE may be configured to employ the same OFDM symbols for downlink CSI-RS and SS/PBCH blocks when the downlink CSI-RS and SS/PBCH blocks are spatially QCLed and resource elements associated with the downlink CSI-RS are outside of PRBs configured for the SS/PBCH blocks.

Downlink DMRSs may be transmitted by a base station and used by a UE for channel estimation. For example, the downlink DMRS may be used for coherent demodulation of one or more downlink physical channels (e.g., PDSCH). An NR network may support one or more variable and/or configurable DMRS patterns for data demodulation. At least one downlink DMRS configuration may support a front-loaded DMRS pattern. A front-loaded DMRS may be mapped over one or more OFDM symbols (e.g., one or two adjacent OFDM symbols). A base station may semi-statically configure the UE with a number (e.g. a maximum number) of front-loaded DMRS symbols for PDSCH. A DMRS configuration may support one or more DMRS ports. For example, for single user-MIMO, a DMRS configuration may support up to eight orthogonal downlink DMRS ports per UE. For multiuser-MIMO, a DMRS configuration may support up to 4 orthogonal downlink DMRS ports per UE. A radio network may support (e.g., at least for CP-OFDM) a common DMRS structure for downlink and uplink, wherein a DMRS location, a DMRS pattern, and/or a scrambling sequence may be the same or different. The base station may transmit a downlink DMRS and a corresponding PDSCH using the same precoding matrix. The UE may use the one or more downlink DMRSs for coherent demodulation/channel estimation of the PDSCH.

In an example, a transmitter (e.g., a base station) may use a precoder matrices for a part of a transmission bandwidth. For example, the transmitter may use a first precoder matrix for a first bandwidth and a second precoder matrix for a second bandwidth. The first precoder matrix and the second precoder matrix may be different based on the first bandwidth being different from the second bandwidth. The UE may assume that a same precoding matrix is used across a set of PRBs. The set of PRBs may be denoted as a precoding resource block group (PRG).

A PDSCH may comprise one or more layers. The UE may assume that at least one symbol with DMRS is present on a layer of the one or more layers of the PDSCH. A higher layer may configure up to 3 DMRSs for the PDSCH.

Downlink PT-RS may be transmitted by a base station and used by a UE for phase-noise compensation. Whether a downlink PT-RS is present or not may depend on an RRC configuration. The presence and/or pattern of the downlink PT-RS may be configured on a UE-specific basis using a combination of RRC signaling and/or an association with one or more parameters employed for other purposes (e.g., modulation and coding scheme (MCS), which may be indicated by DCI. When configured, a dynamic presence of a downlink PT-RS may be associated with one or more DCI parameters comprising at least MCS. An NR network may support a plurality of PT-RS densities defined in the time and/or frequency domains. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. Downlink PT-RS may be confined in the scheduled time/frequency duration for the UE. Downlink PT-RS may be transmitted on symbols to facilitate phase tracking at the receiver.

The UE may transmit an uplink DMRS to a base station for channel estimation. For example, the base station may use the uplink DMRS for coherent demodulation of one or more uplink physical channels. For example, the UE may transmit an uplink DMRS with a PUSCH and/or a PUCCH. The uplink DM-RS may span a range of frequencies that is similar to a range of frequencies associated with the corresponding physical channel. The base station may configure the UE with one or more uplink DMRS configurations. At least one DMRS configuration may support a front-loaded DMRS pattern. The front-loaded DMRS may be mapped over one or more OFDM symbols (e.g., one or two adjacent OFDM symbols). One or more uplink DMRSs may be configured to transmit at one or more symbols of a PUSCH and/or a PUCCH. The base station may semi-statically configure the UE with a number (e.g. maximum number) of front-loaded DMRS symbols for the PUSCH and/or the PUCCH, which the UE may use to schedule a single-symbol DMRS and/or a double-symbol DMRS. An NR network may support (e.g., for cyclic prefix orthogonal frequency division multiplexing (CP-OFDM)) a common DMRS structure for downlink and uplink, wherein a DMRS location, a DMRS pattern, and/or a scrambling sequence for the DMRS may be the same or different.

A PUSCH may comprise one or more layers, and the UE may transmit at least one symbol with DMRS present on a layer of the one or more layers of the PUSCH. In an example, a higher layer may configure up to three DMRSs for the PUSCH.

Uplink PT-RS (which may be used by a base station for phase tracking and/or phase-noise compensation) may or may not be present depending on an RRC configuration of the UE. The presence and/or pattern of uplink PT-RS may be configured on a UE-specific basis by a combination of RRC signaling and/or one or more parameters employed for other purposes (e.g., Modulation and Coding Scheme (MCS)), which may be indicated by DCI. When configured, a dynamic presence of uplink PT-RS may be associated with one or more DCI parameters comprising at least MCS. A radio network may support a plurality of uplink PT-RS densities defined in time/frequency domain. When present, a frequency domain density may be associated with at least one configuration of a scheduled bandwidth. The UE may assume a same precoding for a DMRS port and a PT-RS port. A number of PT-RS ports may be fewer than a number of DMRS ports in a scheduled resource. For example, uplink PT-RS may be confined in the scheduled time/frequency duration for the UE.

SRS may be transmitted by a UE to a base station for channel state estimation to support uplink channel dependent scheduling and/or link adaptation. SRS transmitted by the UE may allow a base station to estimate an uplink channel state at one or more frequencies. A scheduler at the base station may employ the estimated uplink channel state to assign one or more resource blocks for an uplink PUSCH transmission from the UE. The base station may semi-statically configure the UE with one or more SRS resource sets. For an SRS resource set, the base station may configure the UE with one or more SRS resources. An SRS resource set applicability may be configured by a higher layer (e.g., RRC) parameter. For example, when a higher layer parameter indicates beam management, an SRS resource in a SRS resource set of the one or more SRS resource sets (e.g., with the same/similar time domain behavior, periodic, aperiodic, and/or the like) may be transmitted at a time instant (e.g., simultaneously). The UE may transmit one or more SRS resources in SRS resource sets. An NR network may support aperiodic, periodic and/or semi-persistent SRS transmissions. The UE may transmit SRS resources based on one or more trigger types, wherein the one or more trigger types may comprise higher layer signaling (e.g., RRC) and/or one or more DCI formats. In an example, at least one DCI format may be employed for the UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH and SRS are transmitted in a same slot, the UE may be configured to transmit SRS after a transmission of a PUSCH and a corresponding uplink DMRS.

The base station may semi-statically configure the UE with one or more SRS configuration parameters indicating at least one of following: a SRS resource configuration identifier; a number of SRS ports; time domain behavior of an SRS resource configuration (e.g., an indication of periodic, semi-persistent, or aperiodic SRS); slot, mini-slot, and/or subframe level periodicity; offset for a periodic and/or an aperiodic SRS resource; a number of OFDM symbols in an SRS resource; a starting OFDM symbol of an SRS resource; an SRS bandwidth; a frequency hopping bandwidth; a cyclic shift; and/or an SRS sequence ID.

An antenna port is defined such that the channel over which a symbol on the antenna port is conveyed can be inferred from the channel over which another symbol on the same antenna port is conveyed. If a first symbol and a second symbol are transmitted on the same antenna port, the receiver may infer the channel (e.g., fading gain, multipath delay, and/or the like) for conveying the second symbol on the antenna port, from the channel for conveying the first symbol on the antenna port. A first antenna port and a second antenna port may be referred to as quasi co-located (QCLed) if one or more large-scale properties of the channel over which a first symbol on the first antenna port is conveyed may be inferred from the channel over which a second symbol on a second antenna port is conveyed. The one or more large-scale properties may comprise at least one of: a delay spread; a Doppler spread; a Doppler shift; an average gain; an average delay; and/or spatial Receiving (Rx) parameters.

Channels that use beamforming require beam management. Beam management may comprise beam measurement, beam selection, and beam indication. A beam may be associated with one or more reference signals. For example, a beam may be identified by one or more beamformed reference signals. The UE may perform downlink beam measurement based on downlink reference signals (e.g., a channel state information reference signal (CSI-RS)) and generate a beam measurement report. The UE may perform the downlink beam measurement procedure after an RRC connection is set up with a base station.

Figure 11B:
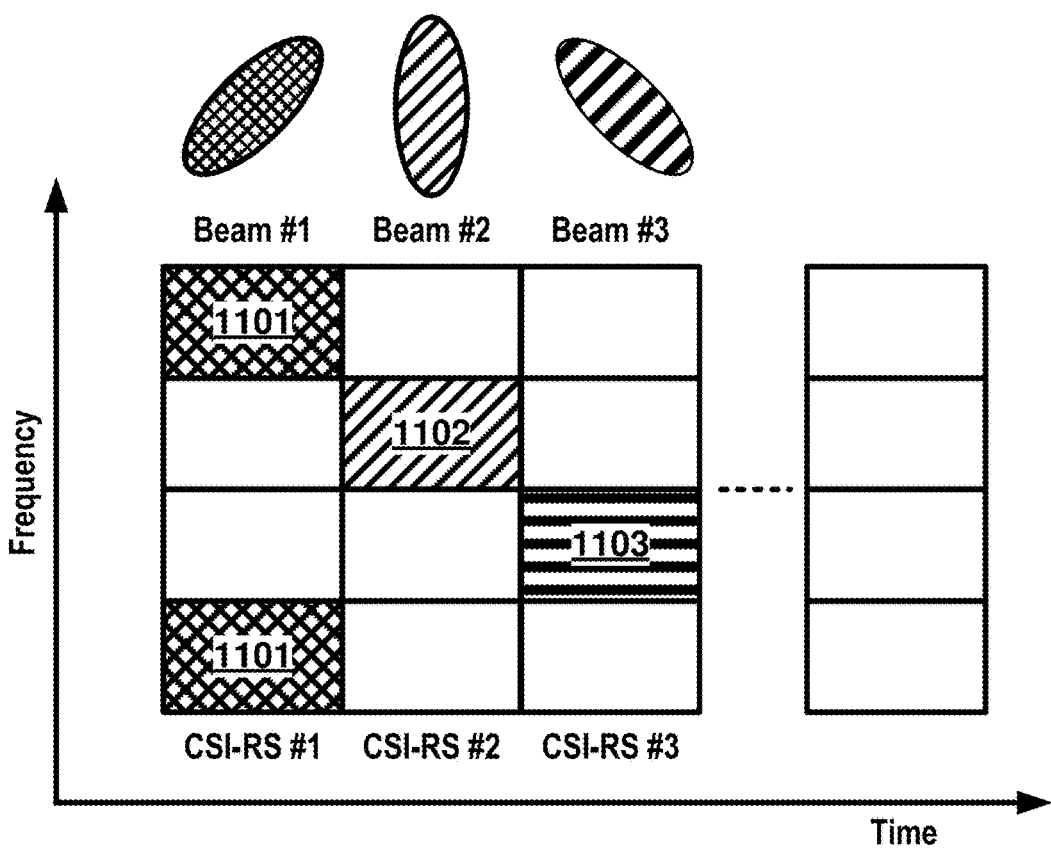
FIG. 11B illustrates an example of CSI-RSs that are mapped in the time and frequency domains.

FIG. 11B illustrates an example of channel state information reference signals (CSI-RSs) that are mapped in the time and frequency domains. A square shown in FIG. 11B may span a resource block (RB) within a bandwidth of a cell. A base station may transmit one or more RRC messages comprising CSI-RS resource configuration parameters indicating one or more CSI-RSs. One or more of the following parameters may be configured by higher layer signaling (e.g., RRC and/or MAC signaling) for a CSI-RS resource configuration: a CSI-RS resource configuration identity, a number of CSI-RS ports, a CSI-RS configuration (e.g., symbol and resource element (RE) locations in a subframe), a CSI-RS subframe configuration (e.g., subframe location, offset, and periodicity in a radio frame), a CSI-RS power parameter, a CSI-RS sequence parameter, a code division multiplexing (CDM) type parameter, a frequency density, a transmission comb, quasi co-location (QCL) parameters (e.g., QCL-scramblingidentity, crs-portscount, mbsfn-subframeconfiglist, csi-rs-configZPid, qcl-csi-rs-configNZPid), and/or other radio resource parameters.

The three beams illustrated in FIG. 11B may be configured for a UE in a UE-specific configuration. Three beams are illustrated in FIG. 11B (beam #1, beam #2, and beam #3), more or fewer beams may be configured. Beam #1 may be allocated with CSI-RS 1101 that may be transmitted in one or more subcarriers in an RB of a first symbol. Beam #2 may be allocated with CSI-RS 1102 that may be transmitted in one or more subcarriers in an RB of a second symbol. Beam #3 may be allocated with CSI-RS 1103 that may be transmitted in one or more subcarriers in an RB of a third symbol. By using frequency division multiplexing (FDM), a base station may use other subcarriers in a same RB (for example, those that are not used to transmit CSI-RS 1101) to transmit another CSI-RS associated with a beam for another UE. By using time domain multiplexing (TDM), beams used for the UE may be configured such that beams for the UE use symbols from beams of other UEs.

CSI-RSs such as those illustrated in FIG. 11B (e.g., CSI-RS 1101, 1102, 1103) may be transmitted by the base station and used by the UE for one or more measurements. For example, the UE may measure a reference signal received power (RSRP) of configured CSI-RS resources. The base station may configure the UE with a reporting configuration and the UE may report the RSRP measurements to a network (for example, via one or more base stations) based on the reporting configuration. In an example, the base station may determine, based on the reported measurement results, one or more transmission configuration indication (TCI) states comprising a number of reference signals. In an example, the base station may indicate one or more TCI states to the UE (e.g., via RRC signaling, a MAC CE, and/or a DCI). The UE may receive a downlink transmission with a receive (Rx) beam determined based on the one or more TCI states. In an example, the UE may or may not have a capability of beam correspondence. If the UE has the capability of beam correspondence, the UE may determine a spatial domain filter of a transmit (Tx) beam based on a spatial domain filter of the corresponding Rx beam. If the UE does not have the capability of beam correspondence, the UE may perform an uplink beam selection procedure to determine the spatial domain filter of the Tx beam. The UE may perform the uplink beam selection procedure based on one or more sounding reference signal (SRS) resources configured to the UE by the base station. The base station may select and indicate uplink beams for the UE based on measurements of the one or more SRS resources transmitted by the UE.

In a beam management procedure, a UE may assess (e.g., measure) a channel quality of one or more beam pair links, a beam pair link comprising a transmitting beam transmitted by a base station and a receiving beam received by the UE. Based on the assessment, the UE may transmit a beam measurement report indicating one or more beam pair quality parameters comprising, e.g., one or more beam identifications (e.g., a beam index, a reference signal index, or the like), RSRP, a precoding matrix indicator (PMI), a channel quality indicator (CQI), and/or a rank indicator (RI).

FIG. 12A illustrates examples of three downlink beam management procedures: P1, P2, and P3. Procedure P1 may enable a UE measurement on transmit (Tx) beams of a transmission reception point (TRP) (or multiple TRPs), e.g., to support a selection of one or more base station Tx beams and/or UE Rx beams (shown as ovals in the top row and bottom row, respectively, of P1). Beamforming at a TRP may comprise a Tx beam sweep for a set of beams (shown, in the top rows of P1 and P2, as ovals rotated in a counter-clockwise direction indicated by the dashed arrow). Beamforming at a UE may comprise an Rx beam sweep for a set of beams (shown, in the bottom rows of P1 and P3, as ovals rotated in a clockwise direction indicated by the dashed arrow). Procedure P2 may be used to enable a UE measurement on Tx beams of a TRP (shown, in the top row of P2, as ovals rotated in a counter-clockwise direction indicated by the dashed arrow). The UE and/or the base station may perform procedure P2 using a smaller set of beams than is used in procedure P1, or using narrower beams than the beams used in procedure P1. This may be referred to as beam refinement. The UE may perform procedure P3 for Rx beam determination by using the same Tx beam at the base station and sweeping an Rx beam at the UE.

FIG. 12B illustrates examples of three uplink beam management procedures: U1, U2, and U3. Procedure U1 may be used to enable a base station to perform a measurement on Tx beams of a UE, e.g., to support a selection of one or more UE Tx beams and/or base station Rx beams (shown as ovals in the top row and bottom row, respectively, of U1). Beamforming at the UE may include, e.g., a Tx beam sweep from a set of beams (shown in the bottom rows of U1 and U3 as ovals rotated in a clockwise direction indicated by the dashed arrow). Beamforming at the base station may include, e.g., an Rx beam sweep from a set of beams (shown, in the top rows of U1 and U2, as ovals rotated in a counter-clockwise direction indicated by the dashed arrow). Procedure U2 may be used to enable the base station to adjust its Rx beam when the UE uses a fixed Tx beam. The UE and/or the base station may perform procedure U2 using a smaller set of beams than is used in procedure P1, or using narrower beams than the beams used in procedure P1. This may be referred to as beam refinement The UE may perform procedure U3 to adjust its Tx beam when the base station uses a fixed Rx beam.

A UE may initiate a beam failure recovery (BFR) procedure based on detecting a beam failure. The UE may transmit a BFR request (e.g., a preamble, a UCI, an SR, a MAC CE, and/or the like) based on the initiating of the BFR procedure. The UE may detect the beam failure based on a determination that a quality of beam pair link(s) of an associated control channel is unsatisfactory (e.g., having an error rate higher than an error rate threshold, a received signal power lower than a received signal power threshold, an expiration of a timer, and/or the like).

The UE may measure a quality of a beam pair link using one or more reference signals (RSs) comprising one or more SS/PBCH blocks, one or more CSI-RS resources, and/or one or more demodulation reference signals (DMRSs). A quality of the beam pair link may be based on one or more of a block error rate (BLER), an RSRP value, a signal to interference plus noise ratio (SINR) value, a reference signal received quality (RSRQ) value, and/or a CSI value measured on RS resources. The base station may indicate that an RS resource is quasi co-located (QCLed) with one or more DM-RSs of a channel (e.g., a control channel, a shared data channel, and/or the like). The RS resource and the one or more DMRSs of the channel may be QCLed when the channel characteristics (e.g., Doppler shift, Doppler spread, average delay, delay spread, spatial Rx parameter, fading, and/or the like) from a transmission via the RS resource to the UE are similar or the same as the channel characteristics from a transmission via the channel to the UE.

A network (e.g., a gNB and/or an ng-eNB of a network) and/or the UE may initiate a random access procedure. A UE in an RRC_IDLE state and/or an RRC_INACTIVE state may initiate the random access procedure to request a connection setup to a network. The UE may initiate the random access procedure from an RRC_CONNECTED state. The UE may initiate the random access procedure to request uplink resources (e.g., for uplink transmission of an SR when there is no PUCCH resource available) and/or acquire uplink timing (e.g., when uplink synchronization status is non-synchronized). The UE may initiate the random access procedure to request one or more system information blocks (SIBs) (e.g., other system information such as SIB2, SIB3, and/or the like). The UE may initiate the random access procedure for a beam failure recovery request. A network may initiate a random access procedure for a handover and/or for establishing time alignment for an SCell addition.

Figure 13C:
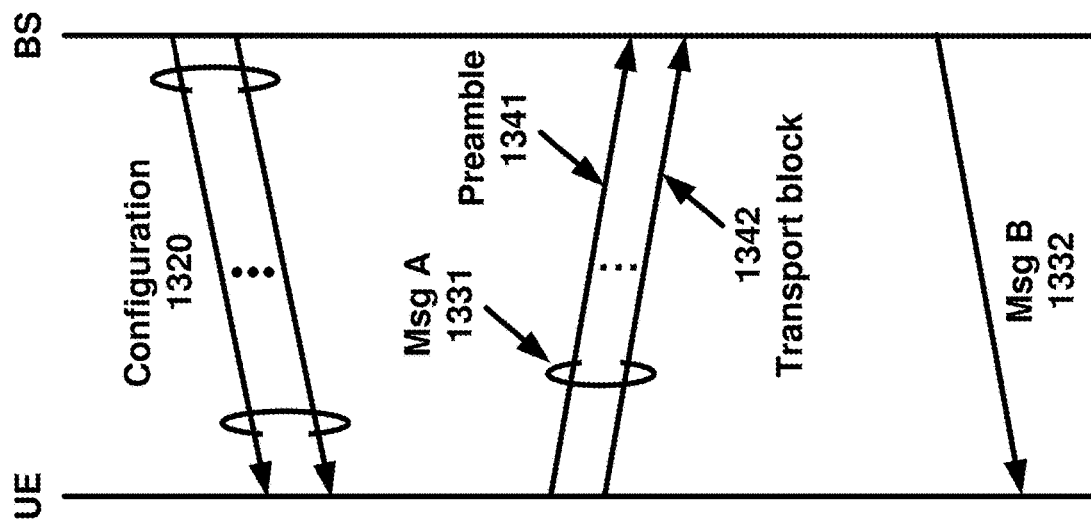
FIG. 13A, FIG. 13B, and FIG. 13C respectively illustrate a four-step contention-based random access procedure, a two-step contention-free random access procedure, and another two-step random access procedure.
Figure 13B:
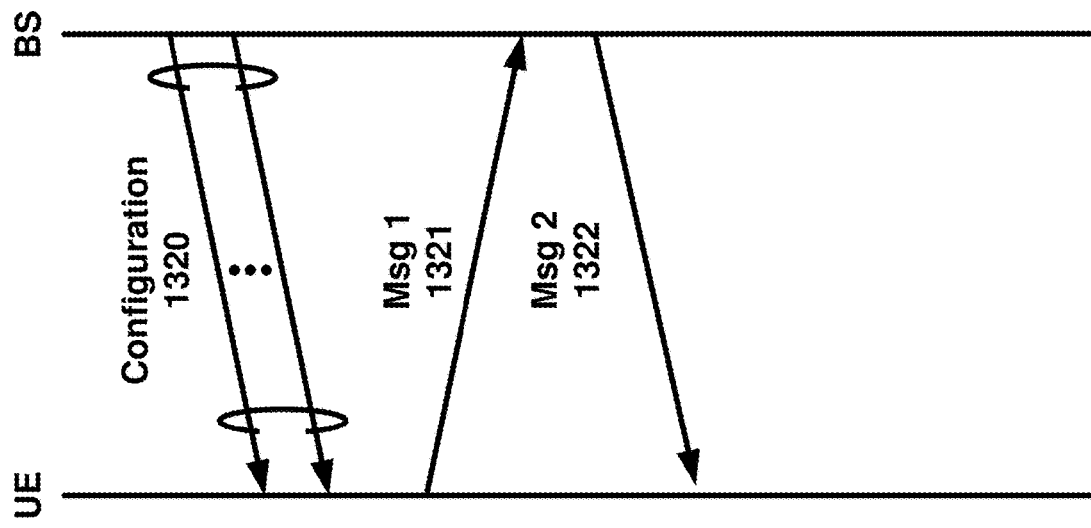
Figure 13A:
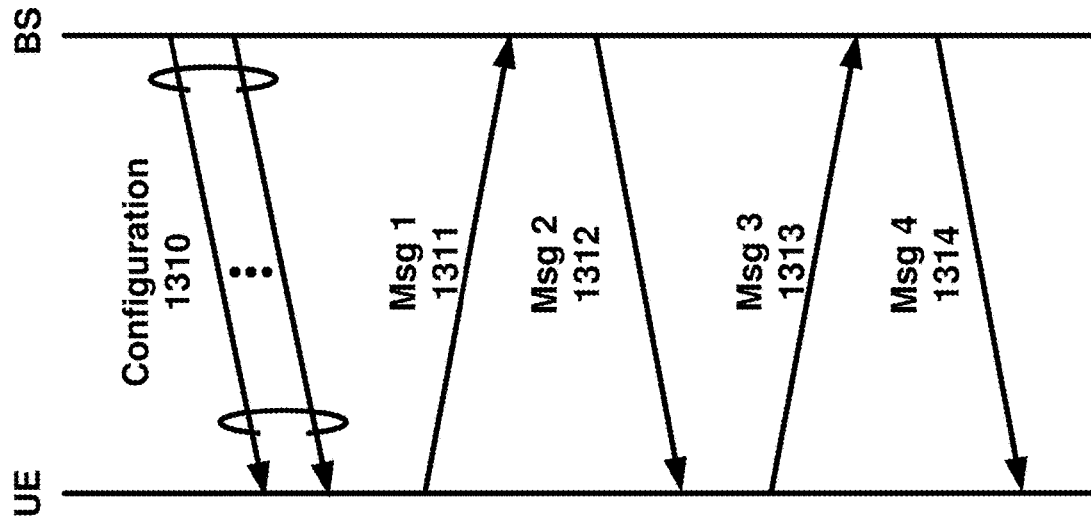

FIG. 13A illustrates a four-step contention-based random access procedure. Prior to initiation of the procedure, a base station may transmit a configuration message 1310 to the UE. The procedure illustrated in FIG. 13A comprises transmission of four messages: a Msg 1 1311, a Msg 2 1312, a Msg 3 1313, and a Msg 4 1314. The Msg 1 1311 may include and/or be referred to as a preamble (or a random access preamble). The Msg 2 1312 may include and/or be referred to as a random access response (RAR).

The configuration message 1310 may be transmitted, for example, using one or more RRC messages. The one or more RRC messages may indicate one or more random access channel (RACH) parameters to the UE. The one or more RACH parameters may comprise at least one of following: general parameters for one or more random access procedures (e.g., RACH-configGeneral); cell-specific parameters (e.g., RACH-ConfigCommon); and/or dedicated parameters (e.g., RACH-configDedicated). The base station may broadcast or multicast the one or more RRC messages to one or more UEs. The one or more RRC messages may be UE-specific (e.g., dedicated RRC messages transmitted to a UE in an RRC_CONNECTED state and/or in an RRC_INACTIVE state). The UE may determine, based on the one or more RACH parameters, a time-frequency resource and/or an uplink transmit power for transmission of the Msg 1 1311 and/or the Msg 3 1313. Based on the one or more RACH parameters, the UE may determine a reception timing and a downlink channel for receiving the Msg 2 1312 and the Msg 4 1314.

The one or more RACH parameters provided in the configuration message 1310 may indicate one or more Physical RACH (PRACH) occasions available for transmission of the Msg 1 1311. The one or more PRACH occasions may be predefined. The one or more RACH parameters may indicate one or more available sets of one or more PRACH occasions (e.g., prach-ConfigIndex). The one or more RACH parameters may indicate an association between (a) one or more PRACH occasions and (b) one or more reference signals. The one or more RACH parameters may indicate an association between (a) one or more preambles and (b) one or more reference signals. The one or more reference signals may be SS/PBCH blocks and/or CSI-RSs. For example, the one or more RACH parameters may indicate a number of SS/PBCH blocks mapped to a PRACH occasion and/or a number of preambles mapped to a SS/PBCH blocks.

The one or more RACH parameters provided in the configuration message 1310 may be used to determine an uplink transmit power of Msg 1 1311 and/or Msg 3 1313. For example, the one or more RACH parameters may indicate a reference power for a preamble transmission (e.g., a received target power and/or an initial power of the preamble transmission). There may be one or more power offsets indicated by the one or more RACH parameters. For example, the one or more RACH parameters may indicate: a power ramping step; a power offset between SSB and CSI-RS; a power offset between transmissions of the Msg 1 1311 and the Msg 3 1313; and/or a power offset value between preamble groups. The one or more RACH parameters may indicate one or more thresholds based on which the UE may determine at least one reference signal (e.g., an SSB and/or CSI-RS) and/or an uplink carrier (e.g., a normal uplink (NUL) carrier and/or a supplemental uplink (SUL) carrier).

The Msg 1 1311 may include one or more preamble transmissions (e.g., a preamble transmission and one or more preamble retransmissions). An RRC message may be used to configure one or more preamble groups (e.g., group A and/or group B). A preamble group may comprise one or more preambles. The UE may determine the preamble group based on a pathloss measurement and/or a size of the Msg 3 1313. The UE may measure an RSRP of one or more reference signals (e.g., SSBs and/or CSI-RSs) and determine at least one reference signal having an RSRP above an RSRP threshold (e.g., rsrp-ThresholdSSB and/or rsrp-Threshold-CSI-RS). The UE may select at least one preamble associated with the one or more reference signals and/or a selected preamble group, for example, if the association between the one or more preambles and the at least one reference signal is configured by an RRC message.

The UE may determine the preamble based on the one or more RACH parameters provided in the configuration message 1310. For example, the UE may determine the preamble based on a pathloss measurement, an RSRP measurement, and/or a size of the Msg 3 1313. As another example, the one or more RACH parameters may indicate: a preamble format; a maximum number of preamble transmissions; and/or one or more thresholds for determining one or more preamble groups (e.g., group A and group B). A base station may use the one or more RACH parameters to configure the UE with an association between one or more preambles and one or more reference signals (e.g., SSBs and/or CSI-RSs). If the association is configured, the UE may determine the preamble to include in Msg 1 1311 based on the association. The Msg 1 1311 may be transmitted to the base station via one or more PRACH occasions. The UE may use one or more reference signals (e.g., SSBs and/or CSI-RSs) for selection of the preamble and for determining of the PRACH occasion. One or more RACH parameters (e.g., ra-ssb-OccasionMskIndex and/or ra-OccasionList) may indicate an association between the PRACH occasions and the one or more reference signals.

The UE may perform a preamble retransmission if no response is received following a preamble transmission. The UE may increase an uplink transmit power for the preamble retransmission. The UE may select an initial preamble transmit power based on a pathloss measurement and/or a target received preamble power configured by the network. The UE may determine to retransmit a preamble and may ramp up the uplink transmit power. The UE may receive one or more RACH parameters (e.g., PREAMBLE_POWER_RAMPING_STEP) indicating a ramping step for the preamble retransmission. The ramping step may be an amount of incremental increase in uplink transmit power for a retransmission. The UE may ramp up the uplink transmit power if the UE determines a reference signal (e.g., SSB and/or CSI-RS) that is the same as a previous preamble transmission. The UE may count a number of preamble transmissions and/or retransmissions (e.g., PREAMBLE_TRANSMISSION_COUNTER). The UE may determine that a random access procedure completed unsuccessfully, for example, if the number of preamble transmissions exceeds a threshold configured by the one or more RACH parameters (e.g., preambleTransMax).

The Msg 2 1312 received by the UE may include an RAR. In some scenarios, the Msg 2 1312 may include multiple RARs corresponding to multiple UEs. The Msg 2 1312 may be received after or in response to the transmitting of the Msg 1 1311. The Msg 2 1312 may be scheduled on the DL-SCH and indicated on a PDCCH using a random access RNTI (RA-RNTI). The Msg 2 1312 may indicate that the Msg 1 1311 was received by the base station. The Msg 2 1312 may include a time-alignment command that may be used by the UE to adjust the UE's transmission timing, a scheduling grant for transmission of the Msg 3 1313, and/or a Temporary Cell RNTI (TC-RNTI). After transmitting a preamble, the UE may start a time window (e.g., ra-ResponseWindow) to monitor a PDCCH for the Msg 2 1312. The UE may determine when to start the time window based on a PRACH occasion that the UE uses to transmit the preamble. For example, the UE may start the time window one or more symbols after a last symbol of the preamble (e.g., at a first PDCCH occasion from an end of a preamble transmission). The one or more symbols may be determined based on a numerology. The PDCCH may be in a common search space (e.g., a Type1-PDCCH common search space) configured by an RRC message. The UE may identify the RAR based on a Radio Network Temporary Identifier (RNTI). RNTIs may be used depending on one or more events initiating the random access procedure. The UE may use random access RNTI (RA-RNTI). The RA-RNTI may be associated with PRACH occasions in which the UE transmits a preamble. For example, the UE may determine the RA-RNTI based on: an OFDM symbol index; a slot index; a frequency domain index; and/or a UL carrier indicator of the PRACH occasions. An example of RA-RNTI may be as follows:

RA-RNTI=1+s_id+14×t_id+14×80×f_id+14×80×8× ul_carrier_id where s_id may be an index of a first OFDM symbol of the PRACH occasion (e.g., 0≤s_id<14), t_id may be an index of a first slot of the PRACH occasion in a system frame (e.g., 0≤t_id<80), f_id may be an index of the PRACH occasion in the frequency domain (e.g., 0≤f_id<8), and ul_carrier_id may be a UL carrier used for a preamble transmission (e.g., 0 for an NUL carrier, and 1 for an SUL carrier).

The UE may transmit the Msg 3 1313 in response to a successful reception of the Msg 2 1312 (e.g., using resources identified in the Msg 2 1312). The Msg 3 1313 may be used for contention resolution in, for example, the contention-based random access procedure illustrated in FIG. 13A. In some scenarios, a plurality of UEs may transmit a same preamble to a base station and the base station may provide an RAR that corresponds to a UE. Collisions may occur if the plurality of UEs interpret the RAR as corresponding to themselves. Contention resolution (e.g., using the Msg 3 1313 and the Msg 4 1314) may be used to increase the likelihood that the UE does not incorrectly use an identity of another the UE. To perform contention resolution, the UE may include a device identifier in the Msg 3 1313 (e.g., a C-RNTI if assigned, a TC-RNTI included in the Msg 2 1312, and/or any other suitable identifier).

The Msg 4 1314 may be received after or in response to the transmitting of the Msg 3 1313. If a C-RNTI was included in the Msg 3 1313, the base station will address the UE on the PDCCH using the C-RNTI. If the UE's unique C-RNTI is detected on the PDCCH, the random access procedure is determined to be successfully completed. If a TC-RNTI is included in the Msg 3 1313 (e.g., if the UE is in an RRC_IDLE state or not otherwise connected to the base station), Msg 4 1314 will be received using a DL-SCH associated with the TC-RNTI. If a MAC PDU is successfully decoded and a MAC PDU comprises the UE contention resolution identity MAC CE that matches or otherwise corresponds with the CCCH SDU sent (e.g., transmitted) in Msg 3 1313, the UE may determine that the contention resolution is successful and/or the UE may determine that the random access procedure is successfully completed.

The UE may be configured with a supplementary uplink (SUL) carrier and a normal uplink (NUL) carrier. An initial access (e.g., random access procedure) may be supported in an uplink carrier. For example, a base station may configure the UE with two separate RACH configurations: one for an SUL carrier and the other for an NUL carrier. For random access in a cell configured with an SUL carrier, the network may indicate which carrier to use (NUL or SUL). The UE may determine the SUL carrier, for example, if a measured quality of one or more reference signals is lower than a broadcast threshold. Uplink transmissions of the random access procedure (e.g., the Msg 1 1311 and/or the Msg 3 1313) may remain on the selected carrier. The UE may switch an uplink carrier during the random access procedure (e.g., between the Msg 1 1311 and the Msg 3 1313) in one or more cases. For example, the UE may determine and/or switch an uplink carrier for the Msg 1 1311 and/or the Msg 3 1313 based on a channel clear assessment (e.g., a listen-before-talk).

FIG. 13B illustrates a two-step contention-free random access procedure. Similar to the four-step contention-based random access procedure illustrated in FIG. 13A, a base station may, prior to initiation of the procedure, transmit a configuration message 1320 to the UE. The configuration message 1320 may be analogous in some respects to the configuration message 1310. The procedure illustrated in FIG. 13B comprises transmission of two messages: a Msg 1 1321 and a Msg 2 1322. The Msg 1 1321 and the Msg 2 1322 may be analogous in some respects to the Msg 1 1311 and a Msg 2 1312 illustrated in FIG. 13A, respectively. As will be understood from FIGS. 13A and 13B, the contention-free random access procedure may not include messages analogous to the Msg 3 1313 and/or the Msg 4 1314.

The contention-free random access procedure illustrated in FIG. 13B may be initiated for a beam failure recovery, other SI request, SCell addition, and/or handover. For example, a base station may indicate or assign to the UE the preamble to be used for the Msg 1 1321. The UE may receive, from the base station via PDCCH and/or RRC, an indication of a preamble (e.g., ra-PreambleIndex).

After transmitting a preamble, the UE may start a time window (e.g., ra-ResponseWindow) to monitor a PDCCH for the RAR. In the event of a beam failure recovery request, the base station may configure the UE with a separate time window and/or a separate PDCCH in a search space indicated by an RRC message (e.g., recoverySearchSpaceId). The UE may monitor for a PDCCH transmission addressed to a Cell RNTI (C-RNTI) on the search space. In the contention-free random access procedure illustrated in FIG. 13B, the UE may determine that a random access procedure successfully completes after or in response to transmission of Msg 1 1321 and reception of a corresponding Msg 2 1322. The UE may determine that a random access procedure successfully completes, for example, if a PDCCH transmission is addressed to a C-RNTI. The UE may determine that a random access procedure successfully completes, for example, if the UE receives an RAR comprising a preamble identifier corresponding to a preamble transmitted by the UE and/or the RAR comprises a MAC sub-PDU with the preamble identifier. The UE may determine the response as an indication of an acknowledgement for an SI request.

FIG. 13C illustrates another two-step random access procedure. Similar to the random access procedures illustrated in FIGS. 13A and 13B, a base station may, prior to initiation of the procedure, transmit a configuration message 1330 to the UE. The configuration message 1330 may be analogous in some respects to the configuration message 1310 and/or the configuration message 1320. The procedure illustrated in FIG. 13C comprises transmission of two messages: a Msg A 1331 and a Msg B 1332.

Msg A 1331 may be transmitted in an uplink transmission by the UE. Msg A 1331 may comprise one or more transmissions of a preamble 1341 and/or one or more transmissions of a transport block 1342. The transport block 1342 may comprise contents that are similar and/or equivalent to the contents of the Msg 3 1313 illustrated in FIG. 13A. The transport block 1342 may comprise UCI (e.g., an SR, a HARQ ACK/NACK, and/or the like). The UE may receive the Msg B 1332 after or in response to transmitting the Msg A 1331. The Msg B 1332 may comprise contents that are similar and/or equivalent to the contents of the Msg 2 1312 (e.g., an RAR) illustrated in FIGS. 13A and 13B and/or the Msg 4 1314 illustrated in FIG. 13A.

The UE may initiate the two-step random access procedure in FIG. 13C for licensed spectrum and/or unlicensed spectrum. The UE may determine, based on one or more factors, whether to initiate the two-step random access procedure. The one or more factors may be: a radio access technology in use (e.g., LTE, NR, and/or the like); whether the UE has valid TA or not; a cell size; the UE's RRC state; a type of spectrum (e.g., licensed vs. unlicensed); and/or any other suitable factors.

The UE may determine, based on two-step RACH parameters included in the configuration message 1330, a radio resource and/or an uplink transmit power for the preamble 1341 and/or the transport block 1342 included in the Msg A 1331. The RACH parameters may indicate a modulation and coding schemes (MCS), a time-frequency resource, and/or a power control for the preamble 1341 and/or the transport block 1342. A time-frequency resource for transmission of the preamble 1341 (e.g., a PRACH) and a time-frequency resource for transmission of the transport block 1342 (e.g., a PUSCH) may be multiplexed using FDM, TDM, and/or CDM. The RACH parameters may enable the UE to determine a reception timing and a downlink channel for monitoring for and/or receiving Msg B 1332.

The transport block 1342 may comprise data (e.g., delay-sensitive data), an identifier of the UE, security information, and/or device information (e.g., an International Mobile Subscriber Identity (IMSI). The base station may transmit the Msg B 1332 as a response to the Msg A 1331. The Msg B 1332 may comprise at least one of following: a preamble identifier; a timing advance command; a power control command; an uplink grant (e.g., a radio resource assignment and/or an MCS); a UE identifier for contention resolution; and/or an RNTI (e.g., a C-RNTI or a TC-RNTI). The UE may determine that the two-step random access procedure is successfully completed if: a preamble identifier in the Msg B 1332 is matched to a preamble transmitted by the UE; and/or the identifier of the UE in Msg B 1332 is matched to the identifier of the UE in the Msg A 1331 (e.g., the transport block 1342).

A UE and a base station may exchange control signaling. The control signaling may be referred to as L1/L2 control signaling and may originate from the PHY layer (e.g., layer 1) and/or the MAC layer (e.g., layer 2). The control signaling may comprise downlink control signaling transmitted from the base station to the UE and/or uplink control signaling transmitted from the UE to the base station.

The downlink control signaling may comprise: a downlink scheduling assignment; an uplink scheduling grant indicating uplink radio resources and/or a transport format; a slot format information; a preemption indication; a power control command; and/or any other suitable signaling. The UE may receive the downlink control signaling in a payload transmitted by the base station on a physical downlink control channel (PDCCH). The payload transmitted on the PDCCH may be referred to as downlink control information (DCI). In some scenarios, the PDCCH may be a group common PDCCH (GC-PDCCH) that is common to a group of UEs.

A base station may attach one or more cyclic redundancy check (CRC) parity bits to a DCI in order to facilitate detection of transmission errors. When the DCI is intended for a UE (or a group of the UEs), the base station may scramble the CRC parity bits with an identifier of the UE (or an identifier of the group of the UEs). Scrambling the CRC parity bits with the identifier may comprise Modulo-2 addition (or an exclusive OR operation) of the identifier value and the CRC parity bits. The identifier may comprise a 16-bit value of a radio network temporary identifier (RNTI).

DCIs may be used for different purposes. A purpose may be indicated by the type of RNTI used to scramble the CRC parity bits. For example, a DCI having CRC parity bits scrambled with a paging RNTI (P-RNTI) may indicate paging information and/or a system information change notification. The P-RNTI may be predefined as "FFFE" in hexadecimal. A DCI having CRC parity bits scrambled with a system information RNTI (SI-RNTI) may indicate a broadcast transmission of the system information. The SI-RNTI may be predefined as "FFFF" in hexadecimal. A DCI having CRC parity bits scrambled with a random access RNTI (RA-RNTI) may indicate a random access response (RAR). A DCI having CRC parity bits scrambled with a cell RNTI (C-RNTI) may indicate a dynamically scheduled unicast transmission and/or a triggering of PDCCH-ordered random access. A DCI having CRC parity bits scrambled with a temporary cell RNTI (TC-RNTI) may indicate a contention resolution (e.g., a Msg 3 analogous to the Msg 3 1313 illustrated in FIG. 13A). Other RNTIs configured to the UE by a base station may comprise a Configured Scheduling RNTI (CS-RNTI), a Transmit Power Control-PUCCH RNTI (TPC-PUCCH-RNTI), a Transmit Power Control-PUSCH RNTI (TPC-PUSCH-RNTI), a Transmit Power Control-SRS RNTI (TPC-SRS-RNTI), an Interruption RNTI (INT-RNTI), a Slot Format Indication RNTI (SFI-RNTI), a Semi-Persistent CSI RNTI (SP-CSI-RNTI), a Modulation and Coding Scheme Cell RNTI (MCS-C-RNTI), and/or the like.

Depending on the purpose and/or content of a DCI, the base station may transmit the DCIs with one or more DCI formats. For example, DCI format 0_0 may be used for scheduling of PUSCH in a cell. DCI format 0_0 may be a fallback DCI format (e.g., with compact DCI payloads). DCI format 0_1 may be used for scheduling of PUSCH in a cell (e.g., with more DCI payloads than DCI format 0_0). DCI format 1_0 may be used for scheduling of PDSCH in a cell. DCI format 1_0 may be a fallback DCI format (e.g., with compact DCI payloads). DCI format 1_1 may be used for scheduling of PDSCH in a cell (e.g., with more DCI payloads than DCI format 1_0). DCI format 2_0 may be used for providing a slot format indication to a group of UEs. DCI format 2_1 may be used for notifying a group of UEs of a physical resource block and/or OFDM symbol where the UE may assume no transmission is intended to the UE. DCI format 2_2 may be used for transmission of a transmit power control (TPC) command for PUCCH or PUSCH. DCI format 2_3 may be used for transmission of a group of TPC commands for SRS transmissions by one or more UEs. DCI format(s) for new functions may be defined in future releases. DCI formats may have different DCI sizes, or may share the same DCI size.

After scrambling a DCI with a RNTI, the base station may process the DCI with channel coding (e.g., polar coding), rate matching, scrambling and/or QPSK modulation. A base station may map the coded and modulated DCI on resource elements used and/or configured for a PDCCH. Based on a payload size of the DCI and/or a coverage of the base station, the base station may transmit the DCI via a PDCCH occupying a number of contiguous control channel elements (CCEs). The number of the contiguous CCEs (referred to as aggregation level) may be 1, 2, 4, 8, 16, and/or any other suitable number. A CCE may comprise a number (e.g., 6) of resource-element groups (REGs). A REG may comprise a resource block in an OFDM symbol. The mapping of the coded and modulated DCI on the resource elements may be based on mapping of CCEs and REGs (e.g., CCE-to-REG mapping).

Figure 14A:
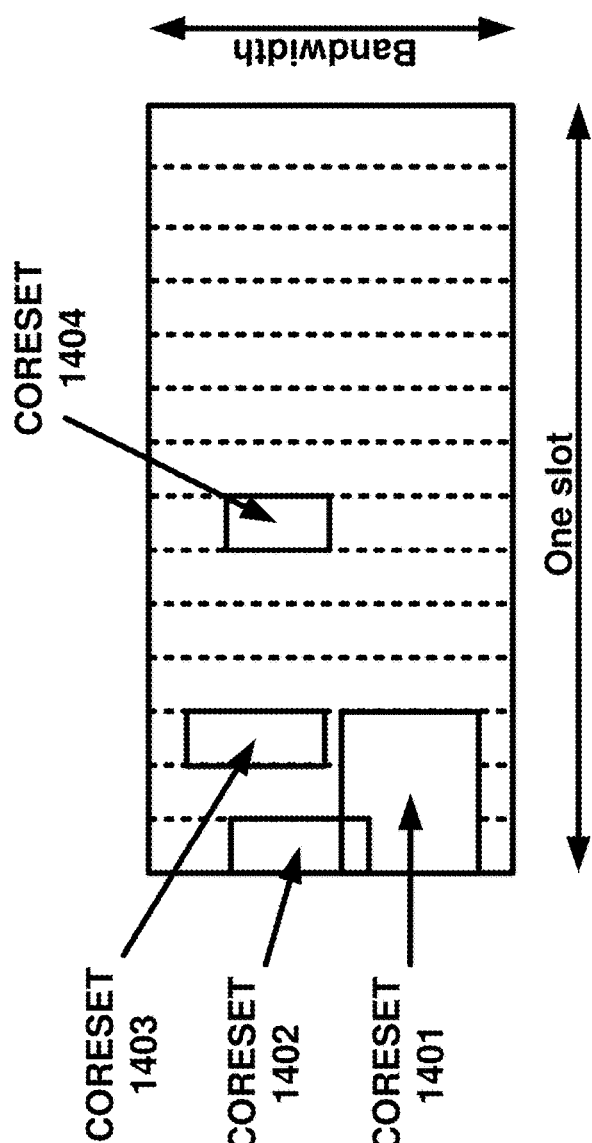
FIG. 14A illustrates an example of CORESET configurations for a bandwidth part.

FIG. 14A illustrates an example of CORESET configurations for a bandwidth part. The base station may transmit a DCI via a PDCCH on one or more control resource sets (CORESETs). A CORESET may comprise a time-frequency resource in which the UE tries to decode a DCI using one or more search spaces. The base station may configure a CORESET in the time-frequency domain. In the example of FIG. 14A, a first CORESET 1401 and a second CORESET 1402 occur at the first symbol in a slot. The first CORESET 1401 overlaps with the second CORESET 1402 in the frequency domain. A third CORESET 1403 occurs at a third symbol in the slot. A fourth CORESET 1404 occurs at the seventh symbol in the slot. CORESETs may have a different number of resource blocks in frequency domain.

Figure 14B:
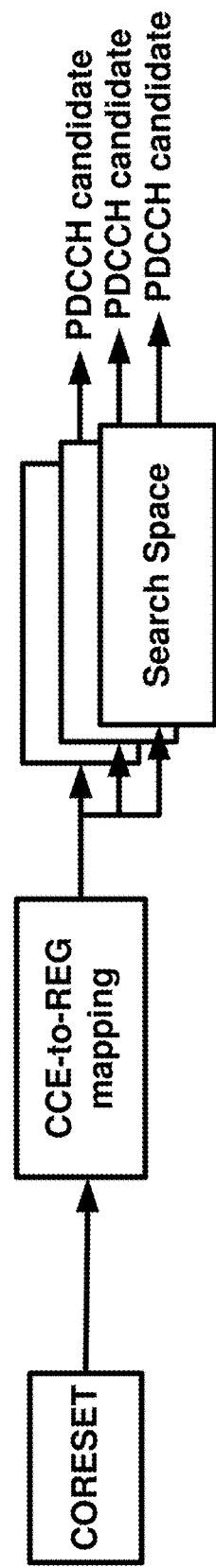
FIG. 14B illustrates an example of a CCE-to-REG mapping for DCI transmission on a CORESET and PDCCH processing.

FIG. 14B illustrates an example of a CCE-to-REG mapping for DCI transmission on a CORESET and PDCCH processing. The CCE-to-REG mapping may be an interleaved mapping (e.g., for the purpose of providing frequency diversity) or a non-interleaved mapping (e.g., for the purposes of facilitating interference coordination and/or frequency-selective transmission of control channels). The base station may perform different or same CCE-to-REG mapping on different CORESETs. A CORESET may be associated with a CCE-to-REG mapping by RRC configuration. A CORESET may be configured with an antenna port quasi co-location (QCL) parameter. The antenna port QCL parameter may indicate QCL information of a demodulation reference signal (DMRS) for PDCCH reception in the CORESET.

The base station may transmit, to the UE, RRC messages comprising configuration parameters of one or more CORESETs and one or more search space sets. The configuration parameters may indicate an association between a search space set and a CORESET. A search space set may comprise a set of PDCCH candidates formed by CCEs at a given aggregation level. The configuration parameters may indicate: a number of PDCCH candidates to be monitored per aggregation level; a PDCCH monitoring periodicity and a PDCCH monitoring pattern; one or more DCI formats to be monitored by the UE; and/or whether a search space set is a common search space set or a UE-specific search space set. A set of CCEs in the common search space set may be predefined and known to the UE. A set of CCEs in the UE-specific search space set may be configured based on the UE's identity (e.g., C-RNTI).

As shown in FIG. 14B, the UE may determine a time-frequency resource for a CORESET based on RRC messages. The UE may determine a CCE-to-REG mapping (e.g., interleaved or non-interleaved, and/or mapping parameters) for the CORESET based on configuration parameters of the CORESET. The UE may determine a number (e.g., at most 10) of search space sets configured on the CORESET based on the RRC messages. The UE may monitor a set of PDCCH candidates according to configuration parameters of a search space set. The UE may monitor a set of PDCCH candidates in one or more CORESETs for detecting one or more DCIs. Monitoring may comprise decoding one or more PDCCH candidates of the set of the PDCCH candidates according to the monitored DCI formats. Monitoring may comprise decoding a DCI content of one or more PDCCH candidates with possible (or configured) PDCCH locations, possible (or configured) PDCCH formats (e.g., number of CCEs, number of PDCCH candidates in common search spaces, and/or number of PDCCH candidates in the UE-specific search spaces) and possible (or configured) DCI formats. The decoding may be referred to as blind decoding. The UE may determine a DCI as valid for the UE, in response to CRC checking (e.g., scrambled bits for CRC parity bits of the DCI matching a RNTI value). The UE may process information contained in the DCI (e.g., a scheduling assignment, an uplink grant, power control, a slot format indication, a downlink preemption, and/or the like).

The UE may transmit uplink control signaling (e.g., uplink control information (UCI) to a base station. The uplink control signaling may comprise hybrid automatic repeat request (HARQ) acknowledgements for received DL-SCH transport blocks. The UE may transmit the HARQ acknowledgements after receiving a DL-SCH transport block. Uplink control signaling may comprise channel state information (CSI) indicating channel quality of a physical downlink channel. The UE may transmit the CSI to the base station. The base station, based on the received CSI, may determine transmission format parameters (e.g., comprising multi-antenna and beamforming schemes) for a downlink transmission. Uplink control signaling may comprise scheduling requests (SR). The UE may transmit an SR indicating that uplink data is available for transmission to the base station. The UE may transmit a UCI (e.g., HARQ acknowledgements (HARQ-ACK), CSI report, SR, and the like) via a physical uplink control channel (PUCCH) or a physical uplink shared channel (PUSCH). The UE may transmit the uplink control signaling via a PUCCH using one of several PUCCH formats.

There may be five PUCCH formats and the UE may determine a PUCCH format based on a size of the UCI (e.g., a number of uplink symbols of UCI transmission and a number of UCI bits). PUCCH format 0 may have a length of one or two OFDM symbols and may include two or fewer bits. The UE may transmit UCI in a PUCCH resource using PUCCH format 0 if the transmission is over one or two symbols and the number of HARQ-ACK information bits with positive or negative SR (HARQ-ACK/SR bits) is one or two. PUCCH format 1 may occupy a number between four and fourteen OFDM symbols and may include two or fewer bits. The UE may use PUCCH format 1 if the transmission is four or more symbols and the number of HARQ-ACK/SR bits is one or two. PUCCH format 2 may occupy one or two OFDM symbols and may include more than two bits. The UE may use PUCCH format 2 if the transmission is over one or two symbols and the number of UCI bits is two or more. PUCCH format 3 may occupy a number between four and fourteen OFDM symbols and may include more than two bits. The UE may use PUCCH format 3 if the transmission is four or more symbols, the number of UCI bits is two or more and PUCCH resource does not include an orthogonal cover code. PUCCH format 4 may occupy a number between four and fourteen OFDM symbols and may include more than two bits. The UE may use PUCCH format 4 if the transmission is four or more symbols, the number of UCI bits is two or more and the PUCCH resource includes an orthogonal cover code.

The base station may transmit configuration parameters to the UE for a plurality of PUCCH resource sets using, for example, an RRC message. The plurality of PUCCH resource sets (e.g., up to four sets) may be configured on an uplink BWP of a cell. A PUCCH resource set may be configured with a PUCCH resource set index, a plurality of PUCCH resources with a PUCCH resource being identified by a PUCCH resource identifier (e.g., pucch-Resourceid), and/or a number (e.g. a maximum number) of UCI information bits the UE may transmit using one of the plurality of PUCCH resources in the PUCCH resource set. When configured with a plurality of PUCCH resource sets, the UE may select one of the plurality of PUCCH resource sets based on a total bit length of the UCI information bits (e.g., HARQ-ACK, SR, and/or CSI). If the total bit length of UCI information bits is two or fewer, the UE may select a first PUCCH resource set having a PUCCH resource set index equal to "0". If the total bit length of UCI information bits is greater than two and less than or equal to a first configured value, the UE may select a second PUCCH resource set having a PUCCH resource set index equal to "1". If the total bit length of UCI information bits is greater than the first configured value and less than or equal to a second configured value, the UE may select a third PUCCH resource set having a PUCCH resource set index equal to "2". If the total bit length of UCI information bits is greater than the second configured value and less than or equal to a third value (e.g., 1406), the UE may select a fourth PUCCH resource set having a PUCCH resource set index equal to "3".

After determining a PUCCH resource set from a plurality of PUCCH resource sets, the UE may determine a PUCCH resource from the PUCCH resource set for UCI (HARQ-ACK, CSI, and/or SR) transmission. The UE may determine the PUCCH resource based on a PUCCH resource indicator in a DCI (e.g., with a DCI format 1_0 or DCI for 1_1) received on a PDCCH. A three-bit PUCCH resource indicator in the DCI may indicate one of eight PUCCH resources in the PUCCH resource set. Based on the PUCCH resource indicator, the UE may transmit the UCI (HARQ-ACK, CSI and/or SR) using a PUCCH resource indicated by the PUCCH resource indicator in the DCI.

Figure 15:
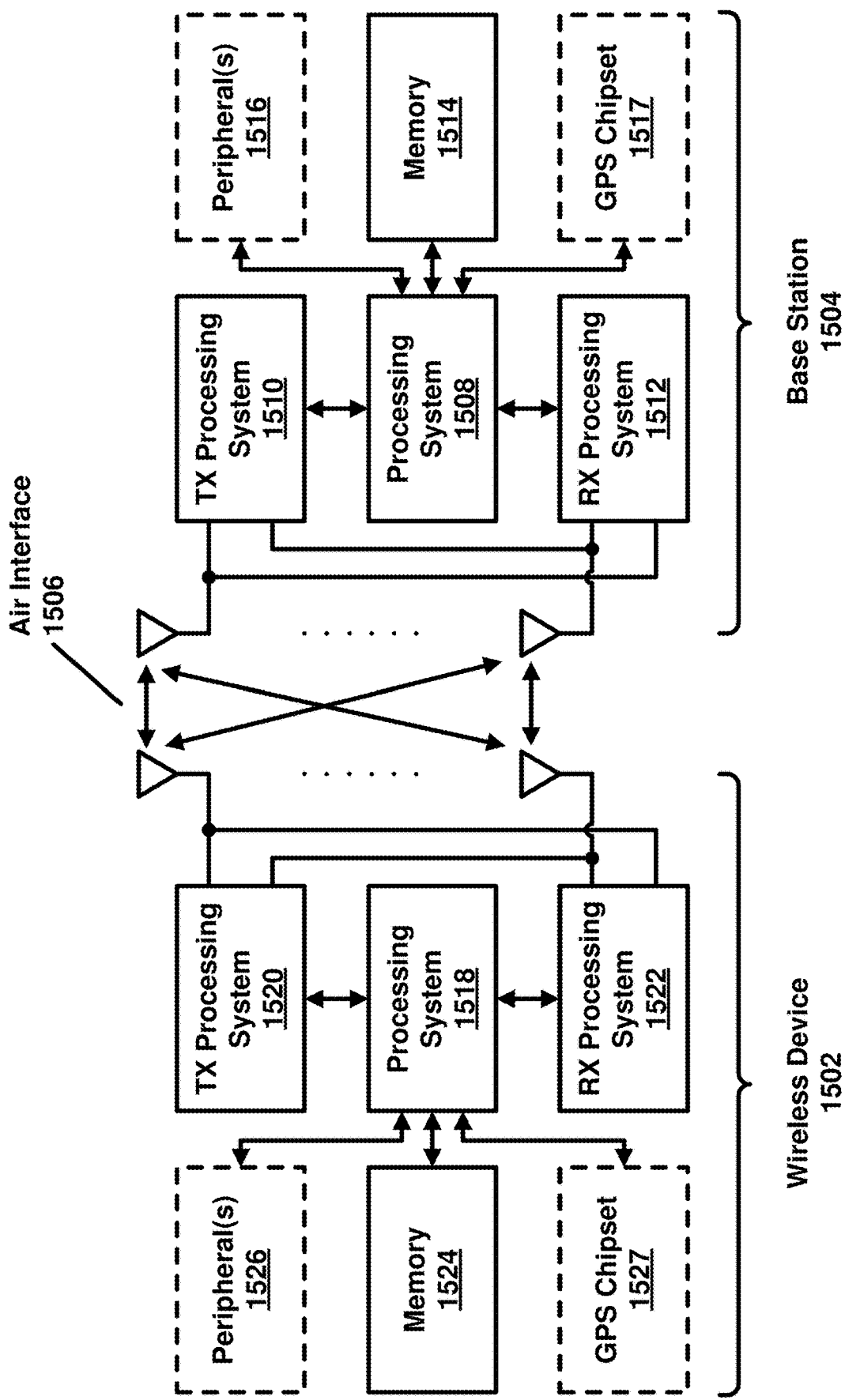
FIG. 15 illustrates an example of a wireless device in communication with a base station.

FIG. 15 illustrates an example of a wireless device 1502 in communication with a base station 1504 in accordance with embodiments of the present disclosure. The wireless device 1502 and base station 1504 may be part of a mobile communication network, such as the mobile communication network 100 illustrated in FIG. 1A, the mobile communication network 150 illustrated in FIG. 1B, or any other communication network. Only one wireless device 1502 and one base station 1504 are illustrated in FIG. 15, but it will be understood that a mobile communication network may include more than one UE and/or more than one base station, with the same or similar configuration as those shown in FIG. 15.

The base station 1504 may connect the wireless device 1502 to a core network (not shown) through radio communications over the air interface (or radio interface) 1506. The communication direction from the base station 1504 to the wireless device 1502 over the air interface 1506 is known as the downlink, and the communication direction from the wireless device 1502 to the base station 1504 over the air interface is known as the uplink. Downlink transmissions may be separated from uplink transmissions using FDD, TDD, and/or some combination of the two duplexing techniques.

In the downlink, data to be sent to the wireless device 1502 from the base station 1504 may be provided to the processing system 1508 of the base station 1504. The data may be provided to the processing system 1508 by, for example, a core network. In the uplink, data to be sent to the base station 1504 from the wireless device 1502 may be provided to the processing system 1518 of the wireless device 1502. The processing system 1508 and the processing system 1518 may implement layer 3 and layer 2 OSI functionality to process the data for transmission. Layer 2 may include an SDAP layer, a PDCP layer, an RLC layer, and a MAC layer, for example, with respect to FIG. 2A, FIG. 2B, FIG. 3, and FIG. 4A. Layer 3 may include an RRC layer as with respect to FIG. 2B.

After being processed by processing system 1508, the data to be sent to the wireless device 1502 may be provided to a transmission processing system 1510 of base station 1504. Similarly, after being processed by the processing system 1518, the data to be sent to base station 1504 may be provided to a transmission processing system 1520 of the wireless device 1502. The transmission processing system 1510 and the transmission processing system 1520 may implement layer 1 OSI functionality. Layer 1 may include a PHY layer with respect to FIG. 2A, FIG. 2B, FIG. 3, and FIG. 4A. For transmit processing, the PHY layer may perform, for example, forward error correction coding of transport channels, interleaving, rate matching, mapping of transport channels to physical channels, modulation of physical channel, multiple-input multiple-output (MIMO) or multi-antenna processing, and/or the like.

At the base station 1504, a reception processing system 1512 may receive the uplink transmission from the wireless device 1502. At the wireless device 1502, a reception processing system 1522 may receive the downlink transmission from base station 1504. The reception processing system 1512 and the reception processing system 1522 may implement layer 1 OSI functionality. Layer 1 may include a PHY layer with respect to FIG. 2A, FIG. 2B, FIG. 3, and FIG. 4A. For receive processing, the PHY layer may perform, for example, error detection, forward error correction decoding, deinterleaving, demapping of transport channels to physical channels, demodulation of physical channels, MIMO or multi-antenna processing, and/or the like.

As shown in FIG. 15, a wireless device 1502 and the base station 1504 may include multiple antennas. The multiple antennas may be used to perform one or more MIMO or multi-antenna techniques, such as spatial multiplexing (e.g., single-user MIMO or multi-user MIMO), transmit/receive diversity, and/or beamforming. In other examples, the wireless device 1502 and/or the base station 1504 may have a single antenna.

The processing system 1508 and the processing system 1518 may be associated with a memory 1514 and a memory 1524, respectively. Memory 1514 and memory 1524 (e.g., one or more non-transitory computer readable mediums) may store computer program instructions or code that may be executed by the processing system 1508 and/or the processing system 1518 to carry out one or more of the functionalities discussed in the present application. Although not shown in FIG. 15, the transmission processing system 1510, the transmission processing system 1520, the reception processing system 1512, and/or the reception processing system 1522 may be coupled to a memory (e.g., one or more non-transitory computer readable mediums) storing computer program instructions or code that may be executed to carry out one or more of their respective functionalities.

The processing system 1508 and/or the processing system 1518 may comprise one or more controllers and/or one or more processors. The one or more controllers and/or one or more processors may comprise, for example, a general-purpose processor, a digital signal processor (DSP), a microcontroller, an application specific integrated circuit (ASIC), a field programmable gate array (FPGA) and/or other programmable logic device, discrete gate and/or transistor logic, discrete hardware components, an on-board unit, or any combination thereof. The processing system 1508 and/or the processing system 1518 may perform at least one of signal coding/processing, data processing, power control, input/output processing, and/or any other functionality that may enable the wireless device 1502 and the base station 1504 to operate in a wireless environment.

The processing system 1508 and/or the processing system 1518 may be connected to one or more peripherals 1516 and one or more peripherals 1526, respectively. The one or more peripherals 1516 and the one or more peripherals 1526 may include software and/or hardware that provide features and/or functionalities, for example, a speaker, a microphone, a keypad, a display, a touchpad, a power source, a satellite transceiver, a universal serial bus (USB) port, a hands-free headset, a frequency modulated (FM) radio unit, a media player, an Internet browser, an electronic control unit (e.g., for a motor vehicle), and/or one or more sensors (e.g., an accelerometer, a gyroscope, a temperature sensor, a radar sensor, a lidar sensor, an ultrasonic sensor, a light sensor, a camera, and/or the like). The processing system 1508 and/or the processing system 1518 may receive user input data from and/or provide user output data to the one or more peripherals 1516 and/or the one or more peripherals 1526. The processing system 1518 in the wireless device 1502 may receive power from a power source and/or may be configured to distribute the power to the other components in the wireless device 1502. The power source may comprise one or more sources of power, for example, a battery, a solar cell, a fuel cell, or any combination thereof. The processing system 1508 and/or the processing system 1518 may be connected to a GPS chipset 1517 and a GPS chipset 1527, respectively. The GPS chipset 1517 and the GPS chipset 1527 may be configured to provide geographic location information of the wireless device 1502 and the base station 1504, respectively.

FIG. 16A illustrates an example structure for uplink transmission. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 16A. These functions are illustrated as examples and it is anticipated that other mechanisms may be implemented in various embodiments.

FIG. 16B illustrates an example structure for modulation and up-conversion of a baseband signal to a carrier frequency. The baseband signal may be a complex-valued SC-FDMA or CP-OFDM baseband signal for an antenna port and/or a complex-valued Physical Random Access Channel (PRACH) baseband signal. Filtering may be employed prior to transmission.

FIG. 16C illustrates an example structure for downlink transmissions. A baseband signal representing a physical downlink channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

FIG. 16D illustrates another example structure for modulation and up-conversion of a baseband signal to a carrier frequency. The baseband signal may be a complex-valued OFDM baseband signal for an antenna port. Filtering may be employed prior to transmission.

A wireless device may receive from a base station one or more messages (e.g. RRC messages) comprising configuration parameters of a plurality of cells (e.g. primary cell, secondary cell). The wireless device may communicate with at least one base station (e.g. two or more base stations in dual-connectivity) via the plurality of cells. The one or more messages (e.g. as a part of the configuration parameters) may comprise parameters of physical, MAC, RLC, PCDP, SDAP, RRC layers for configuring the wireless device. For example, the configuration parameters may comprise parameters for configuring physical and MAC layer channels, bearers, etc. For example, the configuration parameters may comprise parameters indicating values of timers for physical, MAC, RLC, PCDP, SDAP, RRC layers, and/or communication channels.

A timer may begin running once it is started and continue running until it is stopped or until it expires. A timer may be started if it is not running or restarted if it is running. A timer may be associated with a value (e.g. the timer may be started or restarted from a value or may be started from zero and expire once it reaches the value). The duration of a timer may not be updated until the timer is stopped or expires (e.g., due to BWP switching). A timer may be used to measure a time period/window for a process. When the specification refers to an implementation and procedure related to one or more timers, it will be understood that there are multiple ways to implement the one or more timers. For example, it will be understood that one or more of the multiple ways to implement a timer may be used to measure a time period/window for the procedure. For example, a random access response window timer may be used for measuring a window of time for receiving a random access response. In an example, instead of starting and expiry of a random access response window timer, the time difference between two time stamps may be used. When a timer is restarted, a process for measurement of time window may be restarted. Other example implementations may be provided to restart a measurement of a time window.

Figure 17:
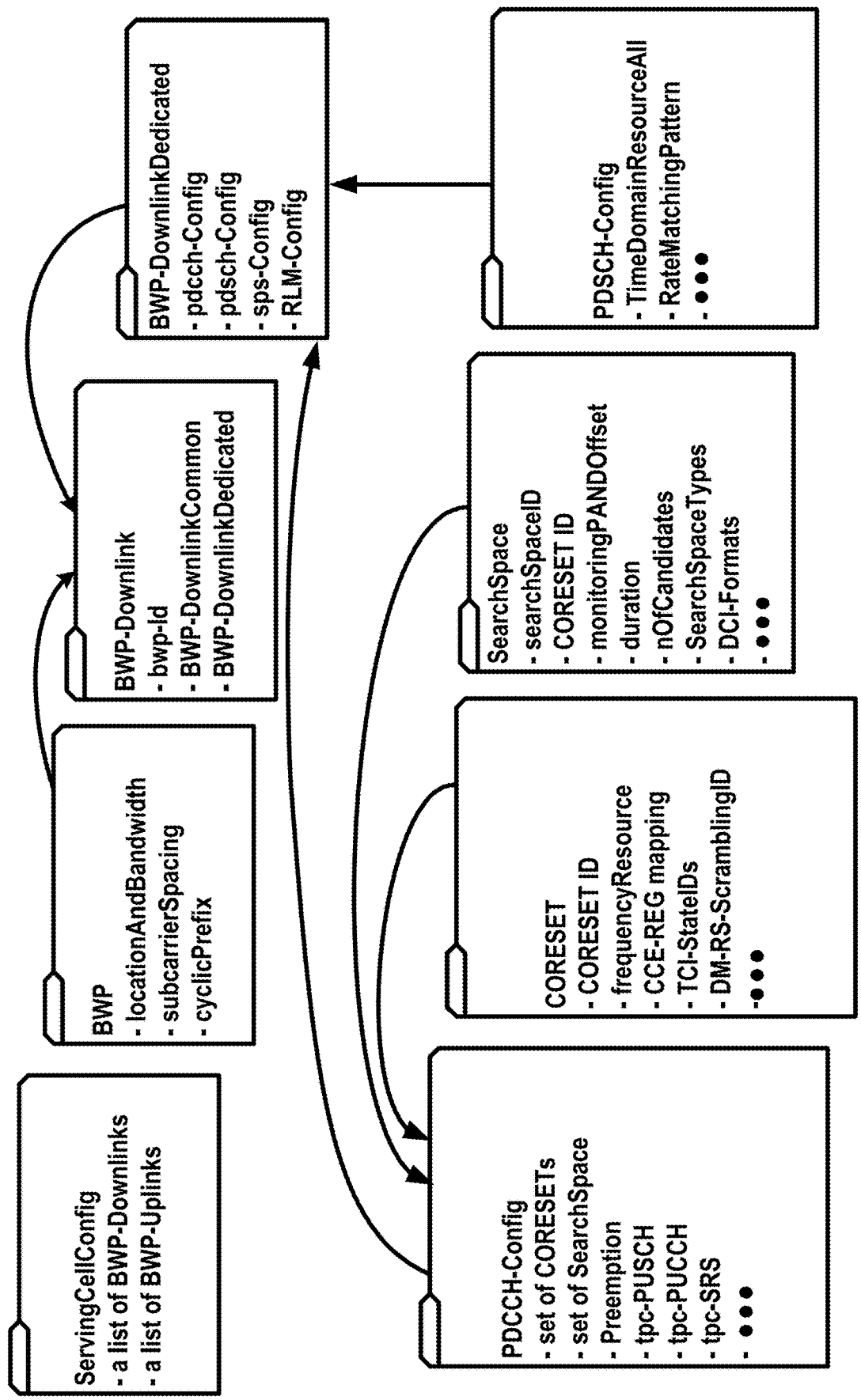
FIG. 17 illustrates configuration parameters for a wireless device to receive control and/or data from a base station as per an aspect of an example embodiment of the present disclosure.

FIG. 17 illustrates example configuration parameters for a wireless device to receive control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). A downlink bandwidth part (e.g., BWP-Downlink) and/or an uplink bandwidth part (e.g., BWP-Uplink) may comprise a bandwidth part index (e.g., bwp-Id), configuration parameters of a cell-common downlink bandwidth part (e.g., BWP-DownlinkCommon, BWP-UplinkCommon), and/or a UE-specific downlink bandwidth part (e.g., BWP-DownlinkDedicated, BWP-UplinkDedicated). For example, the bandwidth part index (bwp-Id) may indicate a bandwidth part configuration. For example, an index of the bandwidth part is the bandwidth part index. The bandwidth part configuration may comprise a location and bandwidth information (locationAndBandwidth). The locationAndBandwidth may indicate a starting resource block (RB) of the bandwidth part and a bandwidth of the bandwidth part, based on a reference point (e.g., a pointA of a carrier/cell for the bandwidth part). The bandwidth part configuration may comprise a subcarrier spacing (e.g., subcarrierSpacing) and a cyclic prefix (e.g., cyclicPrefix). For example, the subcarrier spacing may be one of 15 kHz, 30 kHz, 60 kHz, 120 kHz, 240 kHz, 480 kHz, and 960 kHz. For example, the cyclic prefix may be one of a normal cyclic prefix and an extended cyclic prefix.

For example, configuration parameters of the cell-specific downlink bandwidth (e.g., BWP-DownlinkCommon) may indicate/comprise genericParameters, pdcch-ConfigCommon, and/or pdsch-ConfigCommon. For example, pdcch-ConfigCommon may comprise cell-specific parameters for receiving downlink control information (DCIs) via the cell-specific downlink bandwidth part (e.g., an initial BWP). For example, pdsch-ConfigCommon may comprise cell-specific parameters for receiving PDSCHs of transport blocks (TBs) via the cell-specific downlink bandwidth part. Configuration parameters of the UE-specific downlink bandwidth part (e.g., BWP-DownlinkDedicated) may comprise pdcch-Config, pdsch-Config, sps-Config, and/or radioLinkMonitoring-Config (e.g., RLM-Config). The configuration parameters may comprise sps-ConfigList and/or beam FailureRecoverySCellConfig. For example, beamFailureRecoverySCellConfig may comprise reference signal parameters for beam failure recovery for secondary cells. For example, pdcch-Config may comprise parameters for receiving DCIs for the UE-specific downlink bandwidth part. For example, pdsch-Config may comprise parameters for receiving PDSCHs of TBs for the UE-specific downlink bandwidth part. For example, sps-Config may comprise parameters for receiving semi-persistent scheduling PDSCHs. The base station may configure a SPS for a BWP or a list of SPS for the BWP. For example, radioLinkMonitoringConfig may comprise parameters for radio link monitoring.

Configuration parameters of pdcch-Config may indicate/comprise at least one of a set of coresets, a set of search spaces, a downlink preemption (e.g., downlinkPreemption), a transmission power control (TPC) for PUSCH (e.g. tpc-PUSCH), a TPC for PUCCH and/or a TPC for SRS. The configuration parameters may comprise a list of search space switching groups (e.g., searchsSpaceSwitchingGroup), a search space switching timer (e.g., search SpaceSwitchingTimer), an uplink cancellation, and/or a monitoring capability configuration (e.g., monitoringCapabilityConfig). The base station may configure the list of search space switching groups, where the wireless device may switch from a first search space group to a second search space group based on the search space switching timer or a rule, an indication, or an event. The base station may configure up to K (e.g., K=3) coresets for a BWP of a cell. The downlink preemption may indicate whether to monitor for a downlink preemption indication for the cell. The monitoring capability config may indicate whether a monitoring capability of the wireless device would be configured for the cell, where the capability is based on a basic capability or an advanced capability. The base station may configure up to M (e.g., M=10) search spaces for the BWP of the cell. The tpc-PUCCH, tpc-PUSCH, or tpc-SRS may enable and/or configure reception of TPC commands for PUCCH, PUSCH or SRS respectively. The uplink cancellation may indicate to monitor uplink cancellation for the cell.

Configuration parameters of pdcch-ConfigCommon may comprise a control resource set zero (e.g., controlResourceSetZero), a common control resource set (e.g., commonControlResourceSet), a search space zero (e.g., searchSpaceZero), a list of common search space (e.g., commonSearchSpaceList), a search space for SIB1 (e.g., searchSpaceSIB1), a search space for other SIBs (e.g., searchSpaceOtherSystemInformation), a search space for paging (e.g., pagingSearchSpace), a search space for random access (e.g., ra-SearchSpace), and/or a first PDCCH monitoring occasion. The control resource set zero may comprise parameters for a first coreset with an index value zero. The coreset zero may be configured for an initial bandwidth part of the cell. The wireless device may use the control resource set zero in a BWP of the cell, wherein the BWP is not the initial BWP of the cell based on one or more conditions. For example, a numerology of the BWP may be same as the numerology of the initial BWP. For example, the BWP may comprise the initial BWP. For example, the BWP may comprise the control resource set zero. The common control resource set may be an additional common coreset that may be used for a common search space (CSS) or a UE-specific search space (USS). The base station may configure a bandwidth of the common control resource set where the bandwidth is smaller than or equal to a bandwidth of the control resource set zero. The base station may configure the common control resource set such that it is contained within the control resource set zero (e.g., CORESET #0). The list of common search space may comprise one or more CSSs. The list of common search space may not comprise a search space with index zero (e.g., SS #0). The first PDCCH monitoring occasion may indicate monitoring occasion for paging occasion. The base station may configure a search space for monitoring DCIs for paging (e.g., pagingSearchSpace), for RAR monitoring (e.g., ra-SearchSpace), for SIB1 (e.g., searchSpaceSIB1) and/or for other SIBs than SIB1 (e.g., search SpaceOtherSystemInformation). The search space with index zero (e.g., searchSpaceZero, SS #0) may be configured for the initial BWP of the cell. Similar to the coreset/CORESET #0, the SS #0 may be used in the BWP of the cell based on the one or more conditions.

Figure 18:
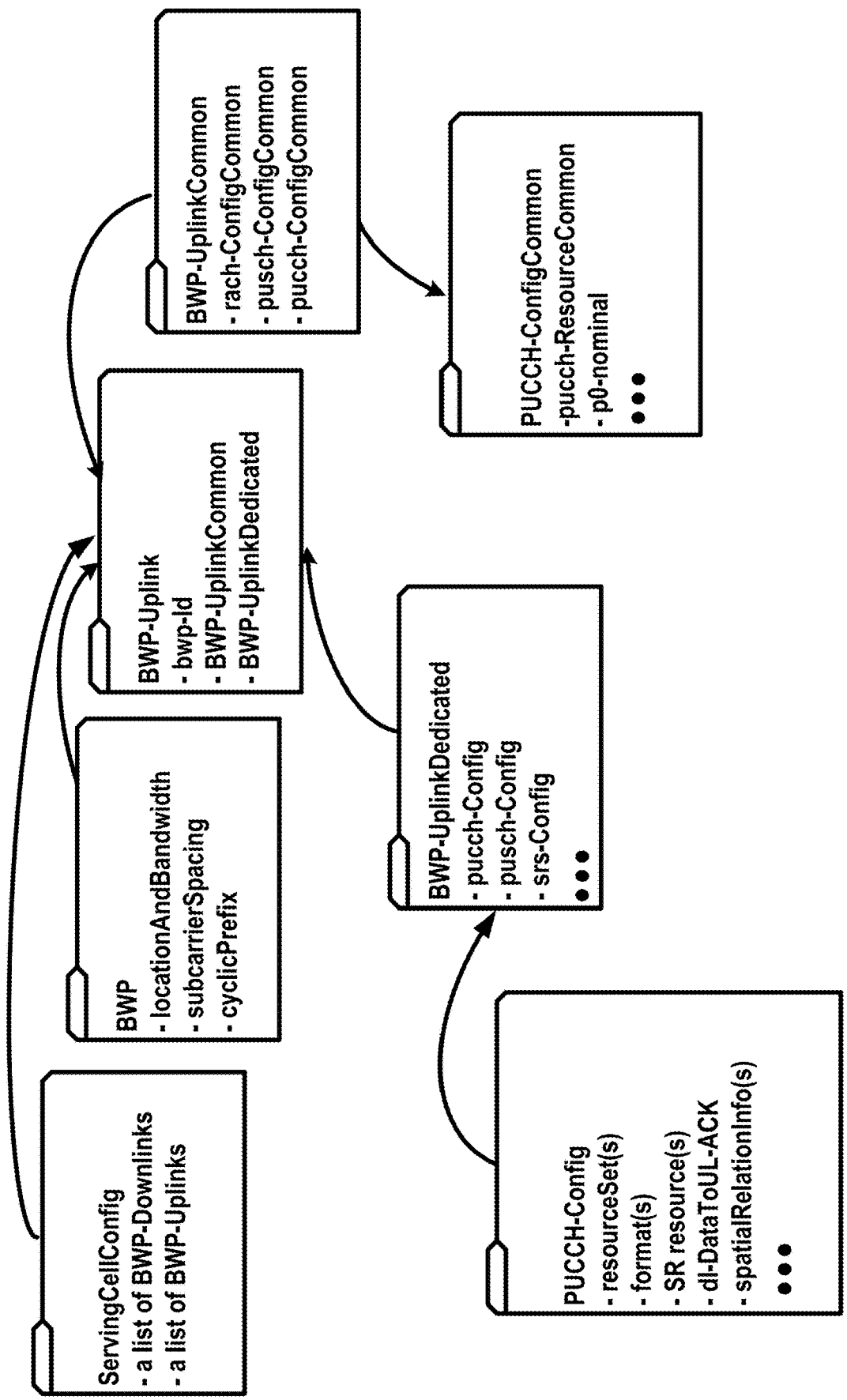
FIG. 18 illustrates configuration parameters for a wireless device to transmit control and/or data from a base station as per an aspect of an example embodiment of the present disclosure.

FIG. 18 illustrates example configuration parameters for a wireless device to transmit control and/or data from a base station. A wireless device may receive one or more radio resource control (RRC) messages comprising configuration parameters of a cell. The configuration parameters may comprise one or more parameters of a serving cell configuration (e.g., ServingCellConfig). The one or more parameters of the serving cell configuration may comprise one or more downlink bandwidth parts (e.g., a list of BWP-Downlinks). The one or more parameters of the serving cell configuration may comprise one or more uplink bandwidth parts (e.g., a list of BWP-Uplinks). An uplink BWP may comprise a bandwidth part index (bwp-id), one or more common uplink BWPs (e.g., configured via SIB/MIB, BWP-UplinkCommon), and/or one or more dedicated uplink BWPs (e.g., configured via RRC signaling, BWP-UplinkDedcated).

For example, configuration parameters of a cell-specific uplink bandwidth (e.g., BWP-UplinkCommon) may indicate/comprise rach-ConfigCommon, pusch-ConfigCommon and pucch-ConfigCommon. For example, pucch-ConfigCommon may comprise cell-specific parameters for transmitting uplink control information (UCIs) via the cell-specific uplink bandwidth part (e.g., initial UL BWP). For example, pusch-ConfigCommon may comprise cell-specific parameters for transmitting PUSCHs of transport blocks (TBs) via the cell-specific uplink bandwidth part. Configuration parameters of the UE-specific uplink bandwidth part (e.g., BWP-UplinkDedicated) may comprise pucch-Config, pusch-Config, srs-Config. For example, pucch-Config may comprise one or more PUCCH resource sets, one or more PUCCH formats (format), one or more scheduling request (SR) resources, one or more values for an offset between a PDSCH to a PUCCH or a HARQ-ACK feedback corresponding to the PDSCH (e.g., dl-DataToUL-ACK), and/or spatial domain filter parameters (spatialRelationInfo).

In an example, a base station and a wireless device may use a plurality of downlink control information (DCI) formats to communicate control information to schedule downlink data and/or uplink data and/or to deliver control information. For example, a DCI format 0_0 may be used to schedule an uplink resource for a PUSCH over a cell. A DCI format 0_1 may be used to schedule one or more PUSCHs in one cell or may be used to indicate downlink feedback information for configured grant PUSCH (CG-DFI). A DCI format 0_2 may be used to schedule a resource for a PUSCH in one cell. Similarly, for downlink scheduling, a DCI format 1_0 may schedule a resource for a PDSCH in one cell. A DCI format 1_1 may be used to schedule a PDSCH in one cell or trigger one shot HARQ-ACK feedback. A DCI format 1_2 may be used to schedule a resource for a PDSCH in one cell. There are one or more DCI formats carrying non-scheduling information. For example, a DCI format 2_0 may be used to indicate a slot formation information for one or more slots of one or more cells. A DCI format 2_2 may be used to indicate one or more transmit power control commands for PUCCH and PUSCH. A DCI format 2_3 may be used to indicate one or more transmit power control for SRS. A DCI format 2_4 may be used to indicate an uplink cancellation information. A DCI format 2_5 may be used to indicate a preemption information. A DCI format 2_6 may be used to indicate a power saving state outside of DRX active time. A DCI format 3_0 or 3_1 may be used to schedule NR sidelink resource or LTE sidelink resource in one cell.

In an example, a DCI format 0_0 and a DCI format 1_0 may be referred as a fallback DCI format for scheduling uplink and downlink respectively. In an example, a DCI format 0_1 and a DCI format 1_1 may be referred as a non-fallback DCI format scheduling uplink and downlink respectively. In an example, a DCI format 0_2 and a DCI format 1_2 may be referred as a compact DCI format for scheduling uplink and downlink respectively. A base station may configure one or more DCI formats for scheduling downlink and/or uplink resources. For example, a DCI format 0_0, 0_1 and 0_2 may be used to schedule uplink resource(s) for one or more PUSCHs. A DCI format 1_0, 1_1 and 1_2 may be used to schedule downlink resource(s) for one or more PDSCHs. A DCI format 2_0, 2_1, 2_2, 2_3, 2_4, 2_5 and 2_6 may be used for a group-common DCI transmission. Each format of DCI format 2_x may be used for different information. For example, the DCI format 2_4 may be used to indicate uplink resources for a group of wireless devices. In response to receiving a DCI based on the DCI format 2_4, a wireless device may cancel any uplink resource, scheduled prior to the receiving, when the uplink resource may be overlapped with the indicated uplink resources.

A DCI format may comprise one or more DCI fields. A DCI field may have a DCI size. A wireless device may determine one or more bitfield sizes of one or more DCI fields of the DCI format based on one or more radio resource control (RRC) configuration parameters by a base station. For example, the one or more RRC configuration parameters may be transmitted via master information block (MIB). For example, the one or more RRC configuration parameters may be transmitted via system information blocks (SIBs). For example, the one or more RRC configuration parameters may be transmitted via one or more a wireless device specific messages. For example, the wireless device may determine one or more DCI sizes of one or more DCI fields of a DCI format 0_0 based on the one or more RRC configuration parameters transmitted via the MIB and/or the SIBs. The wireless device may be able to determine the one or more DCI sizes of the DCI format 0_0 without receiving any the wireless device specific message. Similarly, the wireless device may determine one or more DCI sizes of one or more second DCI fields of a DCI format 1_0 based on the one or more RRC configuration parameters transmitted via the MIB and/or the SIBs.

Figure 19:
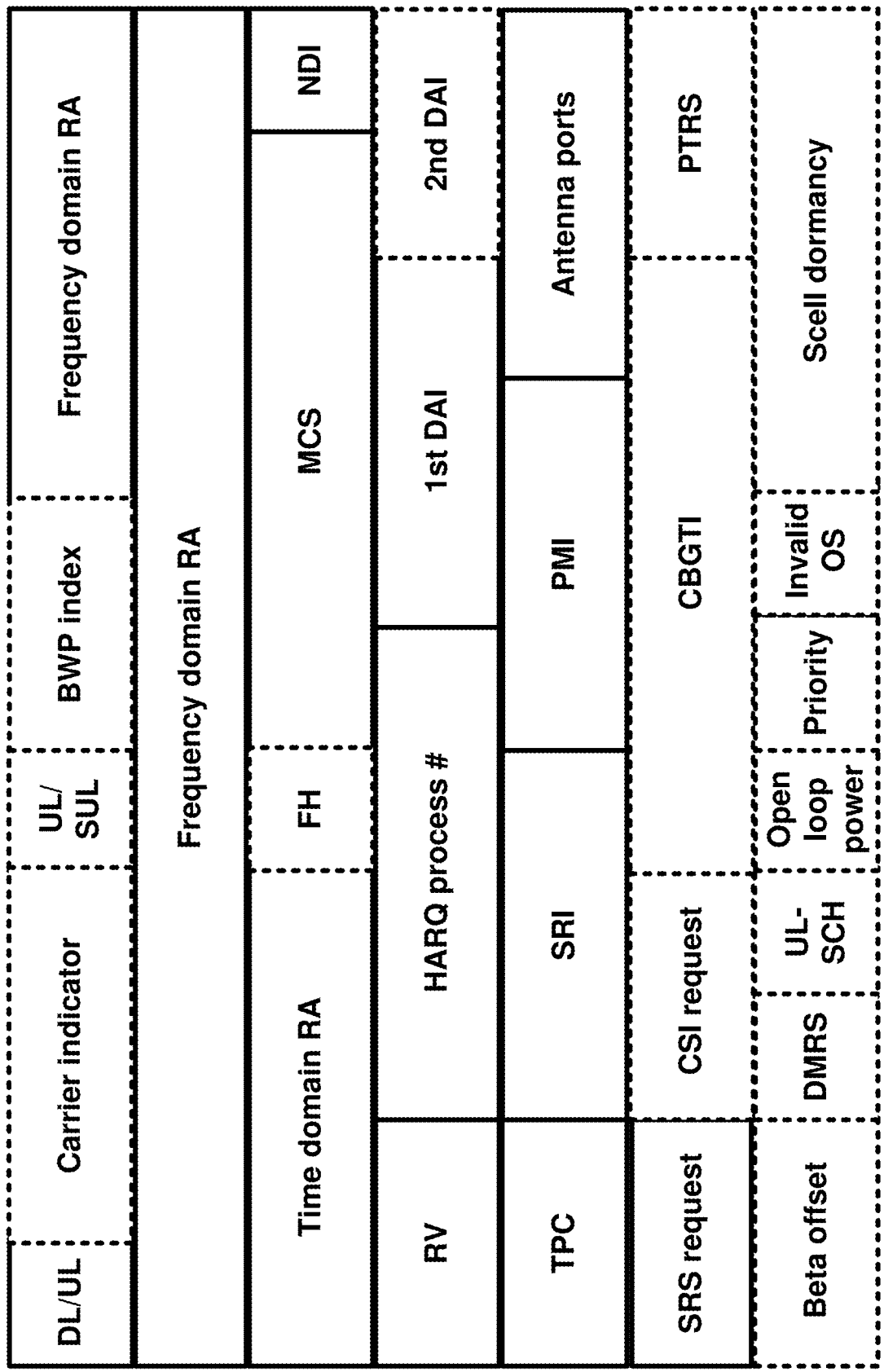
FIG. 19 illustrates an example DCI format for scheduling uplink resource of a single cell as per an aspect of an example embodiment of the present disclosure.

For example, the wireless device may determine one or more first DCI sizes of one or more first DCI fields of a DCI format 0_2 based on one or more RRC configuration parameters transmitted via the MIB and/or the SIBs and/or the wireless device specific RRC message(s). The wireless device may determine one or more bitfield sizes of the one or more first DCI fields based on the one or more RRC configuration parameters. For example, FIG. 19 may illustrate the one or more first DCI fields of the DCI format 0_2. In FIG. 19, there are one or more second DCI fields that may present in the DCI format 0_2 regardless of the wireless device specific RRC message(s). For example, the one or more second DCI fields may comprise at least one of DL/UL indicator, frequency domain resource allocation, MCS, NDI, and TPC fields. For example, the one or more first DCI fields may comprise the one or more second DCI fields and one or more third DCI fields. A DCI field of the one or more third DCI fields may be present or may not be present based on one or more configuration parameters transmitted by the base station. For example, the one or more third DCI fields may comprise at least one of a BWP index, RV, HARQ process #, PMI, antenna ports, and/or beta offset.

For example, the DCI format 0_2 may comprise a 1-bit DL/UL indicator where the bit is configured with zero ('0') to indicate an uplink grant for the DCI format 0_2. DCI field(s) shown in dotted boxes may not be present or a size of the DCI field(s) may be configured as zero. For example, a carrier indicator may be present when the DCI format 0_2 is used to schedule a cell based on cross-carrier scheduling. The carrier indicator may indicate a cell index of a scheduled cell by the cross-carrier scheduling. For example, UL/SUL indicator (shown UL/SUL in FIG. 19) may indicate whether a DCI based on the DCI format 0_2 schedules a resource for an uplink carrier or a supplemental uplink. The UL/SUL indicator field may be present when the wireless device is configured with a supplemental uplink for a scheduled cell of the DCI. Otherwise, the UL/SUL indicator field is not present.

A field of BWP index may indicate a bandwidth part indicator. The base station may transmit configuration parameters indicating one or more uplink BWPs for the scheduled cell. The wireless device may determine a bit size of the field of BWP index based on a number of the one or more uplink BWPs. For example, 1 bit may be used. The number of the one or more uplink BWPs (excluding an initial UL BWP) is two. The field of BWP index may be used to indicate an uplink BWP switching. The wireless device may switch to a first BWP in response to receiving the DCI indicating an index of the first BWP. The first BWP is different from an active uplink BWP (active before receiving the DCI).

A DCI field of frequency domain resource allocation (frequency domain RA in FIG. 19) may indicate uplink resource(s) of the scheduled cell. For example, the base station may transmit configuration parameters indicating a resource allocation type 0. With the resource allocation type 0, a bitmap over one or more resource block groups (RBGs) may schedule the uplink resource(s). With a resource allocation type 1, a starting PRB index and a length of the scheduled uplink resource(s) may be indicated. In an example, a length may be a multiple of K1 resource blocks. For example, the configuration parameters may comprise a resource allocation type1 granularity for the DCI format 0_2 (e.g., K1). A default value of the K1 may be one ('1'). The base station may transmit configuration parameters indicating a dynamic change between the resource allocation type 0 and the resource allocation type 1 (e.g., 'dynamicswitch'). The wireless device may determine a field size of the frequency domain RA field based on the configured resource allocation type and a bandwidth of an active UL BWP of the scheduled cell. The wireless device may further determine the field size of the frequency domain RA field based on the K1 value, when the resource allocation type 1 may be used/configured. For example, when the resource allocation type 0 is configured, the bitmap may indicate each of the one or more RBGs covering the bandwidth of the active UL BWP. A size of the bitmap may be determined based on a number of the one or more RBGs of the active UL BWP. For example, the wireless device may determine the size of the frequency domain RA field based on the resource allocation type 1 based on the bandwidth of the active uplink BWP (e.g., ceil (log 2 (BW/K1 (BW/K1+1)/2) and the resource allocation type1 granularity. E.g., the BW is the bandwidth of the active uplink BWP. E.g., the K1 is the resource allocation type1 granularity.).

The wireless device may determine a resource allocation indicator value (RIV) table, where an entry of the table may comprise a starting PRB index and a length value. The wireless device may determine the RIV table based on the resource allocation type1 granularity. For example, when the dynamic change between the resource allocation type 0 and the resource allocation type 1 is used, a larger size between a first size based on the resource allocation type 0 (e.g., the bitmap size) and a second size based on the resource allocation type 1 (e.g., the RIV table size) with additional 1 bit indication to indicate either the resource allocation type 0 or the resource allocation type 1. For example, the frequency domain RA field may indicate a frequency hopping offset. The base station may use K (e.g., 1 bit for two offset values, 2 bits for up to four offset values) bit(s) to indicate the frequency hopping offset from one or more configured offset values, based on the resource allocation type 1. The base station may use ceil (log 2(BW/K1 (BW/K1+1)/2)-K bits to indicate the uplink resource(s) based on the resource allocation type 1, when frequency hopping is enabled. Otherwise, the base station/wireless device may use ceil (log 2(BW/K1 (BW/K1+1)/2) bits to indicate the uplink resource(s) based on the resource allocation type 1.

In an example, a base station may transmit one or more messages comprising configuration parameters of a BWP of a cell. The configuration parameters may indicate/comprise a resource allocation type for one or more PUSCHs scheduled by one or more DCIs, based on a first RNTI. The resource allocation type may be a resource allocation type 0 or a resource allocation type 1 or a dynamic switching between the resource allocation type 0 and the resource allocation type 1. For example, the first RNTI is a C-RNTI. The configuration parameters may indicate/comprise a configured grant configuration or a SPS configuration. The configuration parameters may indicate a resource allocation type for the configured grant configuration or the SPS configuration. The resource allocation type may be a resource allocation type 0 or a resource allocation type 1 or a dynamic switching between the resource allocation type 0 and the resource allocation type 1.

A DCI field of time domain resource allocation (time domain RA shown in FIG. 19) may indicate time domain resource of one or more slots of the scheduled cell. The base station may transmit configuration parameters indicating one or more time domain resource allocation lists of a time domain resource allocation table for an uplink BWP of the scheduled cell. The wireless device may determine a bit size of the time domain RA field based on a number of the one or more time domain resource allocation lists of the time domain resource allocation table. The base station may indicate a frequency hopping flag by a FH flag (shown as FH in FIG. 19). For example, the FH flag may present when the base station may enable a frequency hopping of the scheduled cell or the active UL BWP of the scheduled cell. A DCI field of modulation and coding scheme (MCS) (shown as MCS in FIG. 19) may indicate a coding rate and a modulation scheme for the scheduled uplink data. In an example, a bit size of the MCS field may be predetermined as a constant (e.g., 5 bits). A new data indicator (NDI) field may indicate whether the DCI schedules the uplink resource(s) for a new/initial transmission or a retransmission. A bit size of the NDI may be fixed as a constant value (e.g., 1 bit). A redundancy version (RV) field may indicate one or more RV values (e.g., a RV value may be 0, 2, 3, or 1) for one or more PUSCHs scheduled over the one or more slots of the scheduled cells. For example, the DCI may schedule a single PUSCH via one slot, a RV value is indicated. For example, the DCI may schedule two PUSCHs via two slots, two RV values may be indicated. A number of PUSCHs scheduled by a DCI may be indicated in a time domain resource allocation list of the one or more time domain resource allocation lists. The configuration parameters may indicate/comprise a bit size of the RV field. For example, the bit size may be 0, 1 or 2 bits for a single PUSCH. When the bit size is configured as zero ('0'), the wireless device may apply a RV=0 for any uplink resource scheduled by a DCI based on the DCI format 0_2.

A DCI field of hybrid automatic repeat request (HARQ) process number (HARQ process # in FIG. 19) may indicate an index of a HARQ process used for the one or more PUSCHs. The wireless device may determine one or more HARQ processes for the one or more PUSCHs based on the index of the HARQ process. The wireless device may determine the index for a first HARQ process of a first PUSCH of the one or more PUSCHs and select a next index as a second HARQ process of a second PUSCH of the one or more PUSCHs and so on. The configuration parameters may indicate/comprise a bit size for the HARQ process #field. For example, the bit size may be 0, 1, 2, 3 or 4 bits for a single PUSCH. The wireless device may assume that a HARQ process index=0 in case the bit size is configured as zero. The wireless device may assume that a HARQ process index in a range of [0, 1] when the bit size is configured as one. The wireless device may assume that a HARQ process index in a range of [0, . . . , 3] when the bit size is configured as two. The wireless device may assume that a HARQ process index in a range of [0, . . . , 7] when the bit size is configured as three. For the 4 bits of bit size, the wireless device may use a HARQ process in a range of [0, . . . , 15].

The DCI format 0_2 may have a first downlink assignment index (1st DAI) and/or a second DAI (2nd DAI). The configuration parameters may indicate/comprise a parameter to indicate whether to use DAI for the DCI format 0_2 (e.g., Downlinkassignmentindex-ForDCIFormat0_2). The first DAI may be used to indicate a first size of bits of first HARQ-ACK codebook group. The second DAI may be present when the base station may transmit configuration parameters indicating a plurality of HARQ-ACK codebook groups. When there is no HARQ-ACK codebook group configured, the wireless device may assume the first HARQ-ACK codebook group only. The second DAI may indicate a second size of bits of second HARQ-ACK codebook group. The first DAI may be 1 bit when a semi-static HARQ-ACK codebook generation mechanism is used. The first DAI may be 2 bits or 4 bits when a dynamic HARQ-ACK codebook generation mechanism is used.

A field of transmission power control (TPC shown in FIG. 19) may indicate a power offset value to adjust transmission power of the one or more scheduled PUSCHs. A field of sounding reference signal (SRS) resource indicator (SRI) may indicate an index of one or more configured SRS resources of an SRS resource set. A field of precoding information and number of layers (shown as PMI in FIG. 19) may indicate a precoding and a MIMO layer information for the one or more scheduled PUSCHs. A field of antenna ports may indicate DMRS pattern(s) for the one or more scheduled PUSCHs. A field of SRS request may indicate to trigger a SRS transmission of a SRS resource or skip SRS transmission. A field of CSI request may indicate to trigger a CSI feedback based on a CSI-RS configuration or skip CSI feedback. A field of phase tracking reference signal (PTRS)-demodulation reference signal (DMRS) association (shown as PTRS in FIG. 19) may indicate an association between one or more ports of PTRS and one or more ports of DM-RS. The one or more ports may be indicated in the field of antenna ports. A field of beta_offset indicator (beta offset in FIG. 19) may indicate a code rate for transmission of uplink control information (UCI) via a PUSCH of the one or more scheduled PUSCHs. A field of DM-RS sequence initialization (shown as DMRS in FIG. 19) may present based on a configuration of transform precoding. A field of UL-SCH indicator (UL-SCH) may indicate whether a UCI may be transmitted via a PUSCH of the one or more scheduled PUSCHs or not. A field of open loop power control parameter set indication (open loop power in FIG. 19) may indicate a set of power control configuration parameters. The wireless device is configured with one or more sets of power control configuration parameters. A field of priority indicator (priority) may indicate a priority value of the one or more scheduled PUSCHs. A field of invalid symbol pattern indicator (invalid OS) may indicate one or more unavailable/not-available OFDM symbols to be used for the one or more scheduled PUSCHs.

Note that additional DCI field(s), although not shown in FIG. 19, may be present for the DCI format 0_2. For example, a downlink feedback information (DFI) field indicating for one or more configured grant resources may present for an unlicensed/shared spectrum cell. For example, the unlicensed/shared spectrum cell is a scheduled cell. When the DCI format 0_2 is used for indicating downlink feedback information for the one or more configured grant resources, other DCI fields may be used to indicate a HARQ-ACK bitmap for the one or more configured grant resources and TPC commands for a scheduled PUSCH. Remaining bits may be reserved and filled with zeros ('0's).

Figure 20:
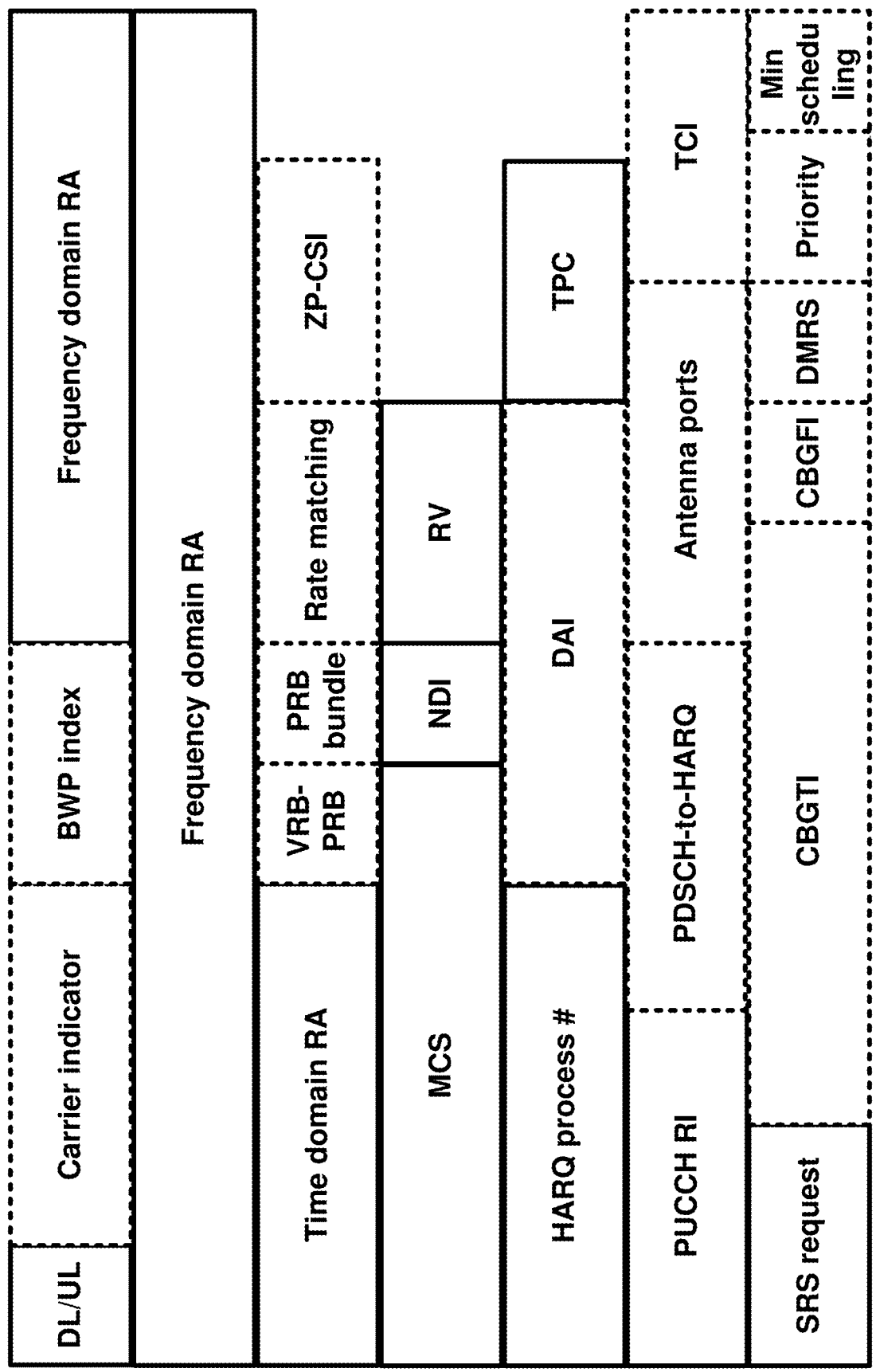
FIG. 20 illustrates an example DCI format for scheduling downlink resource of a single cell as per an aspect of an example embodiment of the present disclosure

FIG. 20 shows an example of a DCI format 1_2. The DCI format 1_2 may schedule a downlink resource for a scheduled downlink cell. The DCI format 1_2 may comprise one or more DCI fields such as an identifier for DCI formats (DL/UL), a carrier indicator, bandwidth part indicator (BWP index), a frequency domain resource assignment (frequency domain RA), a time domain resource assignment (time domain RA), a virtual resource block to physical resource block mapping (VRB-PRB), Physical resource block (PRB) bundling size indicator (PRB bundle), rate matching indicator (rate matching), zero power CSI-RS (ZP-CSI), a MCS, a NDI, a RV, a HARQ process number, a downlink assignment index (DAI), a TPC command for a PUCCH, a PUCCH resource indicator (PUCCH-RI), a PDSCH-to-HARQ feedback timing indicator (PDSCH-to-HARQ in FIG. 20), an antenna ports, a transmission configuration indication (TCI), a SRS request, DMRS sequence initialization (DMRS), and a priority indicator (priority).

The base station may transmit one or more messages indicating configuration parameters for the DCI format 1_2. Similar to the DCI format 0_2 of FIG. 19, one or more DCI fields shown in dotted lined boxes may be present or may not be present based on the configuration parameters. The configuration parameters may indicate/comprise one or more DCI bit sizes and/or related configuration parameters/values for the one or more DCI fields.

For example, the VRB-PRB field may indicate whether a mapping is based on a virtual RB or a physical RB. For example, the PRB bundle may indicate a size of PRB bundle when a dynamic PRB bundling is enabled. For example, the rate matching may indicate one or more rate matching resources where the scheduled data may be mapped around based on the rate matching. For example, the ZP-CSI field may indicate a number of aperiodic ZP CSI-RS resource sets configured by the base station. For example, the DCI format 1_2 may also include MCS, NDI and RV for a second transport block, in response to a max number of codewords scheduled by DCI may be configured as two. The DCI format 1_2 may not include MCS, NDI and RV field for the second transport block. For example, the DAI field may indicate a size of bits of HARQ-ACK codebook. The TPC field may indicate a power offset for the scheduled PUCCH. The wireless device may transmit the scheduled PUCCH comprising HARQ-ACK bit(s) of the scheduled downlink data by the DCI. The PUCCH-RI may indicate a PUCCH resource of one or more PUCCH resources configured by the base station. The PDSCH-to-HARQ field may indicate a timing offset between an end of a scheduled PDSCH by the DCI and a starting of the scheduled PUCCH. The field of antenna ports may indicate DMRS patterns for the scheduled PDSCH. The TCI field may indicate a TCI code point of one or more active TCI code points/active TCI states. The base station may transmit configuration parameters indicating one or more TCI states for the scheduled cell. The base station may active one or more second TCI states of the one or more TCI states via one or more MAC CEs/DCIs. The wireless device may map an active TCI code point of the one or more active TCI code points to an active TCI of the one or more second TCI states.

In an example, a wireless device may receive a DCI indicating an activation, a release, or a retransmission for one or more configured grant configurations or one or more semi-persistent scheduling configurations. The DCI may be cyclic redundancy check (CRC) scrambled with a first radio network temporary identifier (RNTI). The wireless device may receive a second DCI indicating one or more resources for scheduling downlink and/or uplink data. The second DCI may be CRC scrambled with a second RNTI. For example, the second RNTI may be a cell RNTI (C-RNTI) and/or MCS-C-RNTI. For example, the first RNTI may be configured scheduling RNTI (CS-RNTI) for an uplink configured grant configuration. The first RNTI may be semi-persistent scheduling RNTI (SPS-RNTI). The DCI and the second DCI may be based on a DCI format. For example, the DCI and the second DCI may be based on a DCI format 0_2 for uplink (e.g., uplink grant and/or configured grant (CG). For example, the DCI and the second DCI may be based on a DCI format 1_2 for downlink (e.g., downlink scheduling and/or semi-persistent scheduling (SPS)).

For example, the wireless device may determine whether the DCI indicates the activation, the release or the retransmission for the one or more CG configurations or for the one or more SPS configurations based on determining one or more values of one or more DCI fields of the DCI format used for the DCI. For example, the wireless device may determine the DCI indicates the activation in response to receiving the DCI with a HARQ process #(HARQ process number) field of the DCI format indicating zero(s) (e.g., '0, . . . , 0') and a RV (redundancy version) field of the DCI indicating zero(s). The wireless device may first determine whether a NDI field of the DCI may indicate a new data or not. In response to receiving the DCI with the NDI field of the new data, the wireless device may further determine the HARQ process number field and the redundancy version field of the DCI. In response to determining the HARQ process number field being set to a predetermined value (e.g., zero(s) and the redundancy version field being set to a predetermined value (e.g., zero(s)), the wireless device may determine the DCI may indicate the activation or the release of at least one CG configuration or at least one SPS configuration. For example, the wireless device may further check/determine a MCS (modulation and coding scheme) field of the DCI and/or a FDRA (frequency domain resource assignment) field of the DCI to differentiate between the activation and the release. In response to the MCS field being set to a second predetermined value (e.g., one(s), '1, . . . , 1') and the FDRA field being set to a third predetermined value (e.g., zero(s) for resource allocation type 0 or a resource allocation type 2 with mu=1, one(s) for resource allocation type 1 or the resource allocation type 2 with mu=0), the wireless device may determine the DCI indicates the release for the at least one CG configuration or the at least one SPS configuration. In response to the MCS field being set to different value from the second predetermined value and/or the FDRA field being set to the third predetermined value, the wireless device may determine the DCI may indicate the activation for the at least one CG configuration or the at least one SPS configuration.

For example, a DCI format 0_0/0_1/0_2, CRC scrambled with the first RNTI, may be used to indicate an activation, a release and/or retransmission for a configured grant (CG) based on setting one or more DCI fields with one or more predetermined values. For example, a DCI format 1_0/1_2, CRC scrambled with a third RNTI (e.g., SPS-RNTI), may be used to indicate an activation, a release and/or retransmission for a semi-persistent scheduling (SPS) on setting the one or more DCI fields with one or more predetermined values.

In an example, two downlink resource allocation schemes, type 0 and type 1, are supported. A wireless device may determine a frequency domain resource based on a DCI based on a fallback DCI format such as DCI format 0_1 based on a resource allocation type 1. A base station may transmit configuration parameters indicating a dynamic switch between the type 0 and the type 1 resource allocation via an indication in a DCI. The configuration parameters may comprise 'dynamicswitch' to enable dynamic switching between the type 0 and the type 1 via the DCI. The dynamic switching may be supported for a DCI based on a non-fallback DCI format such as DCI format 1_1 or DCI format 1_2. The configuration parameters may comprise/indicate either the type 0 or the type 1 as a resource allocation type via an RRC signaling. The wireless device may determine a frequency domain resource based on a DCI based on the resource allocation configured via the RRC signaling, in response to 'dynamicswitch' being not configured. The wireless device may determine a frequency domain resource based on a frequency domain resource assignment field of a DCI based on an active downlink BWP of a cell. The cell is a scheduled cell. The DCI may indicate a BWP index. The wireless device may determine the frequency domain resource based on one or more configuration parameters of an indicated BWP by the BWP index. For a PDSCH scheduled with a DCI based on a fallback DCI format (e.g., DCI format 1_0) via any common search space, a RB numbering, to determine a frequency domain resource, may start from a lowest RB of a coreset. For example, the DCI has been received via the coreset. In other cases, the RB numbering may start from a lowest RB of an active BWP of the scheduled cell.

For example, a resource allocation type 0 may use a bitmap to indicate a frequency domain resource. The bitmap may indicate one or more resource block groups (RBGs) that may allocate the frequency domain resource. One RBG may represent a set of consecutive virtual resource blocks defined by a rgb-Size. For example, the rbg-Size may be indicated as a parameter of a PDSCH-Config under a servingCellConfig. For example, the rbg-Size may be determined based on a parameter of 'Configuration 1' or 'Configuration 2' and a bandwidth of an active BWP of a scheduled cell. For example, when the bandwidth of the active BWP is between 1 to 36 RBs, 'Configuration 1' indicates the rbg-Size of 2 and 'Configuration 2' indicates the rbg-Size of 4. For example, when the bandwidth of the active BWP is between 37 to 72 RBs, 'Configuration 1' indicates the rbg-Size of 4 and 'Configuration 2' indicates the rbg-Size of 8. For example, when the bandwidth of the active BWP is between 73 to 144 RBs, 'Configuration 1' indicates the rbg-Size of 8 and 'Configuration 2' indicates the rbg-Size of 16. For example, when the bandwidth of the active BWP is between 145 to 275 (or 550) RBs, 'Configuration 1' indicates the rbg-Size of 16 and 'Configuration 2' indicates the rbg-Size of 16. A number of RBGs (N_RBG) for a downlink BWP may present. A DCI field size of a frequency domain resource allocation based on the resource allocation type 0 would be ceil (N_RBG+ (N_start_BWP mode P))/P) where a size of a first RBG is P-N_start_BWP mode P, a size of a last RBG is (N_start_BWP+bandwidth) mode P wherein is (N_start_BWP+bandwidth) mode P is greater than zero, a size of other RBGs are P, and P is the rbg-Size. The bitmap of N_RBG bits with one bitmap bit per a corresponding RBG, such that the corresponding RBG may be scheduled. The one or more RBGs may be indexed in an order of increasing frequency, and indexing may start from a lowest frequency of the active BWP. The order of the bitmap may be determined such that RBG #0 to RBG #N_RBG−1 may be mapped to most significant bit to least significant bit of the bitmap. The wireless device may assume an RBG is allocated in response to a corresponding bit of the bitmap being allocated/assigned as 1. The wireless device may assume a second RBG is not allocated in response to a corresponding bit of the bitmap being allocated/assigned as 0.

When a virtual RB to a physical RB mapping is enabled, the wireless device may determine one or more physical RBGs based on the indicated bitmap for the virtual RBGs. Otherwise, the indicated bitmap may determine the one or more physical RBGs.

For example, a resource allocation type 1, a frequency domain resource allocation may indicate a set of contiguously allocated non-interleaved or interleaved virtual resource blocks within an active bandwidth part of a scheduled cell. For example, a DCI may be scheduled via a USS. The frequency domain resource allocation field based on the resource allocation type 1 may use a resource allocation value (RIV). The RIV may indicate a starting virtual RB (RB_start) and a length in terms of contiguously allocated virtual RBs (L_rbs). The RIV value may be determined as the RIV=bandwidth (L_rbs−1)+RB_start when (L_rbs−1) is smaller than or equal to floor (bandwidth/2), or the RIV=bandwidth (bandwidth−L_rbs+1)+ (bandwidth−1−RB_start) otherwise. The bandwidth may represent a bandwidth of the active BWP.

A base station may enable a PRB bundling. A wireless device may assume a same precoding over a number RBs of the PRB bundle (e.g., two PRBs, four PRBs or the bandwidth). The base station may schedule the PRB bundle or not, and may not schedule partial PRB bundle to the wireless device.

Similar to downlink, for an uplink transmission, a few resource allocation types are supported. For the uplink transmission, a resource allocation type 0, resource allocation type 1 or resource allocation type 2 may be supported. The resource allocation type 0 may be used in response to a transform precoding being disabled. The resource allocation type 1 or the resource allocation type 2 may be used in response to the transform precoding being enabled or being disabled. For the uplink transmission, a 'dynamicswitch' may be configured. In response to the 'dynamicswitch', the wireless device may switch between the resource allocation type 0 and the resource allocation type 1 based on a DCI. The base station may configure a resource allocation type via an RRC signaling in response to the 'dynamicswitch' being not configured/enabled. The resource allocation type 2 may be used in response to an interlaced PUSCH being enabled. The wireless device may apply the resource allocation type 1 for a DCI based on a fallback DCI format such as a DCI format 0_0. The interlaced PUSCH is disabled for the fallback DCI format. When the interlaced PUSCH is enabled, the wireless device may apply the resource allocation type 2 for the DCI. The wireless device may determine a frequency domain resource based on a frequency domain resource allocation field of a DCI based on an active uplink BWP of a scheduled cell. The DCI may not comprise a BWP index. The wireless device may determine the frequency domain resource based on an indicated BWP by a BWP index when the DCI comprises the BWP index.

In an example, a resource allocation type 0 for an uplink transmission may use a bitmap indicating one or more RBGs within an active UL BWP of a scheduled cell. One RBG may represent a set of consecutive virtual resource blocks defined by a rbg-Size. The rbg-Size may be indicated as a parameter of a PYSCH-Config under a servingCellConfig. For example, the rbg-Size may be determined based on a parameter of 'Configuration 1' or 'Configuration 2' and a bandwidth of an active UL BWP of a scheduled cell. For example, when the bandwidth of the active UL BWP is between 1 to 36 RBs, 'Configuration 1' indicates the rbg-Size of 2 and 'Configuration 2' indicates the rbg-Size of 4. For example, when the bandwidth of the active UL BWP is between 37 to 72 RBs, 'Configuration 1' indicates the rbg-Size of 4 and 'Configuration 2' indicates the rbg-Size of 8. For example, when the bandwidth of the active UL BWP is between 73 to 144 RBs, 'Configuration 1' indicates the rbg-Size of 8 and 'Configuration 2' indicates the rbg-Size of 16. For example, when the bandwidth of the active UL BWP is between 145 to 275 (or 550) RBs, 'Configuration 1' indicates the rbg-Size of 16 and 'Configuration 2' indicates the rbg-Size of 16. A number of RBGs (N_RBG) for a uplink BWP may present. Determination of a bit of the bitmap of the uplink resource allocation type 1 is same as that of the downlink resource allocation type 1. In frequency range 1 (e.g., below 7 GHZ), almost contiguous allocation may be supported. In frequency range 2 (e.g., above 7 GHZ and below 52.6 GHZ), contiguous resource allocation may be supported.

The resource allocation type 0 for an uplink transmission may follow similar procedure to the resource allocation type 0 for an downlink transmission.

The resource allocation type 2 may be used to indicate an interlaced resource allocation, wherein M is a number of interlaces. For example, a frequency domain resource allocation field may comprise a RIV. For the RIV between 0 and M (M+1)/2 (e.g., 0<=RIV<M (M+1)/2), the RIV may indicate a starting interlace index m_0 and a number of contiguous interlace indices L (L>=1). For example, when (L−1)<=floor (M/2), the RIV may define M (L−1)+m_0. Otherwise, the RIV may define M (M−L+1)+(M−1−m_0). For the RIV larger than or equal to M (M+1)/2 (e.g., RIV>=M (M+1)/2), the RIV may indicate a starting interlace index m_0 and a set of values I based on one or more set of values. For example, an entry may represent {RIV-M (M+1)/2, m_0, I}. For example, the one or more set of values may comprise {0, 0, {0, 5}}, {1, 0, {0, 1, 5, 6}}, {2, 1, {0, 5}}, {3, 1, {0, 1, 3, 5, 6, 7, 8}}, {4, 2, {0, 5}}, {5, 2, {0, 1, 2, 5, 6, 7}}, {6, 3, {0, 5}}, and/or {7, 4, {0, 5}}.

Resource allocation type and mechanism based on a DCI may be also applied to a configured grant configuration or semi-persistent scheduling configuration.

In an example, a base station may transmit a DCI. The DCI may comprise a time domain resource allocation field. A value of the time domain resource allocation field (e.g., m) may indicate a row index m+1 of a time domain resource allocation lists/a time domain resource allocation table. The base station may transmit configuration parameters indicating one or more time domain resource allocation tables. For example, a first time domain resource allocation table may be used for a fallback DCI format scheduled via a CSS. For example, a second time domain resource allocation table may be used for a fallback DCI format and/or a non-fallback DCI format via a USS. The wireless device may determine a time domain resource allocation table from the one or more time domain resource allocation tables for the DCI in response to receiving the DCI. The configuration parameters may comprise one or more time domain resource allocation entries for a time domain resource allocation table. One time domain resource allocation entry may comprise a starting and a length indicator value (SLIV), a PUSCH mapping type, and K2 value. The K2 may represent a scheduling offset between a scheduling DCI of a PUSCH and a starting slot index of the PUSCH. The one time domain resource allocation (TDRA) entry may comprise a repetition number (numberOfRepetitions). The one TDRA entry may comprise a starting symbol (startSymbol) and a length addition to the SLIV. For a PUSCH, scheduled by a non-fallback DCI format such as DCI format 0_1, a base station may transmit, to a wireless device, configuration parameters indicating PUSCHRepTypeIndicaor-ForDCIFormat0_1 to 'puschRepTypeB' indicating a repetition type B. In response to being configured with 'puschRepTypeB', the wireless device may determine a resource based on a procedure for the repetition type B and a time domain resource allocation field of a DCI based on the DCI format 0_1. Similarly, the configuration parameters may comprise PUSCHRepTypeIndicator-ForDCIformat0_2 to 'puschRepTypeB' to apply the repetition type B for a second DCI based on a DCI format 0_2. When the base station may not configure PUSCHRepTypeIndicaor-ForDCIFormat0_1 indicating 'puschRepTypeB', the wireless device may determine a time domain resource based on a DCI based on a repetition type A.

For example, when the repetition type A is configured/enabled, the wireless device may determine a starting symbol S in a starting slot and a number of consecutive symbols L from the starting symbol S based on a SLIV value. For example, the SLIV value may define SLIV=14*(L−1)+S when (L−1) is smaller than or equal to 7 (half slot based on a normal CP). The SLF value may define SLIV=14*(14−L+1)+ (14−1−S) when (L−1) is larger than 7. For example, L would be greater than 0, and may be smaller than or equal to 14-S. In an uplink BWP with an extended CP, 12 OFDM symbols may be assumed for a slot. A SLIV value may be determined by 12*(L−1)+S or 12*(12−L+1)+(14−1−S) respectively based on L−1 being smaller than/equal to 6 or larger than 6. For the repetition type A, the configuration parameters may comprise/indicate a TypeA or Type B for a PUSCH mapping type. For example, the base station may determine a first OFDM symbol comprising a DM-RS based on a fixed location (e.g., a first symbol of a slot) when the TypeA is configured for the PUSCH mapping type. For example, the base station may determine a first OFDM symbol comprising a DM-RS based on a starting OFDM symbol of the PUSCH in response to the TypeB being configured for the PUSCH mapping type.

For example, when the repetition type B is configured/enabled, the wireless device may determine a starting OFDM symbol S in a starting slot, and a number of consecutive OFDM symbols L based on a row of a time domain resource allocation table. For example, the row of the time domain resource allocation table may comprise startSymbol for the starting OFDM symbol S and length for the number of consecutive OFDM symbols L. For the repetition type B, the wireless device may assume that the TypeB is configured for the PUSCH mapping type. For example, when a TypeA is configured for a PUSCH mapping type, a staring OFDM symbol S, a length L, and S+L may represent one or more values. For example, {S, L, S+L} may be {0, {4, . . . , 14}, {4, . . . , 14}} for a normal CP, and {0, {4, . . . , 12}, {4, . . . , 12}} for an extended CP. When a TypeB is configured for the PUSCH mapping type, {S, L, S+L} may be {0, . . . , 13}, {1, . . . , 14}, {1, . . . , 14} for a repetition type A, {1, . . . , 27} for a repetition type B} for the normal CP, and {0, . . . , 11}, {1, . . . , 12}, {1, . . . , 12} for the extended CP.

For a repetition type A, a wireless device may determine a repetition number K based on a row of a time domain resource allocation table. The row may comprise a number of repetitions. The wireless device may determine based on an RRC parameter, 'pusch-AggregationFactor' when the row may not comprise the number of repetitions. The wireless device may determine a single transmission based on the row may not comprise the number of repetitions nor the 'pusch-AggregationFactor' is not configured. The wireless device may determine the single transmission for a PUSCH scheduled by a fallback DCI such as a DCI format 0_0.

For a repetition type A with a repetition number K being larger than 1, a wireless device may apply a starting OFDM symbol S and a length L in a slot across K consecutive slots based on a single transmission layer. The wireless device may repeat a TB across the K consecutive slots applying same OFDM symbols in each slot. A redundancy version (RV) applied on a i-th transmission of the K consecutive slots may be determined based on a repetition type. For example, when a RV value indicated by a DCI is 0, a second RV value for i-th transmission occasion (when a repetition type A is configured) or i-th actual repetition (when a repetition type B is configured) may be determined as 0 for i mod 4=0, 2 for i mod 4=1, 3 for i mod 4=2, 4 for i mod 4=3. When the RV value is 2, the second RV value may be determined as 2 for i mod 4=0, 3 for i mod 4=1, 1 for i mod 4=2, 0 for i mod 4=3. When the RV value is 3, the second RV value may be determined as 3 for i mod 4=0, 1 for i mod 4=1, 0 for i mod 4=2, 0 for i mod 4=2. When the RV value is 1, the second RV value may be determined as 1 for i mod 4=0, 0 for i mod 4=1, 2 for i mod 4=2, 3 for i mod 4=3.

For a repetition type A, a PUSCH transmission of a slot over a plurality of slots may be omitted when the slot may not have a sufficient number of uplink OFDM symbols for the PUSCH transmission. For a repetition type B, a wireless device may determine one or more slots for a number of nominal repetition number N. For a i-th nominal repetition, wherein i is 0, . . . , N−1, wherein N may be configured by a base station via an RRC signaling or a time domain resource allocation of a DCI. The wireless device may determine a slot. The i-th nominal repetition may start, wherein a slot index would be Ks+floor ((S+iL)/N_slot_symbol), and a starting symbol in the slot may be given by mod (S+iL, N_slot_symbol). The N_slot_symbol may be 14 with a normal CP and 12 with an extended CP. The S may represent a starting OFDM symbol indicated by a time domain resource allocation field of a DCI and L may represent a length indicated by the time domain resource allocation field of the DCI. The wireless device may determine a second slot wherein the i-th nominal repetition may end wherein a second slot index of the second slot may be determined as Ks+floor ((S+ (i+1)*L−1)/N_slot_symbol), and an ending symbol in the second slot may be determined as mod (S+ (i+1)*L−1, N_slot_symbol). The Ks may be determined as a starting slot indicated by the time domain resource allocation field of the DCI.

When the wireless device is configured with the repetition type B, the wireless device may determine invalid OFDM symbol for PUSCH repetitions based on a tdd-UL-DL-ConfigurationCommon/a tdd-UL-DL-Configuration Dedicated and/or an InvalidSymbolPattern indicated by an RRC signaling. For example, the wireless device may determine a downlink symbol based on the tdd-UL-DL-Configuration-Common or the tdd-UL-DL-Configuration Dedicated as an invalid OFDM symbol for the repetition type B. The base station may transmit the InvalidSymbolPattern, a bitmap of OFDM symbols over one slot or two slots. A bit of the bitmap may indicate '1' to invalidate a corresponding OFDM symbol. The base station may further configure periodicityAndPattern. A bit of the periodicityAndPattern may correspond to a unit equal to a duration of the bitmap of the InvalidSymbolPattern. The wireless device may determine invalid OFDM symbol(s) based on the InvalidSymbolPattern and the periodicityAndPattern. For example, when a PUSCH is scheduled/activated by a non-fallback DCI format such as a DCI format 0_1/0_2 and InvalidSymbolPatternIndicator-ForDCIFormat0_1/0_2 is configured, a invalid symbol pattern indicator field may indicate 1, the wireless device may apply an invalid symbol pattern (e.g., InvalidSymbolPattern). Otherwise, the wireless device may not apply the invalid symbol pattern. When the InvalidSymbolPatternIndicator-ForDCIFormat0_1/0_2 is not configured, the wireless device may not apply the invalid symbol pattern. The wireless device may determine remaining OFDM symbols. The remaining OFDM symbols may not comprise invalid OFDM symbol(s), the wireless device may consider the remaining OFDM symbols as valid OFDM symbols. When there is a sufficient number of valid OFDM symbols in a slot to transmit a PUSCH based on a scheduling DCI, the wireless device may determine an actual repetition of a slot wherein the slot may have consecutive sufficient valid consecutive OFDM symbols. The wireless device may skip the actual repetition based on a slot formation indication. The wireless device may apply a redundancy version based on the actual repetition.

In an example, a row of a time domain resource allocation may comprise one or more resource assignments for one or more contiguous PUSCHs. A K2 of the row may indicate a first PSCH of the one or more contiguous PUSCHs. Each PUSCH of the one or more contiguous PUSCHs may be indicated/scheduled with a separate SLIV value and a PUSCH mapping type.

Figure 21A:
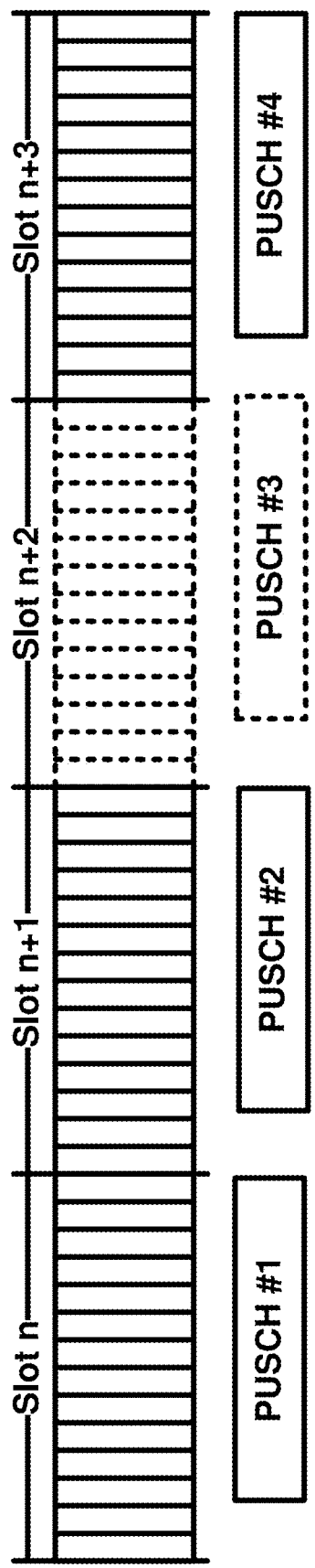
FIG. 21A illustrates an example of TypeA repetition for an uplink transmission as per an aspect of an example embodiment of the present disclosure.
Figure 21B:
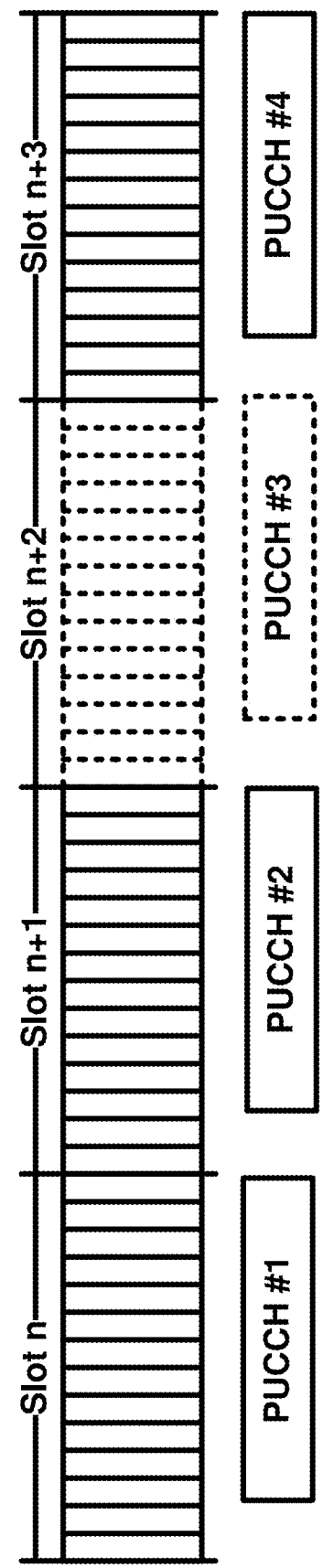
FIG. 21B illustrates an example of TypeA repetition for an uplink transmission as per an aspect of an example embodiment of the present disclosure.

FIG. 21A and FIG. 21B illustrate an example of TypeA repetition for an uplink transmission as per an aspect of an example embodiment of the present disclosure. FIG. 21A illustrates a TypeA PUSCH mapping type for a PUSCH repetition. FIG. 21B illustrates a TypeA PUCCH mapping type for a PUCCH repetition. TypeA repetition may be called as a slot aggregation.

For example, FIG. 21A and FIG. 21B may illustrate 4 times of repetition. The wireless device may determine four PUSCHs (in FIG. 21A) or four PUCCHs (in FIG. 21B), where a set of OFDM symbols in each slot of four slots is identical. For example, slot n+2 may be a downlink slot. The wireless device may drop a third PUSCH or PUCCH in the slot n+2. A resource in each slot may be referred as a PUSCH resource of the slot or a PUCCH resource of the slot. The resource in each slot may be identical in a time domain (e.g., a same set of OFDM symbols in a slot) and may or may not be same in a frequency domain based on a hopping pattern. For example, when hopping is not used/enabled, the resource may be identical in each slot in the frequency domain. When hoping is enabled/used, the resource may be different (based on a hopping offset) in each slot.

Figure 22A:
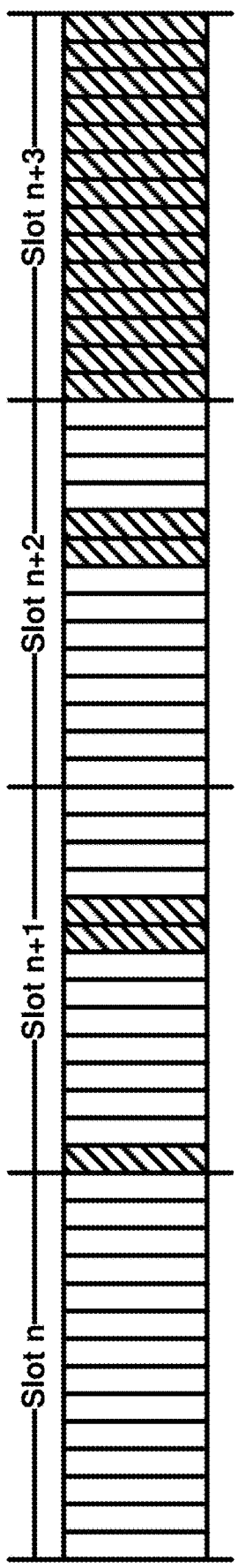
FIG. 22A illustrates an example of TypeB repetition for an uplink transmission as per an aspect of an example embodiment of the present disclosure.
Figure 22B:
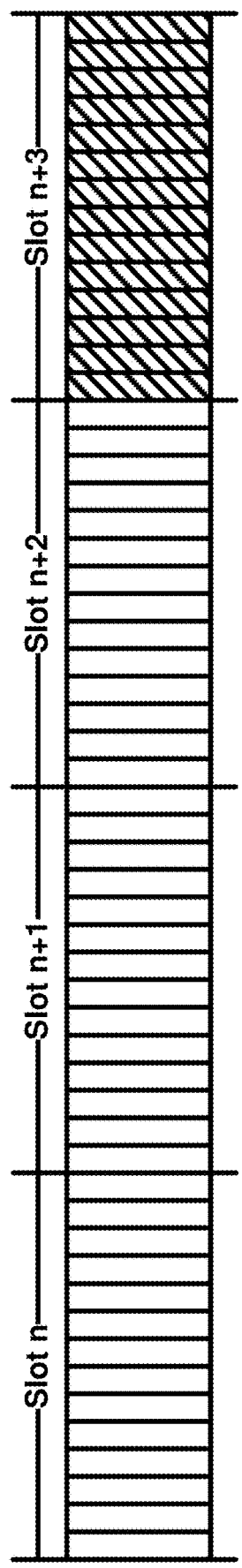
FIG. 22B illustrates an example of TypeB repetition for an uplink transmission as per an aspect of an example embodiment of the present disclosure.

FIG. 22A and FIG. 22B illustrates an example of TypeB repetition for an uplink transmission as per an aspect of an example embodiment of the present disclosure. FIG. 22A illustrates a TypeB PUSCH mapping type for a PUSCH repetition. FIG. 22B illustrates a TypeB PUCCH mapping type for a PUCCH repetition. TypeB repetition may be called as an enhanced uplink repetition.

For example, FIG. 22A and FIG. 22B may illustrate 4 times of nominal repetition. The wireless device may determine four nominal PUSCHs (in FIG. 22A) or four nominal PUCCHs (in FIG. 22B), where a number of OFDM symbols in each nominal repetition may be identical. Within each nominal repetition, the wireless device may determine one or more actual repetition (if any). For example, the wireless device may not determine any actual repetition in a slot n+3 wherein the slot n+3 is a downlink slot. In a first nominal PUSCH repetition or PUCCH repetition (PUSCH #1 or PUCCH #1), the wireless device may determine two actual repetitions (#1 and #2). The wireless device may determine to end an actual repetition in response to a slot boundary or an unavailable symbol. The wireless device may determine three actual repetitions for a second PUSCH.

In FIG. 22A, the wireless device may determine two OFDM symbols of the slot n+1 are unknown or unavailable or downlink. The wireless device may split a first actual repetition (#1) of the second nominal repetition and a second actual repetition (#2) of the second nominal repetition around the two OFDM symbols. The two OFDM symbols may be indicated by a scheduling uplink grant.

In FIG. 22A, the wireless device may determine two actual repetition of a third nominal repetition based on unavailable/downlink OFDM symbols in the middle of slot n+2. The wireless device may determine one actual repetition of a fourth nominal repetition, which may be dropped due to the slot 4 being a downlink slot.

In FIG. 22B, the wireless device may determine two actual repetitions for a first PUCCH nominal repetition, two actual repetitions for a second PUCCH nominal repetition, one actual repetition for a third PUCCH nominal repetition, and drop a fourth nominal repetition. The wireless device may drop the fourth nominal repetition in response to the slot n+4 being a downlink slot.

A similar mechanism may be used to schedule a time domain resource for a downlink data.

In an example, a carrier or a cell (e.g., an uplink carrier/cell or a downlink carrier/cell) may comprise a plurality of resource blocks (RBs). A resource block may comprise a set of subcarriers (e.g., 1 RB=12 subcarriers). The carrier may be configured with one or more uplink BWPs. An uplink BWP may comprise a plurality of consecutive RBs and a numerology. A wireless device may transmit a TB via the carrier, whereas the wireless device may transmit a part of TB (e.g., a modulation symbol) via a subcarrier.

In an example, a wireless device may transmit a first PUSCH of a TB via a first uplink carrier/cell and a second PUSCH of the TB via the second uplink carrier/cell simultaneously based on the first uplink carrier may operate in a first frequency range and the second uplink (UL) carrier may operate in a second frequency range. For example, a wireless device may receive a first PDSCH of a TB via a first downlink (DL) carrier/cell and a second PDSCH of the TB via the second downlink carrier/cell simultaneously based on the first downlink carrier may operate in a first frequency range and the second downlink carrier may operate in a second frequency range. For example, the first frequency range may be different from the second frequency range. The first frequency range may belong to a frequency range 1, a frequency range 2 or a frequency range 3. The second frequency range may belong to the frequency range 1, the frequency range 2 or the frequency range 3.

For example, the first UL carrier may be a non-supplemental uplink carrier of a cell and the second UL carrier may be a supplemental uplink carrier of the cell. For example, the first uplink carrier is associated with a first uplink panel and/or a first transmission and reception point (TRP) (e.g., a first coreset pool, a first coreset group) of the cell, and the second uplink carrier is associated with a second uplink panel and/or a second TRP (e.g., a second coreset pool, a second coreset group) of the cell. The first UL carrier may be associated with a first cell. The second UL carrier may be associated with a second cell. The first cell and the second cell may be different. For example, the first DL carrier may be a non-supplemental downlink carrier of a cell and the second DL carrier may be a supplemental downlink carrier of the cell. For example, the first downlink carrier is associated with a first uplink panel and/or a first transmission and reception point (TRP) (e.g., a first coreset pool, a first coreset group) of the cell, and the second downlink carrier is associated with a second uplink panel and/or a second TRP (e.g., a second coreset pool, a second coreset group) of the cell. The first DL carrier may be associated with a first cell. The second DL carrier may be associated with a second cell. The first cell and the second cell may be different.

Figure 23:
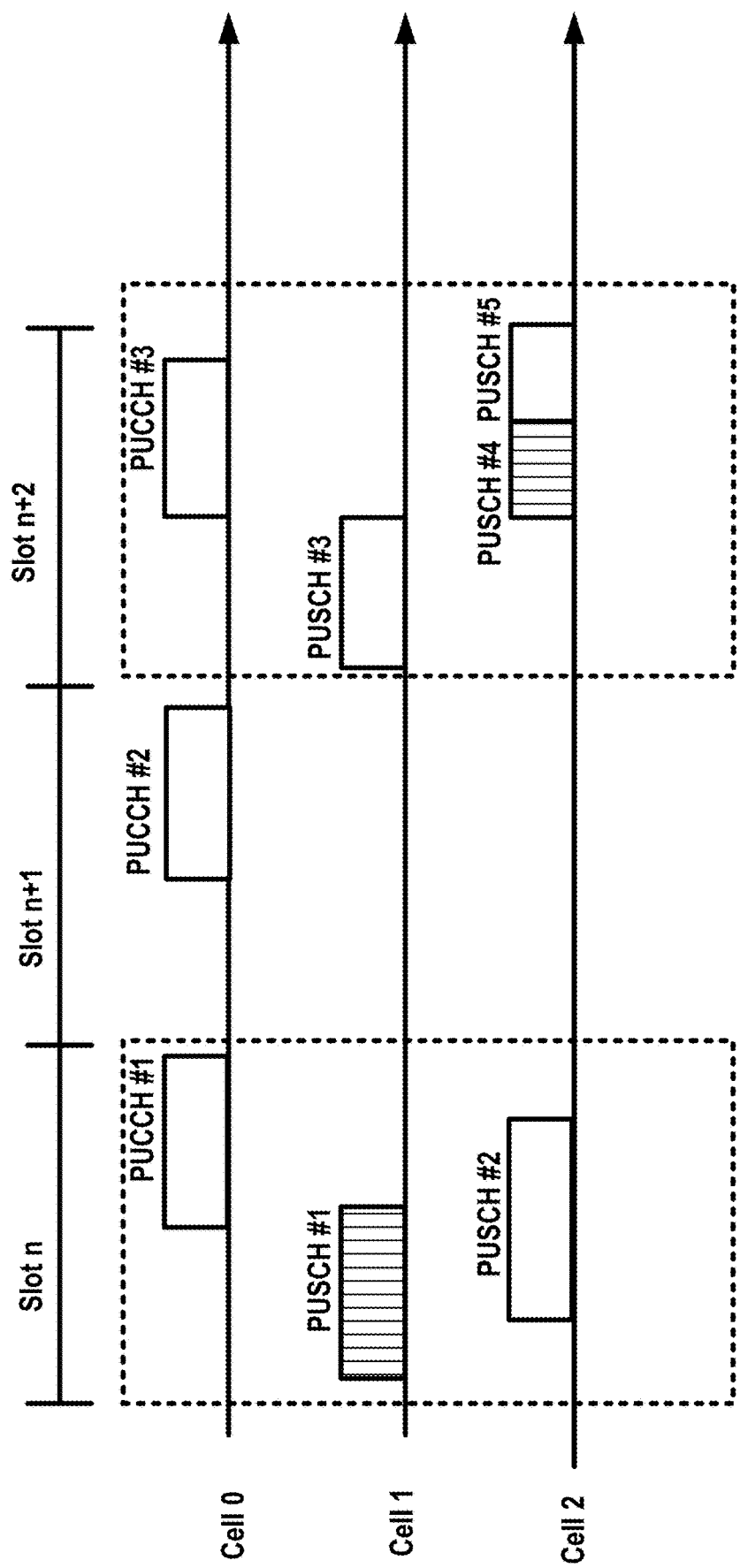
FIG. 23 illustrates an example diagram of a slot format with a PUSCH repetition as per an aspect of an example embodiment of the present disclosure.

FIG. 23 illustrates an example scenario of multiplexing UCI in a PUSCH when a PUCCH comprising the UCI and the PUSCH overlap as per an aspect of an example embodiment of the present disclosure. For example, a wireless device may be configured with a first cell (Cell 0), a second cell (Cell 1) and a third cell (Cell 2). In a slot n, the wireless device may be scheduled with a first PUCCH (PUCCH #1) via the first cell, a first PUSCH (PUSCH #1) via the second cell, and a second PUSCH (PUSCH #2) via the third cell. The wireless device may determine the first PUCCH overlaps with the first PUSCH and the second PUSCH. The wireless device may determine whether one or more conditions (e.g., processing time requirement) are met for the first PUSCH and the second PUSCH. In response to the first PUSCH and the second PUSCH being met the one or more conditions, the wireless device may determine the first PUSCH for multiplexing UCI of the PUCCH, based on a first cell index of the second cell being lower than a second cell index of the third cell.

The wireless device may determine the first PUSCH as a PUSCH to piggyback the UCI of the first PUCCH in response to the PUCCH. The wireless device may multiplex the UCI to the first PUSCH. The wireless device may transmit the first PUSCH comprising the UCI via the second cell. The wireless device may drop the first PUCCH in response to multiplexing the UCI to the first PUSCH. The wireless device may transmit the second PUSCH.

In a slot n+1, the wireless device may be scheduled with a second PUCCH. The wireless device may transmit the second PUCCH as there is no overlapping PUSCH scheduled in the slot n+1.

In a slot n+2, the wireless device may be scheduled with a third PUCCH (PUCCH #3). The wireless device may be scheduled with a third PUSCH (PUSCH #3) and Type B PUSCH repetitions (PUSCH #4 and PUSCH #5). The wireless device may determine that TypeB PUSCH repetitions may overlap with the third PUCCH. The wireless device may determine an earliest PUSCH of the TypeB PUSCH repetitions, where the earliest PUSCH overlaps with the third PUCCH. The wireless device may multiplex/piggyback the UCI of the third PUCCH to the earliest PUSCH of the TypeB PUSCH repetitions (e.g., PUSCH #4). The wireless device may transmit the third PUSCH. The wireless device may transmit a fourth PUSCH (the earliest PUSC of the Type B PUSCH repetitions, PUSCH #4) carrying the UCI. The wireless device may transmit a fifth PUSCH (a second PUSCH of the TypeB PUSCH repetitions, PUSCH #5). The wireless device may drop the third PUCCH (PUCCH #3). FIG. 23 illustrates that the first PUSCH and the fourth PUSCH comprise UCI.

In an example, a wireless device may be configured with a plurality of cells, where the plurality of cells may be configured with different numerologies/subcarrier spacings. A PUCCH of a first cell based on a first numerology/subcarrier spacing may overlap with a plurality of PUSCHs of a second cell based on a second numerology/subcarrier spacing. For example, the first numerology/subcarrier spacing may be a 15 kHz. The second numerology/subcarrier spacing may be 60 KHz. The slot of the first cell may overlap with four slots of the second cell. The PUCCH of the first cell may overlap with one or more PUSCHs of the second cell.

Figure 24:
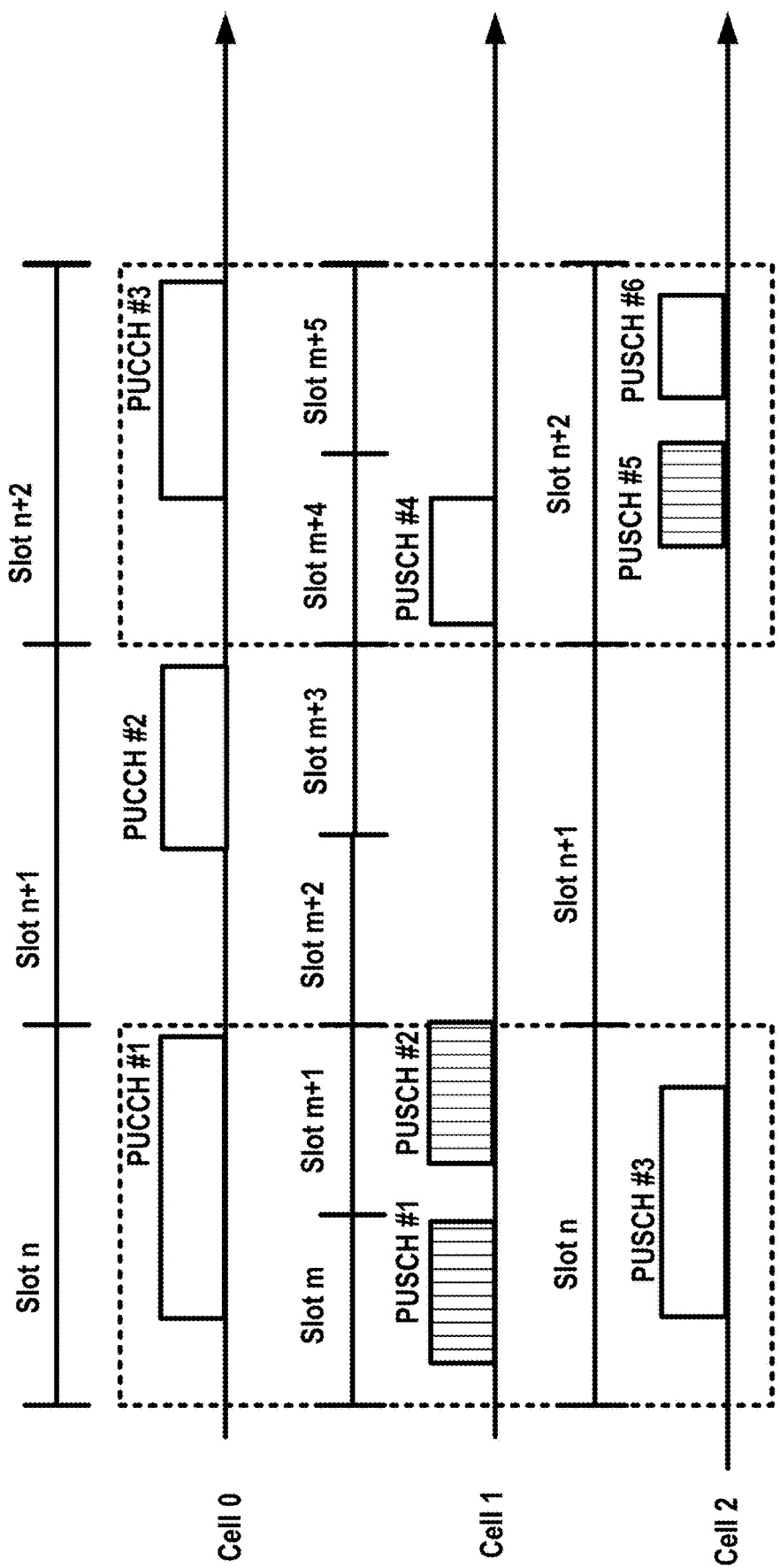
FIG. 24 illustrates an example diagram as per an aspect of an example embodiment of the present disclosure.

FIG. 24 illustrates an example scenario of multiplexing UCI in one or more PUSCHs when a PUCCH comprising the UCI and the one or more PUSCHs overlap as per an aspect of an example embodiment of the present disclosure.

For example, a wireless device may be configured with a first cell (Cell 0) with a first numerology. The wireless device may be configured with a second cell (Cell 1) with a second numerology and a third cell (Cell 2) with the first numerology. For example, the second numerology may have two times higher subcarrier spacing than the first numerology. A slot of the first cell may overlap with two slots of the second cell.

For example, a slot n of the first cell may overlap with a slot m and a slot m+1 of the second cell. For example, the wireless device may be scheduled with a first PUCCH (PUCCH #1) in the slot n. The wireless device may be scheduled with a first PUSCH (PUSCH #1) in the slot m. The wireless device may be scheduled with a second PUSCH, that is a repetition of the first PUSCH in the slot m+1. The wireless device may be scheduled with a third PUSCH (PUSCH #3) in the slot n of the third cell.

The wireless device may determine one or more PUSCHs overlapping with the first PUCCH. The wireless device may determine the first PUSCH, the second PUSCH and the third PUSCH overlapping with the first PUCCH. When the first PUSCH and the second PUSCH of the second cell satisfies one or more conditions for UCI multiplexing, the wireless device may determine the first PUSCH and the second PUSCH belong to candidate PUSCH(s). When the third PUSCH of the third cell satisfies the one or more conditions for UCI multiplexing, the wireless device may determine the third PUSCH as one of the candidate PUSCH(s). The wireless device may determine the second cell for the UCI multiplexing based on a cell index (e.g., a first cell index of the second cell is lower than a second cell index of the third cell). For example, the second PUSCH may be a Type A repetition of the first PUSCH.

For the second cell, when the wireless device may determine a plurality of slots of the second cell (e.g., determined cell for the UCI piggybacking) may overlap with a slot of the PUCCH (e.g., slot m and slot m+1 overlap with slot n), the wireless device may determine a PUSCH of each slot of the plurality of slots for the UCI multiplexing when the PUSCH overlaps with the PUCCH. For example, in the slot m, the wireless device may determine the first PUSCH overlaps with the first PUCCH. For example, in the slot m+1, the wireless device may determine the second PUSCH overlaps with the first PUCCH. The wireless device may determine a PUSCH in each slot for the UCI piggybacking. The wireless device may transmit the first PUSCH and the second PUSCH, where the first PUSCH and the second PUSCH comprise the UCI of the first PUCCH. The wireless device may transmit the third PUSCH. The wireless device may drop the first PUCCH in response to the multiplexing the UCI to the first PUSCH and the second PUSCH.

The wireless device may multiplex a UCI of the first PUCCH via the first PUSCH in the slot m and the second PUSCH in the slot m+1. For one or more slots overlapping with a slot of a PUCCH, the wireless device may determine one or more PUSCHs overlapping with the PUCCH. The wireless device may multiplex a UCI of the PUCCH via the one or more PUSCHs. The wireless device may not multiplex the UCI via a PUSCH if the PUSCH does not overlap with the PUCCH.

In a slot n+1, the wireless device may be scheduled a second PUCCH. The wireless device may transmit the second PUCCH.

In a slot n+2, the wireless device may be scheduled with a third PUCCH via the first cell and a TypeB PUSCH repetition (e.g., PUSCH #5 and PUSCH #6) via the third cell. The wireless device may be scheduled with a fourth PUSCH (PUSCH #4) via the second cell in a slot m+4. The wireless device may determine the fourth PUSCH may not overlap with the third PUCCH. The wireless device may determine that a fifth PUSCH and a sixth PUSCH may overlap with the PUCCH. In a slot of the third cell (e.g., slot n+2), the wireless device may determine a PUSCH overlapping with the PUCCH. As the wireless device has a plurality of PUSCHs in the slot n+2 that overlap with the PUCCH, the wireless device may determine an earliest PUSCH of the type B repetition for a UCI multiplexing. The wireless device may determine the fifth PUSCH (PUSCH #5) for multiplexing a UCI of the third PUCC. The wireless device may multiplex/piggyback the UCI of the third PUCCH via the fifth PUSCH (PUSCH #5) and transmit the fifth PUSCH that comprises the UCI of the third PUCCH. The wireless device may drop the third PUCCH in response to the multiplexing the UCI of the third PUCCH to the fifth PUSCH.

In an example, a wireless device may be, via RRC signaling, configured with a first cell group comprising one or more serving cells. The wireless device may be, via RRC signaling, configured with a second cell group comprising one or more second serving cells. The wireless device may perform a hybrid automatic repeat request (HARQ) feedback procedure for the first cell group independently from a second HARQ feedback procedure for the second cell group. A cell group may be a master cell group or a secondary cell group. A cell group may be a first PUCCH cell group comprising a primary cell. A cell group may be a second PUCCH cell group not comprising the primary cell. A cell group may comprise one or more serving cells among a plurality of serving cells configured to the wireless device. A cell group may also represent one or more serving cells associated with a first service or a first link (e.g., sidelink, multicast, broadcast, MBSM, D2D, V2X, V2P, V2I, V2N, and/or the like). A cell group may represent one or more second serving cells associated with a second service or a second link (e.g., downlink/uplink, cellular communication, location service, and/or the like). The wireless device may be configured with, via RRC signaling, a first set of PUCCH resources for the first cell group. The wireless device may be configured with, via RRC signaling, a second set of PUCCH resources for the second cell group. The wireless device may determine a first PUCCH for the first cell group based on the HARQ feedback procedure. The wireless device may determine a second PUCCH for the second cell group based on the second HARQ feedback procedure. For example, the first PUCCH and the second PUCCH may overlap in time and/or frequency domain. The wireless device may determine the first PUCCH or the second PUCCH based on a priority of the first PUCCH and a second priority of the second PUCCH. For example, the wireless device may determine the first PUCCH or the second PUCCH based on a priority of the first PUCCH and a threshold for the first PUCCH. A base station may configure the threshold for the first cell group via RRC signaling.

In an example, a wireless device may be provided with a coreset pool index for one or more coresets of an active bandwidth part of a serving cell. The wireless device may determine a coreset pool index of a coreset as zero in response to the coreset pool index has not been provided for the coreset. The coreset pool index may be zero or one. The base station may transmit one or more RRC messages indicating configuration parameters. The configuration parameters may indicate/comprise a ACKNACKFeedbackMode between SeparateFeedback or JointFeedback. For example, when ACKNACKFeedbackMode is indicated as SeparateFeedback, the wireless device may determine first HARQ feedback bits corresponding to a first corset pool index (or coresets of the first coreset pool index). The wireless device may determine second HARQ feedback bits, independently from the first HARQ feedback bits, corresponding to a second corset pool index (or coresets of the second coreset pool index). When ACKNACKFeedbackMode is indicated as JointFeedback, the wireless device may generate/determine HARQ feedback bits for both coreset pool indexes jointly. When ACKNACKFeedbackMode is indicated as SeparateFeedback, the wireless device may perform a first HARQ feedback process for the first coreset pool independently from a second HARQ feedback process for the second coreset pool.

In an example, a wireless device may determine a priority index of a PUSCH or a PUCCH transmission. For example, the wireless device may determine the priority index of the PUSCH based on a DCI scheduling uplink resource(s) for the PUSCH. The DCI may comprise or indicate the priority index. In response to the DCI does not comprise a priority index field, the wireless device may determine the priority index of the PUSCH is zero (0). The wireless device may determine a priority index of a PUCCH transmission based on one or more priorities of corresponding PDSCH(s) and/or SPS PDSCH(s) or SPS PDSCH release(s) that the PUCCH transmission carries HARQ feedback bits for the corresponding PDSCH(s) and/or SPS PDSCH(s) or SPS PDSCH release(s). In an example, the base station may transmit one or more RRC messages comprising configuration parameters. The configuration parameters may indicate a harq-CodebookID for a SPS configuration, wherein the harq-CodebookID may be used to determine a priority value of a SPS PDSCH or a SPS PDSCH release based on the SPS configuration. The wireless device may receive a second DCI scheduling a PDSCH of the corresponding PDSCH(s). The wireless device may determine a priority of the PDSCH based on the second DCI. For example, the second DCI may comprise/indicate a priority index field indicating the priority. For example, the wireless device may determine the priority as zero (0) in response to the second DCI does not comprise/indicate the priority for the PDSCH.

In an example, a base station may schedule a PUSCH with a first priority that may be used to piggyback/carry HARQ feedback bits with a second priority. The first priority and the second priority may be different or same. The wireless device may determine a prioritization of an overlapping PUSCH with a first priority and a PUCCH with a second priority based on a rule. For example, the rule is that the wireless device may determine or resolve conflict/overlapping between one or more PUCCHs and one or more PUSCHs with a same priority. For example, based on the determining the conflict/overlapping, the wireless device may have a first PUCCH with a high priority (e.g., larger priority index) and either a PUSCH or a second PUCCH with a low priority (e.g., lower priority index) where the first PUCCH overlaps with either the PUSCH or the second PUCCH. The wireless device may determine to transmit the first PUCCH and may cancel either the PUSCH or the second PUCCH before a first symbol overlapping with the first PUCCH transmission. The wireless device may expect that a transmission of the first PUCCH may not start before Tproc+d1 after a last symbol of a first PDCCH reception. The first PDCCH is a DCI scheduling the first PUCCH. For example, Tproc is a processing delay and d1 is an processing offset. For example, based on the determining the conflict/overlapping, the wireless device may have a PUSCH with a larger priority index scheduled by a first DCI format via a first PDCCH repetition and a PUCCH of a smaller priority index. The wireless device may determine to transmit the PUSCH and may cancel the PUCCH. The PUSCH and the PUCCH may overlap in time. The wireless device may cancel a transmission of the PUCCH before a first symbol overlapping with a transmission of the PUSCH. The wireless device may expect that the transmission of the PUSCH may not start before Tproc+d1 after a last symbol of the first PDCCH reception. For example, d1 may be determined based on a UE capability.

When a wireless device may detect a first DCI format (or a first DCI) scheduling a PUCCH with a larger priority index or a PUSCH transmission with a larger priority index that may overlap with a second PUCCH with a smaller priority index or a second PUSCH with a smaller priority index, the wireless device may not expect to receive a second DCI format (or a second DCI), after receiving the first DCI format (or the first DCI), scheduling resource(s) mapped to/fully overlapped to the second PUSCH or the second PUCCH. The base station may not reschedule or reclaim the resource(s) of the second PUSCH or the second PUCCH that are cancelled by a prioritization.

In an example, a wireless device may receive a first DCI format (or a first DCI) in a first PDCCH reception scheduling a first PUCCH or a first PUSCH with a higher priority index. The wireless device may receive a second DCI format (or a second DCI) in a second PDCCH reception scheduling a second PUCCH or a second PUSCH with a smaller priority index. The first PUCCH or the first PUSCH may overlap with the second PUCCH or the second PUSCH. The wireless device may determine Tproc based on a numerology of a smaller subcarrier spacing between a first numerology of the first PDCCH and a second numerology of the second PDCCH and a third numerology of the first PUCCH or the first PUSCH and a fourth numerology of the second PUCCH or the second PUSCH.

In an example, a base station may not schedule a first PUCCH or a first PUSCH with a smaller priority index that may overlap with a second PUCCH with a larger priority index with a HARQ feedback bits corresponding to a SPS PDSCH reception only. The base station may not schedule a first PUCCH with a smaller priority index that may overlap in time with a PUSCH with a larger priority index and comprises SP-CSI report(s) without a corresponding scheduling DCI/PDCCH.

In an example, when a wireless device multiplex UCI(s) with a first priority to a PUCCH or a PUSCH, the wireless device may assume that a priority of the PUCCH or the PUSCH may have a same priority to the first priority. A base station may schedule to multiplex the UCI(s) with the first priority to the PUCCH or the PUSCH with the same priority (e.g., the first priority). In an example, when a wireless device may be scheduled with a PUSCH without UL-SCH (e.g., data) and the PUSCH may overlap with a PUCCH comprising a positive SR, the wireless device may drop/cancel a transmission of the PUSCH. In an example, a wireless device may multiplex HARQ feedback bits in a PUSCH transmission via a configured grant resource that comprises a CG-UCI based on a cg-CG-UCI-Multiplexing configuration parameter. For example, the wireless device may multiple the HARQ feedback bits to the PUSCH with the CG-UCI when the cg-CG-UCI-Multiplexing is provided or indicated or enabled. Otherwise, the wireless device may not multiplex. The wireless device may multiplex the HARQ feedback bits to another transmission of a second PUSCH or a PUCCH.

In an example, a base station may transmit one or more RRC messages comprising configuration parameters. The configuration parameters may comprise/indicate pdsch-HARQ-ACK-Codebook-List. The pdsch-HARQ-ACK-Codebook-List may indicate whether the wireless device needs to generate one HARQ codebook or two HARQ codebook. When the wireless device generates one HARQ codebook, the wireless device may multiplex in a single HARQ codebook of HARQ feedback bits associated with a same priority index. When the wireless device generates two HARQ codebooks, the wireless device may generate a first HARQ codebook for a PUCCH of a first priority index (e.g., priority index 0). The wireless device may generate a second HARQ codebook for a second PUCCH of a second priority index (e.g., priority index 1). For each HARQ codebook, the configuration parameters may indicate PUCCH-Config, UCI-OnPUSCH, and/or PDSCH-codeBlockGroupTransmission.

In an example, a wireless device may generate a positive acknowledgement (ACK) when the wireless device detects a DCI format that may schedule a transport block or indicates a SPS release and the wireless device detects the transport block or the SPS release successfully. Otherwise, the wireless device may generate a negative acknowledgement (NACK). For example, a value 0 may indicate an ACK. A value 1 may indicate an NACK.

In an example, the configuration parameters may indicate PDSCH-CodeBlockGroup Transmission for a serving cell to enable a code block group (CBG) based HARQ feedback. The wireless device may generate N bits of HARQ feedback bits for a transport block when the CBG based HARQ feedback is enabled. For example, N is a number of HARQ feedback bits (e.g., number of CBGs) for a transport block. The wireless device may determine M number of code blocks per each CBG based on a total number of code blocks of the transport block. The wireless device may generate an ACK for a CBG in response to the wireless device correctly receive all code blocks of the CBG. Otherwise, the wireless device may generate an NACK for the CBG. When a wireless device receives two transport blocks by a DCI or a DCI format, the wireless device may generate one or more HARQ feedback bits for a first transport block of the two transport blocks first and then generate one or more second HARQ feedback bits for a second transport block of the two transport blocks. In general, the wireless device may generate HARQ feedback bits for one or more CBGs of a transport block first and then generate next HARQ feedback bits for one or more next transport block and so on.

In an example, a base station may transmit one or more RRC messages comprising/indicating configuration parameters. The configuration parameters may indicate a semi-static HARQ feedback mode (e.g., pdsch-HARQ-ACK-Codebook=semi-static) or a dynamic HARQ feedback mode (e.g., pdsch-HARQ-ACK-Codebook=dynamic).

In an example, a wireless device may be configured with dynamic HARQ feedback mode or dynamic/Type-2 HARQ-ACK codebook determination. Based on the dynamic HARQ feedback mode, the wireless device may multiplex of one or more HARQ-ACK feedback bits based on a PDSCH scheduled by a DCI format that does not include/comprise a counter DAI field. In an example, a wireless device may determine monitoring occasions for receiving DCI(s) of PDCCH(s) with one or more DCI formats scheduling PDSCH or SPS PDSCH release via an active downlink BWP of a serving cell. The wireless device may determine one or more HARQ-ACK/HARQ feedback bits in a same PUCCH in a slot n based on (1) a value of a PDSCH-to-HARQ feedback timing indicator field of a DCI format scheduling a PDSCH reception or a SPS PDSCH release; and (2) a slot offsets or timing offsets between a PDCCH/DCI and a PDSCH (e.g., K0) provided by a time domain resource assignment filed in a DCI format scheduling a PDSCH or a SPS PDSCH release; and (3) a number of slot aggregations for the PDSCH or the SPS PDSCH release.

For example, a wireless device may determine a set of PDCCH monitoring occasions for one or more DCI format that may schedule a PDSCH reception or a SPS PDSCH release. The set of PDCCH monitoring occasions may comprise one or more monitoring occasions based on one or more search spaces of an active DL BWPs of configured serving cells. The one or more monitoring occasions may be indexed in an ascending order of a start time of a search space associated or determining a PDCCH monitoring occasion. A cardinality of the set of PDCCH monitoring occasions may be defined as a total number M of the one or more monitoring occasions. A value of a counter DAI field in one or more DCI formats may represent an accumulative number of {serving cell, PDCCH monitoring occasion}-pair(s) where PDSCH reception or SPS PDSCH release associated with the one or more DCI formats up to a current PDCCH monitoring occasion. A counter DAI value may be updated for each PDCCH monitoring occasion to indicate accumulative number of PDSCH receptions and/or SPS PDSCH release up to the each PDCCH monitoring occasion. When a wireless device may support more than a PDSCH reception per each PDCCH monitoring occasion (e.g., PDSCH-Number-perMOperCell is larger than 1), the wireless device may order one or more PDSCH reception starting time for a same {serving cell, PDCCH monitoring occasion} pair. The wireless device may then order PDCCH monitoring occasion or PDSCH receptions based on a serving cell index. The wireless device may then order PDCCH monitoring occasion index (based on a starting time of PDCCH monitoring occasion). When a wireless device is provided with ACKNACKFeedbackMode=JointFeedback, a first coreset pool index may be ordered first than a second coreset pool index for a same serving cell.

In an example, a value of a total DAI may denote/represent a total number of {serving, PDCCH monitoring occasion}-pair(s) up to a current PDCCH monitoring occasion across one or more serving cells.

In an example, a base station may transmit one or more RRC messages comprising/indicating configuration parameters. The configuration parameters may indicate/comprise a HARQ feedback mode/type/mechanism between Type-1 HARQ-ACK codebook determination (e.g., semi-static HARQ-ACK codebook generation type/mode/mechanism) and Type-2 HARQ-ACK codebook determination (e.g., dynamic HARQ-ACK codebook generation type/mode/mechanism). The configuration parameter may indicate/comprise the HARQ feedback mode/type/mechanism as a Type-3 HARQ-ACK codebook determination that is an advanced dynamic HARQ-ACK codebook generation type/mode/mechanism. The configuration parameters may indicate/comprise one or more time domain resource allocation entries that may be referred via one or more scheduling DCIs indicating downlink resources for PDSCH(s) and/or SPS PDSCH release(s). An entry of the one or more time domain resource allocation entries may include/comprise a scheduling offset (e.g., k0) between an ending time of a scheduling DCI and a start time of a corresponding PDSCH. The entry may comprise a number of repetitions for one or more PDSCHs scheduled by the scheduling DCI. The entry may comprise a starting OFDM symbol in a scheduled slot. The entry may also comprise a length of a PDSCH of the one or more PDSCHs.

For example, the wireless device may determine HARQ-ACK information for a corresponding PDSCH or SPS PDSCH release in a HARQ-ACK codebook that the wireless device may transmits in a slot n based on one or more PDSCH-to-HARQ feedback timing indicator field. For example, the wireless device may report NACK values for HARQ-ACK information bit(s) in a HARQ-ACK codebook that the wireless device transmits in the slot n that are not indicated by a value of a PDSCH-to-HARQ feedback timing indicator field in a corresponding DCI. The wireless device may determine one or more HARQ-ACK information bit(s) based on one or more monitoring occasions and one or more values of scheduling offset. For example, a scheduling offset may represent a gap between a DCI to a corresponding PDSCH scheduled by the DCI. FIG. 24 illustrates an example embodiment. The wireless device may be configured with a first cell (Cell 0) and a second cell (Cell 1). The wireless device may have two monitoring occasions via the first cell that may map to a PUCCH resource (e.g., HARQ). The wireless device may have three monitoring occasions via the second cell that may map to the PUCCH resource. For example, if a wireless device may expect to receive at most one PDSCH scheduled via a monitoring occasion, the wireless device may determine one HARQ-ACK information bit for a corresponding DCI.

A slot format may comprise downlink symbols, uplink symbols, and/or flexible symbols. For a serving cell, a wireless device may receive one or more RRC/SIB configuration message comprising configuration parameters. For example, the configuration parameters may comprise TDD-UL-DL-ConfigCommon that indicate a slot format of each slot. The TDD-UL-DL-ConfigCommon may be broadcasted via a SIB such that a common information may be available to multiple wireless devices. The configuration parameters may comprise a reference subcarrier spacing (SCS) $\mu_{ref}$; and one or more UL-DL patterns.

For example, the one or more UL-DL patterns may comprise a first pattern. The one or more UL-DL patterns may additionally comprise a second pattern. The first pattern may comprise at least one of: a slot configuration period of P msec; a number of slots $d_{slots}$ with only downlink symbols; a number of downlink symbols $d_{sym}$; a number of slots $u_{slots}$ with only uplink symbols; a number of uplink symbols $u_{sym}$. The slot configuration period of P msec may comprise $S=P \cdot 2^{\mu_{ref}}$ slots with SCS configuration $\mu_{ref}$. From the S slots, a first $d_{slots}$ slots may comprise one or more downlink symbols and a last $u_{slots}$ slots may comprise one or more uplink symbols. A $d_{sym}$ symbols after the first $d_{slots}$ slots may comprise one or more downlink symbols. A $u_{sym}$ symbols before the last $u_{slots}$ slots may comprise one or more uplink symbols. A remaining $(S-d_{slots}-u_{slots}) \cdot N_{symb}^{slot} - d_{sym} - u_{sym}$ symbols may comprise one or more flexible symbols. The second pattern may be configured. The wireless device may set the slot format of each slot of a first number of slots as indicated by the first pattern, and may set the slot format of each slot of a second number of slots as indicated by the second pattern.

A wireless device may receive one or more second RRC configuration messages (e.g., TDD-UL-DL-ConfigDedicated) comprising one or more parameters that may override one or more flexible symbols of each slot of a number of slots configured by the TDD-UL-DL-ConfigCommon message. For example, the TDD-DL-UL-ConfigDedicated may comprise at least one of: one or more slot configurations; and/or for each slot configuration of the one or more slot configurations: a slot index for a slot (slotIndex); one or more symbols of a slot (symbols) which indicates a first number of zero or more downlink first symbols in the slot, and a second number of zero or more uplink last symbols in the slot, and a remaining number of zero or more flexible symbols in the slot. The wireless device may determine a slot format for each slot with a corresponding slot index of the slot (slotIndex) based on a format indicated by the one or more symbols of the slot (symbols).

A wireless device may not expect a dedicated RRC configuration message to indicate as uplink or as downlink a symbol that a common RRC configuration message indicates as a downlink or as an uplink symbol, respectively. For each slot configuration of one or more slot configurations indicated by the dedicated RRC configuration message, a reference SCS is the reference SCS indicated by the common RRC configuration message. A slot configuration period and a number of downlink/uplink/flexible symbols in each slot of the one or more slot configuration period may be determined from the common/dedicated RRC configuration messages, and may be common to each one of one or more configured BWPs.

A wireless device may receive a common RRC configuration message and/or a dedicated RRC configuration message indicating one or more symbols in a slot as downlink. The wireless device may consider the one or more symbols to be available for reception. The wireless device may receive a common RRC configuration message and/or a dedicated RRC configuration message indicating one or more symbols in a slot as uplink. The wireless device may consider the one or more symbols to be available for transmission.

One or more symbols of a slot may be indicated as flexible symbols by one or more RRC configuration messages (e.g., TDD-UL-DL-ConfigCommon and/or TDD-UL-DL-ConfigDedicated). The wireless device may not receive the one or more RRC configuration messages indicating a slot format configuration. The wireless device may determine each symbol as a flexible unless configured otherwise via the one or more RRC configuration messages. The wireless device may receive downlink control signals, e.g., DCI format 1_0, DCI format 1_1, DCI format 0_1, DCI format 0_0, and/or DCI format 2_3, scheduling downlink/uplink transmissions. The downlink control signal (e.g., DCI format 1_0, DCI format 1_1, and/or DCI format 0_1) or an RRC message (e.g., SIB1) may indicate to the wireless device a reception of one or more downlink channels/signals (e.g., PDSCH, PDCCH, SSB, and/or CSI-RS) in the one or more symbols of the slot. The wireless device may receive the one or more downlink channels/signals in the one or more symbols. The downlink control signal (e.g., DCI format 1_0, DCI format 1_1, DCI format 0_0, DCI format 2_3, and/or DCI format 0_1) may indicate to the wireless device a transmission of one or more uplink channels/signals (e.g., PUSCH, PUCCH, PRACH, and/or SRS) in the one or more symbols of the slot. The wireless device may transmit the one or more uplink channels/signals in the one or more symbols.

A wireless device may be configured by higher layers to receive a PDCCH, PDSCH, and/or CSI-RS in one or more symbols of a slot. The wireless device may receive the PDCCH, PDSCH, and/or CSI-RS, for example, if the wireless device does not detect a DCI (e.g., DCI format 0_0, DCI format 0_1, DCI format 1_0, DCI format 1_1, and/or DCI format 2_3) indicating to the wireless device to transmit a PUSCH, a PUCCH, a PRACH, and/or a SRS in at least one symbol of the one or more symbols of the slot. The wireless device may not receive the PDCCH, PDSCH, and/or CSI-RS, for example, if the wireless device detects the DCI (e.g., DCI format 0_0, DCI format 0_1, DCI format 1_0, DCI format 1_1, and/or DCI format 2_3) indicating to the wireless device to transmit a PUSCH, a PUCCH, a PRACH, and/or a SRS in the at least one symbol of the one or more symbols of the slot.

A wireless device may be configured by higher layers to transmit SRS, PUCCH, PUSCH, and/or PRACH in one or more symbols of a slot. The wireless device may detect a DCI format 1_0, DCI format 1_1, or DCI format 0_1 indicating to the wireless device to receive CSI-RS and/or PDSCH in at least one symbol of the one or more symbols of the slot. The wireless device may not expect to cancel the transmission in the at least one symbol of the one or more symbols that occur, relative to a last symbol of a CORESET where the wireless device detects the DCI format 1_0 or the DCI format 1_1 or the DCI format 0_1, after a number of symbols that is smaller than the PUSCH preparation time, for the corresponding wireless device processing capability. The wireless device may cancel the SRS, PUCCH, PUSCH, and/or PRACH transmission in remaining symbols from the one or more symbols.

For one or more symbols of a slot that are indicated to a wireless device as uplink by one or more RRC configuration messages (common and/or dedicated), the wireless device may not receive PDCCH, PDSCH, or CSI-RS in the one or more symbols of the slot. For the one or more symbols of the slot that are indicated to the wireless device as downlink by the one or more RRC configuration messages (common and/or dedicated), the wireless device may not transmit PUSCH, PUCCH, PRACH, and/or SRS in the one or more symbols of the slot.

For one or more symbols of a slot that are indicated to a wireless device by one or more RRC parameters for reception of SS/PBCH blocks, the wireless device may not transmit PUSCH, PUCCH, and/or PRACH in the slot if a transmission would overlap with at least one symbol from the one or more symbols and the wireless device may not transmit SRS in the one or more symbols of the slot. The wireless device may not expect the one or more symbols of the slot to be indicated as uplink by RRC configuration messages (common/dedicated) when provided to the wireless device.

For one or more symbols of a slot corresponding to a valid PRACH occasion and symbols before the valid PRACH occasion, the wireless device may not receive PDCCH for Type1-PDCCH CSS set, PDSCH, or CSI-RS in the slot if a reception would overlap with at least one symbol from the one or more symbols. The wireless device may not expect the one or more symbols of the slot to be indicated as downlink by RRC configuration messages (common/dedicated).

If a wireless device is scheduled by a DCI format 1_1 to receive PDSCH over a plurality of slots, and if RRC configuration messages indicate that, for a slot in the plurality of slots, at least one symbol from one or more symbols where the wireless device is scheduled PDSCH reception in the slot is an uplink symbol, the wireless device may not receive the PDSCH in the slot.

If a wireless device is scheduled by a DCI format 0_1 to transmit PUSCH over plurality of slots, and if RRC configuration messages indicates that, for a slot from the plurality of slots, at least one symbol from one or more symbols where the wireless device is scheduled PUSCH transmission in the slot is a downlink symbol, the wireless device may not transmit the PUSCH in the slot.

A wireless device may be configured by higher layers with a parameter indicating one or more slot formats (SlotFormatIndicator). In an example, a DCI format (e.g., DCI format 2_0) may be used for notifying the one or more slot formats. The DCI format may comprise CRC bits scrambled by a first radio network temporary identifier (e.g., SFI-RNTI). The first radio network temporary identifier may be configured by higher layers, or may be predefined, or a fixed value. A size of the DCI format may be configured by higher layers, e.g., up to 128 bits. The DCI format may comprise at least one information of one or more slot format indicators (SFIs). The wireless device may be configured to monitor a group-common-PDCCH for the one or more slot format indicators for each one of one or more serving cells configured by the parameters indicating the one or more slot formats. For each serving cell, the wireless device may be provided at least one of: an identity of the serving cell; a location of an SFI-index field in the DCI format; and/or a set of slot format combinations comprising one or more slot format combinations (slotFormatCombinations), where each of the one or more slot format combinations may comprise: one or more slot formats (slotFormats) for the slot format combination; a mapping for the slot format to a corresponding SFI-index field value in the DCI format (slotFormatCombinationId); and/or at least one reference SCS configuration.

A SFI-index field value in a DCI format (e.g., DCI format 2_0) may indicate to a wireless device a slot format for each of one or more slots in a number of slots for each DL BWP and/or each UL BWP starting from a slot where the wireless device detects the DCI format.

For one or more symbols of a slot, a wireless device may not expect to detect a DCI format (e.g., DCI format 2_0) with an SFI-index field value indicating the one or more symbols of the slot as uplink and to detect a DCI format 1_0, a DCI format 1_1, or DCI format 0_1 indicating to the wireless device to receive PDSCH or CSI-RS in the one or more symbols of the slot.

For one or more symbols of a slot, a wireless device may not expect to detect a DCI format (e.g., DCI format 2_0) with an SFI-index field value indicating the one or more symbols in the slot as downlink and to detect a DCI format 0_0, DCI format 0_1, DCI format 1_0, DCI format 1_1, DCI format 2_3, or a RAR UL grant indicating to the wireless device to transmit PUSCH, PUCCH, PRACH, or SRS in the one or more symbols of the slot.

For one or more symbols of a slot that are indicated as downlink/uplink by RRC configuration messages (e.g., TDD-UL-DL-ConfigurationCommon, or TDD-UL-DL-ConfigDedicated), the wireless device may not expect to detect a DCI format (e.g., DCI format 2_0) with an SFI-index field value indicating the one or more symbols of the slot as uplink/downlink, respectively, or as flexible. In an example, a OFDM symbol indicated as a flexible by TDD-UL-DL-ConfigCommon and/or TDD-UL-DL-ConfigDedicated may be indicated as a flexible (e.g., unknown, unavailable) by an SFI-DCI (e.g., a DCI scrambled with SFI-RNTI, a DCI indicating slot formats). In a flexible (unknown, unavailable) OFDM symbol, the wireless device may not transmit or may not receive any signal.

For one or more symbols of a slot indicated to a wireless device by RRC messages (e.g., ssb-PositionsInBurst in SystemInformationBlockType1 or ssb-PositionsInBurst in ServingCellConfigCommon) for reception of SS/PBCH blocks, the wireless device may not expect to detect a DCI format (e.g., DCI format 2_0) with an SFI-index field value indicating the one or more symbols of the slot as uplink.

For one or more symbols of a slot indicated to a wireless device by RRC messages (e.g., prach-ConfigurationIndex in RACH-ConfigCommon) for PRACH transmissions, the wireless device may not expect to detect a DCI format (e.g., DCI format 2_0) with an SFI-index field value indicating the one or more symbols of the slot as downlink.

For one or more symbols of a slot indicated to a wireless device by RRC messages (e.g., pdcch-ConfigSIB1 in MIB) for a CORESET for Type0-PDCCH CSS set, the wireless device may not expect to detect a DCI format (e.g., DCI format 2_0) with an SFI-index field value indicating the one or more symbols of the slot as uplink.

For one or more symbols of a slot indicated to a wireless device as flexible by RRC configuration messages (e.g., TDD-UL-DL-ConfigurationCommon and TDD-UL-DL-ConfigDedicated), or when RRC configuration messages are not provided to the wireless device, the wireless device may detect a DCI format (e.g. DCI format 2_0) providing a format for the slot. If at least one symbol of the one or more symbols is a symbol in a CORESET configured to the wireless device for PDCCH monitoring, the wireless device may receive PDCCH in the CORESET only if an SFI-index field value in the DCI format indicates that the at least one symbol is a downlink symbol. If the SFI-index field value in the DCI format indicates the one or more symbols of the slot as flexible and the wireless device detects a DCI format 1_0, DCI format 1_1, or DCI format 0_1 indicating to the wireless device to receive PDSCH or CSI-RS in the one or more symbols of the slot, the wireless device may receive PDSCH or CSI-RS in the one or more symbols of the slot.

If the SFI-index field value in the DCI format indicates the one or more symbols of the slot as flexible and the wireless device detects a DCI format 0_0, DCI format 0_1, DCI format 1_0, DCI format 1_1, DCI format 2_3, or a RAR UL grant indicating to the wireless device to transmit PUSCH, PUCCH, PRACH, or SRS in the one or more symbols of the slot, the wireless device may transmit the PUSCH, PUCCH, PRACH, or SRS in the one or more symbols of the slot.

If the SFI-index field value in the DCI format indicates the one or more symbols of the slot as flexible, and the wireless device does not detect a DCI format 1_0, DCI format 1_1, or DCI format 0_1 indicating to the wireless device to receive PDSCH or CSI-RS, or the wireless device does not detect a DCI format 0_0, DCI format 0_1, DCI format 1_0, DCI format 1_1, DCI format 2_3, or a RAR UL grant indicating to the wireless device to transmit PUSCH, PUCCH, PRACH, or SRS in the one or more symbols of the slot, the wireless device may not transmit or receive in the one or more symbols of the slot. If the wireless device is configured by higher layers to receive PDSCH or CSI-RS in the one or more symbols of the slot, the wireless device may receive the PDSCH or the CSI-RS in the one or more symbols of the slot only if an SFI-index field value in the DCI format indicates the one or more symbols of the slot as downlink. If the wireless device is configured by higher layers to transmit PUCCH, or PUSCH, or PRACH in the one or more symbols of the slot, the wireless device transmits the PUCCH, or the PUSCH, or the PRACH in the slot only if an SFI-index field value in the DCI format indicates the one or more symbols of the slot as uplink. If the wireless device is configured by higher layers to transmit SRS in the one or more symbols of the slot, the wireless device transmits the SRS only in a subset of symbols from the one or more symbols of the slot indicated as uplink symbols by an SFI-index field value in the DCI format.

A wireless device may not expect to detect an SFI-index field value in the DCI format indicating the one or more symbols of the slot as downlink and also detect a DCI format 0_0, DCI format 0_1, DCI format 1_0, DCI format 1_1, DCI format 2_3, or a RAR UL grant indicating to the wireless device to transmit SRS, PUSCH, PUCCH, or PRACH, in at least one symbol of the one or more symbols of the slot. A wireless device may not expect to detect an SFI-index field value in the DCI format indicating the one or more symbols of the slot as downlink or flexible if the one or more symbols of the slot includes at least one symbol corresponding to any repetition of a PUSCH transmission activated by an UL Type 2 grant PDCCH. A wireless device may not expect to detect an SFI-index field value in the DCI format indicating the one or more symbols of the slot as uplink and also detect a DCI format 1_0 or DCI format 1_1 or DCI format 0_1 indicating to the wireless device to receive PDSCH or CSI-RS in at least one symbol of the one or more symbols of the slot.

If a wireless device is configured by higher layers to receive a CSI-RS or a PDSCH in one or more symbols of a slot and the wireless device detects a DCI format (e.g., DCI format 2_0) with a slot format value that indicates a slot format with a subset of symbols from the one or more symbols as uplink or flexible, or the wireless device detects a DCI format 0_0, DCI format 0_1, DCI format 1_0, DCI format 1_1, or DCI format 2_3 indicating to the wireless device to transmit PUSCH, PUCCH, SRS, or PRACH in at least one symbol in the one or more symbols, the wireless device cancels the CSI-RS reception in the one or more symbols of the slot or cancels the PDSCH reception in the slot.

A wireless device may be configured by higher layers to transmit SRS, or PUCCH, or PUSCH, or PRACH in one or more symbols of a slot and the wireless device may detect a DCI format (e.g., DCI format 2_0) with a slot format value that indicates a slot format with a subset of symbols from the one or more symbols as downlink or flexible, or the wireless device may detect a DCI format 1_0, DCI format 1_1, or DCI format 0_1 indicating to the wireless device to receive CSI-RS or PDSCH in a subset of symbols from the one or more symbols. The wireless device may not expect to cancel the transmission in symbols from the subset of symbols that occur, relative to a last symbol of a CORESET where the wireless device detects the DCI format 2_0 or the DCI format 1_0 or the DCI format 1_1 or the DCI format 0_1, after a number of symbols that is smaller than the PUSCH preparation time for the corresponding PUSCH processing capability. The wireless device may cancel the PUCCH, or PUSCH, or PRACH transmission in remaining symbols from the one or more symbols and may cancel the SRS transmission in remaining symbols from the subset of symbols.

A wireless device may assume that flexible symbols in a CORESET configured to the wireless device for PDCCH monitoring are downlink symbols if the wireless device does not detect an SFI-index field value in a DCI format (e.g., DCI format 2_0) indicating one or more symbols of a slot as flexible or uplink and the wireless device does not detect a DCI format 0_0, DCI format 0_1, DCI format 1_0, DCI format 1_1, or DCI format 2_3 indicating to the wireless device to transmit SRS, PUSCH, PUCCH, or PRACH in the one or more symbols.

For one or more symbols of a slot that are indicated as flexible by RRC configuration messages (e.g. TDD-UL-DL-ConfigurationCommon, and TDD-UL-DL-ConfigDedicated), or when RRC configuration messages are not provided to a wireless device, the wireless device may not detect a DCI format (e.g., DCI format 2_0) providing a slot format for the slot. The wireless device may receive PDSCH or CSI-RS in the one or more symbols of the slot if the wireless device receives a corresponding indication by a DCI format 1_0, DCI format 1_1, or DCI format 0_1. The wireless device may transmit PUSCH, PUCCH, PRACH, or SRS in the one or more symbols of the slot if the wireless device receives a corresponding indication by a DCI format 0_0, DCI format 0_1, DCI format 1_0, DCI format 1_1, or DCI format 2_3. The wireless device may receive PDCCH. If the wireless device is configured by higher layers to receive PDSCH or CSI-RS in the one or more symbols of the slot, the wireless device may not receive the PDSCH or the CSI-RS in the one or more symbols of the slot. If the wireless device is configured by higher layers to transmit SRS, or PUCCH, or PUSCH, or PRACH in the one or more symbols of the slot, the wireless device may not transmit the PUCCH, or the PUSCH, or the PRACH in the slot and may not transmit the SRS in symbols from the one or more symbols in the slot, if any, starting from a symbol that is a number of symbols equal to the PUSCH preparation time for the corresponding PUSCH timing capability after a last symbol of a CORESET where the wireless device is configured to monitor PDCCH for DCI format 2_0. The wireless device may not expect to cancel the transmission of the SRS, or the PUCCH, or the PUSCH, or the PRACH in symbols from the one or more symbols in the slot, if any, starting before a symbol that is a number of symbols equal to the PUSCH preparation time for the corresponding PUSCH timing capability after a last symbol of a CORESET where the wireless device is configured to monitor PDCCH for DCI format 2_0.

For unpaired spectrum operation for a wireless device on a cell in a frequency band of FR1, and when the scheduling restrictions due to RRM measurements are not applicable, if the wireless device detects a DCI format 0_0, DCI format 0_1, DCI format 1_0, DCI format 1_1, or DCI format 2_3 indicating to the wireless device to transmit in one or more symbols, the wireless device may not be required to perform RRM measurements based on a SS/PBCH block or CSI-RS reception on a different cell in the frequency band if the SS/PBCH block or CSI-RS reception includes at least one symbol from the set of symbols.

FIG. 23 illustrates an example diagram of a slot format with a PUSCH repetition as per an aspect of an example embodiment of the present disclosure. For example, one or more RRC parameters (e.g., TDD-UL-DL-ConfigCommon and/or TDD-UL-DL-ConfigDedicated, or TDD DL-UL Config) may indicate a slot n is a downlink slot, a slot n+1 is a downlink slot, a slot n+2 is a downlink slot, and slot n+3 to slot n+5 are flexible slots.

Before slot n+1, the wireless device may receive a SFI-DCI indicating one or more slot formats for slot n+1 to n+5. The SFI-DCI may indicate that slot n+3 is an uplink slot, n+4 is an unavailable/flexible slot and n+5 is an uplink slot. For example, the SFI-DCI may indicate that [D D U F U] where each bit corresponds to each slot of five slots. For example, D may represent a downlink slot. U may represent an uplink slot. F may represent a flexible/unavailable slot.

The wireless device may receive a DCI at a slot n+1 indicating a Type A PUSCH repetition with K=3. The wireless device may drop a second PUSCH that overlaps with a flexible/unavailable slot. The wireless device may not expect that a DCI indicating a PUSCH repetition that any PUSCH of the PUSCH repetition may overlap with a downlink and/or flexible OFDM symbols. The wireless device may drop a PUSCH of the PUSCH repetition when the PUSCH overlaps with a downlink OFDM symbol or an unknown OFDM symbol.

In the specification, a flexible OFDM symbol may refer a OFDM symbol indicated as flexible by one or more RRC messages (e.g., TDD-UL-DL-ConfigCommon, TDD-UL-DL-ConfigDedicated). An unknown OFDM symbol may refer a OFDM symbol indicated as flexible by the one or more RRC messages and may be indicated as flexible by a SFI-DCI.

In an example, a wireless device may be scheduled with an uplink signal repetition, where the wireless device may transmit a plurality of uplink signal repetitions (e.g., uplink signal of a PUSCH, uplink signal of a PUCCH) over a plurality of uplink resources. A nominal uplink signal repetition may refer a uplink resource determined based on a scheduling DCI (e.g., uplink grant) scheduling the uplink signal repetitions based on a TypeB repetition (e.g., a TypeB PUSCH mapping, TypeB PUCCH mapping). Based on a TypeA repetition (e.g., a TypeA PUSCH mapping, a TypeA PUCCH mapping), an uplink resource of the plurality of uplink resources may be a slot.

The wireless device may be enabled with a DM-RS bundling over the plurality of uplink signal repetitions. When the DM-RS bundling is enabled, the wireless device may use a same DM-RS sequence over one or more uplink signal repetitions of the plurality of uplink signal repetitions in a DM-RS bundle. For example, the wireless device may be configured with or indicated with a number of repetitions used for the DM-RS bundling (e.g., M). The wireless device may determine M numbers of uplink signal repetitions of the plurality of uplink signal repetitions as the one or more uplink signal repetition the DM-RS bundle. The plurality of uplink signal repetitions may have one or more DM-RS bundles.

In each DM-RS bundle, the wireless device may have one or more uplink signal repetitions. For example, when the M is 1, the wireless device may have a single uplink signal repetition. When M>1, the wireless device may have a second plurality of uplink signal repetitions in a DM-RS bundle.

In the specification, a DM-RS bundle may refer the one or more uplink signal repetitions in the DM-RS bundle. For each DM-RS bundle, the wireless device may determine a single DM-RS sequence, where the wireless device may use the single DM-RS sequence over the one or more uplink signal repetitions. For each DM-RS bundle, the wireless device may determine a single transmission power, where the wireless device may use the single transmission power over the one or more uplink signal repetitions. For each DM-RS bundle, the wireless device may determine a single transmission configuration indicator (TCI) state or a single spatial domain filter parameter, where the wireless device may use the single TCI state or the single spatial domain filter parameter over the one or more uplink signal repetitions.

In an example, the wireless device may receive a DCI, MAC-CE or RRC to change a TCI state (e.g., a common beam update DCI, a BWP switching, and/or the like) for uplink transmission of a cell after a first uplink signal of the one or more uplink signal repetitions of the cell and before a last uplink signal of the one or more uplink signal repetitions. The wireless device may apply a new TCI state after completing the DM-RS bundle. The wireless device may maintain a same TCI state or a same spatial domain filter parameter during a DM-RS bundle.

The wireless device may support a TCI state having two reference signals where each reference signal may correspond to a TRP or a panel. The wireless device may support simultaneous reception from both TRPs or support simultaneous transmissions to both TRPs. For each TRP/panel, a single TCI state or a single spatial domain filter parameter may be maintained during a DM-RS bundle.

In an example, a wireless device may transmit one or more PUSCHs, of a plurality of PUSCHs, based on a same DM-RS sequence. This may be referred as a DM-RS bundling. For example, the plurality of PUSCHs may comprise one or more first PUSCHs based on a first DM-RS sequence. The plurality of PUSCHs may comprise one or more second PUSCHs based on a second DM-RS sequence. The wireless device may use the first DM-RS sequence over the one or more first PUSCHs. A base station may aggregate one or more DM-RSs of the one or more first PUSCHs, based on the first DM-RS sequence, before performing a channel estimation. Based on the first DM-RS sequence, the wireless device may transmit the one or more DM-RSs. The base station may aggregate signals of the one or more DM-RSs based on a same DM-RS sequence (e.g., the first DM-RS sequence) for a channel estimation. The base station may receive the one or more first PUSCHs based on the channel estimation.

Similarly, the wireless device may use the second DM-RS sequence over the one or more second PUSCHs. The base station may aggregate one or more second DM-RSs of the one or more second PUSCHs, based on the second DM-RS sequence, before performing a second channel estimation. The base station may receive the one or more second PUSCHs based on the second channel estimation.

In an example, one or more PUSCHs based on a same DM-RS sequence may be called as one or more bundled PUSCHs. One or more DM-RSs of the one or more PUSCHs may be called as one or more bundled DM-RSs. In an example, a wireless device may use/configure a same transmission power across the one or more DM-RSs and/or across the one or more PUSCHs. The wireless device may not switch from uplink transmission to downlink reception during a time interval of the one or more PUSCHs. When the wireless device may switch between uplink transmission and downlink reception, the one or more PUSCHs may not result in power continuity. With discontinuity of transmission power across transmission(s) of the one or more PUSCHs may lead distortion that may lead performance degradation in channel estimation based on a DM-RS bundling.

In an example, a wireless device may receive a DCI indicating a repetition of one or more PUSCHs. The one or more PUSCHs may carry a transport block. The DCI may indicate resource(s) for the one or more PUSCHs based on a TypeA repetition (e.g., slot aggregation). The DCI may indicate an offset between the DCI and a starting PUSCH of the one or more PUSCHs and may indicate a repetition number K. A wireless device may determine a starting slot of the one or more slots based on the offset and the starting PUSCH. For example, when the wireless device receives the DCI at a slot n with the offset=M, the wireless device may determine the starting slot as a slot with index n+M. In existing technologies, the wireless device may determine the one or more slots based on the starting slot and the repetition number K. For example, the one or more slots may comprise slot n+M, n+M+1, . . . , n+M+K−1.

In an example, a TypeA repetition (e.g., a TypeA PUSCH mapping type, a TypeA PUCCH mapping type) may determine a same set of OFDM symbols in a slot of a plurality of slots where a repetition occurs. The wireless device may determine the same set of OFDM symbols based on a resource assignment of an uplink grant scheduling the repetition. The wireless device may determine the same set of OFDM symbols based on a configured grant configuration.

In an example, the DCI may comprise a starting OFDM symbol and a duration for a resource allocation in a slot. The wireless device may determine/apply the starting OFDM symbol and the duration for each slot of the one or more slots. The wireless device may determine a PUSCH resource in the each slot based on the starting OFDM symbol and the duration. For example, the starting OFDM symbol may be 3rd OFDM symbol and the duration may be 9. In each slot of the one or more slots, the wireless device may determine a PUSCH resource, in a time domain, between 3rd OFDM symbol and 12th OFDM symbol. The DCI may indicate frequency domain resource. The wireless device may determine the PUSCH resource in the each slot based on the frequency domain resource. For example, a same frequency domain resource may be used in the each slot. For example, the wireless device may determine a frequency domain resource of a PUSCH resource in a slot based on a hopping pattern and the frequency domain resource indicated by the DCI.

A first uplink channel (e.g., PUSCH) may overlap with a second uplink channel (e.g., PUCCH) in this specification may imply that a time resource of the first uplink channel overlaps with a time resource of the second uplink channel. A frequency resource of the first uplink channel may not overlap with a frequency resource of the second uplink channel. 'Overlap' in the specification may refer 'overlap in time domain or overlap in time' unless otherwise noted.

In an example, a PUCCH repetition may refer one or more PUCCHs carrying one or more repetitions of a UCI. The UCI may comprise at least one of a HARQ-ACK feedback, a SR, and CSI feedback. A PUSCH repetition may refer one or more PUSCHs carrying one or more repetitions of a transport block. The PUCCH repetition may comprise the one or more PUCCHs. The PUSCH repetition may comprise the one or more PUSCHs.

A repetition number K of an uplink channel repetition (e.g., a PUCCH repetition or a PUSCH repetition) may indicate K numbers of a plurality of the uplink channels. The plurality of uplink channels may comprise/carry K numbers of repetitions of a UCI (if the PUCCH repetition) or a transport block (if the PUSCH repetition).

In existing technologies, a wireless device may be scheduled with a plurality of PUSCHs that may overlap with a PUCCH transmission in a slot. The wireless device may determine an earliest PUSCH of the plurality of PUSCHs and may multiplex an UCI of the PUCCH via the earliest PUSCH. For example, the plurality of PUSCHs may belong to a DM-RS bundle of a PUSCH repetition. A first transmission power of the earliest PUSCH may be determined differently from a second transmission power of a second PUSCH of the plurality of PUSCHs. For example, the wireless device may determine a transmission power of a PUSCH based on a number of resource blocks, a beta_offset of UCI multiplexing, and/or pathloss. As the earliest PUSCH may comprise the UCI and the second PUSCH may not comprise the UCI, the first transmission power may be different from the second transmission power.

The first transmission power being different from the second transmission power may lead a phase discontinuity across the earliest PUSCH and the second PUSCH in the DM-RS bundle. This may degrade the performance at the base station with the phase discontinuity/power discontinuity. Enhancements to maintain a transmission power constant across one or more PUSCHs of a DM-RS bundle are needed.

In an example, a wireless device may determine a PUSCH overlapping with a PUCCH. The wireless device may multiplex a UCI of the PUCCH via the PUSCH. When a PUSCH belongs to a DM-RS bundle, the wireless device may multiplex the UCI via one or more PUSCHs of the DM-RS bundle. In an example, when the wireless device may have a second PUSCH of the DM-RS bundle, and a processing time for the second PUSCH may not satisfy the wireless device's capability, the wireless device may not multiplex the UCI via the PUSCH or the one or more PUSCHs of the DM-RS bundle. The wireless device may determine to drop the one or more PUSCHs of the DM-RS bundle or the PUCCH based on one or more rules. For example, the one or more rules may be a rule based on a first priority of the one or more PUSCHs and a second priority of the PUCCH. For example, the one or more rules may be a rule that the one or more PUSCHs may be prioritized over other uplink signal(s).

In an example, a wireless device may multiplex a UCI of a PUCCH via a PUSCH of a DM-RS bundle, when the PUCCH overlaps with the PUSCH. The wireless device may determine a transmission power based on the PUSCH. The wireless device may use the transmission power for one or more PUSCHs of the DM-RS bundle. The wireless device may use a largest transmission power of one or more transmission powers of the one or more PUSCHs, where each of the one or more transmission powers may correspond to each of the one or more PUSCHs.

Embodiments may allow constant power across one or more PUSCHs of a DM-RS bundle, and thus maintain a phase continuity across the DM-RS bundle. Embodiments may enhance a reliability and performance of a uplink signal repetition.

In existing technologies, a wireless device may be scheduled with a plurality of PUCCHs of a PUCCH repetition. The wireless device may be scheduled with one or more PUSCHs that overlap with the plurality of PUCCHs in time. The wireless device may not multiplex a UCI of the plurality of PUCCHs via the one or more PUSCHs in response to a number of repetition of the plurality of PUCCHs being larger than one. The wireless device may drop the one or more PUSCHs. The wireless device may transmit the plurality of the PUCCHs. This may degrade performance as the wireless device drop the one or more PUSCHs. For example, when the wireless device may need a PUCCH repetition to enhance a coverage, a repetition may be required for a PUSCH transmission of a transport block. Based on an implementation of existing technologies, a base station may need to schedule either a PUCCH repetition or a PUSCH repetition at a time duration. This may limit a scheduling flexibility and may increase a latency to schedule a PUSCH repetition. For example, the base station may need to wait until a PUCCH repetition finishes before the base station schedules a PUSCH repetition. This may not support quality of service requirements of a PUSCH transmission.

In existing technologies, a PUCCH repetition may be transmitted via a plurality of TRPs and/or panels. The wireless device may drop the one or more PUSCHs, scheduled via the plurality of TRPs/panels. When a first TRP of the plurality of TRPs may not be equipped with a zero-latency (e.g., ideal) backhaul to/from a second TRP of the plurality of TRPs, this may lead to drop a PUSCH, associated with the first TRP, of the one or more PUSCHs due to a PUCCH, associated with the second TRP, of the plurality of PUCCHs. Based on a latency between the first TRP and the second TRP, the first TRP may not know the dropping of the PUSCH until the latency laps. This may delay scheduling a retransmission of a transport block scheduled via the PUSCH. This may degrade the performance.

In an example, a wireless device may determine to multiplex a UCI of a plurality of PUCCHs of a PUCCH repetition via one or more PUSCHs based on one or more rules. For example, the one or more rules may comprise a first PUSCH of the one or more PUSCHs overlaps with a first PUSCH of the plurality of PUCCHs. The first PUSCH may be an earliest PUSCH of the one or more PUSCHs. The first PUCCH may be an earliest PUCCH, of the plurality of PUCCHs, that overlaps with the one or more PUSCHs. The wireless device may transmit the one or more PUSCHs, where each PUSCH of the one or more PUSCHs multiplexes the UCI of the plurality of the PUCCHs. The one or more PUSCHs may be scheduled via an uplink grant or via a configured grant. The one or more PUSCHs may carry a repetition of a transport block. Example embodiments may allow to piggyback/multiple a repetition of a UCI via a repetition of a PUSCH repetition. Example embodiments enhance a reliability of the UCI transmission by multiplexing via a PUSCH repetition. Example embodiments enhance scheduling flexibility and reduce latency of PUSCH scheduling. Example embodiments may allow higher throughput and better quality of service.

In an example, a wireless device may be scheduled with a plurality of PUCCHs comprising a first PUCCH and a second PUCCH. The first PUCCH may be associated with a first TRP. The second PUCCH may be associated with the second TRP. The wireless device may determine one or more first PUSCHs for multiplexing a first UCI of the first PUCCH. The wireless device may determine one or more second PUSCHs for multiplexing a second UCI of the second PUCCH. The one or more first PUSCHs may overlap with the first PUCCH in time. The one or more first PUSCHs may be associated with the first TRP. The one or more second PUSCHs may overlap with the second PUCCH in time. The one or more second PUSCHs may be associated with the second TRP. The wireless device may multiple the first UCI and the second UCI independently. Example embodiments may support non-ideal backhaul between TRPs and may ensure transmission of a UCI via a TRP.

In an example, a wireless device may be scheduled with a plurality of PUCCHs. The plurality of PUSCHs may be scheduled/transmitted via a plurality of TRPs. The wireless device may determine a plurality of PUSCHs that are associated with the plurality of TRPs and at least one of the plurality of PUSCHs, where the at least one PUSCH overlaps with the plurality of PUCCHs (e.g., overlap in time with a first PUCCH of the plurality of PUCCHs, wherein the first PUCCH is an earliest PUCCH of the plurality of PUCCHs, which overlaps with the at least one PUSCH). In response to the determining the plurality of PUSCHs, the wireless device may multiplex a UCI of the plurality of PUCCHs via the plurality of PUSCHs. Each of the plurality of PUCCHs may comprise a repletion of the UCI of the plurality of PUCCHs. The wireless device may transmit the plurality of PUSCHs. The wireless device may drop the plurality of PUCCHs. Example embodiments may improve performance by keeping a spatial diversity across the plurality of TRPs for a UCI repetition. Example embodiments may improve scheduling flexibility and reduce latency of a data transmission.

Figure 25:
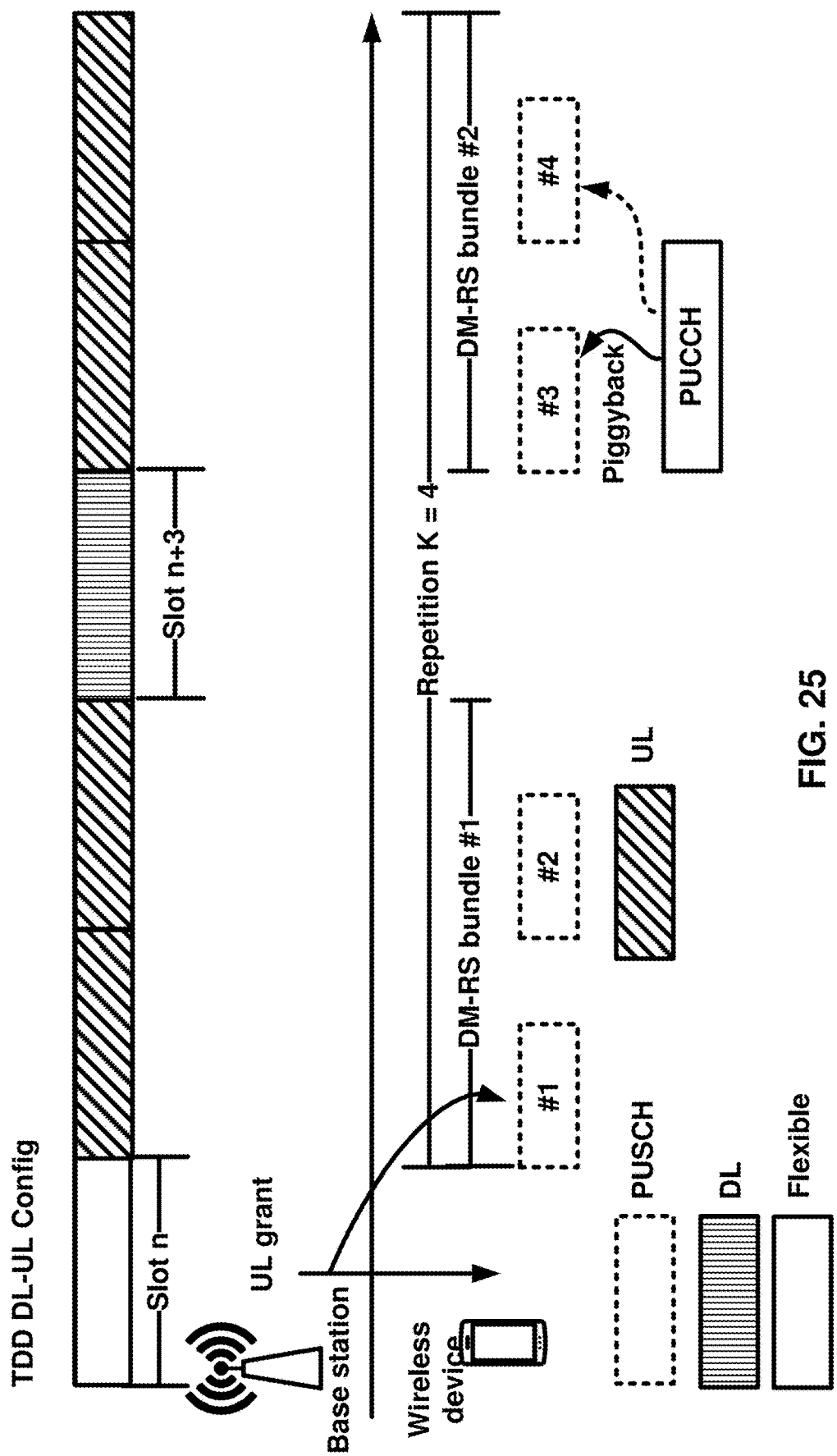
FIG. 25 illustrates an example diagram of a TypeB repetition as per an aspect of an example embodiment of the present disclosure.

FIG. 25 illustrates an example diagram as per an aspect of an example embodiment of the present disclosure. The wireless device may receive one or more RRC configuration parameters for indicating resource type of one or more slots/OFDM symbols (e.g., TDD-UL-DL-ConfigCommon, TDD-UL-DL-ConfigDedicated, TDD DL-UL Config). The wireless device may receive an SFI-DCI indicating (dynamically) resource type(s) for OFDM symbols of one or more slots. The SFI-DCI may indicate a downlink for a downlink OFDM symbol configured via the one or more RRC configuration parameters. The SFI-DCI may indicate an uplink for an uplink OFDM symbol configured via the one or more RRC configuration parameters. The SFI-DCI may indicate a downlink, an uplink or a flexible (or unknown) for a flexible OFDM symbol configured via the one or more RRC configuration parameters.

In FIG. 25, the one or more RRC messages indicate flexible slot for slot n. The one or more RRC messages may indicate uplink slots for the slot n+1/n+2 and downlink slot for slot n+3, uplink slot for slot n+4 and unknown slot for slot n+5.

An uplink grant (DCI) may schedule a PUSCH repetition (e.g., a plurality of PUSCHs), based on a TypeA repetition mechanism. For example, the DCI may indicate a repetition number K=4. For example, the wireless device may determine/apply a DM-RS bundle with a DM-RS bundle size M=2. Within 4 PUSCH repetitions, the wireless device may determine two DM-RS bundles (e.g., a first DM-RS bundle and a second DM-RS bundle, DM-RS bundle #1 and DM-RS bundle #2).

The wireless device may determine a duration of a DM-RS bundle based on one or more consecutive slots from a starting slot with a duration of the DM-RS bundle size. In FIG. 25, the uplink grant may indicate a scheduling offset of 1 (e.g., next slot to start a PUSCH repetition). The wireless device determines the first DM-RS bundle comprising a first PUSCH (#1) and a second PUSCH (#2) via the slot n+1 and the slot n+2. The wireless device may determine a second DM-RS bundle comprising a third PUSCH (#3) and a fourth PUSCH (#4) via the slot n+4 and the slot n+5.

Between the first DM-RS bundle and the second DM-RS bundle, the wireless device may skip one or more second slots. The one or more slots are consecutive slots, where each slot of the one or more slots may comprise a downlink OFDM symbol that overlaps, in time, with a PUSCH resource of the PUSCH repetition. The wireless device may determine the PUSCH resource assuming the wireless device may transmit the PUSCH in the each slot based on a resource assignment of the uplink grant. FIG. 25 shows that slot n+3 is skipped as a gap between the first DM-RS bundle and the second DM-RS bundle.

In the slot n+4, the wireless device may be scheduled with a PUCCH that overlaps with a third PUSCH (#3) of the PUSCH repetition (e.g., the plurality of PUSCHs). The third PUSCH is a part of the second DM-RS bundle. The wireless device may determine whether one or more PUSCHs (e.g., the third PUSCH and a fourth PUSCH in FIG. 25) are able to multiplex or piggyback a UCI of the PUCCH based on a processing capability of the wireless device. For example, the wireless device may determine a delay between a last PDSCH, where the UCI comprises a HARQ-ACK feedback corresponding to the last PDSCH, and the third PUSCH or the fourth PUSCH. In response to the delay being larger than a value, determined based on the capability of the wireless device, the wireless device may determine that the second DM-RS bundle may support multiplexing of the UCI of the PUCCH. In response to determining that the second DM-RS bundle supports the multiplexing, the wireless device may multiplex/piggyback the UCI of the PUCCH via the third PUSCH and the fourth PUSCH.

The wireless device may determine a DM-RS bundle overlaps with a PUCCH. The wireless device may determine the DM-RS bundle overlaps with the PUCCH in response to at least one PUSCH of the DM-RS bundle overlapping with the PUCCH. The wireless device may determine each of one or more PUSCHs of the DM-RS bundle satisfies a processing capability of the wireless device for multiplexing a UCI of the PUCCH. In response to the one or more PUSCHs satisfying the capability of the wireless device, the wireless device may multiplex the UCI of the PUCCH via the one or more PUSCHs. When at least one PUSCH of the one or more PUSCHs may not satisfy the capability of the wireless device, the wireless device may determine whether to drop one or more second PUSCHs or the PUCCH. For example, the one or more second PUSCHs of the one or more PUSCHs may overlap with PUCCH.

The wireless device may determine to drop the one or more second PUSCHs in response to a first priority of the one or more second PUSCHs being lower than a second priority of the PUCCH. The wireless device may determine the first priority based on a logical channel (with a highest priority (value)) of a transport block carried over the one or more PUSCHs. The wireless device may determine the second priority based on a priority value of a PDSCH (or highest priority of one or more PDSCHs) where corresponding HARQ-ACK feedback of the PDSCH (or the one or more PDSCHs) is comprised in the UCI of the PUCCH.

In an example, the wireless device may prioritize the one or more second PUSCHs and drop the PUCCH in response to the PUCCH is not configured/scheduled with a repetition. In response to the PUCCH being scheduled with a repetition (e.g., the PUCCH is one of a plurality of PUCCHs comprising/carrying the UCI), the wireless device may determine which to drop based on the first priority and the second priority.

In an example, the wireless device may prioritize the PUCCH and drop the one or more second PUSCHs.

In an example, a base station may indicate whether to drop the PUCCH or the one or more PUSCHs via DCI, MAC-CE or RRC signaling.

In an example, the wireless device may drop the one or more PUSCHs in response to determining the one or more second PUSCHs.

In an example, a wireless device may multiplex a UCI via one or more PUSCHs of a DM-RS bundle. A first UCI multiplexed in a first PUSCH of the one or more PUSCHs may be same as a second UCI multiplexed in a second PUSCH of the one or more PUSCHs. When the first UCI may be different from the second UCI, the wireless device may drop the first UCI or the second UCI. The wireless device may drop the second UCI in response to the first UCI occurs before the second UCI (e.g., the first UCI was scheduled for the first PUCCH occurring before the second UCI scheduled via the second PUCCH). The wireless device may drop the first UCI in response to a first priority of the first UCI being lower than a second priority of the second UCI.

In an example, a wireless device may multiplex a UCI of the PUCCH via the third PUSCH in FIG. 25. For example, the wireless device may determine a PUSCH in a slot, where the PUSCH overlaps with a PUCCH, for multiplexing a UCI of the overlapping PUCCH.

The wireless device may maintain a constant power across one or more PUSCHs in a DM-RS bundle. The wireless device may have a first PUSCH of the one or more PUSCHs, where the first PUSCH carries/multiplexes/piggybacks the UCI of the PUCCH. The wireless device may have a second PUSCH of the one or more PUSCHs, where the second PUSCH does not multiplex/carry/piggyback the UCI of the PUCCH.

The wireless device may determine a transmission power of the one or more PUSCHs based on an earliest PUSCH. The wireless device may multiplex the UCI via the first PUSCH, while keeping the transmission power of the first PUSCH. The wireless device may not determine a second transmission power for the first PUSCH, based on the UCI multiplexed with the first PUSCH.

In an example, the wireless device may determine the transmission power of the one or more PUSCHs based on a formula as in below. For example, the wireless device may transmit the earliest PUSCH of the one or more PUSCHs via an active UL BWP b of carrier (e.g., a uplink carrier (f=0) or a supplemental uplink carrier (f=1) of a serving cell c. The wireless device may receive one or more RRC messages indicating a power control parameter set configured with index j.

The wireless device may determine the transmission power of the earliest PUSCH $P_{PUSCH,b,f,c}(i, j, q_d, l)$ in a transmission occasion i (e.g., a slot index i, a OFDM symbol index i, a mini-slot index i, a subframe index i) as
$P_{PUSCH,b,f,c}(i, j, q_d, l) = \min\{P_{O\_PUSCH,b,f,c}(j)+ 10 \log_{10}(2^\mu \cdot M_{RB,b,f,c}^{PUSCH}(i))+\alpha_{b,f,c}(j) \cdot PL_{b,f,c}(q_d)+\Delta_{TF,b,f,c}(i)+f_{b,f,c}(i,l)\}$
[dBm].

For example, $P_{CMAX,f,c}(i)$ may be an allowed transmission power for the wireless device (e.g., a maximum output power) for the carrier f of the serving cell c in the PUSCH transmission occasion i. $P_{O\_PUSCH,b,f,c}(j)$ may be a parameter of a sum of $P_{O\_NOMINAL\_PUSCH,f,c}(j)$ and $P_{O\_UE\_PUSCH,b,f,c}(j)$. For example, j belongs to set of $\{0, 1, \ldots, J-1\}$. For example, j=0 when the wireless device may not be configured/provided with P0-PUSCH-AlphaSet or the earliest PUSCH may be scheduled by a RAR UL grant. In such a case, j becomes 0 and $P_{O\_UE\_PUSCH,b,f,c}(0)=0$ and $P_{O\_NOMINAL,PUSCH,f,c}(0)=P_{O\_PRE}+\Delta_{PREAMBLE\_Msg3}$. For example, $P_{O\_PRE}$ may be provided by preambleReceivedTargetPower configured via a SIB message and $\Delta_{PREAMBLE\_Msg3}$ may be configured by msgADeltaPreamble. $\Delta_{MsgA\_PUSCH}=\Delta_{PREAMBLE\_Msg3}$ dB if msgADeltaPreamble is not provided, for the carrier f of the serving cell c.

For example, $\Delta_{TF,b,f,c}(i)=10 \log_{10}((2^{BPRE \cdot K_s}-1) \cdot \beta_{offset}^{PUSCH})$ for $K_s=1.25$ and $\Delta_{TF,b,f,c}(i)=0$ for $K_s=0$ offset where $K_s$ is provided by deltaMCS for each UL BWP b of the carrier f and the serving cell c. For example, for a data transmission and $BPRE=Q_m \cdot R/\beta_{offset}^{PUSCH}$ for a CSI transmission without a data transmission. Buffet $\beta_{offset}^{PUSCH}=1$ when the earliest PUSCH includes data and $\beta_{offset}^{PUSCH}=\beta_{offset}^{CSI,1}$, when the earliest PUSCH includes CSI and does not include data.

A first transmission power of a first PUSCH of the one or more PUSCHs may be same as a second transmission power of a second PUSCH of the one or more PUSCHs when one or more conditions are satisfied. For example, a first UCI carried over the first PUSCH may be same as a second UCI carried over the second PUSCH. For example, the first UCI does not comprise CSI. The first UCI may comprise HARQ-ACK bits. For example, the second UCI does not comprise CSI. The second UCI may comprise HARQ-ACK feedbacks. For example, the first PUSCH and the second PUSCH may comprise the data. For example, the first PUSCH and the second PUSCH may be scheduled via a same set of frequency RBs. For example, the wireless device may not apply/accumulate a transmission power control (TPC) between the first PUSCH and the second PUSCH. The wireless device may apply/accumulate a TPC before an earliest PUSCH of the one or more PUSCHs or after a latest PUSCH of the one or more PUSCHs. The wireless device may apply a same power control parameter set index j for the first PUSCH and the second PUSCH (e.g., a same P0-PUSCH-AlphaSet).

In an example, a wireless device may be scheduled with a type B PUSCH repetition. The type B PUSCH repetition may comprise one or more PUSCHs via one or more slots. At least one of the one or more PUSCHs may overlap with a PUCCH.

Figure 26:
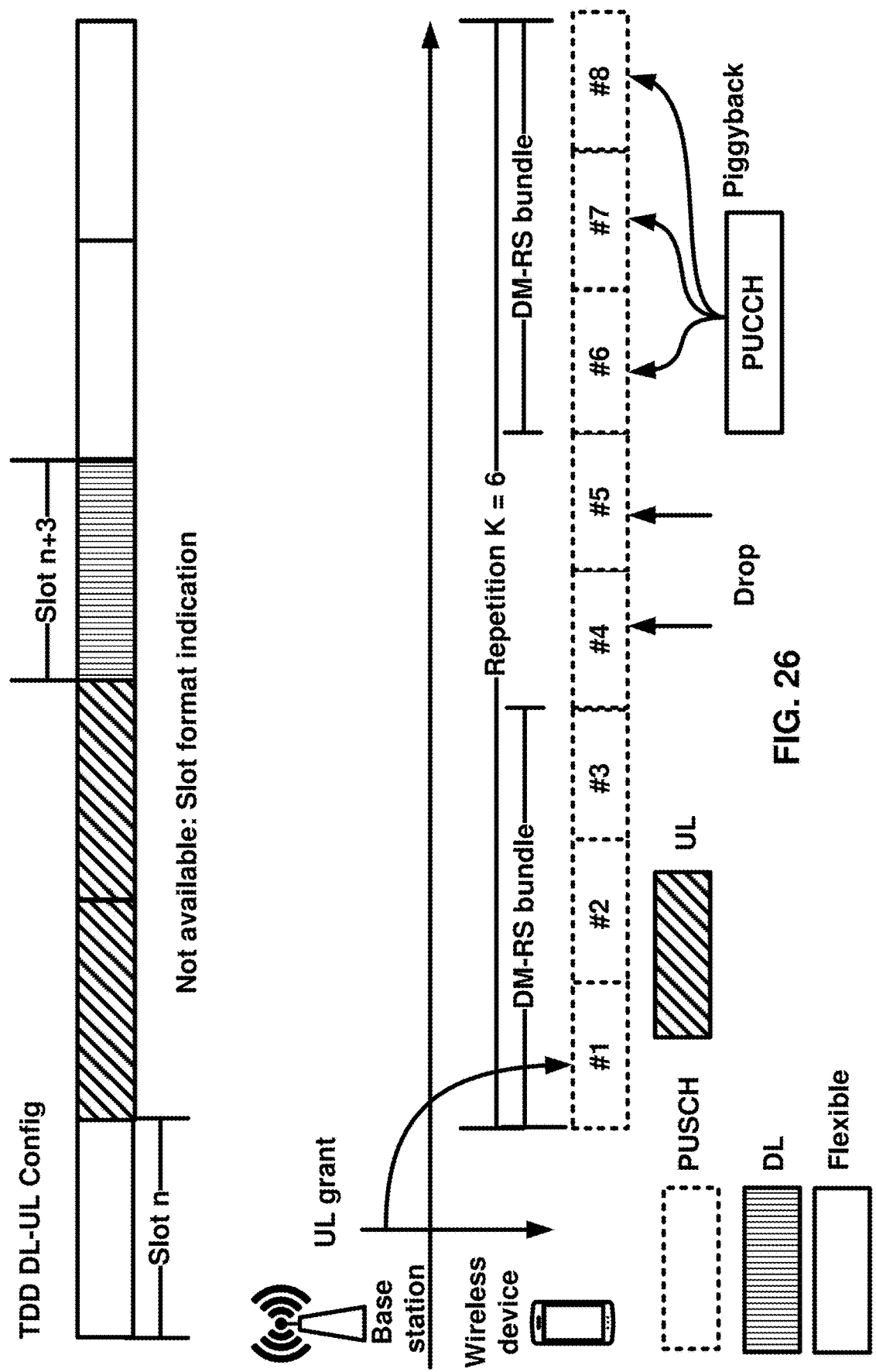
FIG. 26 illustrates an example diagram as per an aspect of an example embodiment of the present disclosure.

FIG. 26 illustrates an example of a type B PUSCH repetition as per an aspect of an example embodiment of the present disclosure. For example, the wireless device may be scheduled with a type B PUSCH repetition with 6 repetition (e.g., a repetition number K=6). The type B PUSCH repetition may be configured with a DM-RS bundling, where a DM-RS bundle size (e.g., M) is 3 (e.g., M=3). The wireless device may determine a first DM-RS bundle that comprises M=3 PUSCHs. The wireless device may skip one or more nominal repetition(s) that overlaps with downlink OFDM symbol(s). In FIG. 26, the wireless device may skip two nominal repetitions that overlap with a downlink slot. The wireless device may determine a second DM-RS bundle that comprises three PUSCHs (e.g., 6th nominal repetition, 7th nominal repetition and 8th nominal repetition).

In an example, the wireless device may skip a nominal repetition where any of one or more DM-RS symbols of the nominal repetition overlaps with downlink symbol(s) or unknown symbol(s). The wireless device may determine the downlink symbol(s) or the unknown symbol(s) based on one or more TDD DL-UL config (e.g., TDD-UL-DL-Config-Common, TDD-UL-DL-ConfigDedicated) and/or a dynamic SFI (e.g., SFI-DCI).

In an example, the wireless device may skip/drop a nominal repetition in response to any of one or more DM-RS symbols of the nominal repetition overlaps with downlink symbol(s) and/or unknown symbol(s). When the wireless device may not be configured with a SFI-DCI (e.g., a SFI indication via DCI mechanism), the wireless device may determine to drop/skip a nominal repetition in response to any of the one or more DM-RS symbols overlaps with downlink symbol(s). In an example, regardless of a SFI-DCI, the wireless device may determine to drop/skip a nominal repetition in response to any of the one or more DM-RS symbols overlaps with downlink symbol(s).

FIG. 26 illustrates that the wireless device is configured with the one or more TDD DL-UL config. The wireless device is also configured with a SFI-DCI. In the example, the wireless device may fail to receive a SFI-DCI indicating slot format(s) of slots between a slot n+1 and a slot n+5.

In response to failing receiving the SFI-DCI, the wireless device may determine an (OFDM) symbol indicated as a downlink by the one or more TDD DL-UL Config as the downlink (e.g., a downlink OFDM symbol). The wireless device may determine a second OFDM symbol indicated as an uplink by the TDD DL-UL config as an uplink symbol. The wireless device may determine a third OFDM symbol indicated as a flexible by the TDD DL-UL Config as an unknown symbol, unless additional signaling may indicate the third symbol otherwise.

The wireless device may not transmit nor receive any uplink/downlink signal(s) in an unknown symbol.

The wireless device may receive additional signaling to indicate a downlink or uplink for a flexible OFDM symbol. For example, additional signaling may be an uplink grant or a downlink scheduling DCI indicating a resource overlapping with the flexible symbol. In response to receiving the uplink grant or the downlink scheduling DCI, the wireless device may determine that the third OFDM symbol is an uplink symbol (based on the uplink grant) or a downlink symbol (based on downlink scheduling DCI).

In an example, the uplink grant may schedule a plurality of PUSCHs or a plurality of PUCCHs. When the uplink grant indicates a plurality of resources, where each maps to each of the plurality of PUSCHs or each of the plurality of PUCCHs, the wireless device may determine any PUSCH of the plurality of PUSCHs or any PUCCH of the plurality of PUCCHs overlaps with the third symbol. Based on the determining, the wireless device may determine the third symbol as the uplink. In an example, the wireless device may determine a first PUSCH (e.g., an earliest PUSCH) of the plurality of PUSCHs or a first PUCCH (e.g., an earliest PUCCH) of the plurality of PUCCHs overlaps with the third symbol. Based on the determining, the wireless device may determine that the third symbol as the uplink.

FIG. 26 illustrates that the wireless device determines any PUSCH of the plurality of PUSCHs overlaps with a flexible OFDM symbol. The wireless device may determine the flexible OFDM symbol as an uplink symbol. The wireless device may determine a slot n+4 and a slot n+5 as an uplink slot as three nominal repetitions of the plurality of PUSCHs overlap with the slot n+4 and the slot n+5.

The wireless device may determine that a sixth nominal repetition (#6) and a seventh nominal repetition (#7) overlap with a PUCCH transmission in a slot n+4. The wireless device may determine a DM-RS bundle that comprises a nominal repetition overlapping with the PUCCH. The wireless device determines a second DM-RS bundle overlapping with the PUCCH. The wireless device may determine whether a first nominal repetition (a first PUSCH) of the second DM-RS bundle satisfies a processing time capability of the wireless device. For example, the wireless device may determine the first PUSCH (the sixth PUSCH) occurs D symbols after a last symbol of a last PDSCH, where a UCI of the PUCCH carries a HARQ-ACK feedback corresponding to the last PDSCH. For example, D may be determined based on the processing time capability of the wireless device. For example, D may be a predetermined value.

FIG. 26 illustrates that the wireless device skips a fourth nominal repetition and a fifth nominal repetition based on overlapping with downlink OFDM symbol(s). The wireless device may determine a first DM-RS bundle comprising first three nominal repetitions. The wireless device may determine a second DM-RS bundle comprising last three nominal repetitions.

The wireless device may multiplex a UCI of the PUCCH via the last three nominal repetitions based on the sixth nominal repetition and the seventh nominal repetition overlapping with the PUCCH. The wireless device multiplexes/carries/piggybacks the UCI via the sixth nominal repetition, the seventh nominal repetition and a eighth nominal repetition.

In an example, a base station may transmit one or more RRC messages indicating/comprising configuration parameters. The configuration parameters may comprise/indicate enabling a PUCCH repetition, where a wireless device may transmit a UCI via a plurality of PUCCHs of one or more slots/one or more units. For example, a unit may be 7 OFDM symbols based on a normal CP and 6 OFDM symbols based on an extended CP. For example, a unit may be 2 OFDM symbols.

The wireless device may repeat the UCI via the plurality of PUCCHs. The configuration parameters may indicate a DM-RS bundling of the PUCCH repetition. The configuration parameters may indicate/comprise a number of repetitions (e.g., K) for the PUCCH repetition. The configuration parameters may indicate/comprise a number of DM-RS bundle (e.g., M).

A one or more PUCCHs of the plurality of PUCCH may overlap with one or more PUSCHs. The wireless device may determine whether to piggyback a UCI of the one or more PUCCHs via the one or more PUSCHs based on one or more following rules. The wireless device may determine to drop the one or more PUCCHs or the one or more PUSCHs in response to determining not to piggyback the UCI via the one or more PUSCHs.

For example, the wireless device may determine a PUSCH of a serving cell in a slot, that overlaps with a PUCCH of the one or more PUCCHs. The wireless device may determine the slot based on a first numerology of the serving cell. For the PUCCH, the wireless device may determine one or more second PUSCHs overlapping with the PUCCH in one or more slots of the serving cell.

The wireless device may determine one or more second PUSCHs overlapping with each PUCCH of the one or more PUCCHs, where the one or more second PUSCHs comprise a first PUSCH in a slot of a serving cell, where the slot is determined based on a numerology of the serving cell. The wireless device may determine the serving cell, when a plurality of serving cells having PUSCHs overlapping with the each PUCCH, based on a serving cell index.

The wireless device may determine the one or more second PUSCHs for each PUCCH of the one or more PUCCHs. For an non-overlapping PUCCH of the plurality of PUCCHs without overlapping with any PUSCH, the wireless device may transmit the non-overlapping PUCCH. In another example, the wireless device may drop the non-overlapping PUCCH as long as there is at least one PUCCH of the plurality of PUCCHs piggybacked over the one or more second PUSCHs.

For example, the wireless device may determine the one or more PUSCHs overlapping with a first PUCCH of the one or more PUCCHs. For example, the first PUCCH may be an earliest PUCCH of the one or more PUCCHs. The one or more PUCCHs may comprise a PUCCH of the plurality of PUCCHs where the PUCCH overlaps with a PUSCH.

In an example, the wireless device may determine one or more second PUSCHs overlapping with a first PUCCH of the one or more PUCCHs with a first spatial domain filter parameter and a second PUCCH of the one or more PUCCHs with a second spatial domain filter parameter. The second PUCCH may or may not present depending on a number of spatial domain filter parameters used/configured for the PUCCH repetition. The first PUCCH may be an earliest PUCCH of the one or more PUCCHs with the first spatial domain filter parameter. The second PUCCH may be an earliest PUCCH of the one or more PUCCHs with the second spatial domain filter parameter.

For example, the first spatial domain filter parameter may be associated with a first TRP, a first coreset pool, a first uplink panel or a first group. For example, the second spatial domain filter parameter may be associated with a second TRP, a second coreset pool, a second uplink panel or a second group. For example, the first group and the second group may be configured by a base station via RRC, MAC-CE, and/or DCI signaling. For example, the first group and the second group may be determined based on capabilities of the wireless device. The first group/the second group may comprise one or more first/second serving cells where a wireless device may be able to transmit or receive at a given time across the one or more serving cells.

In an example, the wireless device may determine the one or more PUSCHs based on a first PUCCH (e.g., an earliest PUCCH) of the plurality of PUCCHs. When the wireless device may not have an overlapping PUSCH for the first PUCCH, the wireless device may determine not to piggyback the UCI of the plurality of PUCCHs via the one or more PUSCHs.

In an example, the wireless device may determine the one or more PUSCHs based on a first PUCCH and a second PUCCH of the plurality of PUCCHs. For example, the first PUCCH may be an earliest (or a latest) PUCCH of the plurality of PUCCHs. For example, the second PUCCH may be a next earliest (or a next latest) PUCCH of the plurality of PUCCHs.

In an example, the wireless device may determine the one or more PUSCHs based on a first PUCCH and a second PUCCH of the one or more PUCCHs. For example, the first PUCCH may be an earliest (or a latest) PUCCH of the one or more PUCCHs. For example, the second PUCCH may be a next earliest (or a next latest) PUCCH of the one or more PUCCHs.

In an example, the wireless device may determine the one or more PUSCHs based on a first K PUCCHs of the plurality of PUCCHs or a first K PUCCHs of the one or more PUCCHs. For example, the first K PUCCHs may comprise K PUCCHs sequentially starting from an earliest PUCCH. For example, K may be 2, 3 or configured via a RRC signaling.

In an example, when there is no PUSCH overlapping with one or more PUCCHs used for the determining, the wireless device may transmit the plurality of PUCCHs. The wireless device may drop one or more third PUSCHs overlapping with any PUCCH of one or more second PUCCHs of the plurality of PUCCHs in response to the determining, where the wireless device may not piggyback the UCI via the third PUSCHs. The wireless device may determine one or more second PUCCHs of the plurality of PUCCHs, where the wireless device may transmit the one or more second PUCCHs without dropping.

The wireless device may drop a PUCCH of the plurality of PUCHs in response to multiplexing the UCI of the plurality of PUCCHs via at least one PUSCH of the one or more PUSCHs. The wireless device may not transmit the at least one PUSCH comprising/carrying the UCI and at least one PUCCH comprising/carrying the UCI. The wireless device may transmit a UCI either via one or more PUSCHs or via one or more PUCCHs. The wireless device may transmit the UCI via a plurality of PUSCHs in response to a repetition is configured for a PUCCH transmission initially scheduled for the UCI or in response to a repetition of the PUSCHs. The wireless device may transmit the UCI via a plurality of PUCCHs in response to a PUCCH repetition being configured/enabled.

In an example, a wireless device may determine one or more PUCCHs via one or more slots of a first cell based on a first numerology. The wireless device may determine a PUCCH of a slot of the one or more slots. The PUCCH may be an earliest PUCCH of one or more second PUCCHs of the slot. The PUCCH may overlap with a PUSCH. The PUCCH may be a latest PUCCH of the one or more second PUCCHs. The wireless device may determine each PUCCH for each slot of the one or more slots. For the each PUCCH (e.g., a target PUCCH) for the each slot, the wireless device may determine one or more PUSCHs (if any) overlapping with the each PUCCH in a time domain. The one or more PUSCHs may be scheduled via one or more serving cells. The one or more serving cells may comprise the first cell or may not comprise the first cell.

The wireless device may determine a serving cell of the one or more serving cells where the serving cell has a lowest cell index among the one or more serving cells. The wireless device may determine a target PUSCH for the each PUCCH, where the target PUSCH of the one or more PUSCHs is scheduled via the serving cell.

The wireless device may piggyback a UCI of the each PUCCH (e.g., the target PUCCH) via the target PUSCH. The wireless device may drop the target PUCCH in response to piggybacking the UCI. The wireless device may transmit the target PUSCH carrying/multiplexing/comprising the UCI.

In an example, a wireless device may be scheduled with a plurality of PUCCHs over one or more slots. The wireless device may determine a piggybacking for a PUCCH of the plurality of PUCCHs independently. For example, the wireless device may determine one or more PUSCHs to piggyback a UCI of the PUCCH as similar manner to a case when the wireless device determines one or more second PUSCHs to piggyback a second UCI of a second PUCCH without repetition (e.g., a single PUCCH transmission for a UCI). For each PUCCH of the plurality of PUCCHs, the wireless device may determine one or more PUSCHs to piggyback/multiplex a UCI of the each PUCCH. The wireless device may multiplex the UCI of the each PUCCH via the one or more PUSCHs. The wireless device may transmit the one or more PUSCHs, and may drop the each PUCCH where the UCI of the each PUCCH has been piggybacked via the one or more PUSCHs.

When a PUCCH of the plurality of PUCCHs does not overlap with any PUSCH, the wireless device may transmit the PUCCH. Alternatively, the wireless device may drop the PUCCH if any PUSCH carries/multiplexes/piggybacks a UCI of the PUCCH (e.g., one of repeated UCI).

In an example, a wireless device may be scheduled with a plurality of PUCCHs over one or more slots. The wireless device may determine one or more PUSCHs to piggyback a UCI of the plurality of PUCCHs based on an earliest PUCCH of the plurality of PUCCHs. The wireless device may determine the one or more PUSCHs overlapping with the earliest PUCCH based on a rule used for a case when the wireless device is scheduled with a non-repetition PUCCH.

The wireless device may determine that the earliest PUCCH does not overlap with any PUSCH. In that case, the wireless device may determine not to piggyback the UCI of the plurality of PUCCHs via the one or more PUSCHs. The wireless device may transmit the plurality of PUCCHs. The wireless device may drop any PUSCH overlapping with the plurality of PUCCHs when the wireless device may not support simultaneous transmission of a PUCCH and a PUSCH at a given time.

The wireless device may determine the one or more PUSCHs overlapping with the earliest PUCCH of the plurality of PUCCHs. The wireless device may transmit the one or more PUSCHs carrying the UCI of the plurality of PUCCHs and drop the plurality of PUCCHs.

Figure 27:
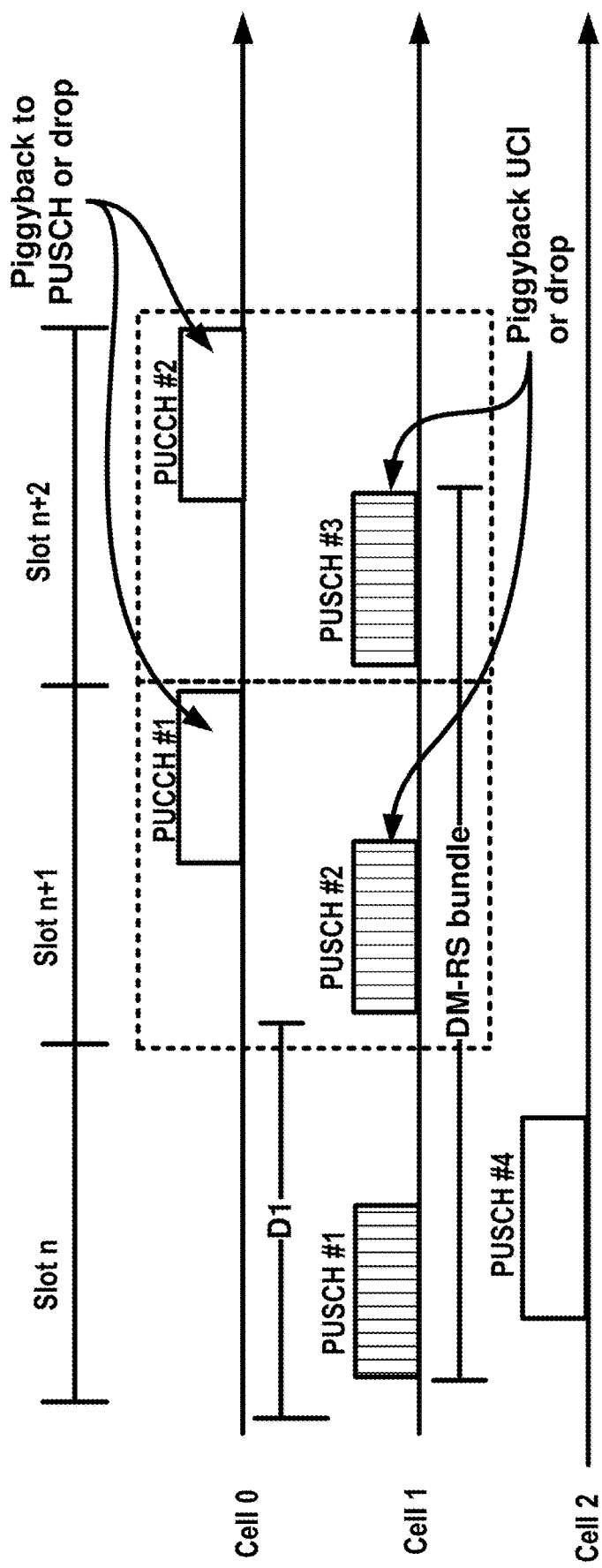
FIG. 27 illustrates an example diagram as per an aspect of an example embodiment of the present disclosure.

FIG. 27 illustrates an example of a UCI piggybacking mechanism of a PUCCH repetition. The wireless device is configured with three serving cells comprising a first cell (Cell 0), a second cell (Cell 1) and a third cell (Cell 2). The wireless device is scheduled with a PUCCH repetition comprising a first PUCCH at a slot n+1 and a second PUCCH at a slot n+2. The wireless device is scheduled with a PUSCH repetition of the second cell (e.g., a first PUSCH, a second PUSCH, a third PUSCH) based on a DM-RS bundling across a slot n to the slot n+2. The wireless device is scheduled with a fourth PUSCH (PUSCH #4) via the slot n of the third cell.

The wireless device may determine a piggybacking of a UCI of the PUCCH repetition via one or more PUSCHs based on each PUCCH of the PUCCH repetition. For example, The wireless device may determine the second PUSCH (PUSCH #2) overlaps with the first PUCCH (PUCCH #1) at the slot n+1. The wireless device may determine whether a delay (e.g., D1) satisfies a processing time capability of the wireless device. For example, the delay may be between a last OFDM symbol of a PDSCH to a first OFDM symbol of the second PUSCH, where the UCI of the first PUCCH comprises a HARQ-ACK feedback corresponding to the PDSCH. In response to the delay being larger than the processing time capability of the wireless device, the wireless device may multiplex/piggyback the UCI via the second PUSCH. The wireless device may transmit the second PUSCH. In response to the multiplexing/piggybacking, the wireless device may drop the first PUCCH.

The wireless device may determine the third PUSCH (PUSCH #3) overlaps with the second PUCCH. The wireless device may determine one or more PUSCHs overlapping with each of one or more PUCCHs of the PUCCH repetition. The wireless device may determine to piggyback a UCI of the third PUCCH, a repetition of the UCI of the first PUCCH, via the third PUSCH. The wireless device may transmit the third PUSCH and drop the second PUCCH. For example, when the third PUSCH may not be scheduled, the wireless device may not multiplex the UCI of the second PUCCH via a PUSCH. The wireless device may transmit the second PUCCH. The wireless device may drop the second PUCCH.

In an example, the first PUCCH may carry a first UCI. The second PUCCH may carry a second UCI. The first UCI and the second UCI may be different. The first PUCCH may be a PUCCH transmission without a repetition of the first UCI. The second PUCCH may be a PUCCH transmission without a repetition of the second UCI.

When the second PUSCH overlaps with the first PUCCH and the third PUSCH overlaps with the second PUCCH, where the second PUSCH and the third PUSCH belong to a single/same DM-RS bundle, the wireless device may determine whether a first transmission power of the second PUSCH after multiplexing the first UCI to the second PUSCH being equal to a second transmission power of the third PUSCH after multiplexing the second UCI to the third PUSCH. In response to the determining, the wireless device may multiplex the first UCI via the second PUSCH and the second UCI via the third PUSCH. Otherwise, the wireless device may drop the second PUCCH and may not multiplex the second UCI via the third PUSCH. The wireless device may drop the third PUSCH and may transmit the second PUCCH carrying the second UCI.

In an example, the wireless device may determine one or more PUSCHs based on the first PUCCH of the PUCCH repetition. For example, in FIG. 27, the wireless device may determine a second PUSCH for piggybacking a UCI of the PUCCH repetition. The wireless device may multiplex/piggyback the UCI via the second PUSCH and drop the first PUCCH and the second PUCCH (e.g., the PUCCH repetition). When there is no PUSCH overlapping (e.g., no existing of the second PUSCH) with the first PUCCH, the wireless device may determine to transmit the PUCCH repetition. The wireless device may drop the third PUSCH overlapping with the second PUCCH of the PUCCH repetition.

In an example, a wireless device may be scheduled with a PUSCH, a part of a PUSCH repetition (e.g., the PUSCH is one of a plurality of PUSCHs with the repetition) via a first slot of a first cell. The PUSCH may not be a first PUSCH (e.g., an earliest PUSCH) of the plurality of PUSCHs. The wireless device may be scheduled with a PUCCH via a second slot of a second cell. The first slot may overlap with the second slot in time domain. The first cell may be same to the second cell. A slot format indication of the first cell may be same as a slot format indication of the second cell. For example, a single SFI-DCI and/or a single SFI information/entry may indicate slot format(s) of one or more slots of the first cell and the second cell. The wireless device may not receive a SFI-DCI indicating a slot format for the first slot of the first cell and the second slot of the second slot.

The wireless device may determine one or more OFDM symbols of a resource of the PUCCH as uplink OFDM symbol(s) in response to the PUCCH being scheduled via a DCI. For example, the PUCCH may be scheduled via a downlink scheduling DCI or the PUCCH may be scheduled via a DCI indicating a dormancy or a power saving scheme. The wireless device may determine that resources, of the first cell and the second cell, overlapping with the resource of the PUCCH in a time domain as valid/uplink resources. When a resource of the PUSCH fully overlaps with the one or more OFDM symbols, the wireless device may determine that the resource of the PUSCH valid and may transmit the PUSCH.

Without the PUCCH overlapping with the PUSCH or the one or more OFDM symbols may not fully comprise the resource of the PUSCH, the wireless device may determine to drop the PUSCH. The wireless device may transmit the PUCCH.

Figure 28:
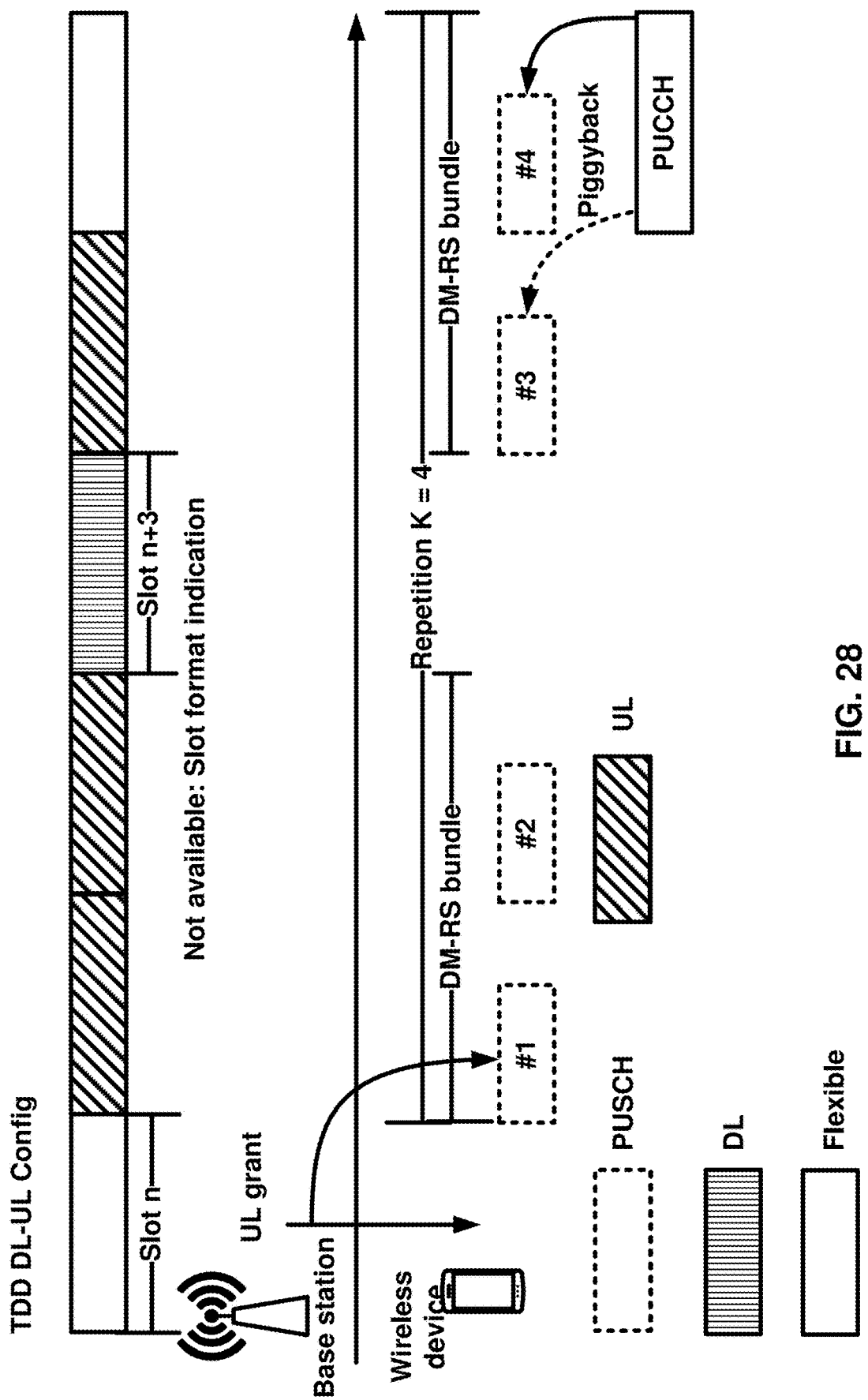
FIG. 28 illustrates an example diagram as per an aspect of an example embodiment of the present disclosure.

FIG. 28 illustrates an example of handling a SFI DCI missing for a UCI piggyback as per as per an aspect of an example embodiment. Similar to FIG. 26, the wireless device may determine a slot n+5 as unavailable due to a missing of a SFI-DCI indicating a slot format for the slot n+5. The wireless device is scheduled with a PUSCH (e.g. #4) in the slot n+5, where the PUSCH is a last PUSCH of a PUSCH repetition (e.g., K=4). The wireless device may drop the PUSCH in response to the slot n+5 being unavailable without any additional information. The wireless device is scheduled with a PUCCH in the slot n+5, where the PUCCH may be scheduled by a DCI (e.g., a downlink scheduling DCI based on a DCI format 1_1, or a DCI format 1_2, or a DCI format 1_0). The wireless device may determine one or more OFDM symbols overlapping with the PUCCH as uplink OFDM symbols as the PUCCH is indicated by the DCI. The wireless device may determine transmitting the PUSCH as the PUCCH overlaps with the one or more symbols of the uplink OFDM symbols. The wireless device may determine to piggyback a UCI of the PUCCH via the PUSCH based on a processing time capability of the wireless device. The wireless device may piggyback/multiplex the UCI via the PUSCH. The wireless device may transmit the PUSCH and may drop the PUCCH in response to the multiplexing.

In an example, a wireless device may be scheduled with a plurality of PUSCHs of a PUSCH repetition via a plurality of TRPs/panels/coreset pools. The wireless device may be scheduled with a PUCCH that may overlap with one or more PUSCHs of the plurality of PUSCHs. The wireless device may determine whether to piggyback a UCI of the PUCCH based on the one or more PUSCHs and one or more spatial domain filter parameters/TCI states of the one or more PUSCHs. For example, the wireless device may determine to piggyback the UCI of the PUCCH in response to a spatial domain filter parameter or a TCI state being associated/used/configured for the one or more PUSCHs. For example, the wireless device may determine to piggyback the UCI of the PUCCH in response to a first spatial domain filter parameter or a first TCI state of the one or more PUSCHs being same as a second spatial domain filter parameter or a second TCI state of the PUCCH. For example, the wireless device may determine to piggyback the UCI of the PUCCH in response to a first spatial domain filter parameter or a first TCI state of the one or more PUSCHs belonging to a same coreset pool/a same TRP/a same panel to a second spatial domain filter parameter or a second TCI state of the PUCCH.

FIG. 28 illustrates an example of a multi-TRP scenario for a UCI piggyback as per as per an aspect of an example embodiment. The wireless device is scheduled with a first PUCCH (PUCCH #1) in a slot n, a second PUCCH (PUCCH #2) in a slot n+1, and a third PUCCH (PUCCH #3) in a slot n+2 via a first cell (Cell 0) based on a first numerology. The wireless device is scheduled with a first PUSCH (PUSCH #1) in a slot m and a second PUSCH (PUSCH #2) in a slot m+1 via a second cell (Cell 1). The first PUSCH is scheduled via a first TRP or a first coreset pool or a first panel or a first group. The second PUSCH is scheduled via a second TRP or a second coreset pool or a second panel or a second group. The wireless device may determine the first PUSCH and the second PUSCH overlapping with the first PUCCH in each slot of the second cell.

Figure 29:
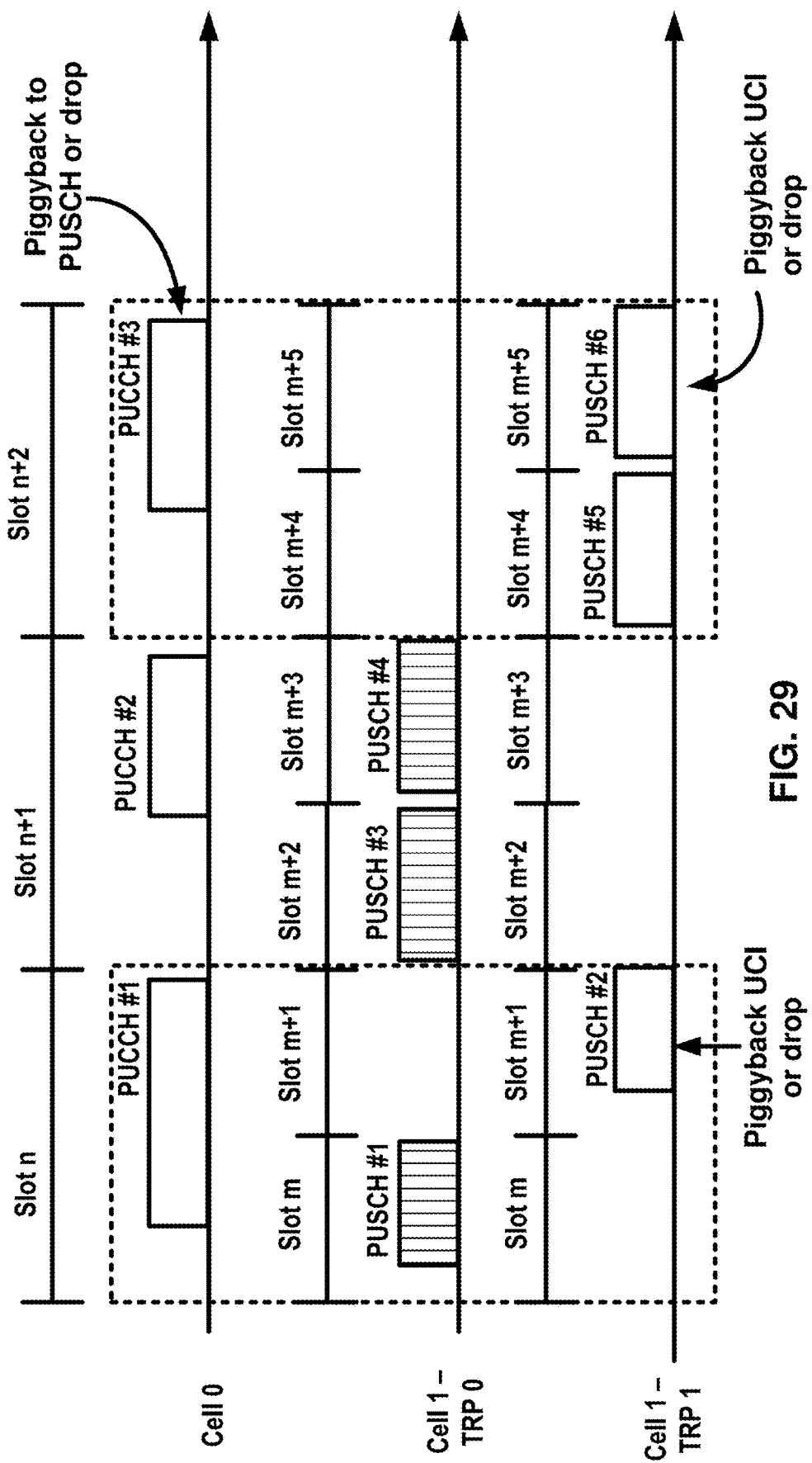
FIG. 29 illustrates an example diagram as per an aspect of an example embodiment of the present disclosure.

The wireless device may multiplex a UCI of the first PUCCH via the first PUSCH and the second PUSCH when the first PUSCH and the second PUSCH are scheduled via a same TRP/coreset pool/panel/group. In FIG. 29, the second PUSCH is scheduled via the second TRP/coreset pool/panel/group. The wireless device may determine that the second PUSCH does not overlap with the PUCCH. The wireless device may determine to multiplex/piggyback the UCI of the PUCCH via the first PUSCH. The wireless device may transmit the first PUSCH. The wireless device may drop the first PUCCH.

The wireless device may determine not to piggyback/multiplex the UCI via the second PUSCH in response to a second spatial domain filter parameter of the second PUSCH being different from a first spatial domain filter parameter of the first PUSCH. The wireless device may determine an earliest PUSCH of one or more PUSCHs overlapping with a PUCCH. The wireless device may piggyback a UCI of the PUCCH via the earliest PUSCH based on a spatial domain filter parameter of the earliest PUSCH. The wireless device may piggyback the UCI of the PUCCH via a second PUSCH of the one or more PUSCHs in response to a second spatial domain filter parameter of the second PUSCH being same to the spatial domain filter parameter. The wireless device may piggyback the UCI of the PUCCH via a second PUSCH of the one or more PUSCHs in response to a second spatial domain filter parameter of the second PUSCH being associated with a same TRP/panel/group/coreset pool as the spatial domain filter parameter.

FIG. 29 illustrates that the wireless device may piggyback a second UCI of a second PUCCH (PUCCH #2) via a third PUSCH and a fourth PUSCH (PUSCH #3/PUSCH #4) in response to the third PUSCH and the fourth PUSCH being scheduled via the first TRP of the second cell and overlapping with the second PUCCH. The wireless device may determine to piggyback a third UCI of a third PUCCH (PUCCH #3) via a fifth PUSCH (PUSCH #5) and a sixth PUSCH (PUSCH #6) in response the fifth PUSCH and the sixth PUSCH being scheduled via the second TRP or a first spatial domain filter parameter of the fifth PUSCH being same as a second spatial domain filter parameter of the sixth PUSCH or the first spatial domain filter being associated with a same TRP/panel/coreset group to the second spatial domain filter. The wireless device may determine not to multiplex/piggyback the third UCI in response to a third spatial domain filter parameter of the third PUCCH being different from the first spatial domain filter parameter (or the second spatial domain filter parameter) or the third spatial domain filter being associated with the first TRP while the first/second spatial domain filter parameter being associated with the second TRP/coreset pool/panel.

In an example, a transmission of a cell may be assumed to be transmitted via a first TRP/panel/coreset pool/group unless it is explicitly associated/scheduled via a second TRP/panel/coreset pool/group. In FIG. 29, the first PUCCH, the second PUCCH and the third PUCCH are assumed to be associated with the first TRP/panel/coreset pool/group in response to no explicit indication of a TRP/panel/coreset pool/group is given.

Figure 30:
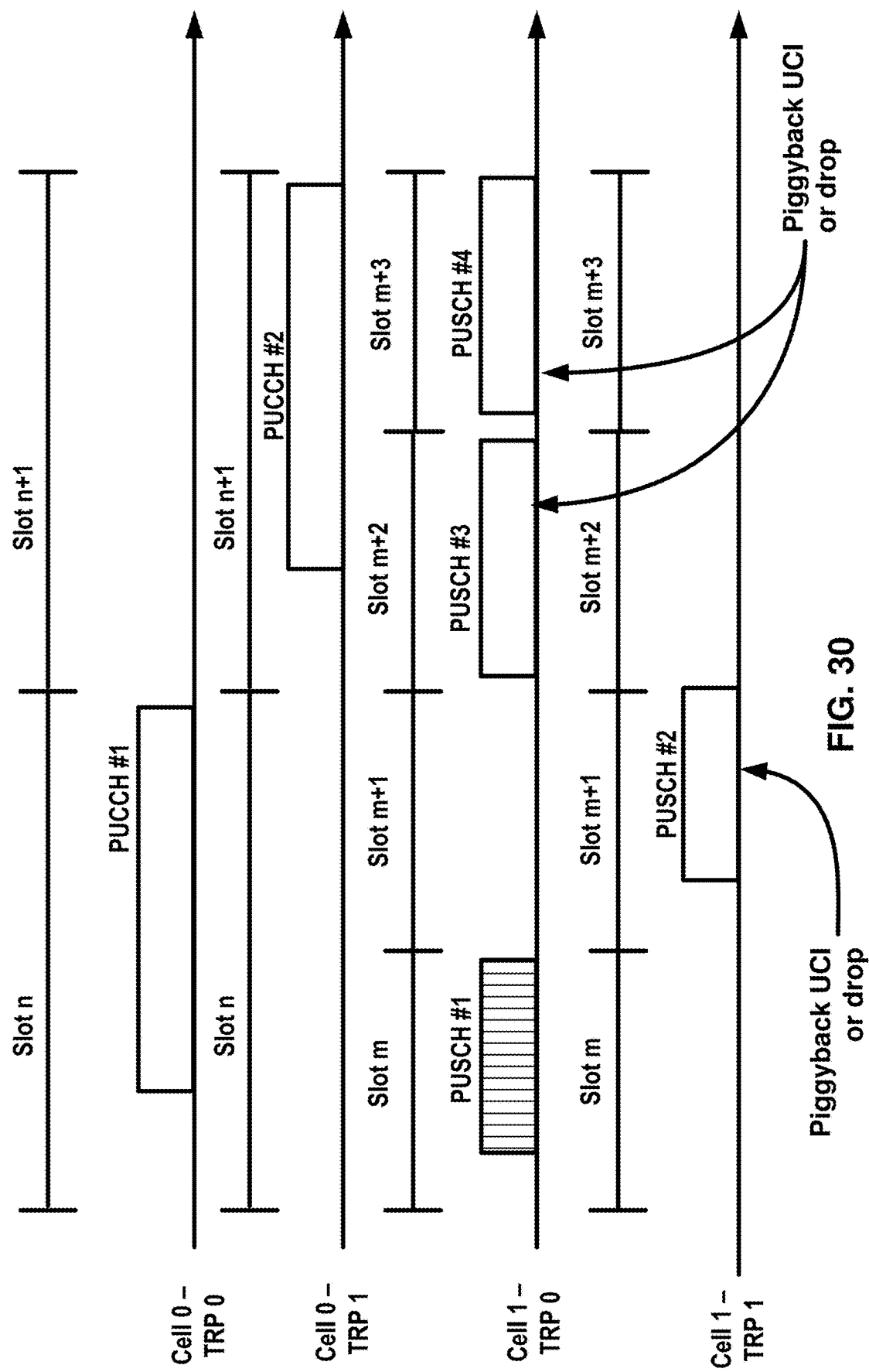
FIG. 30 illustrates an example repetition of a multiple TRPs/panels as per aspect of an example embodiment of the present disclosure.

FIG. 30 illustrates an example of a multi-TRP scenario for a UCI piggyback as per as per an aspect of an example embodiment. Similar to FIG. 29, the wireless device may determine one or more PUSCHs for a PUCCH for piggybacking a UCI of the PUCCH based on spatial domain filter parameter(s) of the one or more PUSCHs and/or a spatial domain filter parameter of the PUCCH.

In FIG. 30, the wireless device may determine to piggyback a first UCI of a first PUCCH via a first PUSCH in response to a spatial domain filter parameter of the first PUCCH being associated with a first spatial domain filter parameter of the first PUSCH (e.g., first TRP). The wireless device may determine not to piggyback the first UCI of the first PUCCH via a second PUSCH in response to a second spatial domain filter parameter being different from the first spatial domain filter parameter or the second spatial domain filter parameter being associated with the second TRP. The wireless device may determine not to piggyback a third UCI of a second PUCCH via a third PUSCH and a fourth PUSCH in response to the second PUCCH being associated with the first TPR (e.g., being scheduled via the first TRP) while the third PUSCH and the fourth PUSCH being associated with the second TRP (e.g., scheduled via the second TRP).

The wireless device may transmit the second PUCCH in response to determining not to multiplex. The wireless device may drop the third PUSCH and the fourth PUSCH. The wireless device may determine whether to drop the second PUCCH based on a first priority of the third PUCCH and a second priority of the third PUSCH and the fourth PUSCH. For example, when the first priority is higher than the second priority, the wireless device may drop the third PUSCH and the fourth PUSCH. If the first priority is lower than the second profit, the wireless device may drop the second PUCCH. When the first priority is same as the second priority, the wireless device may prioritize the second PUCCH and drop the third PUSCH and the fourth PUSCH.

In an example, a wireless device may be scheduled with a plurality of PUCCHs for a PUCCH repetition, where the wireless device may repeat a UCI transmission via each of the plurality of PUCCHs (if transmitted). The wireless device may be scheduled with a first PUSCH via a first cell, where the first PUSCH overlap with the plurality of PUCCHs.

The wireless device may be scheduled with second plurality of PUSCHs via a second cell, where the second plurality of PUSCHs overlap with the plurality of PUCCHs. The second plurality of PUSCHs may be scheduled with a PUSCH repetition. The second plurality of PUSCHs may be scheduled via one or more slots of the second cell.

For example, a first cell index of the first cell may be lower than a second cell index of the second cell.

The wireless device may determine whether to piggyback/multiple the UCI of the plurality of PUCCHs via one or more PUSCHs based on an earliest PUCCH (e.g., a first PUCH) of the plurality of PUCCHs and one or more parameters of the plurality of PUCCHs. For example, the one or more parameters may comprise a number of the PUCCH repetition. For example, the one or more parameters may comprise a PUCCH format of the PUCCH repetition/the plurality of PUCCHs. For example, the one or more parameters may comprise a bit size of the UCI via the plurality of PUCCHs.

The wireless device may determine that the first PUSCH overlaps with the first PUCCH of the plurality of PUCCHs. The wireless device may determine a second PUSCH of the second plurality of PUSCHs overlap with the first PUCCH. The wireless device may determine the first PUSCH or the second PUSCH to piggyback the UCI in response to satisfying a condition based on the one or more parameters of the plurality of PUCCHs.

For example, the condition may be based on a number of repetition of a PUCCH repetition. The wireless device may determine the second PUSCH in response to a number of the plurality of PUSCHs being larger than or equal to a number of repetition K of the PUCCH repetition. The second PUSCH may be a first (an earliest) PUSCH of the second plurality of PUSCHs. The wireless device may determine the second PUSCH as the first PUSCH is not configured with a repetition.

For example, the condition may be based on a repetition scheme of the PUCCH repetition. For example, the wireless device may transmit the plurality of PUCCHs via a plurality of TRPs/panels/coreset pools/groups. For example, the plurality of PUCCHs may be associated/configured with a plurality of TCI states or a plurality of spatial domain filter parameters. The wireless device may transmit the plurality of PUCCHs via a TDM manner. The wireless device may transmit a PUCCH of the plurality of PUCCHs based on each TCI state of the plurality of TCI states or each spatial domain filter parameter of the plurality of spatial domain filter parameters. For example, a spatial domain filter parameter may be associated/configured with a SRS resource index (e.g., SRI) or a TCI state.

In the TDM manner, the wireless device may transmit a PUCCH based on a TCI state or a spatial domain filter parameter at a time. The wireless device may transmit the plurality of PUCCHs via a FDM manner. In the FDM manner, the wireless device may transmit a first PUCCH based on a first TCI state or a first spatial domain filter parameter via a first frequency resource and a second PUCCH based on a second TCI state or a second spatial domain filter parameter via a second frequency resource in a time. The wireless device may transmit the plurality of PUCCHs via a SDM manner. In the SDM manner, the wireless device may simultaneously transmit, via a same time/frequency resource, a first PUCCH based on a first TCI state or a first spatial domain filter parameter and a second PUCCH based on a second TCI state or a second spatial domain filter parameter.

The wireless device may determine a second PUSCH of the second plurality of PUSCHs in response to a repetition scheme of the PUSCH repetition being same as the repetition scheme of the PUCCH repetition. For example, the second plurality of PUSCHs may be configured with a TDM (or FDM or SDM) manner repetition and the plurality of PUCCHs may be configured with the TDM manner.

In an example, the condition may be based on one or more TCI states or spatial domain filter parameters or TRPs or panels configured/associated with the plurality of PUCCHs. For example, when the plurality of PUCCHs are configured to be transmitted via a single TRP (e.g., a single TCI state) or a single panel, the wireless device may piggyback the UCI of the plurality of PUCCHs via the first PUSCH or the second PUSCH. For example, the plurality of PUCCHs are configured to be transmitted via a plurality of TRPs (e.g., a plurality of TCI state) or a multiple panels, the wireless device may determine the second PUSCH in response to the second plurality of PUSCHs being configured to be transmitted via the plurality of TRPs or the multiple panels.

In an example, the condition may be based on a number of the PUCCH repetition and one or more TCI states or spatial domain filter parameters or TRPs or panels configured/associated with the plurality of PUCCHs. The condition may be based on a combination of examples listed above (e.g., combination of one or more of a number of repetition, a repetition mechanism, one or more TRPs/panels/TCI states).

In an example, the wireless device may be scheduled with a third plurality of PUSCHs via a third cell, where an earliest PUSCH (e.g., a third PUSCH) of the plurality of PUSCHs overlaps with the first PUCCH of the plurality of PUCCHs and the third plurality of PUSCHs satisfies the condition. When the wireless device may have a plurality of PUSCHs satisfying the condition, the wireless device may determine a PUSCH of the plurality of PUSCHs via a lowest cell indexed cell.

Figure 31:
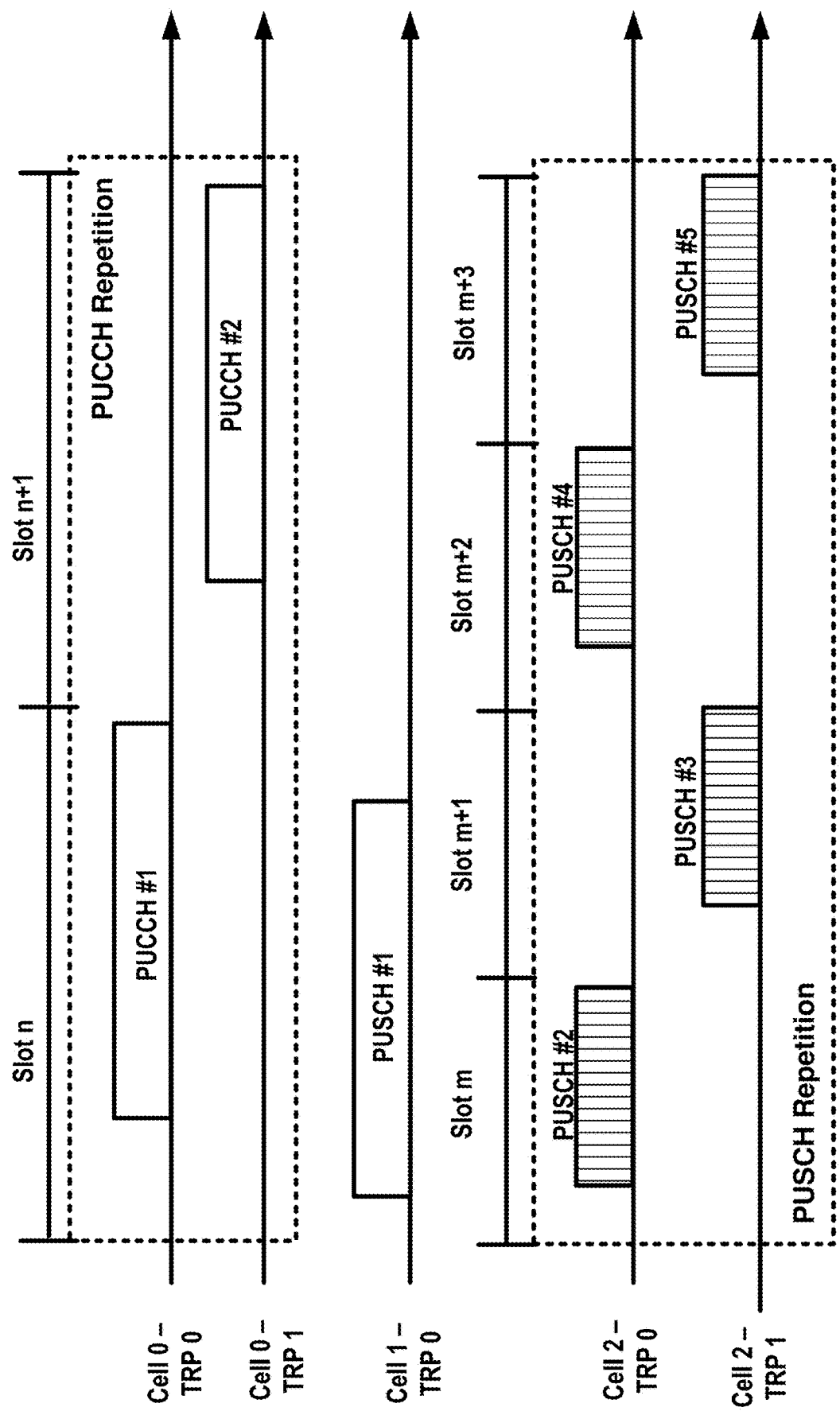
FIG. 31 illustrates an example repetition of a multiple TRPs/panels as per aspect of an example embodiment of the present disclosure.

FIG. 31 illustrates an example of a UCI piggyback determination as per as per an aspect of an example embodiment. In FIG. 31, the wireless device is configured with three serving cells comprising a first cell (Cell 0), a second cell (Cell 1) and a third cell (Cell 2). The wireless device is configured with a plurality of TRPs comprising a first TRP (TRP 0) and a second TRP (TRP 1). A TRP may be represented as a coreset pool, a TCI state group, a group of TCI states, a group of spatial domain filter parameters, a group of SRS resources, a SRI group, and/or like. The first cell is associated with the first TRP and the second TRP. The wireless device is configured with PUCCH resources via the first cell. The wireless device may be configured with a PUCCH repetition via the first cell. A number of repetitions for the PUCCH repetition may be configured via a RRC signaling and/or a DCI indication. For example, the wireless device may receive one or more RRC messages indicating configuration parameters. The configuration parameters may comprise a maximum number of repetitions for a PUCCH repetition. A DCI, comprising downlink resource assignment, may indicate a number of repetitions that is smaller than or equal to the maximum number of repetitions. The wireless device may determine a number of repetitions based on the configuration parameters and/or downlink scheduling DCIs.

The wireless device may perform a PUCCH repetition across a plurality of slots of the first cell. the wireless device may determine a same set of OFDM symbols in each slot of the plurality of slots for a plurality of PUCCHs. The set of OFDM symbols may be indicated via configuration parameters. The configuration parameters may comprise/indicate a repetition mechanism across the plurality of TRPs. For example, the repetition mechanism may be one of TDM, FDM and SDM. The configuration parameters may comprise/indicate one or more TCI states or one or more SRIs or one or more spatial domain filter parameters associated with each TRP for transmitting a PUCCH via the each TRP.

The base station may indicate, via MAC CE and/or a DCI signaling, a TCI state of the one or more TCI states or a SRI of the one or more SRIs or one spatial domain filter parameter of he one or more spatial domain filter parameters of the PUCCH transmission via the ach TRP. For example, a MAC CE and/or a DCI may indicate one of the one or more TCI states or the one or more SRIs or the one or more spatial domain filter parameters.

For example, a first MAC CE and/or a first DCI may indicate a first one of one or more first TCI states, one or more first SRIs, or one or more first spatial domain filter parameters for the first TRP. The first MAC CE and/or the first DCI may indicate a second one of one or more second TCI states, one or more second SRIs, or one or more second spatial domain filter parameters for the second TRP. The one or more first TCI states, the one or more first SRIs or the one or more first spatial domain filter parameters may be associated/configured for the first TRP. The one or more second TCI states, the one or more second SRIs or the one or more second spatial domain filter parameters may be associated/configured for the second TRP.

In an example, a first MAC CE and/or a first DCI may indicate first one of the one or more TCI states, the one or more SRIs, or the one or more first spatial domain filter parameters for the first TRP (e.g., one TCI state, or one SRI or one spatial domain filter parameter). A second MAC CE and/or a second DCI may indicate second one of the one or more second TCI states, the one or more second SRIs, or the one or more second spatial domain filter parameters. The second MAC CE may be different form the first MAC Ce. The second DCI may be different from the first DCI.

FIG. 31 shows a first PUCCH (PUCCH #1) and a second PUCCH (PUCCH #2) are scheduled for a PUCCH repetition for a UCI. The wireless device may transmit the UCI via the first PUCCH and repeat the UCI via the second PUCCH if the wireless device transmits the first PUCCH and the second PUCCH. The first PUCCH is scheduled in slot n and the second PUCCH is scheduled in slot n+1.

The wireless device is scheduled with a first PUSCH (PUSCH #1) via the second cell. The first PUSCH is scheduled without a repetition (e.g., a repetition number K=1). The second cell may have a same numerology to the first cell. The first PUSCH is scheduled in the slot n.

The wireless device is scheduled with a PUSCH repetition comprising a plurality of PUSCHs of a second PUSCH (PUCH #2), a third PUSCH (PUSCH #3), a fourth PUSCH (PUSCH #4) and a fifth PUSCH (PUSCH #5). The PUSCH repetition may be scheduled based on a TypeA repetition (or a PUSCH mapping Type A). The PUSCH repetition may be scheduled based on TypeB repetition (or a PUSCH mapping Type B). A PUSCH of the plurality of PUSCHs may refer an actual PUSCH based on the PUSCH mapping Type B. A PUSCH of the plurality of PUSCHs may refer an nominal PUSCH based on the PUSCH mapping Type B. A PUSCH may be an uplink channel/signal of the plurality of PUSCHs in each slot based on the PUSCH mapping TypeA.

The PUSCH repetition is configured to be transmitted via the first TRP and the second TRP based on a TDM mechanism. The second PUSCH is scheduled in slot m. The third PUSCH is scheduled in slot m+1. The fourth PUSCH is scheduled in slot m+2 and the fifth PUSCH is scheduled in slot m+3. A second numerology of the third cell may be different from the numerology of the first cell. The third cell may have two slots per one slot of the first cell.

The wireless device may determine to multiplex/piggyback the UCI of the plurality of PUCCHs via one or more PUSCHs based on a first PUCCH (e.g., an earliest PUCCH, or an earliest PUCCH that overlaps with a PUSCH) of the plurality of PUCCHs and one or more parameters of the PUCCH repetition.

For example, the wireless device may determine one or more overlapping PUSCHs that overlap with the first PUCCH. In FIG. 31, the first PUSCH, the second PUSCH and the third PUSCH are the one or more overlapping PUSCHs. The wireless device may determine whether each PUSCH of the one or more overlapping PUSCHs satisfies one or more piggyback conditions. For example, the one or more piggyback conditions may comprise a set of condition, where each condition of the set of condition may be determined based on a parameter of the one or more parameters of the PUCCH repetition.

For example, the one or more piggyback conditions may comprise a first condition and a second condition. The first condition may be that a number of repetition for a PUSCH being larger than or equal to a number of the PUCCH repetition. The second condition may be that one or more first TRPs associated with the PUSCH or a PUSCH repetition comprising the PUSCH being same to one or more second TRPs associated with the PUCCH repetition. The first condition may be that a number of repetition for the PUSCH being larger than one in response to the PUCCH repetition being configured. When the PUCCH is transmitted without a repetition (e.g., K=1), the first condition may be satisfied based on that the repetition for the PUSCH may be one. The second condition may be that a first repetition mechanism (e.g., TDM, SDM, FDM) of the PUSCH repetition comprising the PUSCH being equal to a second repetition mechanism of the PUCCH repetition. The first condition may be receiving an uplink grant for the PUSCH, where the uplink grant indicates 'UCI piggyback'. When the uplink grant indicates to piggyback/multiplex the UCI, the wireless device may multiplex/piggyback the UCI based on satisfying the one or more piggyback conditions.

A base station may transmit one or more RRC messages indicating/comprising configuration parameters. The configuration parameters may indicate/comprise the one or more piggyback conditions and/or the first condition and/or the second condition. For example, the one or more piggyback conditions may be determined based on a parameter of the configuration parameters. For example, when the configuration parameters indicates 'multiplex PUCCH repetition' (e.g., multiplexing of UCI of a PUCCH repetition to a PUSCH is enabled), the wireless device may determine a PUSCH, regardless a repetition or regardless of the one or more parameters of the PUCCH repetition, for multiplexing/piggybacking the UCI.

In FIG. 31, the wireless device may determine the second PUSCH satisfies the one or more piggyback conditions. For example, the one or more piggyback conditions may be based on a PUSCH repetition comprising the second PUSCH being scheduled via the first TRP and the second TRP. For example, the one or more piggyback conditions may be based on a PUSCH repetition comprising the second PUSCH being scheduled via the first TRP and the second TRP based on a TDM manner. For example, the one or more piggyback conditions may be based on a PUSCH repetition comprising the second PUSCH having a repetition number K=4 larger than 2 (a repetition number of the PUCCH repetition).

The wireless device may determine the third PUSCH satisfies the one or more piggyback conditions. The wireless device may determine to piggyback the UCI of the PUCCH repetition via the second PUSCH based on the second PUSCH is an earliest of the second PUSCH and the third PUSCH.

The wireless device may determine the second PUSCH and the third PUSCH to piggyback the UCI as both satisfy the one or more piggyback conditions. The wireless device may piggyback/multiplex the UCI via the second PUSCH. The wireless device may piggyback/multiplex the UCI via the third PUSCH. The wireless device may drop the plurality of PUCCHs in response to the piggybacking. The wireless device may transmit the plurality of PUSCHs and the first PUSCH.

The wireless device may determine the plurality of PUSCHs comprising the second PUSCH or the third PUSCH to piggyback the UCI. The wireless device may multiplex/piggyback the UCI via each of the plurality of PUSCHs. The wireless device may drop the plurality of PUCCHs. The wireless device may transmit the plurality of PUSCHs and the first PUSCH.

For example, the first PUSCH may satisfy the one or more piggyback conditions. The second PUSCH may satisfy the one or more piggyback conditions. The wireless device may determine the first PUSCH with a lower cell index.

In an example, the wireless device may determine whether an earliest PUSCH (of a PUSCH repetition, e.g., a first PUSCH of a plurality of PUSCHs) satisfies one or more piggyback conditions to piggyback a UCI of a PUCCH repetition. For example, the one or more piggyback conditions may comprise that a delay between a last PDSCH where the UCI carries HARQ-ACK bit(s) corresponding to the last PDSCH and a first symbol of the earliest PUSCH is larger than or equal to a processing time capability of the wireless device. The one or more piggyback conditions may (additionally) comprise that the earliest PUSCH overlaps with an earliest PUCCH of the PUCCH repetition (e.g., a first PUCCH of a plurality of PUCCHs, or an earliest PUSCH of the PUCCH repetition, which overlaps with a PUSCH of the PUCCH repetition). The one or more piggyback conditions may (additionally) comprise that a first number of repetitions of the PUSCH repetition is larger than or equal to a number. The number may be a repetition number of the PUCCH repetition. The number may be configured by a RRC signaling. The number may be predetermined (e.g., 2). The number may be determined based on a repetition number of the PUCCH repetition (e.g., K/2, where K is the repetition number of the PUCCH repetition). The one or more piggyback conditions may (additionally) comprise that one or more first TRPs of the PUSCH repetition comprise one or more second TRPs of the PUCCH repetition. The one or more piggyback conditions may (additionally) comprise that a repetition mechanism across multiple TRPs of the PUSCH repetition (e.g., TDM, SDM, or FDM) may be same as a second repetition mechanism across multiple TRPs of the PUCCH repetition.

In an example, the wireless device may determine whether a PUSCH of a PUSCH repetition, (e.g., a first PUSCH of a plurality of PUSCHs) satisfies one or more piggyback conditions to piggyback a UCI of a PUCCH repetition. The PUSCH may be an earliest PUSCH or any PUSCH of the PUSCH repetition. In response to determining the PUSCH satisfying the one or more piggyback conditions, the wireless device may piggyback the UCI via one or more PUSCHs comprising the PUSCH. The one or more PUSCHs may comprise a PUSCH, of a plurality of PUSCHs of the PUSCH repetition, occurring after the PUSCH (e.g., successive PUSCHs(s) since the PUSCH from the plurality of PUSCHs of the PUSCH repetition). The wireless device may drop the PUCCH repetition. The wireless device may transmit the plurality of PUSCHs where the one or more PUSCHs comprise the UCI and one or more second PUSCHs of the plurality of PUSCHs may not comprise the UCI. The plurality of PUSCHs comprise the one or more PUSCHs and the one or more second PUSCHs.

In an example, a base station may transmit one or more RRC messages indicating configuration parameters. The configuration parameters may comprise/indicate a mechanism of a UCI determination mechanism. For example, the UCI determination mechanism may be applied for determining whether to piggyback a UCI via one or more PUSCHs when one or more PUCCHs of a plurality of PUCCHs of a PUCCH repetition overlap with the one or more PUSCHs. For example, the UCI determination mechanism may be applied for a PUCCH without a repetition.

An example of the UCI determination mechanism is the following. First, the wireless device may determine one or more PUSCHs via one or more serving cells overlapping with a first PUSCH (e.g., an earliest PUCCH, or an earliest PUCCH that overlaps with a PUSCH in time) of a plurality of PUCCHs of a PUCCH repetition. Second, the wireless device may select a PUSCH of the one or more PUSCHs based on a rule. For example, the rule is based on a lowest serving cell index. The wireless device may determine a PUSCH of the one or more PUSCHs with a lowest serving cell index. For example, the rule is based on a timing. The wireless device may determine a PUSCH of the one or more PUSCHs, which occurs at earliest (e.g., the PUSCH occurs earliest among the one or more PUSCHs). The wireless device may determine a PUSCH of the one or more PUSCHs, which occurs at latest (e.g., the PUSCH occurs latest among the one or more PUSCHs).

For example, the rule is based on a number of repetition. The wireless device may determine a PUSCH of the one or more PUSCHs, which is configured/associated with a largest repetition number (e.g., the PUSCH is part of a PUSCH repetition with a largest repetition number). For example, the rule is based on a grant type scheduling PUSCH. The wireless device may determine a PUSCH of the one or more PUSCHs, where the PUSCH is scheduled via a DCI (e.g., UL grant). For example, the rule is based on a number of TRPs/panels associated with a PUSCH repetition comprising a PUSCH. The wireless device may determine a PUSCH of a PUSCH repetition associated with multiple TRP/panels.

In an example, one or more piggyback conditions for determining a PUSCH to piggyback/multiplex a UCI of a PUCCH may comprise a UL grant scheduling the PUSCH. When the PUSCH is scheduled via a configured grant configuration, the base station may indicate whether to support a UCI multiplexing via the configured grant configuration or not via a RRC signaling.

An example of the UCI determination mechanism is the following. First, the wireless device may determine one or more overlapping PUSCHs via one or more serving cells overlapping with a first PUSCH (e.g., an earliest PUCCH) of a plurality of PUCCHs of a PUCCH repetition. Second, the wireless device may determine one or more PUSCHs of the one or more overlapping PUSCHs, wherein the one or more PUSCHs satisfy one or more cases. Third, the wireless device may select a PUSCH of the one or more PUSCHs based on the rule mentioned in above. The one or more cases may be determined based on the one or more piggyback conditions mentioned in the specifications.

In an example, a wireless device may schedule (e.g., based on an uplink grant or a configured grant) a PUSCH in a slot n. The wireless device may schedule a PUCCH (e.g., based on a downlink scheduling DCI or a (semi-persistent) CSI feedback) in the slot n. The PUSCH may overlap with the PUCCH at least over one OFDM symbol. The wireless device may determine whether to piggyback or multiplex UCI of the PUCCH via the PUSCH based on one or more piggyback conditions. The wireless device may transmit the PUSCH with multiplexed UCI and may drop the PUCCH in response to the one or more conditions being met. Otherwise, the wireless device may transmit the PUCCH and drop the PUSCH.

For example, the one or more piggyback conditions may comprise that a first OFDM symbol of the PUCCH or the PUSCH may occur after $(N_1+d_{1,1}+1) \cdot (2048+144) \cdot \kappa \cdot 2^{-\mu} \cdot T_C$ of a last PDSCH. For example, the last PDSCH may refer a PDSCH, occurring latest, of one or more PDSCHs for HARQ-ACK feedbacks, where the UCI of the PUCCH comprises the HARQ-ACK feedbacks of the one or more PDSCHs. The last PDSCH may refer a last PDSCH of the one or more PDSCHs. For example, $N_1$ may be determined based on a UE processing capability for PDSCH reception. For example, u is a subcarrier spacing of the PDSCH. For example, d1,1 is an offset value. $(2048+144) \cdot \kappa \cdot 2^{-\mu} \cdot T_C$ may represent a time of an OFDM symbol based on the subcarrier spacing.

For example, the one or more piggyback conditions may comprise that a first OFDM symbol of the PUSCH or the PUCCH may be $T_{proc,release}^{mux}$ after a last symbol of a SPS PDSCH release or a DCI format 1_1 indicating SCell dormancy indication. For example, $T_{proc,release}^{mux}$ may represent a minimum processing time for a SPS PDSCH release or a SCell dormancy indication based on a DCI format 1_1.

For example, the one or more piggyback conditions may comprise that the PUSCH may be one of a plurality of PUSCHs of a PUSCH repetition in response to the PUCCH being one of a plurality of PUCCHs of a PUCCH repetition. The PUSCH may be an earliest/a first PUSCH of the plurality of PUSCHs. The PUCCH may be an earliest/a first PUCCH of the plurality of PUCCHs.

For example, the one or more piggyback conditions may comprise that the PUSCH may be one of a plurality of PUSCHs of a PUSCH repetition associated with one or more first TRPs/panels. The one or more first TRPs/panels may comprise one or more second TRPs/panels associated with one or more PUCCHs of a PUCCH repetition, where the one or more PUCCHs comprise the PUCCH.

In an example, the wireless device may schedule a second PUSCH in the slot, where the second PUSCH may satisfy the one or more piggyback conditions and may overlap with the PUCCH. In the example, the PUSCH may satisfy the one or more piggyback conditions. The wireless device may determine the PUSCH or the second PUSCH for multiplexing the UCI based on a serving cell index. For example, the PUSCH may be scheduled for a first cell with a first serving cell index. The second PUSCH may be scheduled for a second cell with a second serving cell index. The wireless device may determine the PUSCH in response to the first serving cell index being smaller than the second serving cell index. For example, the wireless device may determine a target PUSCH for multiplexing the UCI, between the PUSCH and the second PUSCH, where the target PUSCH may be scheduled via an UL grant. For example, the wireless device may determine the second PUSCH in response to the second PUSCH being scheduled by an uplink grant and the PUSCH being scheduled by a configured grant. The wireless device may prioritize or select first PUSCHs scheduled dynamically based on UL grant(s) and may determine a lowest cell index PUSCH if the first PUSCHs are more than one.

In an example, the PUSCH may be an earliest actual repetition of one or more PUSCH repetitions, wherein the one or more PUSCH repetitions in a slot may overlap with the PUCCH. For example, the wireless device may determine the slot based on a subcarrier spacing of the one or more PUSCH repetitions.

In an example, when the PUSCH may be based on a configured grant configuration, the wireless device may multiplex the UCI to the PUSCH when cg-CG-UCI-Multiplexing is enabled or configured. Otherwise, the wireless device may not transmit the PUSCH and may transmit the PUCCH.

In an example, a wireless device may receive one or more radio resource control (RRC) messages. The one or more RRC messages may indicate a plurality of resource types of a plurality of symbols of plurality of slots. For example, the plurality of resource types may comprise downlink, uplink and flexible. For example, the one or more RRC messages may indicate a resource type for each symbol of the plurality of symbols, wherein the resource type is one of the plurality of the resource types. The wireless device may receive a DCI. The DCI may comprise one or more resource assignments. The one or more resource assignments may indicate a physical uplink shared channel (PUSCH) resource. The DCI may indicate a number of repetitions occurring over one or more slots of the plurality of slots. The DCI may comprise a number of data demodulation reference signal (DM-RS) bundling.

Based on the number of DM-RS bundling, the wireless device may determine a sequence of demodulation reference signal of one or more first PUSCHs. The wireless device may determine one or more first resources for the one or more first PUSCHs based on the one or more resource assignments and the number of the DM-RS bundling. The wireless device may determine a resource of a PUSCH of the one or more first PUSCHs overlaps in time with a resource of a physical uplink control channel (PUCCH). The wireless device may, in in response to the determining and satisfying a condition, multiplex a UCI of the PUCCH via each of the one or more first PUSCHs. The wireless device may transmit the one or more first PUSCHs, wherein each PUSCH comprises the sequence of demodulation reference signal and the UCI.

In an example, a wireless device may receive a first control message indicating a plurality of resources of a plurality of physical uplink control channels (PUCCHs). The plurality of PUCCHs may comprise a repetition of an uplink control information (UCI). The wireless device may receive a second control message indicating one or more physical uplink shared channels (PUSCHs). The one or more PUSCHs may overlap in time with the plurality of PUCCHs.

The wireless device may determine multiplex the UCI via the one or more of PUSCHs based on a first PUSCH of the one or more PUSCHs overlapping in time with a first PUSCH of the plurality of PUCCHs and the one or more PUSCHs transmitting one or more repetition of a transport block. Based on the determining, the wireless device may transmit the one or more PUSCHs and drop the plurality of PUCCHs. Each of the plurality of PUSCHs may multiplex the UCI and the transport block.

According an example embodiment, the first PUSCH may be an earliest PUSCH of the one or more PUSCHs. According an example embodiment, the first PUCCH may be an earliest PUCCH of the plurality of PUCCHs. According an example embodiment, the first PUCCH may be an earliest PUCCH of one or more PUCCHs of the plurality of PUCCHs, wherein the one or more PUCCHs overlap in time with the one or more PUSCHs.

According to an example embodiment, the determine multiplexing may be further based on one or more transmission and reception points (TRPs) associated with the plurality of PUCCHs being same to one or more second TRPs associated with the one or more PUSCHs. According to an example embodiment, the determine multiplexing may be further based on one or more TRPs associated with the plurality of PUCCHs comprising one or more second TRPs associated with the one or more PUSCHs.

For example, a TRP may be associated with an uplink channel in response to a transmission configuration indicator (TCI) of the TRP is configured for the uplink channel. For example, the uplink channel may be configured with a TCI state of the TRP. For example, a TRP may be associated with an uplink channel in response to a control resource set (coreset) pool of a TRP is configured for the uplink channel. For example, a resource of the uplink channel may be configured with/associated with the coreset pool of the TRP.

According to an example embodiment, the determining multiplexing may be further based on a number of repetition of the one or more PUSCHs being larger than a number of repetition of the plurality of PUCCHs. According to an example embodiment, the wireless device may drop the one or more PUSCHs in response to failing the determining multiplexing the UCI via the one or more PUSCHs. The wireless device may transmit the plurality of PUCCHs in response to failing the determining multiplexing the UCI via the one or more PUSCHs.

According to an example embodiment, the UCI may comprise a hybrid automatic repeat request (HARQ) feedback.

According to an example embodiment, the wireless device may determine a second PUSCH not overlapping with the plurality of PUSCHs in response to the determining multiplexing the UCI via the one or more of PUSCHs. A resource of the second PUSCH may overlap with resources of the plurality of PUCCHs. The wireless device may transmit the second PUSCH.

According to an example embodiment, the wireless device may consider a second PUCCH invalid in response to the second PUCCH overlapping with the one or more PUSCHs and the determining multiplexing the UCI via the one or more of PUSCHs. The wireless device may drop the second PUCCH based on the considering. According to an example embodiment, the UCI may be repeated via the one or more PUSCHs.

According to an example embodiment, the first PUCCH may be an earliest PUCCH of one or more PUCCHs of the plurality of PUCCHs, wherein the one or more PUCCHs overlap in time with the one or more PUSCHs. The determining may be further based on a delay, between end of a physical downlink shared channel (PDSCH) and start of the one or more PUSCHs, being larger than a threshold. For example, the PDSCH may be a latest PDSCH of one or more PDSCHs for the UCI. The first PUCCH may be a second earliest PUCCH of the plurality of PUCCHs. An earliest PUCCH of the plurality of PUCCHs may not overlap with a PUSCH in a time domain.

In an example, a wireless device may receive one or more radio resource control (RRC) messages. The one or more RRC messages may indicate a plurality of resource types of a plurality of symbols of plurality of slots. The plurality of resource types may comprise downlink, uplink and flexible. A symbol of the plurality of symbols may have a resource type of the plurality of resource types. The wireless device may receive a DCI comprising one or more resource assignments indicating a physical uplink shared channel (PUSCH) resource and a number of repetitions occurring over one or more slots of the plurality of slots. The DCI may comprise a number indicating a demodulation reference signal (DM-RS) bundling. The wireless device may determine a sequence of demodulation reference signal of one or more first PUSCHs. The wireless device may determine one or more first resources for the one or more first PUSCHs based on the one or more resource assignments and the number of DM-RS bundling. The wireless device may determine a resource of a PUSCH of the one or more first PUSCHs overlaps in time with a resource of a physical uplink control channel (PUCCH). In response to the determining and satisfying a condition, the wireless device may multiplex a UCI of the PUCCH via each of the one or more first PUSCHs. The wireless device may transmit the one or more first PUSCHs. Each PUSCH may comprise the sequence of demodulation reference signal and the UCI.

In an example, a wireless device may receive one or more radio resource control (RRC) messages. The RRC messages may indicate a slot format indicator (SFI) radio network temporary identifier (RNTI) for monitoring SFI downlink control information (DCI) for a cell. The RRC messages may indicate a configured grant configuration for the cell. The wireless device may determine a resource type of a first slot and a second slot as unknown in response to failing receiving a SFI-DCI indicating the resource type of the second slot and the second slot. The wireless device may determine to multiplex a UCI, of a physical layer uplink control channel (PUCCH) scheduled in the first slot of the cell, via a physical layer uplink shared control channel (PUSCH) scheduled in the first slot of the cell. the wireless device may determine to drop a second PUSCH scheduled in the second slot in response to the second PUSCH not overlapping with a second PUCCH in the second slot and the second PUSCH being scheduled based on the configured grant configuration.

In an example, a wireless device may receive DCI scheduling a plurality of physical uplink shared channels (PUSCHs) over a plurality of slots of a first cell based on a first subcarrier spacing. One or more first PUSCHs of the plurality of PUSCHs may be associated with a first group and one or more second PUSCHs of the plurality of PUSCHs may be associated with a second group. The wireless device may determine a resource of physical uplink control channel (PUCCH) in a second slot of a second cell. The second slot overlaps with the plurality of slots, the second slot may be based on a second subcarrier spacing and the PUCCH is associated with the first group. The wireless device may multiplex a UCI of the PUCCH via one or more first PUSCHs. The wireless device may drop the PUCCH and transmit the plurality of PUSCHs. The one or more first PUSCHs may comprise the UCI.

Figure 32:
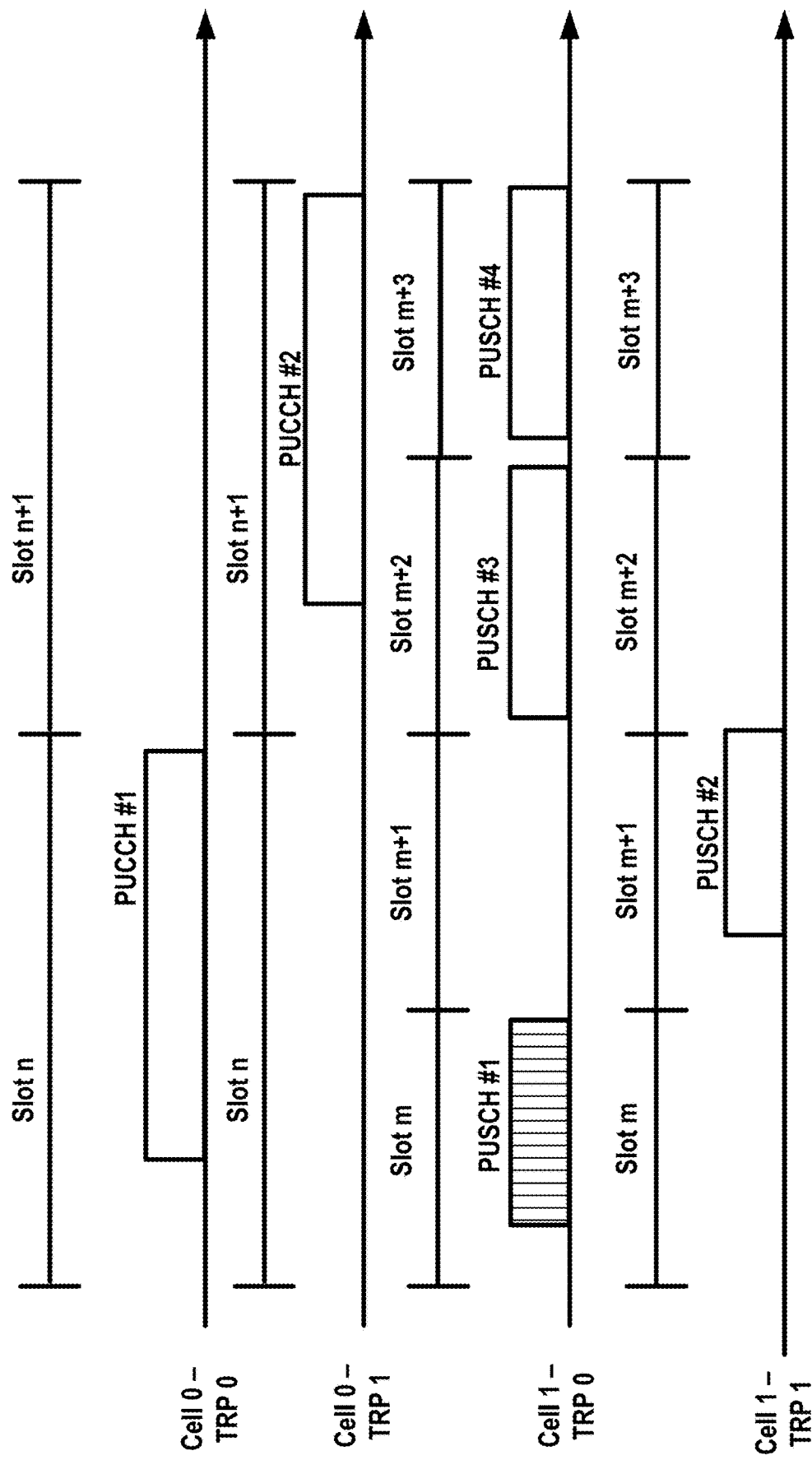
FIG. 32 illustrates an example repetition of a multiple TRPs/panels as per an aspect of an example embodiment of the present disclosure.

FIG. 32 illustrates an example of a multi-TRP scenario for a UCI piggyback as per as per an aspect of an example embodiment. The wireless device may determine one or more PUSCHs for a PUCCH for piggybacking a UCI of the PUCCH based on spatial domain filter parameter(s) of the one or more PUSCHs and/or a spatial domain filter parameter of the PUCCH.

In FIG. 32, the wireless device may determine to piggyback a first UCI of a first PUCCH via a first PUSCH in response to a spatial domain filter parameter of the first PUCCH being associated with a first spatial domain filter parameter of the first PUSCH (e.g., first TRP). The wireless device may determine not to piggyback the first UCI of the first PUCCH via a second PUSCH in response to a second spatial domain filter parameter being different from the first spatial domain filter parameter or the second spatial domain filter parameter being associated with the second TRP. The wireless device may determine not to piggyback a third UCI of a second PUCCH via a third PUSCH and a fourth PUSCH in response to the second PUCCH being associated with the first TPR (e.g., being scheduled via the first TRP) while the third PUSCH and the fourth PUSCH being associated with the second TRP (e.g., scheduled via the second TRP).

The wireless device may transmit the second PUCCH in response to determining not to multiplex. The wireless device may drop the third PUSCH and the fourth PUSCH. The wireless device may determine whether to drop the second PUCCH based on a first priority of the third PUCCH and a second priority of the third PUSCH and the fourth PUSCH. For example, when the first priority is higher than the second priority, the wireless device may drop the third PUSCH and the fourth PUSCH. If the first priority is lower than the second profit, the wireless device may drop the second PUCCH. When the first priority is same as the second priority, the wireless device may prioritize the second PUCCH and drop the third PUSCH and the fourth PUSCH.

In an example, a wireless device may be scheduled with a plurality of PUCCHs for a PUCCH repetition, where the wireless device may repeat a UCI transmission via each of the plurality of PUCCHs (if transmitted). The wireless device may be scheduled with a first PUSCH via a first cell, where the first PUSCH overlap with the plurality of PUCCHs.

The wireless device may be scheduled with second plurality of PUSCHs via a second cell, where the second plurality of PUSCHs overlap with the plurality of PUCCHs. The second plurality of PUSCHs may be scheduled with a PUSCH repetition. The second plurality of PUSCHs may be scheduled via one or more slots of the second cell.

For example, a first cell index of the first cell may be lower than a second cell index of the second cell.

The wireless device may determine whether to piggyback/multiple the UCI of the plurality of PUCCHs via one or more PUSCHs based on an earliest PUCCH (e.g., a first PUCH) of the plurality of PUCCHs and one or more parameters of the plurality of PUCCHs. For example, the one or more parameters may comprise a number of the PUCCH repetition. For example, the one or more parameters may comprise a PUCCH format of the PUCCH repetition/the plurality of PUCCHs. For example, the one or more parameters may comprise a bit size of the UCI via the plurality of PUCCHs.

The wireless device may determine that the first PUSCH overlaps with the first PUCCH of the plurality of PUCCHs.

The wireless device may determine a second PUSCH of the second plurality of PUSCHs overlap with the first PUCCH. The wireless device may determine the first PUSCH or the second PUSCH to piggyback the UCI in response to satisfying a condition based on the one or more parameters of the plurality of PUCCHs.

For example, the condition may be based on a number of repetition of a PUCCH repetition. The wireless device may determine the second PUSCH in response to a number of the plurality of PUSCHs being larger than or equal to a number of repetition K of the PUCCH repetition. The second PUSCH may be a first (an earliest) PUSCH of the second plurality of PUSCHs. The wireless device may determine the second PUSCH as the first PUSCH is not configured with a repetition.

For example, the condition may be based on a repetition scheme of the PUCCH repetition. For example, the wireless device may transmit the plurality of PUCCHs via a plurality of TRPs/panels/coreset pools/groups. For example, the plurality of PUCCHs may be associated/configured with a plurality of TCI states or a plurality of spatial domain filter parameters. The wireless device may transmit the plurality of PUCCHs via a TDM manner. The wireless device may transmit a PUCCH of the plurality of PUCCHs based on each TCI state of the plurality of TCI states or each spatial domain filter parameter of the plurality of spatial domain filter parameters. For example, a spatial domain filter parameter may be associated/configured with a SRS resource index (e.g., SRI) or a TCI state.

In the TDM manner, the wireless device may transmit a PUCCH based on a TCI state or a spatial domain filter parameter at a time. The wireless device may transmit the plurality of PUCCHs via a FDM manner. In the FDM manner, the wireless device may transmit a first PUCCH based on a first TCI state or a first spatial domain filter parameter via a first frequency resource and a second PUCCH based on a second TCI state or a second spatial domain filter parameter via a second frequency resource in a time. The wireless device may transmit the plurality of PUCCHs via a SDM manner. In the SDM manner, the wireless device may simultaneously transmit, via a same time/frequency resource, a first PUCCH based on a first TCI state or a first spatial domain filter parameter and a second PUCCH based on a second TCI state or a second spatial domain filter parameter.

The wireless device may determine a second PUSCH of the second plurality of PUSCHs in response to a repetition scheme of the PUSCH repetition being same as the repetition scheme of the PUCCH repetition. For example, the second plurality of PUSCHs may be configured with a TDM (or FDM or SDM) manner repetition and the plurality of PUCCHs may be configured with the TDM manner.

In an example, the condition may be based on one or more TCI states or spatial domain filter parameters or TRPs or panels configured/associated with the plurality of PUCCHs. For example, when the plurality of PUCCHs are configured to be transmitted via a single TRP (e.g., a single TCI state) or a single panel, the wireless device may piggyback the UCI of the plurality of PUCCHs via the first PUSCH or the second PUSCH. For example, the plurality of PUCCHs are configured to be transmitted via a plurality of TRPs (e.g., a plurality of TCI state) or a multiple panels, the wireless device may determine the second PUSCH in response to the second plurality of PUSCHs being configured to be transmitted via the plurality of TRPs or the multiple panels.

In an example, the condition may be based on a number of the PUCCH repetition and one or more TCI states or spatial domain filter parameters or TRPs or panels configured/associated with the plurality of PUCCHs. The condition may be based on a combination of examples listed above (e.g., combination of one or more of a number of repetition, a repetition mechanism, one or more TRPs/panels/TCI states).

In an example, the wireless device may be scheduled with a third plurality of PUSCHs via a third cell, where an earliest PUSCH (e.g., a third PUSCH) of the plurality of PUSCHs overlaps with the first PUCCH of the plurality of PUCCHs and the third plurality of PUSCHs satisfies the condition. When the wireless device may have a plurality of PUSCHs satisfying the condition, the wireless device may determine a PUSCH of the plurality of PUSCHs via a lowest cell indexed cell.

Figure 33:
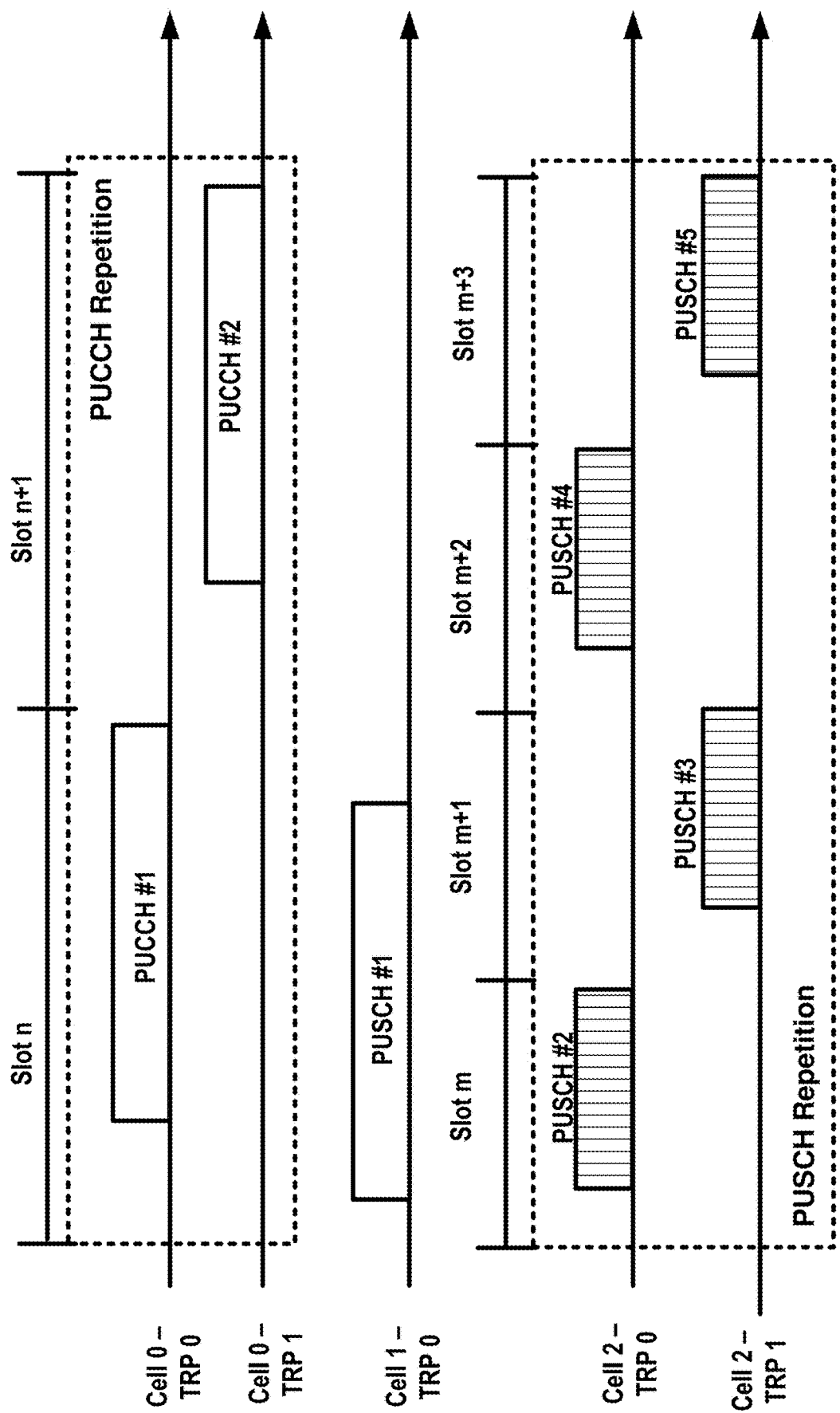
FIG. 33 illustrates an example repetition of a multiple TRPs/panels as per an aspect of an example embodiment of the present disclosure.

FIG. 33 illustrates an example of a UCI piggyback determination as per as per an aspect of an example embodiment. In FIG. 33, the wireless device is configured with three serving cells comprising a first cell (Cell 0), a second cell (Cell 1) and a third cell (Cell 2). The wireless device is configured with a plurality of TRPs comprising a first TRP (TRP 0) and a second TRP (TRP 1). A TRP may be represented as a coreset pool, a TCI state group, a group of TCI states, a group of spatial domain filter parameters, a group of SRS resources, a SRI group, and/or like. The first cell is associated with the first TRP and the second TRP. The wireless device is configured with PUCCH resources via the first cell. The wireless device may be configured with a PUCCH repetition via the first cell. A number of repetitions for the PUCCH repetition may be configured via a RRC signaling and/or a DCI indication. For example, the wireless device may receive one or more RRC messages indicating configuration parameters. The configuration parameters may comprise a maximum number of repetitions for a PUCCH repetition. A DCI, comprising downlink resource assignment, may indicate a number of repetitions that is smaller than or equal to the maximum number of repetitions. The wireless device may determine a number of repetitions based on the configuration parameters and/or downlink scheduling DCIs.

The wireless device may perform a PUCCH repetition across a plurality of slots of the first cell. the wireless device may determine a same set of OFDM symbols in each slot of the plurality of slots for a plurality of PUCCHs. The set of OFDM symbols may be indicated via configuration parameters. The configuration parameters may comprise/indicate a repetition mechanism across the plurality of TRPs. For example, the repetition mechanism may be one of TDM, FDM and SDM. The configuration parameters may comprise/indicate one or more TCI states or one or more SRIs or one or more spatial domain filter parameters associated with each TRP for transmitting a PUCCH via the each TRP.

The base station may indicate, via MAC CE and/or a DCI signaling, a TCI state of the one or more TCI states or a SRI of the one or more SRIs or one spatial domain filter parameter of the one or more spatial domain filter parameters of the PUCCH transmission via the ach TRP. For example, a MAC CE and/or a DCI may indicate one of the one or more TCI states or the one or more SRIs or the one or more spatial domain filter parameters.

For example, a first MAC CE and/or a first DCI may indicate a first one of one or more first TCI states, one or more first SRIs, or one or more first spatial domain filter parameters for the first TRP. The first MAC CE and/or the first DCI may indicate a second one of one or more second TCI states, one or more second SRIs, or one or more second spatial domain filter parameters for the second TRP. The one or more first TCI states, the one or more first SRIs or the one or more first spatial domain filter parameters may be associated/configured for the first TRP. The one or more second TCI states, the one or more second SRIs or the one or more second spatial domain filter parameters may be associated/configured for the second TRP.

In an example, a first MAC CE and/or a first DCI may indicate first one of the one or more TCI states, the one or more SRIs, or the one or more first spatial domain filter parameters for the first TRP (e.g., one TCI state, or one SRI or one spatial domain filter parameter). A second MAC CE and/or a second DCI may indicate second one of the one or more second TCI states, the one or more second SRIs, or the one or more second spatial domain filter parameters. The second MAC CE may be different form the first MAC Ce. The second DCI may be different from the first DCI.

FIG. 33 shows a first PUCCH (PUCCH #1) and a second PUCCH (PUCCH #2) are scheduled for a PUCCH repetition for a UCI. The wireless device may transmit the UCI via the first PUCCH and repeat the UCI via the second PUCCH if the wireless device transmits the first PUCCH and the second PUCCH. The first PUCCH is scheduled in slot n and the second PUCCH is scheduled in slot n+1.

The wireless device is scheduled with a first PUSCH (PUSCH #1) via the second cell. The first PUSCH is scheduled without a repetition (e.g., a repetition number K=1). The second cell may have a same numerology to the first cell. The first PUSCH is scheduled in the slot n.

The wireless device is scheduled with a PUSCH repetition comprising a plurality of PUSCHs of a second PUSCH (PUCH #2), a third PUSCH (PUSCH #3), a fourth PUSCH (PUSCH #4) and a fifth PUSCH (PUSCH #5). The PUSCH repetition may be scheduled based on a TypeA repetition (or a PUSCH mapping Type A). The PUSCH repetition may be scheduled based on TypeB repetition (or a PUSCH mapping Type B). A PUSCH of the plurality of PUSCHs may refer an actual PUSCH based on the PUSCH mapping Type B. A PUSCH of the plurality of PUSCHs may refer an nominal PUSCH based on the PUSCH mapping Type B. A PUSCH may be an uplink channel/signal of the plurality of PUSCHs in each slot based on the PUSCH mapping TypeA.

The PUSCH repetition is configured to be transmitted via the first TRP and the second TRP based on a TDM mechanism. The second PUSCH is scheduled in slot m. The third PUSCH is scheduled in slot m+1. The fourth PUSCH is scheduled in slot m+2 and the fifth PUSCH is scheduled in slot m+3. A second numerology of the third cell may be different from the numerology of the first cell. The third cell may have two slots per one slot of the first cell.

The wireless device may determine to multiplex/piggyback the UCI of the plurality of PUCCHs via one or more PUSCHs based on a first PUCCH (e.g., an earliest PUCCH, or an earliest PUCCH that overlaps with a PUSCH) of the plurality of PUCCHs and one or more parameters of the PUCCH repetition.

For example, the wireless device may determine one or more overlapping PUSCHs that overlap with the first PUCCH. In FIG. 33, the first PUSCH, the second PUSCH and the third PUSCH are the one or more overlapping PUSCHs. The wireless device may determine whether each PUSCH of the one or more overlapping PUSCHs satisfies one or more piggyback conditions. For example, the one or more piggyback conditions may comprise a set of condition, where each condition of the set of condition may be determined based on a parameter of the one or parameters of the PUCCH repetition.

For example, the one or more piggyback conditions may comprise a first condition and a second condition. The first condition may be that a number of repetition for a PUSCH being larger than or equal to a number of the PUCCH repetition. The second condition may be that one or more first TRPs associated with the PUSCH or a PUSCH repetition comprising the PUSCH being same to one or more second TRPs associated with the PUCCH repetition. The first condition may be that a number of repetition for the PUSCH being larger than one in response to the PUCCH repetition being configured. When the PUCCH is transmitted without a repetition (e.g., K=1), the first condition may be satisfied based on that the repetition for the PUSCH may be one. The second condition may be that a first repetition mechanism (e.g., TDM, SDM, FDM) of the PUSCH repetition comprising the PUSCH being equal to a second repetition mechanism of the PUCCH repetition. The first condition may be receiving an uplink grant for the PUSCH, where the uplink grant indicates 'UCI piggyback'. When the uplink grant indicates to piggyback/multiplex the UCI, the wireless device may multiplex/piggyback the UCI based on satisfying the one or more piggyback conditions.

A base station may transmit one or more RRC messages indicating/comprising configuration parameters. The configuration parameters may indicate/comprise the one or more piggyback conditions and/or the first condition and/or the second condition. For example, the one or more piggyback conditions may be determined based on a parameter of the configuration parameters. For example, when the configuration parameters indicates 'multiplex PUCCH repetition' (e.g., multiplexing of UCI of a PUCCH repetition to a PUSCH is enabled), the wireless device may determine a PUSCH, regardless a repetition or regardless of the one or more parameters of the PUCCH repetition, for multiplexing/piggybacking the UCI.

In FIG. 33, the wireless device may determine the second PUSCH satisfies the one or more piggyback conditions. For example, the one or more piggyback conditions may be based on a PUSCH repetition comprising the second PUSCH being scheduled via the first TRP and the second TRP. For example, the one or more piggyback conditions may be based on a PUSCH repetition comprising the second PUSCH being scheduled via the first TRP and the second TRP based on a TDM manner. For example, the one or more piggyback conditions may be based on a PUSCH repetition comprising the second PUSCH having a repetition number K=4 larger than 2 (a repetition number of the PUCCH repetition).

The wireless device may determine the third PUSCH satisfies the one or more piggyback conditions. The wireless device may determine to piggyback the UCI of the PUCCH repetition via the second PUSCH based on the second PUSCH is an earliest of the second PUSCH and the third PUSCH.

The wireless device may determine the second PUSCH and the third PUSCH to piggyback the UCI as both satisfy the one or more piggyback conditions. The wireless device may piggyback/multiplex the UCI via the second PUSCH. The wireless device may piggyback/multiplex the UCI via the third PUSCH. The wireless device may drop the plurality of PUCCHs in response to the piggybacking. The wireless device may transmit the plurality of PUSCHs and the first PUSCH.

The wireless device may determine the plurality of PUSCHs comprising the second PUSCH or the third PUSCH to piggyback the UCI. The wireless device may multiplex/piggyback the UCI via each of the plurality of PUSCHs. The wireless device may drop the plurality of PUCCHs. The wireless device may transmit the plurality of PUSCHs and the first PUSCH.

For example, the first PUSCH may satisfy the one or more piggyback conditions. The second PUSCH may satisfy the one or more piggyback conditions. The wireless device may determine the first PUSCH with a lower cell index.

In an example, the wireless device may determine whether an earliest PUSCH (of a PUSCH repetition, e.g., a first PUSCH of a plurality of PUSCHs) satisfies one or more piggyback conditions to piggyback a UCI of a PUCCH repetition. For example, the one or more piggyback conditions may comprise that a delay between a last PDSCH where the UCI carries HARQ-ACK bit(s) corresponding to the last PDSCH and a first symbol of the earliest PUSCH is larger than or equal to a processing time capability of the wireless device. The one or more piggyback conditions may (additionally) comprise that the earliest PUSCH overlaps with an earliest PUCCH of the PUCCH repetition (e.g., a first PUCCH of a plurality of PUCCHs, or an earliest PUSCH of the PUCCH repetition, which overlaps with a PUSCH of the PUCCH repetition). The one or more piggyback conditions may (additionally) comprise that a first number of repetitions of the PUSCH repetition is larger than or equal to a number. The number may be a repetition number of the PUCCH repetition. The number may be configured by a RRC signaling. The number may be predetermined (e.g., 2). The number may be determined based on a repetition number of the PUCCH repetition (e.g., K/2, where K is the repetition number of the PUCCH repetition). The one or more piggyback conditions may (additionally) comprise that one or more first TRPs of the PUSCH repetition comprise one or more second TRPs of the PUCCH repetition. The one or more piggyback conditions may (additionally) comprise that a repetition mechanism across multiple TRPs of the PUSCH repetition (e.g., TDM, SDM, or FDM) may be same as a second repetition mechanism across multiple TRPs of the PUCCH repetition.

In an example, the wireless device may determine whether a PUSCH of a PUSCH repetition, (e.g., a first PUSCH of a plurality of PUSCHs) satisfies one or more piggyback conditions to piggyback a UCI of a PUCCH repetition. The PUSCH may be an earliest PUSCH or any PUSCH of the PUSCH repetition. In response to determining the PUSCH satisfying the one or more piggyback conditions, the wireless device may piggyback the UCI via one or more PUSCHs comprising the PUSCH. The one or more PUSCHs may comprise a PUSCH, of a plurality of PUSCHs of the PUSCH repetition, occurring after the PUSCH (e.g., successive PUSCHs(s) since the PUSCH from the plurality of PUSCHs of the PUSCH repetition). The wireless device may drop the PUCCH repetition. The wireless device may transmit the plurality of PUSCHs where the one or more PUSCHs comprise the UCI and one or more second PUSCHs of the plurality of PUSCHs may not comprise the UCI. The plurality of PUSCHs comprise the one or more PUSCHs and the one or more second PUSCHs.

In an example, a base station may transmit one or more RRC messages indicating configuration parameters. The configuration parameters may comprise/indicate a mechanism of a UCI determination mechanism. For example, the UCI determination mechanism may be applied for determining whether to piggyback a UCI via one or more PUSCHs when one or more PUCCHs of a plurality of PUCCHs of a PUCCH repetition overlap with the one or more PUSCHs. For example, the UCI determination mechanism may be applied for a PUCCH without a repetition.

An example of the UCI determination mechanism is the following. First, the wireless device may determine one or more PUSCHs via one or more serving cells overlapping with a first PUSCH (e.g., an earliest PUCCH, or an earliest PUCCH that overlaps with a PUSCH in time) of a plurality of PUCCHs of a PUCCH repetition. Second, the wireless device may select a PUSCH of the one or more PUSCHs based on a rule. For example, the rule is based on a lowest serving cell index. The wireless device may determine a PUSCH of the one or more PUSCHs with a lowest serving cell index. For example, the rule is based on a timing. The wireless device may determine a PUSCH of the one or more PUSCHs, which occurs at earliest (e.g., the PUSCH occurs earliest among the one or more PUSCHs). The wireless device may determine a PUSCH of the one or more PUSCHs, which occurs at latest (e.g., the PUSCH occurs latest among the one or more PUSCHs).

For example, the rule is based on a number of repetition. The wireless device may determine a PUSCH of the one or more PUSCHs, which is configured/associated with a largest repetition number (e.g., the PUSCH is part of a PUSCH repetition with a largest repetition number). For example, the rule is based on a grant type scheduling PUSCH. The wireless device may determine a PUSCH of the one or more PUSCHs, where the PUSCH is scheduled via a DCI (e.g., UL grant). For example, the rule is based on a number of TRPs/panels associated with a PUSCH repetition comprising a PUSCH. The wireless device may determine a PUSCH of a PUSCH repetition associated with multiple TRP/panels.

In an example, one or more piggyback conditions for determining a PUSCH to piggyback/multiplex a UCI of a PUCCH may comprise a UL grant scheduling the PUSCH. When the PUSCH is scheduled via a configured grant configuration, the base station may indicate whether to support a UCI multiplexing via the configured grant configuration or not via a RRC signaling.

An example of the UCI determination mechanism is the following. First, the wireless device may determine one or more overlapping PUSCHs via one or more serving cells overlapping with a first PUSCH (e.g., an earliest PUCCH) of a plurality of PUCCHs of a PUCCH repetition. Second, the wireless device may determine one or more PUSCHs of the one or more overlapping PUSCHs, wherein the one or more PUSCHs satisfy one or more cases. Third, the wireless device may select a PUSCH of the one or more PUSCHs based on the rule mentioned in above. The one or more cases may be determined based on the one or more piggyback conditions mentioned in the specifications.

In an example, a wireless device may schedule (e.g., based on an uplink grant or a configured grant) a PUSCH in a slot n. The wireless device may schedule a PUCCH (e.g., based on a downlink scheduling DCI or a (semi-persistent) CSI feedback) in the slot n. The PUSCH may overlap with the PUCCH at least over one OFDM symbol. The wireless device may determine whether to piggyback or multiplex UCI of the PUCCH via the PUSCH based on one or more piggyback conditions. The wireless device may transmit the PUSCH with multiplexed UCI and may drop the PUCCH in response to the one or more conditions being met. Otherwise, the wireless device may transmit the PUCCH and drop the PUSCH.

For example, the one or more piggyback conditions may comprise that a first OFDM symbol of the PUCCH or the PUSCH may occur after $(N_1+d_{1,1}+1)\cdot(2048+144)\cdot\kappa\cdot 2^{-\mu}\cdot T_C$ of a last PDSCH. For example, the last PDSCH may refer a PDSCH, occurring latest, of one or more PDSCHs for HARQ-ACK feedbacks, where the UCI of the PUCCH comprises the HARQ-ACK feedbacks of the one or more PDSCHs. The last PDSCH may refer a last PDSCH of the one or more PDSCHs. For example, $N_1$ may be determined based on a UE processing capability for PDSCH reception. For example, u is a subcarrier spacing of the PDSCH. For example, d1,1 is an offset value. $(2048+144) \cdot \kappa \cdot 2^{-\mu} \cdot T_C$ may represent a time of an OFDM symbol based on the subcarrier spacing.

For example, the one or more piggyback conditions may comprise that a first OFDM symbol of the PUSCH or the PUCCH may be $T_{proc,release}^{mux}$ after a last symbol of a SPS PDSCH release or a DCI format 1_1 indicating SCell dormancy indication. For example, $T_{proc,release}^{mux}$ may represent a minimum processing time for a SPS PDSCH release or a SCell dormancy indication based on a DCI format 1_1.

For example, the one or more piggyback conditions may comprise that the PUSCH may be one of a plurality of PUSCHs of a PUSCH repetition in response to the PUCCH being one of a plurality of PUCCHs of a PUCCH repetition. The PUSCH may be an earliest/a first PUSCH of the plurality of PUSCHs. The PUCCH may be an earliest/a first PUCCH of the plurality of PUCCHs.

For example, the one or more piggyback conditions may comprise that the PUSCH may be one of a plurality of PUSCHs of a PUSCH repetition associated with one or more first TRPs/panels. The one or more first TRPs/panels may comprise one or more second TRPs/panels associated with one or more PUCCHs of a PUCCH repetition, where the one or more PUCCHs comprise the PUCCH.

In an example, the wireless device may schedule a second PUSCH in the slot, where the second PUSCH may satisfy the one or more piggyback conditions and may overlap with the PUCCH. In the example, the PUSCH may satisfy the one or more piggyback conditions. The wireless device may determine the PUSCH or the second PUSCH for multiplexing the UCI based on a serving cell index. For example, the PUSCH may be scheduled for a first cell with a first serving cell index. The second PUSCH may be scheduled for a second cell with a second serving cell index. The wireless device may determine the PUSCH in response to the first serving cell index being smaller than the second serving cell index. For example, the wireless device may determine a target PUSCH for multiplexing the UCI, between the PUSCH and the second PUSCH, where the target PUSCH may be scheduled via an UL grant. For example, the wireless device may determine the second PUSCH in response to the second PUSCH being scheduled by an uplink grant and the PUSCH being scheduled by a configured grant. The wireless device may prioritize or select first PUSCHs scheduled dynamically based on UL grant(s) and may determine a lowest cell index PUSCH if the first PUSCHs are more than one.

In an example, the PUSCH may be an earliest actual repetition of one or more PUSCH repetitions, wherein the one or more PUSCH repetitions in a slot may overlap with the PUCCH. For example, the wireless device may determine the slot based on a subcarrier spacing of the one or more PUSCH repetitions.

In an example, when the PUSCH may be based on a configured grant configuration, the wireless device may multiplex the UCI to the PUSCH when cg-CG-UCI-Multiplexing is enabled or configured. Otherwise, the wireless device may not transmit the PUSCH and may transmit the PUCCH.

In an example, a wireless device may receive a DCI comprising/indicating uplink resource(s) of one or more PUSCHs. The DCI may comprise/indicate a beta offset (beta_offset). The wireless device may determine a number of resource element used for multiplexing a UCI via a PUSCH of the one or more PUSCHs based on the beta offset.

In an example, the one or more PUSCHs may be a PUSCH repetition based on TypeB repetition (e.g., a TypeB PUSCH mapping). The wireless device may determine an actual PUSCH of a nominal PUSCH of the one or more PUSCHs for multiplexing the UCI, in response to the actual PUSCH overlapping with a PUCCH scheduled for the UCI.

A resource of the actual PUSCH may be smaller than a resource of the nominal PUSCH. For example, the actual PUSCH may be transmitted with smaller number of OFDM symbols than that of the nominal PUSCH.

In existing technologies, the wireless device may determine the number of resource element for the UCI based on a number of symbols of the nominal PUSCH. The wireless device may map the UCI via the number of resource element of the actual PUSCH. An effective ratio between the number of resource element compared to a total number of resource element of the actual PUSCH may be larger than a ratio between the number of resource element compared to a second total number of resource element of the nominal PUSCH.

In an example, a wireless device may be scheduled with a plurality of PUCCHs. The wireless device may be scheduled with one or more PUSCHs overlapping with the plurality of PUCCHs in time domain. In existing technologies, the wireless device may drop the plurality of PUCCHs or the one or more PUSCHs. Based on existing technologies, when the plurality of PUCCHs comprise a first PUCCH associated with a first TRP and a second PUCCH associated with a second TRP, the wireless device may drop the one or more PUSCHs that may overlap with the first PUCCH or the second PUCCH.

The plurality of PUCCHs may be transmitted via a plurality of TRPs for a spatial diversity. Avoiding UCI multiplexing of the plurality of PUCCHs associated with the plurality of TRPs may be inefficient. The one or more PUSCHs overlapping with either the first PUCCH or the second PUCCH may be dropped. A UCI via the plurality of PUCCHs, for example, with a low priority, may be dropped when the plurality of PUCCHs may overlap with one or more second PUSCHs with a high priority.

Enhancements of UCI multiplexing when a plurality of PUCCHs associated with a plurality of TRPs and one or more PUSCHs are needed.

In an example, a wireless device may determine to multiplex a UCI of a plurality of PUCCHs, comprising a first TRP associated with a first TRP and a second TRP associated with a second TRP, to one or more PUSCHs in response to the one or more PUSCHs overlapping with the first PUCCH or the second PUCCH and a number of repetition of the plurality of PUCCHs being two (e.g., the plurality of PUCCHs are the first PUCCH and the second PUCCH). The wireless device may determine to multiplex a first UCI of the first PUCCH via one or more first PUSCHs in response to the first PUSCHs overlapping with the first PUCCH. In the example, the one or more first PUSCHs may be associated with the first TRP. The wireless device may determine one or more second PUSCHs overlapping with the second PUCCH. In response to the determining, the wireless device may multiplex a second UCI of the second PUCCH via the one or more second PUSCHs. Otherwise, the wireless device may transmit the second PUCCH.

In an example, a DCI may schedule the one or more first PUSCHs and the one or more second PUSCHs. The DCI may indicate a single beta offset. A number of symbols of the one or more first PUSCHs may be different from a second number of symbols of the one or more second PUSCHs. For example, the one or more first PUSCHs may be one or more actual first PUSCHs. For example, the one or more second PUSCHs may be one or more actual second PUSCHs. The DCI may schedule one or more nominal PUSCHs comprising the one or more first PUSCHs and the one or more second PUSCHs (e.g., the one or more actual first PUSCHs and the one or more actual second PUSCHs). The wireless device may determine a first beta offset for the one or more first actual PUSCHs based on the single beta offset. The wireless device may determine the first beta offset for the one or more first actual PUSCHs based on the single beta offset and a first number of the one or more first actual PUSCHs. The wireless device may determine a second beta offset for the one or more second actual PUSCHs based on the single beta offset. The wireless device may determine the second beta offset for the one or more second actual PUSCHs based on the single beta offset and a second number of the one or more second actual PUSCHs.

Embodiments may enhance reliability of a UCI transmission via a multiplexing to one or more PUSCHs for each PUCCH of a plurality of PUCCHs. Embodiments may reduce dropping of PUSCHs in response to overlapping with a plurality of PUCCHs. Embodiments may determine a beta offset for each PUSCH for multiplexing a UCI of a PUCCH of the plurality of PUCCHs, based on a repetition number corresponding for PUSCH(s) comprising the each PUSCH.

In an example, a wireless device may be scheduled with a plurality of PUCCHs. The wireless device may be scheduled with a plurality of PUSCHs that overlap with the plurality of PUCCHs. For example, the plurality of PUCCHs may comprise a first PUCCH and a second PUCCH. The first PUCCH may be associated with a first TRP or a first coreset pool or a first panel or a first group. The second PUCCH may be associated with a second TRP or a second coreset pool or a second panel or a second group. The wireless device may determine one or more first PUSCHs of the plurality of PUSCHs in response to the one or more PUSCHs overlapping with the first PUCCH. The wireless device may determine one or more second PUSCHs of the plurality of PUSCHs in response to the one or more second PUSCHs overlapping with the second PUCCH. The wireless device may determine the one or more second PUSCHs in response to the plurality of PUCCHs being associated with a plurality of TRPs/panels/coreset pools/groups.

The wireless device may determine the one or more first PUSCHs that overlap with the first PUCCH, where the one or more first PUSCHs may be overlap with the first PUCCH via one or more slots. The one or more slots may be determined based on a numerology of the one or more first PUSCHs. The one or more first PUSCHs may belong to a plurality of PUSCHs of a PUSCH repetition. A first number may represent a number of the one or more first PUSCHs. A second number may represent a number of the one or more seconds PUSCHs. The wireless device may determine the one or more second PUSCHs via one or more second slots. The one or more second slots may be determined based on a numerology of the one or more second PUSCHs. The one or more second PUSCHs may belong to the plurality of PUSCHs of the PUSCH repetition.

The first number may be different from the second number. The DCI may indicate a beta offset. The wireless device may determine a first beta offset based on the beta offset and the first number. The wireless device may determine a second beta offset based on the beta offset and the second number. Embodiments may allow to determine different beta offset for the one or more first PUSCHs from the one or more second PUSCHs in response to the first number being different from the second number.

Figure 34:
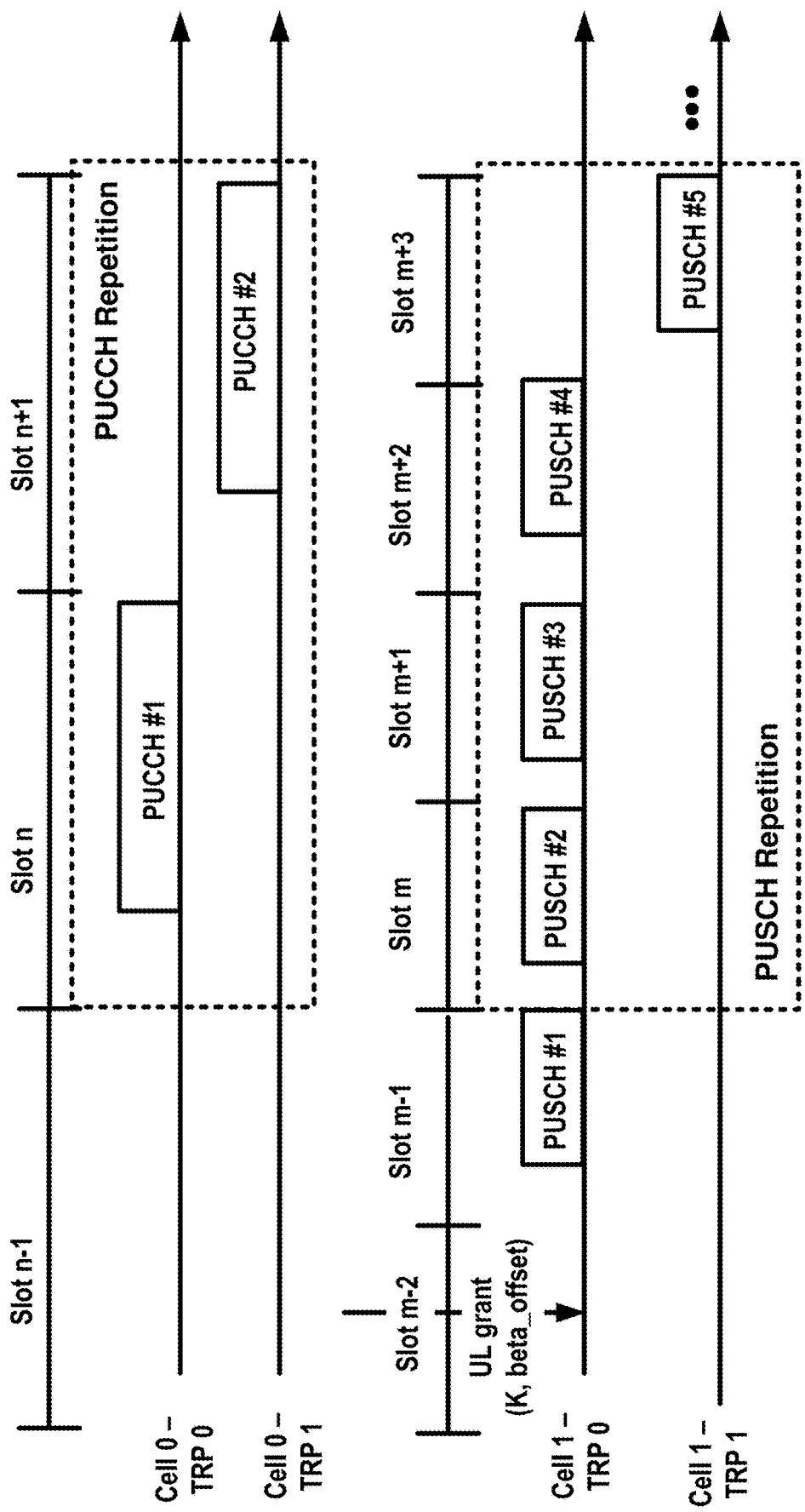
FIG. 34 illustrates an example repetition of a multiple TRPs/panels as per an aspect of an example embodiment of the present disclosure.

FIG. 34 illustrates an example diagram as per an aspect of an example embodiment of the present disclosure. The wireless device may be configured with two serving cells of a first cell (Cell 0) and a second cell (Cell 1). Each cell may be configured with a first TRP (TRP 0) and a second TPR (TRP 1). In an example, a TPR may be indicated with a coreset pool (e.g., TRP 0 is a coreset pool with a coreset pool index 0, and TRP 1 is a coreset pool with a coreset pool index 1). The first cell may operate with a first numerology. The second cell may operate with a second numerology. Based on the first numerology, the wireless device is scheduled with a plurality of PUCCHs comprising a first PUCCH (PUCCH #1) and a second PUCCH (PUCCH #2) via a slot n and slot n+1. The first PUCCH is scheduled via the first TRP. The second PUCCH is scheduled via the second TRP. The wireless device may repeat a UCI via the first PUCCH and the second PUCCH.

The wireless device is scheduled with a PUSCH repetition of a repetition number K=8. For example, the wireless device is scheduled with a plurality of PUSCHs based on a TypeA repetition (e.g., TypeA PUSCH mapping type) with K=8. First four PUSCHs of the plurality of PUSCHs are scheduled via the first TRP (e.g., a first PUSCH to a fourth PUSCH, PUSCH #1 . . . . PUSCH #4). Next four PUSCHs of the plurality of PUSCHs are scheduled via the second TRP (e.g., a fifth PUSCH to an eight PUSCH, PUSCH #5 . . . . PUSCH #8).

The first PUSCH is scheduled at a slot m−1 based on the second numerology. The wireless device may determine a second PUSCH (PUSCH #2) and a third PUSCH (PUSCH #3) overlap with the first PUCCH. The wireless device may determine the fifth PUSCH (PUSCH #5) overlaps with the second PUCCH. The fourth PUSCH (PUSCH #4) overlaps with the second PUCCH. The wireless device may not count the fourth PUSCH as the fourth PUSCH being scheduled via the first TRP while the second PUCCH being scheduled via the second TRP.

The wireless device may determine the second PUSCH and the third PUSCH to multiplex a first UCI of the first PUCCH. The wireless device may determine the fifth PUSCH to multiplex a second UCI of the second PUCCH. The second UCI may be a repetition of the first UCI.

The wireless device may receive an uplink grant (UL grant) at a slot m=2. The uplink grant may schedule the plurality of PUSCHs (e.g., K=8). The uplink grant may comprise a beta offset. The wireless device may determine a first beta offset for the second PUSCH and the third PUSCH based on the beta offset and a first number. The first number may represent a number of repetitions/slots/PUSCHs, associated with the first TRP, overlapping in time with the first PUCCH. The wireless device may determine the first beta offset as the beta offset divided by the first number. The wireless device may determine a second number for the fifth PUSCH. The second number may represent a number of repetitions/slots/PUSCHs, associated with the second TRP, overlapping with the second TRP. The wireless device may determine a second beta offset for the fifth PUSCH based on the beta offset and the second number. The wireless device may determine the second beta offset that the beta offset is divided by the second number.

In an example, the wireless device may determine a first PUSCH, of the plurality of PUSCHs, overlapping with the first PUCCH. The wireless device may multiplex/piggyback the first UCI of the first PUCCH via the first PUSCH. The wireless device may determine a second PUSCH, of the plurality of PUSCHs, overlapping with the second PUCCH. The wireless device may multiplex/piggyback the second UCI of the second PUCCH via the second PUSCH. The wireless device may multiplex a UCI of a PUCCH via at most one PUSCH. The wireless device may determine a first beta offset being same as the beta offset for the first PUSCH. The wireless device may determine a second beta offset being same as the beta offset for the second PUSCH.

In an example, a wireless device may be scheduled with a plurality of PUCCHs comprising a first PUCCH via a first TRP and a second PUCCH via a second TRP. The wireless device may determine no scheduled PUSCH overlapping with the first PUCCH. The wireless device may check one or more PUSCHs scheduled via the first TRP for the determining no scheduled PUSCH overlapping with the first PUCCH. The wireless device may check one or more second PUSCH scheduled via the first TRP and/or the second TRP for the determining no scheduled PUSCH overlapping with the first PUCCH. The wireless device may determine a second PUSCH overlapping with the second PUCCH. For example, the second PUSCH may be scheduled via the second TRP. The second PUSCH may be scheduled via the first TRP. In response to any PUSCH overlapping with any of the first PUCCH or the second PUCCH, the wireless device may determine to multiplex a UCI, of the plurality of PUCCHs, via the any PUSCH (e.g., the second PUSCH). The wireless device may drop the plurality of PUCCHs comprising the first PUCCH and the second PUCCH.

In an example, a wireless device may be scheduled with a plurality of PUCCHs comprising a first PUCCH via a first TRP and a second PUCCH via a second TRP. The wireless device may determine no scheduled PUSCH overlapping with the first PUCCH. The wireless device may determine a second PUSCH overlapping with the second PUCCH. In response to no scheduling PUSCH being overlapped with the first PUCCH, the wireless device may transmit the first PUCCH. In response to overlapping with the second PUSCH, the wireless device may drop the second PUCCH.

In an example, a wireless device may be scheduled with a plurality of PUCCHs comprising a first PUCCH via a first TRP and a second PUCCH via a second TRP. The first TRP may occur before the second TRP. The wireless device may determine no scheduled PUSCH overlapping with the first PUCCH. The wireless device may determine a second PUSCH overlapping with the second PUCCH. In response to no scheduling PUSCH being overlapped with the first PUCCH, the wireless device may transmit the first PUCCH and the second PUCCH. The wireless device may drop the second PUSCH. In response to no scheduling PUSCH being overlapped with the first PUCCH, the wireless device may determine whether to transmit the plurality of PUCCHs or the second PUSCH (e.g., based on a rule).

In an example, a wireless device may be scheduled with a plurality of PUCCHs comprising a first PUCCH via a first TRP and a second PUCCH via a second TRP. The first TRP may occur before the second TRP. The wireless device may determine a first PUSCH overlapping with the first PUCCH. The wireless device may determine a second PUSCH overlapping with the second PUCCH.

In response to determining at least one first PUSCH overlapping with the first PUCCH and at least one second PUSCH overlapping with the second PUCCH, the wireless device may multiplex a first UCI of the first PUCCH via the at least one first PUSCH and multiplex a second UCI of the second PUCCH via the at least one second PUSCH. For example, a DCI may schedule the at least one first PUSCH and the at least one second PUSCH. The DCI may comprise/indicate a beta offset. In response to the at least one first PUSCH and the at least one second PUSCH, the wireless device may determine a first beta offset being equal to the beta offset and may determine a second beta offset being equal to the beta offset. The first beta offset may be used for the at least one first PUSCH. The second beta offset may be used for the at least one second PUSCH.

In an example, a wireless device may be scheduled with a plurality of PUCCHs comprising a first PUCCH via a first TRP and a second PUCCH via a second TRP. The first TRP may occur before the second TRP. The wireless device may determine a first PUSCH overlapping with the first PUCCH. The wireless device may determine no PUSCH overlapping with the second PUCCH.

In response to determining at least one first PUSCH overlapping with the first PUCCH and no PUSCH overlapping with the second PUCCH, the wireless device may multiplex a first UCI of the first PUCCH via the at least one first PUSCH. The wireless device may drop the first PUCCH and the second PUCCH.

For example, a DCI may schedule the at least one first PUSCH. The DCI may comprise/indicate a beta offset. In response to the at least one first PUSCH and no PUSCH overlapping with the second PUSCH, the wireless device may determine a first beta offset being K times of the beta offset (e.g., K=2). The first beta offset may be used for the at least one first PUSCH.

In an example, a base station may transmit an uplink grant comprising/indicating one or more resources of one or more PUSCHs and a beta offset. A wireless device may determine one or more second PUSCHs of the one or more PUSCHs for multiplexing/piggybacking a UCI of a PUCCH. The PUCCH may overlap with the one or more PUSCHs.

In an example, the base station may transmit one or more RRC messages comprising/indicating configuration parameters. The configuration parameters may comprise/indicate one or more beta offset values. One of the one or more beta offset values may be indicated by an uplink grant.

For example, the configuration parameters may indicate/comprise a semi-static method for determining beta offset value(s) for a UCI of HARQ-ACK feedback and/or CSI feedback. Based on the semi-static method, the configuration parameters may indicate/comprise a HARQ-ACK beta offset ($\beta_{offset}^{HARQ-ACK}$), a first CSI beta offset for a CSI part 1 ($\beta_{offset}^{CSI-1}$), and a second CSI beta offset for a CSI part 2 ($\beta_{offset}^{CSI-2}$). Each value may correspond to HARQ-ACK feedback, Part-1 CSI report and Part-2 CSI report respectively.

When a PUSCH transmission is determined based on a configured grant configuration, and the configuration parameters may indicate a CG-UCI-onPUSCH as 'semi-static', the wireless device may apply/determine/use the HARQ-ACK beta offset, the first CSI beta offset, and the second CSI beta offset, configured via the configuration parameters, for HARQ-ACK information, Part 1 CSI reports and Part 2 CSI reports multiplexed via the PUSCH transmission respectively.

The configuration parameters may indicate/comprise a CG-UCI-onPUSCH='dynamic'. The wireless device may determine beta offset value(s) for a HARQ-ACK feedback and/or CSI feedback(s) based on one or more indications via DCIs(s). An uplink grant based on a DCI format may comprise/indicate a beta offset via a beta offset indicator field. For example, the DCI format may comprise a field of the beta offset indicator.

When the configuration parameters indicates/comprises the CG-UCI-onPUSCH as 'dynamic' and the wireless device may receive a second uplink grant based on a DCI format 0_0 (e.g., a fallback DCI format), the wireless device may determine/apply a HARQ-ACK beta offset ($\beta_{offset}^{HARQ-ACK}$) that is a first value of the one or more beta offset values configured via the configuration parameters.

When a PUSCH transmission is based on a configured grant configuration based on a type 2 PUSCH where the configured grant configuration may be activated based on a DCI format 0_0 (e.g., the fallback DCI format) and the CG-UCI-onPUSCH='dynamic', the wireless device may determine/apply a HARQ-ACK beta offset ($\beta_{offset}^{HARQ-ACK}$) that is a first value of the one or more beta offset values configured via the configuration parameters.

The wireless device may determine a HARQ-ACK beta offset value based on a beta offset indicator (e.g., the beta offset value) of the uplink grant when the uplink grant indicates/comprises the beta offset indicator field or a beta offset value. For example, a betaOffsetACKIndex1, a betaoffsetACK-Index2, and a betaOffsetACK-Index3 respectively provide indexes $I_{offset,0}^{HARQ\ ACK}$, $I_{offset,1}^{HARQ\ ACK}$ and $I_{offset,2}^{HARQ\ ACK}$ for the wireless device to use if the UE multiplexes up to 2 HARQ-ACK information bits, more than 2 and up to 11 HARQ-ACK information bits, and more than 11 bits in the PUSCH, respectively.

The wireless device may determine the betaOffsetACK-Index1, the betaoffsetACK-Index2, and the betaOffsetACK-Index3 based on a table shown in FIG. 35 and a HARQ-ACK beta offset value ($\beta_{offset}^{HARQ-ACK}$). A similar mechanism may be used for a CSI part 1 and a CSI part 2.)

A DCI format may comprise a beta offset indicator field with one bit or two bits. The configuration parameters may indicate up to four beta offset sets. For example, when the configuration parameters indicates two beta offset sets, one bit is used for the beta offset indicator field. When configuration parameters indicates four beta offset sets, two bits are used for the beta offset. A value of '0' or '00' may indicate a first beta offset set or a first offset index configured by the configuration parameters. A value '01' or '1' may indicate a second beta offset set or second offset index provided/configured by the configuration parameters.

One beta offset set may comprise values for {betaOffsetACK-Index1, betaOffsetACK-Index2, betaOffsetACK-Index3} and {betaOffsetCSI-Part1-Index1, betaOffsetCSI-Part1-Index2}. The wireless device may determine a HARQ-ACK beta offset from the beta offset set indicated by the uplink grant based on the DCI format in response to multiplexing a HARQ-ACK feedback. The wireless device may determine a CSI beta offset from the beta offset set indicated by the uplink grant based on the DCI format in response to multiplexing a CSI feedback.

FIG. 36 shows an example table for determining a beta offset set or a HARQ-ACK beta offset and a CSI beta offset. The beta offset indicator field may indicate a value for an index for a HARQ-ACK beta offset ($I_{offset}^{HARQ-ACK}$) or an index for a CSI beta offset ($I_{offset}^{CSI-1}$) for a CSI Part 1. The wireless device may determine the HARQ-ACK beta offset ($\beta_{offset}^{HARQ-ACK}$) based on the index ($I_{offset}^{HARQ-ACK}$), e.g., based on a table shown in FIG. 36.

The wireless device may determine a number of coded modulation symbols for a layer (e.g., Q'ACK, a number of resource elements) for a HARQ-ACK transmission via a PUSCH as follows. For example, the PUSCH may comprise/convey/carry a transport block.

$$Q'_{ACK} = \min\left\{ \left\lceil \frac{(O_{ACK} + L_{ACK}) \cdot \beta_{offset}^{PUSCH} \cdot \sum_{l=0}^{N_{symb,all}^{PUSCH}-1} M_{sc}^{UCI}(l0)}{\sum_{r=0}^{C_{UL-SCH}-1} K_r} \right\rceil, \right.$$

$$\left. \left\lceil \alpha \cdot \sum_{l=l_0}^{N_{symb,all}^{PUSCH}-1} M_{sc}^{UCI}(l) \right\rceil \right\}$$

For example, $O_{ACK}$ may represent a number of HARQ-ACK bits. If $O_{ACK} \geq 360$, $L_{ACK}=11$. Otherwise $L_{ACK}$ may represent a number of CRC bits for HARQ-ACK bits. For HARQ-ACK transmission, a beta offset for a PUSCH ($\beta_{offset}^{PUSCH}$) may be set to a HARQ-ACK beta offset (e.g., $\beta_{offset}^{PUSCH}=\beta_{offset}^{HARQ-ACK}$). $C_{UL-SCH}$ may be a number of code blocks for UL-SCH of the PUSCH transmission. For example, when a second uplink grant scheduling the PUSCH comprises a CBGTI field indicating that the wireless device may not transmit a r-th code block, then $K_r=0$. Otherwise, $K_r$ may represent the r-th code block size for UL-SCH of the PUSCH transmission. $M_{sc}^{PUSCH}$ may represent a scheduled bandwidth of the PUSCH transmission, expressed as a number of subcarriers. $M_{sc}^{PT-RS}(l)$ may represent a number of subcarriers in (OFDM) symbol l that carries PTRS, in the PUSCH transmission.

$M_{sc}^{UCI}(l)$ may represent a number of resource elements that may be used for transmission of UCI in a (OFDM) symbol l, for l=0, 1, 2, ..., $N_{symb,all}^{PUSCH}-1$, in the PUSCH transmission and $N_{symb,all}^{PUSCH}$ may represent a total number of (OFDM) symbols of the PUSCH, including all OFDM symbols used for DMRS. The total number of symbols of the PUSCH may be determined based on a nominal PUSCH even if an actual PUSCH, of the nominal PUSCH which is shorter than the nominal PUSCH, is transmitted by the wireless device. For a (OFDM) symbol that carries DMRS of the PUSCH, $M_{sc}^{UCI}(l)=0$. Otherwise, $M_{sc}^{UCI}(l)=M_{sc}^{PUSCH}-M_{sc}^{PT-RS}(l)$. The configuration parameters may configure/indicate/comprise a scaling parameter $\alpha$. $l_0$ may be a symbol index of the first (OFDM) symbol (e.g., an earliest symbol) that does not carry DMRS of the PUSCH, after the first DMRS symbol(s), in the PUSCH transmission.

Similar function may be used for determining a number of coded modulation symbols for a layer (e.g., Q'CSI, a number of resource elements) for a CSI transmission via a PUSCH.

The wireless device may determine a first beta offset for the one or more second PUSCHs. The wireless device may determine a number of resource elements of a resource for each PUSCH of the one or more second PUSCHs. The wireless device may map/multiplex an encoded bits of the UCI via he resource elements of the resource up to the number of the resource elements.

The wireless device may determine the first beta offset based on the beta offset and a number of symbols of a nominal PUSCH of the one or more second PUSCHs. The first beta offset may be a first HARQ-ACK beta offset if the UCI comprises HARQ-ACK feedback. The first beta offset may be a first CSI beta offset if the UCI comprises CSI feedback.

The wireless device may further determine the first beta offset based on a number of nominal PUSCHs of the one or more second PUSCHs. The first beta offset may be the beta offset divided (or multiplied) by the number of nominal PUSCHs.

The wireless device may further determine the first beta offset based on a number of TRPs that are associated with the one or more PUSCHs. The number of TRPs may be determined based on the UL grant scheduling the one or more PUSCHs, where at least one PUSCH scheduled by the UL grant may be associated with a first TRP and/or at least one PUSCH scheduled by the UL grant may be associated with a second TRP. The first beta offset may be the beta offset divided (or multiplied) by the number of TRPs.

The wireless device may further determine the first beta offset based on a number of TRPs that are associated with the PUCCH. The number of TRPs may be determined based on a DCI scheduling the PUCCH, where at least one PUCCH indicated by the DCI may be associated with a first TRP and/or at least one PUCCH indicated by the DCI may be associated with a second TRP. The first beta offset may be the beta offset divided (or multiplied) by the number of TRPs.

The wireless device may further determine a first beta offset of first PUSCH(s) of the one or more second PUSCHs based on the beta offset and a number of the first PUSCH(s). For example, the first PUSCH(s) may be scheduled via/associated with the first TRP. The first beta offset may be the beta offset divided (or multiplied) by the number of the first PUSCH(s). The wireless device may further determine a second beta offset of second PUSCH(s) of the one or more second PUSCHs based on the beta offset and a number of the second PUSCH(s). For example, the second PUSCH(s) may be scheduled via/associated with the second TRP. The second beta offset may be the beta offset divided (or multiplied) by the number of the second PUSCH(s).

Note that unless otherwise noted, a beta offset in the specification may refer a HARQ-ACK beta offset and/or a CSI HARQ-ACK offset (e.g., for CSI Part 1 or for CSI Part 2).

In an example, a base station may indicate a beta offset based on a reference number of (OFDM) symbols (e.g., 14 for a normal CP, 12 for an extended CP). The wireless device may determine a total number of (OFDM) symbols l of a PUSCH transmission. The wireless device may determine a first beta offset as the beta offset/(divided) (l/the reference number) (or the beta offset*(multiplied) (l/the reference number)). In an example, the wireless device may determine a total number of (OFDM) symbols l as the reference number. The wireless device may determine a first beta offset as the beta offset*(l/the reference number) or the beta offset/(l/the reference number).

In an example, a wireless device may be scheduled with a PUCCH repetition comprising a plurality of PUCCHs associated with a plurality of TRPs/panels/coreset pools/groups. The wireless device may be scheduled with a PUSCH repetition comprising a plurality of PUSCHs associated with the plurality of TRPs/panels/coreset pools/groups. The wireless device may determine one or more first PUSCHs overlapping with a first PUCCH of the plurality of PUCCHs, where the first PUCCH is scheduled via or associated with a first TRP/panel/coreset pool/group of the plurality of TRPs/panels/coreset pools/groups. The one or more first PUSCHs may be associated with the first TRP/panel/coreset pool/group.

The wireless device may determine one or more second PUSCHs overlapping with a second PUCCH of the plurality of PUCCHs, where the second PUCCH is scheduled via or associated with a second TRP/panel/coreset pool/group of the plurality of TRPs/panels/coreset pools/groups. The one or more second PUSCHs may be associated with the second TRP/panel/coreset pool/group.

The wireless device may receive a DCI scheduling the one or more first PUSCHs and the one or more second PUSCHs. For example, the DCI may schedule the PUSCH repetition. The wireless device may receive a configured grant configuration scheduling the one or more first PUSCHs and the one or more second PUSCHs. For example, the configured grant configuration may be used for scheduling/transmitting the PUSCH repetition.

In an example, the PUSCH repetition may be scheduled based on a TypeB repetition (e.g., TypeB repetition PUSCH mapping type, puschRep TypeB, PUSCHRep TypeIndicaorForDCIFormat0_1=puschRep TypeB). Based on the TypeB repetition, the wireless device may determine the plurality of PUSCHs via one or more slots. The wireless device may determine one or more first actual PUSCHs of the one or more first PUSCHs based on a slot boundary and/or unavailable (OFDM) symbols. The one or more first PUSCHs may be nominal PUSCH(s). For example, the wireless device may determine one or more second actual PUSCHs of the one or more second PUSCHs based on a slot boundary and/or unavailable symbols. The one or more second PUSCHs may be nominal PUSCH(s).

Figure 37:
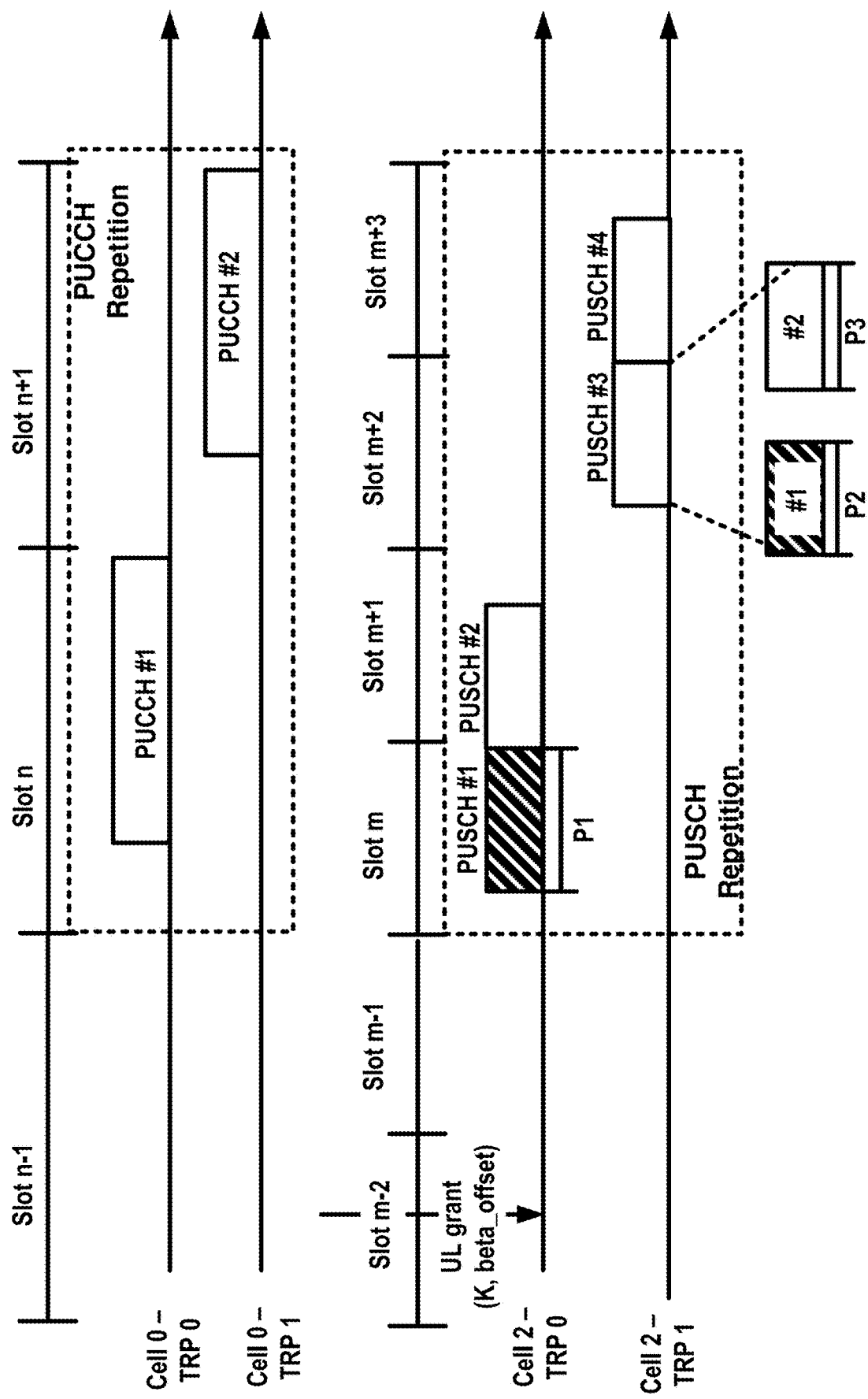
FIG. 37 illustrates an example repetition of a multiple TRPs/panels as per an aspect of an example embodiment of the present disclosure.

FIG. 37 illustrates an example UCI piggybacking with a TypeB PUSCH repetition as per an aspect of an example embodiment of the present disclosure. The wireless device may be configured with a first cell (Cell 0) and a second cell (Cell 1). The wireless device is scheduled with a PUCCH repetition comprising a first PUCCH (PUCCH #1) and a second PUCCH (PUCCH #2). The first PUCCH may be scheduled in a slot n and the second PUCCH may be scheduled in a slot n+1. The slot n and the slot n+1 may be determined based on a first numerology of the first cell/a first uplink carrier of the first cell. The wireless device is scheduled with a PUSCH repetition comprising a first PUSCH (PUSCH #1), a second PUSCH (PUSCH #2), a third PUSCH (PUSCH #3), and a fourth PUSCH (PUSCH #4).

The first PUSCH and the second PUSCH may be scheduled via the first TRP/first coreset pool/first panel/first group. An uplink signal may be scheduled via or associated with a TRP/coreset pool/panel/group in response to a spatial domain filter parameter of the uplink signal may be one of the TRP/coreset pool/panel/group. The third PUSCH and the fourth PUSCH may be scheduled via or associated with the second TRP/coreset pool/panel/group.

For example, the first PUSCH, the second PUSCH, the third PUSCH and the fourth PUSCH are nominal PUSCHs of the PUSCH repetition. For example, a number of (OFDM) symbols of a nominal PUSCH may be P1. The wireless device may determine one actual PUSCH for a first nominal PUSCH (PUSCH #1), one actual PUSCH for a second nominal PUSCH (PUSCH #2), and one actual PUSCH for a fourth nominal PUSCH (PUSCH #4).

The wireless device may determine two actual PUSCHs (e.g., a first actual PUSCH (#1) and a second actual PUSCH (#2) for a third nominal PUSCH (PUSCH #3). A first number of (OFDM) symbols of the first actual PUSCH is P2. A second number of (OFDM) symbols of the second actual PUSCH is P3.

In an example, the wireless device may receive an uplink grant at a slot m−2 indicating the PUSCH repetition. The uplink grant may comprise a number of repetition K (e.g., K=4) and a beta offset.

The wireless device may determine, to multiplex the first UCI, a third actual PUSCH of one or more actual PUSCHs of the one or more first PUSCHs overlapping with the first PUCCH. The third actual PUSCH may overlap with the first PUCCH. The third actual PUSCH may be an earliest actual PUSCH of the one or more actual PUSCHs. In FIG. 37, the first PUSCH that is an actual PUSCH and a nominal PUSCH may be determined as the third actual PUSCH. The wireless device may multiplex a first UCI of the first PUCCH via the third actual PUSCH. In FIG. 37, the third actual PUSCH for the first PUCCH may be the first PUCCH (PUCCH #1).

Similarly, the wireless device may determine, to multiplex the second UCI, a fourth PUSCH of one or more actual PUSCHs of the one or more second PUSCHs overlapping with the second PUCCH. In FIG. 37, the first actual PUSCH of the third PUSCH may be the fourth actual PUSCH. The wireless device may multiplex the second UCI via the first actual PUSCH of the third PUSCH (e.g., #1).

For example, the wireless device may determine a first actual PUSCH, associated with a first TRP, for multiplexing a first UCI of a PUCCH associated with the first TRP. The first actual PUSCH may overlap with the PUCCH and the first actual PUSCH may be an earliest actual PUSCH of one or more actual PUSCHs overlapping with the PUCCH and the one or more actual PUSCHs are associated with the first TRP. Similarly, the wireless device may determine a second actual PUSCH, associated with a second TRP, for multiplexing a first UCI of a PUCCH associated with the second TRP. The second actual PUSCH may overlap with the PUCCH and the second actual PUSCH may be an earliest actual PUSCH of one or more actual PUSCHs overlapping with the PUCCH and the one or more actual PUSCHs are associated with the second TRP.

The wireless device may determine a first beta offset for the third actual PUSCH based on a number of (OFDM) symbols of the third actual PUSCH and a second number of (OFDM) symbols of a nominal PUSCH of the PUSCH repetition. For example, the first beta offset may be the beta offset*(or /)P1/P1=the beta offset.

The wireless device may determine a second beta offset for the fourth actual PUSC based on a number of OFDM symbols of the fourth actual PUSCH and a second number of symbols of the nominal PUSCH. For example, the second beta offset may be the beta offset*(or /)P1/P2.

In an example, the wireless device may multiplex/piggyback the first UCI via one or more first actual PUSCHs overlapping with the first PUCCH. The wireless device may multiplex/piggyback the second UCI via one or more second actual PUSCHs overlapping with the second PUCCH.

Figure 38:
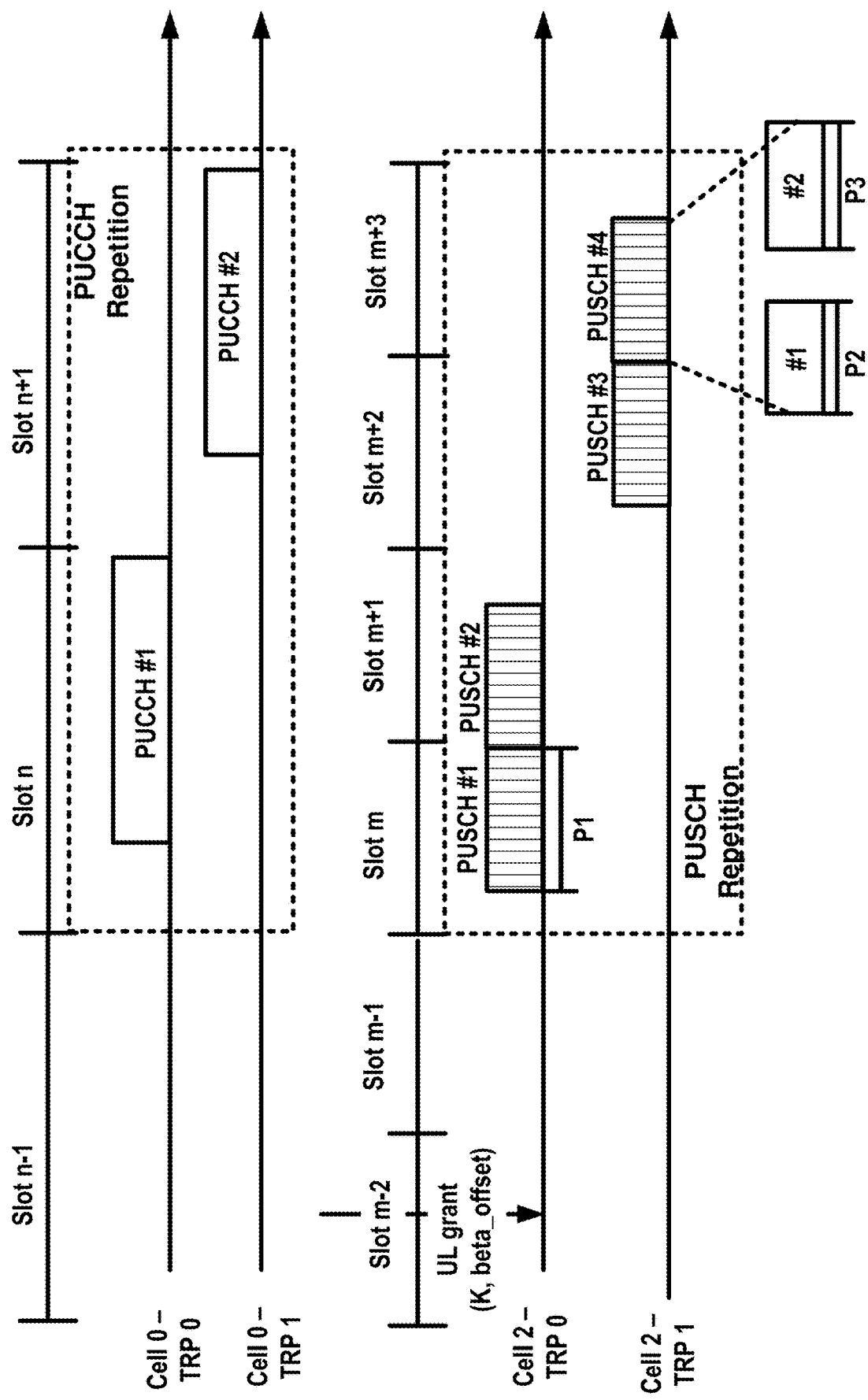
FIG. 38 illustrates an example repetition of a multiple TRPs/panels as per an aspect of an example embodiment of the present disclosure.

FIG. 38 illustrates an example diagram of an example embodiment an aspect of an example embodiment of the present disclosure. Similar to FIG. 37, the wireless device may be scheduled with a PUSCH repetition comprising four nominal PUSCHs. A fourth PUSCH may comprise two actual PUSCHs and other PUSCHs may comprise one actual PUSCH respectively.

The wireless device may determine to piggyback the first UCI via the first PUSCH and the second PUSCH. The wireless device may determine to piggyback the second UCI via the third PUSCH (PUSCH #3) and a first actual PUSCH (#1) of the fourth PUSCH (PUSCH #4). The wireless device may receive the uplink grant comprising a beta offset.

The wireless device may determine one or more first beta offsets based on the beta offset, a number of the one or more first actual PUSCHs (e.g., the first PUSCH, and the second PUSCH, PUSCH #1 and PUSCH #2), and a number of OFDM symbols of an actual PUSCH of the one or more first actual PUSCHs. For example, for a first beta offset for the first PUSCH (PUSCH #1) may be determined based on the beta offset, the number of the one or more first actual PUSCHs N1, and a number of symbols of the first PUSCH P1 (e.g., the first beta offset=the beta offset/(or *) N1/(or *) (a number of symbols of an actual PUSCH/a number of symbols of a nominal PUSCH).

For the fourth PUSCH, the wireless device may determine a fourth beta offset for the first actual PUSCH (#1) of the fourth PUSCH as the beta offset/(or *) N1 (e.g., N1=2)/(or *)P2/P1. The wireless device may piggyback the UCI via the second actual PUSCH of the fourth PUSCH. The wireless device may determine a fifth beta offset for the second actual PUSCH (#2) as the beta offset/(or *) N1 (e.g., N1=2)/(or *)P3/P1.

In an example, the wireless device may determine a beta offset of an actual PUSCH based on a beta offset indicated by an uplink grant, a reference number (e.g., N), and a number of OFDM symbols of a nominal PUSCH comprising the actual PUSCH. In an example, the wireless device may determine a beta offset of an actual PUSCH based on a beta offset indicated by an uplink grant, a reference number (e.g., N), and a number of OFDM symbols of the actual PUSCH and a number of OFDM symbols of a nominal PUSCH comprising the actual PUSCH. The N may be 1, 2 or 4. In an example, the wireless device may determine a beta offset of an actual PUSCH based on a beta offset indicated by an uplink grant, a number of repetition associated with a TRP, and a number of a nominal PUSCH comprising the actual PUSCH. The TRP may be associated with the first actual PUSCH. A PUSCH repetition may be associated with the TRP. The PUSCH repetition may be also associated with another TRP. The wireless device may determine the number of repetition of one or more PUSCHs of a plurality of PUSCHs of the PUSCH repetition, where the one or more PUSCHs are associated with the TRP and/or the one or more PUSCHs overlap with a PUCCH. The N may be 1, 2 or 4.

In an example, the reference number may be determined based on a DM-RS bundling size. For example, for the PUSCH repetition, a DM-RS bundling may be configured with a size M. The reference number may be M in this case.

In an example, a wireless device may receive, a first control message (e.g., a RRC, a DCI). The first control message may indicate a plurality of physical uplink control channels (PUCCHs). The wireless device may receive a second control message (e.g., a RRC, a DCI). The second control message may indicate a plurality of physical uplink shared channels (PUSCHs). The plurality of PUSCHs may comprise a repetition of a transport block. The second control message may indicate a first beta offset for multiplexing the UCI via a PUSCH of the plurality of PUSCHs. The plurality of PUSCHs may comprise a number of the repetition of the transport block. In response to the plurality of PUCCHs overlapping with the plurality of PUSCHs, the wireless device may generate, or map encoded bits of the UCI based on a second beta offset. The wireless device may determine the second beta offset based on the first beta offset and the number of repetitions. The wireless device may transmit the plurality of PUSCHs. The UCI and the transport block may be multiplexed/carried/piggybacked via each of the plurality of PUSCHs. The wireless device may drop the plurality of PUCCHs.

According to an example embodiment, the first control message may be a first downlink control information (DCI) comprising a PUCCH resource indicator (PRI). The PRI may indicate a frequency domain resource for the plurality of PUCCHs. The second control message may be a second DCI comprising a frequency domain resource assignment, indicating a frequency domain resource for the plurality of PUSCHs, and a first value indicating the first beta offset. The first beta offset may be one of a plurality of beta offsets configured for the wireless device. The wireless device may determine the second beta offset as the first beta offset multiplied (or divided) by the number of the repetition of the transport block. The wireless device may determine a number of actual repetition of the repetition of the transport block via the plurality of PUCCHs based on one or more not available symbols overlapping in time with resources of the plurality of PUSCHs. The wireless device may further determine the second beta offset based on the number of actual repetition of the transport block.

According to an example embodiment, the number of repetitions of the transport block may be a number of nominal PUSCHs of the plurality of PUSCHs. The second beta offset may be further based on the number of the nominal PUSCHs. The wireless device may determine the second offset as the first beta offset multiplied (or divided) by the number of nominal PUSCHs. The wireless device may determine a number of symbols of resources of the plurality of PUSCHs, where the symbols comprise uplink symbol(s). The wireless device may further determine the second beta offset based on the number of symbols.

According to an example embodiment, the wireless device may determine a first number of first nominal repetitions of the plurality of PUSCHs. The first nominal repetitions may be associated with a first transmission reception point (TRP). The wireless device may determine a second number of second nominal repetitions of the plurality of PUSCHs. The second nominal repetitions may be associated with a second TRP.

According to an example embodiment, the second beta offset may be further based on the first number of the first nominal repetitions and the second number of the second nominal repetitions. The second beta offset may be based on a larger number between the first number and the second number. The second beta offset may be based on a smaller number between the first number and the second number. The second beta offset may be based on the first number for the first nominal repetitions of the plurality of PUSCHs. The second beta offset may be based on the second number for the second nominal repetitions of the plurality of PUSCHs.

According to an example embodiment, the wireless device may transmit the first nominal repetitions via the first TRP. Each of the first nominal repetitions may comprise the UCI and the transport block. The wireless device may transmit the second nominal repetitions via the second TRP. Each of the second nominal repetitions comprises the UCI and the transport block.

According to an example embodiment, the wireless device may determine the second offset as the first beta offset divided (or multiplied) by the number of nominal PUSCHs. For example, the second beta offset may be further based on a number of repetition of the UCI via the plurality of PUCCHs. The wireless device may determine the second beta offset as the first beta offset multiplied (or divided) by the number of the repetition of the UCI.

According to an example embodiment, the wireless device may determine the second beta offset as the first beta offset multiplied (or divided) by the number of the repetition of the UCI and multiplied (or divided) by the repetition of the transport block. For example, the wireless device may determine the second beta offset as the first beta offset divided (or multiplied) by the number of the repetition of the UCI. For example, the wireless device may determine the second beta offset as the first beta offset divided (or multiplied) by the number of the repetition of the UCI and multiplied (or divided) by the repetition of the transport block.

According to an example embodiment, the wireless device may determine a third beta offset of a second PUSCH, overlapping with a PUCCH, based on a beta offset indicated by a DCI scheduling the second PUSCH in response to the PUCCH is not part of a PUCCH repetition. The PUCCH may be scheduled to be transmitted via a slot.

According to an example embodiment, the wireless device may multiplex a second UCI of the PUCCH via the second PUSCH. The second UCI may be scheduled via a single PUCCH of the PUCCH.

In an example, a wireless device may receive a first control message indicating a plurality of physical uplink control channels (PUCCHs). The plurality of PUCCHs may comprise a first PUCCH and a second PUCCH. The first PUCCH may be associated with a second TRP. The first PUCCH may be associated with a first TRP. The first PUCCH and the second PUCCH may transmit a repetition of a UCI. The wireless device may receive one or more second messages indicating a plurality of physical uplink shared channels (PUSCHs) and a beta offset. The plurality of PUSCHs may comprise one or more first PUSCHs associated with the first TRP and overlapping with the first PUCCH. The plurality of PUSCHs may comprise one or more second PUSCHs associated with the second TRP and overlapping with the second TRP. The wireless device may generate/map encoded bits of the UCI, via the one or more first PUSCHs, based on a first beta offset. The wireless device may determine the first beta offset on the beta offset and a number of the one or more first PUSCHs. The wireless device may generate or map encoded bits of the UCI, via the one or more second PUSCHs, based on a second beta offset. The wireless device may determine the second beta offset based on the beta offset and a number of the one or more second PUSCHs. The wireless device may transmit the plurality of PUSCHs and may drop the plurality of PUCCHs.

In an example, a wireless device may receive a first control message indicating a plurality of physical uplink control channels (PUCCHs) comprising a first PUCCH and a second PUCCH. The first PUCCH may be associated with a first TRP. The second PUCCH may be associated with a second TRP. The first TRP and the second TRP may transmit a repetition of a UCI. The wireless device may receive one or more second messages indicating a plurality of physical uplink shared channels (PUSCHs) and a beta offset. The plurality of PUSCHs may comprise one or more first PUSCHs associated with the first TRP and overlapping with the first PUCCH. The plurality of PUSCHs may comprise one or more second PUSCHs associated with the second TRP and overlapping with the second PUCCH.

The wireless device may generate or map encoded bits of the UCI, via the one or more first PUSCHs, based on a first beta offset. The wireless device may determine the first beta offset based on the beta offset and a number of the one or more first PUSCHs. The wireless device may generate or map encoded bits of the UCI, via the one or more second PUSCHs, based on a second beta offset. The wireless device may determine the second beta offset based on the beta offset and a number of the one or more second PUSCHs.

In an example, a wireless device may receive a first control message indicating a plurality of physical uplink control channels (PUCCHs) comprising a first PUCCH and a second PUCCH. The first PUCCH may be associated with a first TRP. The second PUCCH may be associated with a second TRP. The first TRP and the second TRP may transmit a repetition of a UCI. The wireless device may receive one or more second messages indicating a plurality of physical uplink shared channels (PUSCHs). The one or more nominal PUSCHs may overlap in time with the plurality of PUCCHs. The wireless device may determine to multiplex the UCI via a first a first actual PUSCH of a nominal PUSCH of the one or more PUSCHs based on the first actual PUSCH overlapping in time with the first PUCCH and the first actual PUSCH may be an earliest PUSCH, of the one or more PUSCHs, associated with the first TRP. The wireless device may determine to multiplex the UCI via a second actual PUSCH of a second nominal PUSCH of the one or more PUSCHs based on the second actual PUSCH overlapping in time with the second PUCCH and the second actual PUSCH is an earliest PUSCH, of the one or more PUSCHs, associated with the second TRP.

The wireless device may transmit the one or more nominal PUSCHs comprising the first actual PUSCH and the second actual PUSCH. The UCI may be multiplexed via the first actual PUSCH and the second actual PUSCH. The wireless device may drop the plurality of PUCCHs.

According to an example embodiment, the one or more second messages may be a second downlink control information (DCI) indicating a repetition of a transport block via the one or more PUSCHs. The second DCI may comprise a beta offset. The wireless device may determine a first beta offset for the first actual PUSCH based on the beta offset and a number of symbols of the first actual PUSCH and a number of symbols of the first nominal PUSCH. The wireless device may determine a second beta offset for the second actual PUSCH based on the beta offset and a number of symbols of the second actual PUSCH and a number of symbols of the second nominal PUSCH. The second nominal PUSCH may have a same number of symbols to the first nominal PUSCH. The wireless device may determine a first number of resource elements for multiplexing the UCI via the first actual PUSCH based on the first beta offset.

According to an example embodiment, the wireless device may map the UCI up to the first number of resource elements of a first resource of the first actual PUSCH. The wireless device may determine a second number of resource elements for multiplexing the UCI via the second actual PUSCH based on the second beta offset. The wireless device may map the UCI up to the second number of resource elements of a second resource of the second actual PUSCH.

In an example, a wireless device may receive a first downlink control information (DCI) indicating a plurality of physical uplink control channels (PUCCHs). The plurality of PUCCHs may comprise a repetition of an uplink control information (UCI). The wireless device may receive a second DCI. The second DCI may indicate a plurality of nominal physical uplink shared channels (PUSCHs). Each of the plurality of nominal PUSCHs may comprise one or more actual PUSCHs. The second DCI may indicate a first beta offset for multiplexing the UCI via a nominal PUSCH of the plurality of nominal PUSCHs. The second DCI may indicate a number of the plurality of nominal PUSCHs. In response to an actual PUSCH, of one or more actual PUSCHs of a nominal PUSCH of the plurality of PUSCHs, overlapping with the plurality of PUCCHs, the wireless device may map encoded bits of the UCI based on a second beta offset. The wireless device may determine the second beta offset based on a first number of symbols of the actual PUSCH and a second number of symbols of the nominal PUSCH. The wireless device may transmit actual PUSCH. The UCI and the transport block may be multiplexed via the actual PUSCH. The wireless device may drop the plurality of PUCCHs.

In an example, a wireless device may receive a first downlink control information (DCI) indicating one or more physical uplink control channels (PUCCHs). The plurality of PUCCHs may comprise a repetition of an uplink control information (UCI). The wireless device may receive a second DCI. The second DCI may indicate a plurality of nominal physical uplink shared channels (PUSCHs). Each of the plurality of nominal PUSCHs may comprise one or more actual PUSCHs. The second DCI may indicate a first beta offset for multiplexing the UCI via a nominal PUSCH of the plurality of nominal PUSCHs. The second DCI may indicate a number of the plurality of nominal PUSCHs. In response to an actual PUSCH, of one or more actual PUSCHs of a nominal PUSCH of the plurality of PUSCHs, overlapping with the one or more PUCCHs, the wireless device may map encoded bits of the UCI based on a second beta offset. The wireless device may determine the second beta offset based on a first number of symbols of the actual PUSCH and a second number of symbols of the nominal PUSCH. The wireless device may transmit actual PUSCH. The UCI and the transport block may be multiplexed via the actual PUSCH. The wireless device may drop the one or more PUCCHs.

In an example, a wireless device may receive a first downlink control information (DCI) indicating a plurality of physical uplink control channels (PUCCHs). The plurality of PUCCHs may comprise a repetition of an uplink control information (UCI). The wireless device may receive a second DCI. The second DCI may indicate a plurality of nominal physical uplink shared channels (PUSCHs). Each of the plurality of nominal PUSCHs may comprise one or more actual PUSCHs. The second DCI may indicate a first beta offset for multiplexing the UCI via a nominal PUSCH of the plurality of nominal PUSCHs. The second DCI may indicate a number of the plurality of nominal PUSCHs. In response to an actual PUSCH, of one or more actual PUSCHs of a nominal PUSCH of the plurality of PUSCHs, overlapping with the plurality of PUCCHs, the wireless device may map encoded bits of the UCI based on a second beta offset. The wireless device may determine the second beta offset based on a first number of symbols of the actual PUSCH and a reference number of symbols. The wireless device may transmit actual PUSCH. The UCI and the transport block may be multiplexed via the actual PUSCH. The wireless device may drop the plurality of PUCCHs.

According to an example embodiment, the reference number of symbols may be 14 based on a normal cyclic prefix. The reference number of symbols may be 12 based on an extended cyclic prefix.

What is claimed is:

1. A method comprising:
    transmitting, by a base station to a wireless device, a first message indicating physical uplink control channels (PUCCHs) for repetitions of uplink control information (UCI);
    transmitting a second message indicating:
        a number of repetitions of a transport block via physical uplink shared channels (PUSCHs); and
        a beta offset for multiplexing the UCI via a PUSCH of the PUSCHs; and
    receiving, based on a coding rate that has been determined based on the beta offset and the number of repetitions and in response to the PUCCHs overlapping with the PUSCHs in at least one symbol, the UCI and the transport block multiplexed in the PUSCHs.

2. The method of claim 1, wherein the first message is a first downlink control information (DCI) comprising a PUCCH resource indicator (PRI) indicating a frequency domain resource for the PUCCHs.

3. The method of claim 1, wherein the second message is a second DCI comprising a frequency domain resource assignment indicating a frequency domain resource of the PUSCH.

4. The method of claim 1, wherein the coding rate is further based on the beta offset being:
multiplied by the number of repetitions of the transport block; or
divided by the number of repetitions of the transport block.

5. The method of claim 1, wherein the coding rate is further based on a first number of repetitions of the UCI via the PUCCHs.

6. The method of claim 5, wherein the coding rate is further based on the beta offset being:
multiplied by the first number of repetitions of the UCI; or
divided by the first number of repetitions of the UCI.

7. The method of claim 5, wherein the coding rate is further based on the beta offset being multiplied by the number of repetitions of the transport block.

8. A base station comprising:
one or more processors; and
memory storing instructions that, when executed by the one or more processors, cause the base station to:
transmit, to a wireless device, a first message indicating physical uplink control channels (PUCCHs) for repetitions of uplink control information (UCI);
transmit a second message indicating:
a number of repetitions of a transport block via physical uplink shared channels (PUSCHs); and
a beta offset for multiplexing the UCI via a PUSCH of the PUSCHs; and
receive, based on a coding rate that has been determined based on the beta offset and the number of repetitions and in response to the PUCCHs overlapping with the PUSCHs in at least one symbol, the UCI and the transport block multiplexed in the PUSCHs.

9. The base station of claim 8, wherein the first message is a first downlink control information (DCI) comprising a PUCCH resource indicator (PRI) indicating a frequency domain resource for the PUCCHs.

10. The base station of claim 8, wherein the second message is a second DCI comprising a frequency domain resource assignment indicating a frequency domain resource of the PUSCH.

11. The base station of claim 8, wherein the coding rate is further based on the beta offset being:
multiplied by the number of repetitions of the transport block; or
divided by the number of repetitions of the transport block.

12. The base station of claim 8, wherein the coding rate is further based on a first number of repetitions of the UCI via the PUCCHs.

13. The base station of claim 12, wherein the coding rate is further based on the beta offset being:
multiplied by the first number of repetitions of the UCI; or
divided by the first number of repetitions of the UCI.

14. The base station of claim 12, wherein the coding rate is further based on the beta offset being multiplied by the number of repetitions of the transport block.

15. A non-transitory computer-readable medium comprising instructions that, when executed by one or more processors of a wireless device, cause the wireless device to:
receive a first message indicating physical uplink control channels (PUCCHs) for repetitions of uplink control information (UCI);
receive a second message indicating:
a number of repetitions of a transport block via physical uplink shared channels (PUSCHs); and
a beta offset for multiplexing the UCI via a PUSCH of the PUSCHs;
determine a coding rate based on the beta offset and the number of repetitions; and
transmit, based on the coding rate and in response to the PUCCHs overlapping with the PUSCHs in at least one symbol, the UCI and the transport block multiplexed in the PUSCHs.

16. The non-transitory computer-readable medium of claim 15, wherein:
the first message is a first downlink control information (DCI) comprising a PUCCH resource indicator (PRI) indicating a frequency domain resource for the PUCCHs; and
the second message is a second DCI comprising a frequency domain resource assignment indicating a frequency domain resource of the PUSCH.

17. The non-transitory computer-readable medium of claim 15, wherein the coding rate is further based on the beta offset being:
multiplied by the number of repetitions of the transport block; or
divided by the number of repetitions of the transport block.

18. The non-transitory computer-readable medium of claim 15, wherein the coding rate is further based on a first number of repetitions of the UCI via the PUCCHs.

19. The non-transitory computer-readable medium of claim 18, wherein the coding rate is further based on the beta offset being:
multiplied by the first number of repetitions of the UCI; or
divided by the first number of repetitions of the UCI.

20. The non-transitory computer-readable medium of claim 18, wherein the coding rate is further based on the beta offset being multiplied by the number of repetitions of the transport block.

* * * * *